US 6,684,651 B1

(12) United States Patent
Yoshizawa et al.

(10) Patent No.: US 6,684,651 B1
(45) Date of Patent: Feb. 3, 2004

(54) CHANNEL SELECTOR VALVE AND METHOD OF DRIVING THE SAME, COMPRESSOR WITH THE CHANNEL SELECTOR VALVE, AND DEVICE FOR CONTROLLING REFRIGERATING CYCLE

(75) Inventors: Yoshitaka Yoshizawa, Saitama (JP); Kenji Suzuki, Saitama (JP); Mitsuaki Noda, Saitama (JP); Shigeru Kubota, Saitama (JP); Tadashi Aoki, Tokyo (JP); Hiroshi Ito, Saitama (JP); Nobuyuki Kiuchi, Saitama (JP); Seiichi Nakahara, Saitama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 0 days.

(21) Appl. No.: 09/743,079

(22) PCT Filed: Jul. 1, 1999

(86) PCT No.: PCT/JP99/03557

§ 371 (c)(1),
(2), (4) Date: Jan. 2, 2001

(87) PCT Pub. No.: WO00/01990

PCT Pub. Date: Jan. 13, 2000

(30) Foreign Application Priority Data

| Jul. 2, 1998 | (JP) | 10-187835 |
| Oct. 30, 1998 | (JP) | 10-310635 |
| Dec. 28, 1998 | (JP) | 10-372440 |
| Jun. 28, 1999 | (JP) | 11-181366 |
| Jun. 29, 1999 | (JP) | 11-183418 |

(51) Int. Cl.$^7$ ............................. G12B 1/00; G05D 23/00
(52) U.S. Cl. .................. 62/160; 62/324.6; 137/625.43; 236/80 R
(58) Field of Search .................. 236/80 R, 80 F, 236/80 G; 62/160, 324.6; 137/625.43

(56) References Cited

U.S. PATENT DOCUMENTS

| 1,637,756 A | * | 8/1927 | Stickney et al. ....... 62/324.6 X |
| 2,381,651 A | * | 8/1945 | Dickews ................ 62/324.6 X |

(List continued on next page.)

FOREIGN PATENT DOCUMENTS

| JP | 55-75511 | 6/1980 |
| JP | 62-55032 | 4/1987 |

(List continued on next page.)

*Primary Examiner*—William Wayner
(74) *Attorney, Agent, or Firm*—Butzel Long

(57) ABSTRACT

Upon a selector operation of a valve such as a four-way selector valve provided in a refrigerating cycle for selecting a channel of fluid, prevention of environmental pollution and energy saving and the like are effectively achieved. A sliding valve is coupled with a piston in a housing of a channel selector valve provided in a refrigerating cycle and the sliding valve moves due to a difference in pressure and so on at both sides of the piston, thereby a channel of fluid is selected. A processing section of a control device is constituted with microcomputers of an indoor and outdoor control sections, while a detecting section of the control device includes temperature sensor, detection means for detecting pressure, detection means for detecting flow rate, detection means for detecting voltage/current, and detection means for detecting frequency. Driving sections of an electrically-driven expansion valve, an indoor heat exchanger, an outdoor heat exchanger and a compressor are means that function in response to execution of control programs so that physical quantity, such as pressure, differential pressure and flow rate in the channel selector valve provided in the refrigerating cycle, and a rate of change in physical quantity, such as a rate of change in pressure, a rate of change in differential pressure and a rate of change in flow rate, are controlled, thereby a channel of the fluid is selected by the channel selector valve.

52 Claims, 62 Drawing Sheets

U.S. PATENT DOCUMENTS

| | | | | |
|---|---|---|---|---|
| 2,534,031 A | * | 12/1950 | Kollsman | 62/324.6 X |
| 3,371,502 A | * | 3/1968 | Heidorn | 62/234 |
| 4,055,056 A | * | 10/1977 | Perkins | 62/324.6 |
| 4,577,472 A | * | 3/1986 | Pandeya et al. | 62/324.6 |
| 4,598,559 A | * | 7/1986 | Tomayko et al. | 62/324.6 |
| 5,156,016 A | * | 10/1992 | Day | 236/80 R |
| 5,931,011 A | * | 8/1999 | Shima et al. | 62/228.1 X |

FOREIGN PATENT DOCUMENTS

| | | | | |
|---|---|---|---|---|
| JP | 62-124454 | | 8/1987 | |
| JP | 402263070 | * | 10/1990 | 62/324.6 |
| JP | 8-61800 | | 3/1996 | |
| JP | 8-285113 | | 11/1996 | |

* cited by examiner

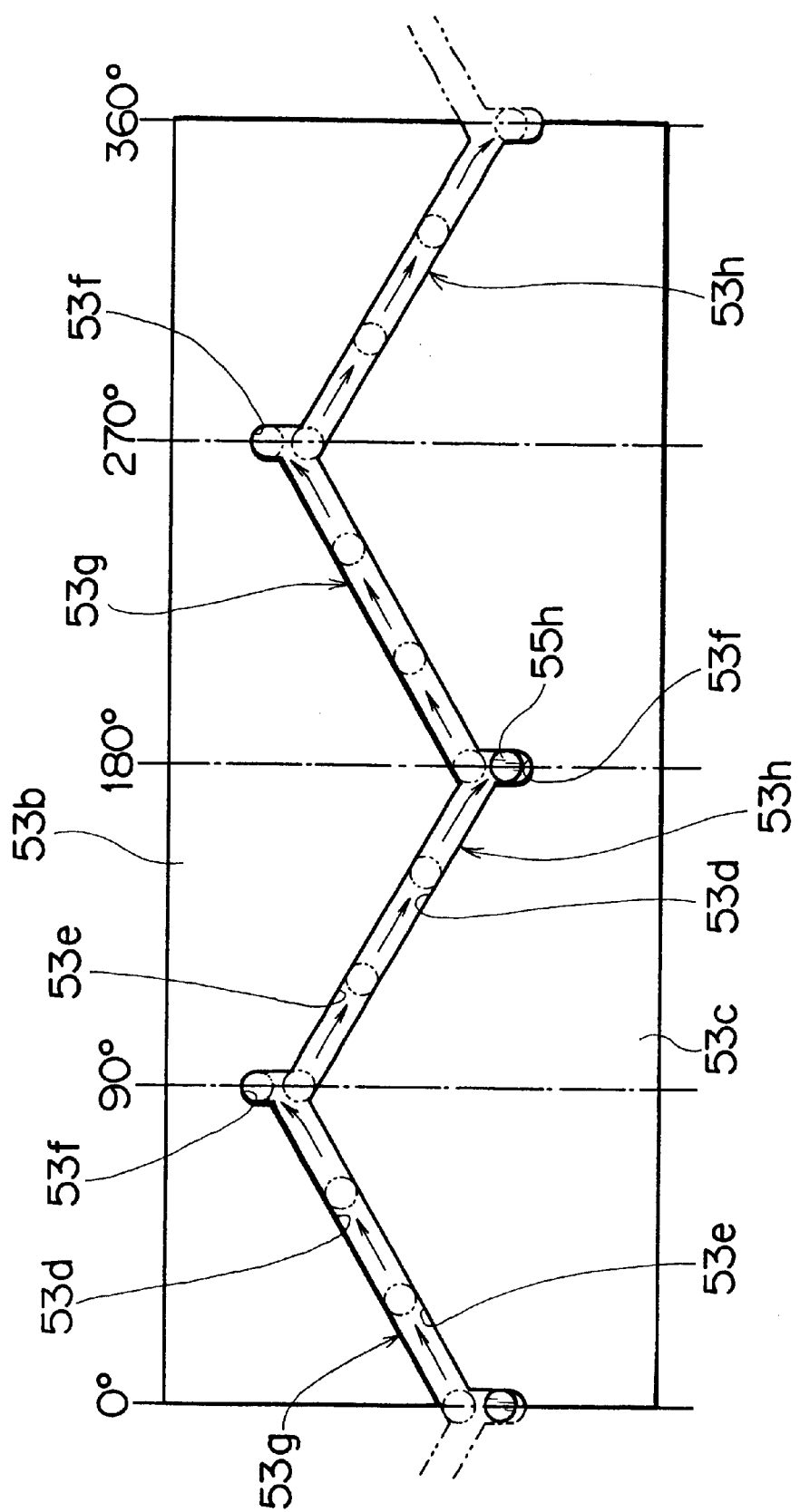
F I G. 44

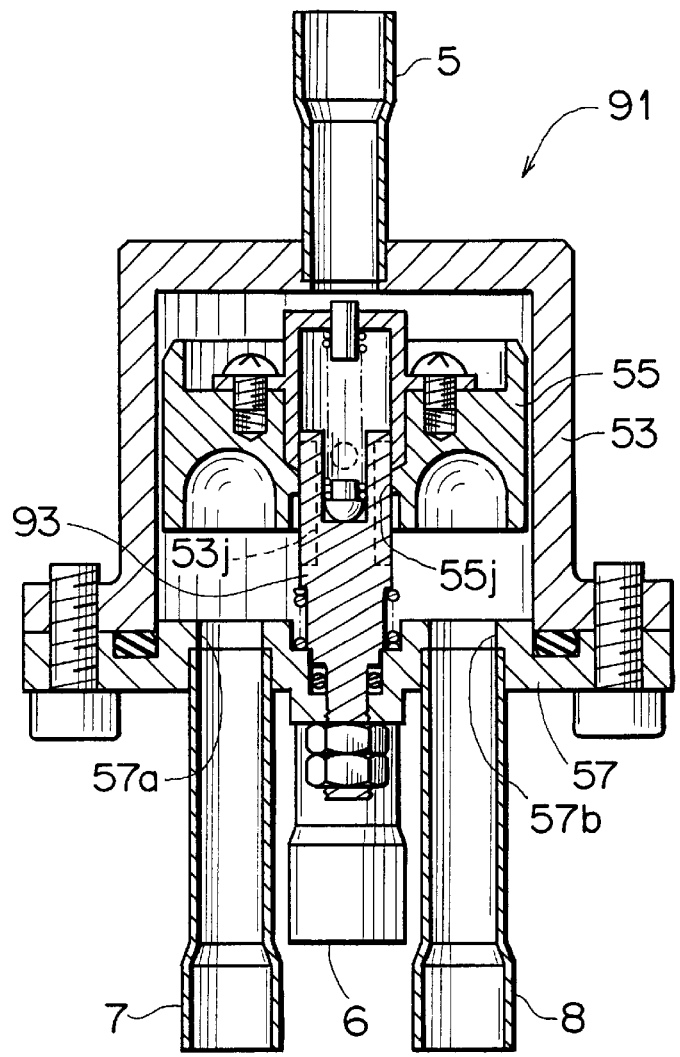
F I G. 5 4
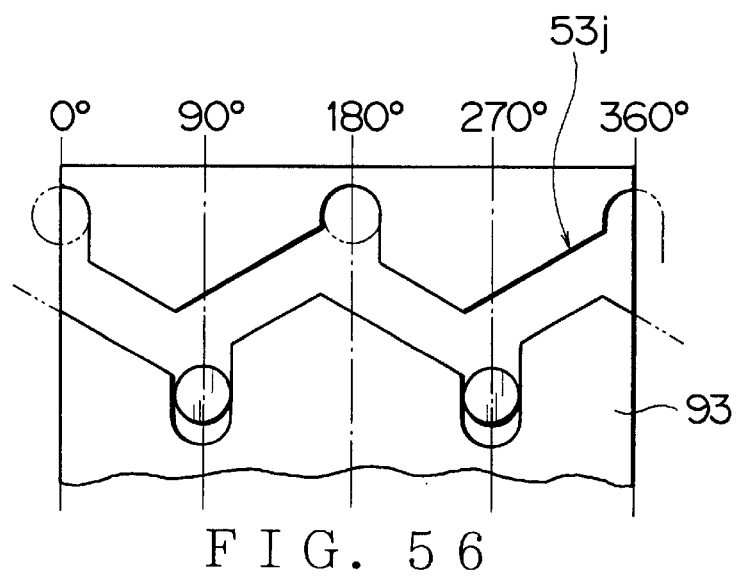
F I G. 5 6

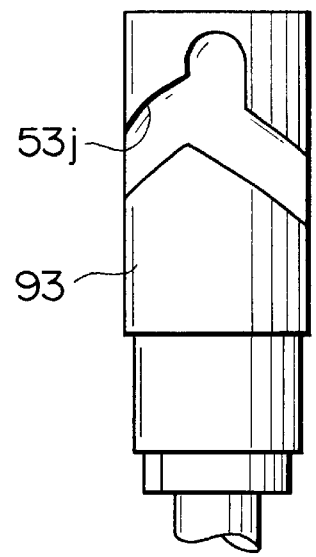
F I G. 5 5
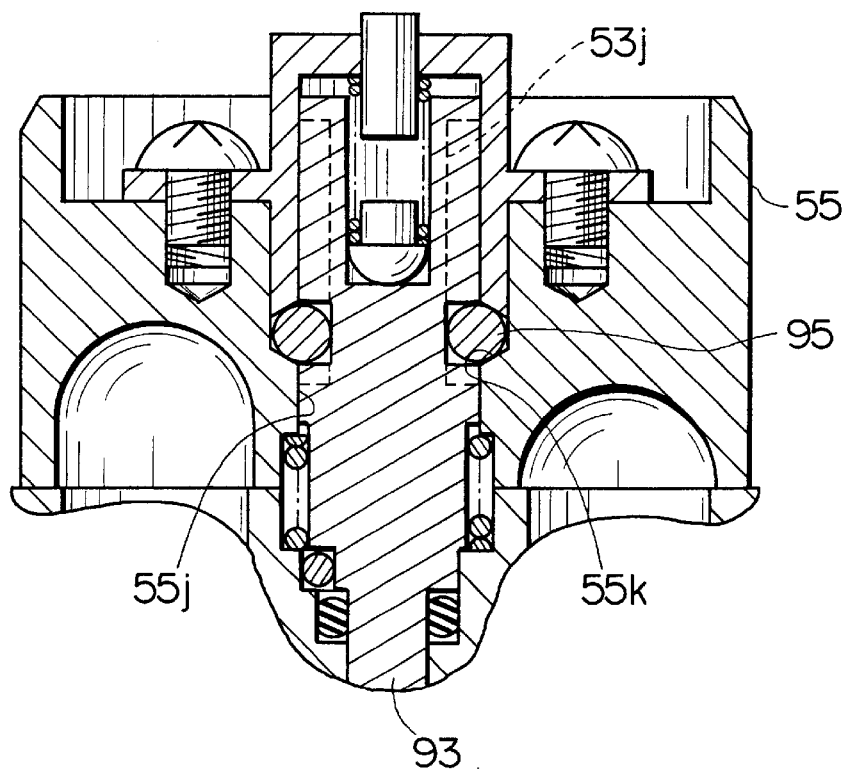
F I G. 5 7

CHANNEL SELECTOR VALVE AND METHOD OF DRIVING THE SAME, COMPRESSOR WITH THE CHANNEL SELECTOR VALVE, AND DEVICE FOR CONTROLLING REFRIGERATING CYCLE

TECHNICAL FIELD

The present invention relates to a channel selector valve and, more specifically, to a channel selector valve, which is used to reverse channels for fluid discharged from a compressor and for fluid sucked into the compressor, and to a device for controlling a refrigerating cycle.

BACKGROUND ART

In general, as to an air conditioner for both cooling and heating, a four-way selector valve selects a circulating direction of a refrigerant in such a manner that upon cooling the refrigerant flows from a compressor, by way of an outdoor heat exchanger, a throttle valve and an indoor heat exchanger, then flows back to the compressor, and that upon heating the refrigerant flows from a compressor, by way of an indoor heat exchanger, a throttle valve and an outdoor heat exchanger, then flows back to the compressor.

The four-way selector valve, used for selecting a circulating direction of a refrigerant in a refrigerating cycle described above, includes the so-called sliding-type four-way selector valve.

As to the sliding-type four-way selector valve, a valve element is moved inside the valve housing so that one port, communicating with an inlet through a space formed inside the valve element, is switched from a first port to a second port out of the two ports and simultaneously that another port, communicating with an outlet through a space formed outside the valve element, is switched from the second port to the first port out of the two ports.

As disclosed, for example, in Japanese Patent Publication No. S35-12689 and Japanese Utility Model Publication No. S55-53825, as to a conventional four-way selector valve, a magnet coil formed outside of the valve housing is provided with electricity so as to selectively decompress either valve chamber between two valve chambers disposed at both sides of a central valve chamber, out of three valve chambers in the valve housing, then the valve element placed in the central valve chamber is slided due to the differential pressure generated between the decompressed valve chamber and the central valve chamber.

In Japanese Patent Publication No. H7-99296, there is disclosed a five-way valve, in which a valve element in a valve chamber is slided with the aid of a plunger of a magnet coil inserted in a valve housing, with supplying electricity to the magnet coil disposed outside the valve housing.

As a conventional art similar to the above four or five-way valve, in Japanese Utility Model Laid-Open No. S58-42465, there is disclosed a four-way selector valve, in which with supplying electricity to heaters in operation chambers formed both sides of a valve housing, two operation rods, each inserted from the respective operation chamber into the valve housing, are alternately slided so that a valve element in the valve housing is slided. Every conventional four or five-way valve mentioned above needs electricity to be supplied to a magnet coil upon selecting by the valve, consequently, there has been a room for improvement in these valves from the viewpoints of prevention of the environmental pollution and energy saving.

Besides the four or five-way valves, for example, in Japanese Utility Model Laid-Open No. H3-119689, there is disclosed a four-way selector valve, in which wax thermoelements are disposed at both sides of a valve housing instead of a magnet coil, and with supplying electricity to heaters of the wax thermoelements, a valve element in the valve housing is slided with the aid of a shaft, inserted from the outside of the valve housing into the inside thereof.

In Japanese Patent No. 2757997, there is disclosed a four-way selector valve, in which a pair of differential pressure chambers partitioned by partition wall plates is formed at respective sides of a valve chamber in a valve housing so that each differential pressure chamber can selectively communicate with the valve chamber by switching a substitute valve formed on the respective partition wall plate, and a constant-temperature heater of each slow operation element disposed at both sides of the valve housing is supplied with electricity so that each operation shaft inserted from the respective side of the valve housing into the respective differential pressure chamber is slided. In this four-way selector valve, the constant-temperature heater of each slow operation element is supplied with electricity so as to slide each operation shaft and to open either substitute valve, thereby both partition wall plates slide within the valve housing together with the valve element in such a manner that the partition wall plates move nearer to the opened substitute valve.

Each conventional four-way selector valve mentioned above does not employ a magnet coil, however, needs electricity to be supplied to the heaters in order to operate the switching valve, consequently, there has been a room for improvement in these valves similarly to the aforementioned conventional four or five-way valve.

On the other hand, as to a four-way selector valve disclosed in Japanese Patent Publication No. H7-43188, although a valve element is slided by supplying electricity to a magnet coil, a permanent magnet attracts the slided valve element so that a position of the valve element after supplying electricity is maintained, thereby saving a further supply of electricity to the magnet coil, then only a tentative electrical supply is performed to another magnet coil for demagnetization when the valve element is moved from the slided position back to an original position before the slide.

As to a four-way selector valve disclosed in Japanese Patent Application Laid-Open No. H9-72633, a position of a valve element after slide is maintained by an intermittent electrical supply to a magnet coil, in the four-way selector valve that is similar to one described in Japanese Patent Publication No. S35-12689.

Since each four-way selector valve, disclosed in Japanese Patent Publication No. H7-43188 or Japanese Patent Application Laid-Open No. H9-72633, does not need a continuous electrical supply to the magnet coil, it has some effect from the viewpoints of prevention of the environmental pollution and energy saving.

Certainly, the four-way selector valve, disclosed in Japanese Patent Publication No. H7-43188 or Japanese Patent Application Laid-Open No. H9-72633, restricts an amount of electrical supply to the magnet coil, however, it still needs some amount of electrical supply. Therefore, from the viewpoints of a vigorous promotion with respect to prevention of the environmental pollution and energy saving, there has been a room for further improvement in the valves described above.

Therefore, as to a selecting operation of a channel selector valve for fluid, such as a four-way selector valve, which is provided in a refrigerating cycle, it is an objective of the present invention to solve the above problems and to provide a channel selector valve that can effectively contribute for prevention of the environmental pollution and energy saving, a method of driving the channel selector valve, a compressor that works excellently with using the channel selector valve, and a device for controlling a refrigerating cycle.

DISCLOSURE OF INVENTION

In order to attain the above objective, embodiments of the present invention relate to a channel selector valve, a method of driving the channel selector valve, a compressor with the channel selector valve, and a device for controlling a refrigerating cycle.

The present invention provides a channel selector valve for selecting a channel of fluid characterized in that the channel is selected by employing non-electric motive power generated when a control section controls a physical quantity of the fluid.

According to one embodiment of the present invention a drive source provided separately from the channel selector valve generates non-electric motive power, by which the channel is passively selected.

According to another embodiment of the present invention the drive source comprises at least one of element components in a refrigerating cycle having a channel selector valve and the channel is passively selected by using the motive power generated by said at least one of the element components.

According to a further embodiment of the present invention the motive power is generated due to a change in physical quantity, which arises in the refrigerating cycle from an action of said at least one of the element components.

According to a further embodiment of the present invention the change in physical quantity is at least one change among changes in pressure, differential pressure and flow rate of fluid in the channel selector valve, said changes arising from an action of said at least one of the element components.

The present invention further provides a channel selector valve comprising: a movable member moving between a first position and a second position in a housing of the channel selector valve; and driving means for driving the movable member between the first position and the second position by employing non-electric motive power generated when a control section controls a physical quantity of the fluid, wherein a first selector port out of two selector ports of the housing communicates with a main port of the housing through the interior of the housing when the movable member is situated at the first position, while a second selector port out of the two selector ports of the housing communicates with a main port of the housing through the interior of the housing when the movable member is situated at the second position.

According to one embodiment of the present invention a drive source generating a non-electric motive power comprises at least one of element components in a refrigerating cycle having the channel selector valve, a change in physical quantity, which arises in the refrigerating cycle from an action of said at least one of element components, is employed as at least a part of said motive power, thereby the channel is passively selected.

According to a further embodiment of the present invention the change in physical quantity is at least one change among changes in pressure, differential pressure and flow rate of fluid in the channel selector valve, said changes arising from an action of said at least one of the element components.

The present invention further provides a channel selector valve constituted as a four-way selector valve by combining first and second three-way selector valves, each of which is constituted by a channel selector valve.

According to one embodiment of the present invention the channel selector valve is constituted as a four-way selector valve by the first and second three-way selector valves in which, the main port of the first three-way selector valve is an inlet port formed in the housing, through which fluid introduced from the exterior to the interior of the housing of the first three-way selector valve passes, while the main port of the second three-way selector valve is an outlet port formed in the housing, through which the fluid discharged from the interior to the exterior of the housing of the second three-way selector valve passes, the first selector port of the first three-way selector valve is connected to the second selector port of the second three-way selector valve, while the second selector port of the first three-way selector valve is connected to the first selector port of the second three-way selector valve, the movable member of the second three-way selector valve moves to the second position when the movable member of the first three-way selector valve moves to the first position, while the movable member of the second three-way selector valve moves to the first position when the movable member of the first three-way selector valve moves to the second position.

According to another embodiment of the present invention the driving means of a first three-way selector valve comprises:

a first drive mechanism that moves the movable member situated at the first position of the first three-way selector valve to the second position when a difference between a fluid pressure at the first selector port in the first three-way selector valve and a fluid pressure at the second selector port cancels out; and a second drive mechanism that moves the movable member situated at the second position of the first three-way selector valve to the first position when a difference between a fluid pressure at the first selector port in the first three-way selector valve and a fluid pressure at the second selector port cancels out.

According to a further embodiment of the present invention first and second three-way selector valves are constructed so that the main port is isolated from the second selector port when a movable member is situated between a first position and a third position where it is nearer to a second position than the first position, while that the main port is isolated from the first selector port when the movable member is situated between the second position and a fourth position where is between the second position and the third position, a first drive mechanism comprises first storing means for storing energizing force to move the movable member of the first three-way selector valve from the first position to the fourth position, by a fluid pressure being higher than a first predetermined value of the main port, when the movable member of the first three-way selector valve is situated at the first position, said energizing force being less than the first predetermined value, and a second drive mechanism comprises second storing means for storing energizing force to move the movable member of the first three-way selector valve from the second position to the third position, by a fluid pressure being higher than a second predetermined value of the main port, when the movable member of the first three-way selector valve is situated at the second position, said energizing force being less than the second predetermined value.

According to a further embodiment of the present invention a main port is an inlet port formed in the housing, through which fluid introduced from the exterior to the interior of the housing passes, the housing further comprises an outlet port, through which the fluid discharged from the interior to the exterior of the housing passes, when a movable member is situated at a first position, an inlet port and a first selector port are communicated with each other inside the housing, while an outlet port and a second selector port are communicated with each other inside the housing, when the movable member is situated at a second position, the inlet port and the second selector port are communicated with each other inside the housing, while the outlet port and the first selector port are communicated with each other inside the housing.

According to another embodiment of the present invention a movable member partitions the interior of the housing into a first and second pressure chambers and also forms first and second spaces in the first pressure chamber, an inlet port is formed in the housing so as to communicate with the first space and an outlet port is formed in the housing so as to communicate with the second space, when the movable member is situated at a first position, fluid introduced from the exterior of the housing into the first space by way of the inlet port is discharged to a first selector port, while the fluid discharged from the second space to the exterior of the housing by way of the outlet port is introduced from a second selector port, when the movable member is situated at a second position, the fluid introduced from the exterior of the housing into the first space by way of the inlet port is discharged to the second selector port, while the fluid discharged from the second space to the exterior of the housing by way of the outlet port is introduced from the first selector port.

The present invention further provides a method of driving a channel selector valve as described above which comprises the steps of:

communicating the first space to the second pressure chamber through an equalizing path formed in the movable member;

energizing the movable member in a direction of moving from the second position to the first position by energizing means for energizing; and applying a force to the movable member from the first pressure chamber side by fluid introduced from the exterior of the housing into the first space by way of the inlet port, said force being stronger than a resultant force consisting of an energizing force by said energizing means and a force applied to the movable member by fluid in the second pressure chamber introduced from the first space by way of said equalizing path, thereby the movable member moves from the first position to the second position.

According to a further embodiment of the present invention a housing has a valve seat disposed in a first pressure chamber, an outlet port and two selector ports are disposed on a valve seat, a second space moves on the valve seat responding to a movement of a movable member moving between first and second positions, and a place with which the outlet port communicates by way of the second space is selected to be either the first selector port or the second selector port.

The present invention further provides a method of driving a channel selector valve as described above which comprises the steps of:

communicating a first space to a second pressure chamber through an equalizing path formed in a movable member;

energizing the movable member in a direction of moving from a second position to a first position by energizing means for energizing; and applying a force to the movable member from a first pressure chamber side by fluid introduced from the exterior of the housing into the first space by way of an inlet port, said force being stronger than a resultant force consisting of an energizing force by said energizing means, a force applied to the movable member by fluid in the second pressure chamber introduced from the first space by way of an equalizing path, and a static friction force between a valve seat and the movable member, whereby the movable member moves from the first position to the second position and the movable member is kept staying at the second position by the static friction force between the valve seat and the movable member against an energizing force of the energizing means, after a difference between a pressure of fluid in the first space and that in the second pressure chamber decreases due to circulation of fluid between the first space and the second pressure chamber through the equalizing path.

According to another embodiment of the present invention the driving means comprises:

a third drive mechanism that moves a movable member from one position out of a first and second positions toward an opposite position; and a fourth drive mechanism that moves the movable member from the opposite position toward the one position, wherein the third and fourth drive mechanisms employ a change in physical quantity of the interior of the housing due to fluid introduced into the interior of the housing at least as a part of the motive power.

According to a further embodiment of the present invention the channel selector valve includes a movable member that partitions the interior of the housing into a first pressure chamber, a second pressure chamber, and a third pressure chamber situated so that the first pressure chamber is sandwiched between the second and third pressure chambers, the channel selector valve further comprises a non-electrically-driven pilot valve that selectively communicates an outlet port to either the second pressure chamber or the third pressure chamber, said pilot valve comprises:

a second housing having a second main port that is provided outside the housing and communicates with the outlet port; and a selector valve element that partitions the interior of a second housing into a fourth pressure chamber communicating with the third pressure chamber and a fifth pressure chamber communicating with the second pressure chamber, and that is movable in the second housing between a fifth position where the second main port communicates with the fourth pressure chamber and a sixth position where the second main port communicates with the fifth pressure chamber, due to a difference between a pressure of fluid in the second pressure chamber and that in the third pressure chamber.

According to another embodiment, the present invention further comprises second driving means to move a selector valve element from one position out of fifth and sixth positions to an opposite position when the difference between a pressure of fluid in a second pressure chamber and that in a third pressure chamber cancels out.

According to a still further embodiment of the present invention a movable member has a first equalizing path communicating a first space to a second pressure chamber and a second equalizing path communicating the first space to a third pressure chamber, the movable member has a first subvalve that isolates the third pressure chamber from a fourth pressure chamber when the movable member is situated at a first position and that communicates the third pressure chamber to the fourth pressure chamber when the movable member is situated at a second position, and has a second subvalve that communicates the second pressure chamber to a fifth pressure chamber when the movable member is situated at the first position and that isolates the second pressure chamber from the fifth pressure chamber when the movable member is situated at the second position, a pilot valve communicates a second main port to the fourth pressure chamber when the selector valve element is situated between a fifth position and a seventh position located nearer to a sixth position than the fifth position, and communicates the second main port to the fifth pressure chamber when the selector valve element is situated between the sixth position and an eighth position located between the sixth position and the seventh position, and a second driving means has third and fourth storing means for storing energizing force, the third storing means for storing energizing force stores an energizing force, which is less than a third predetermined value, to move the selector valve element from the fifth position to the eighth position due to a fluid pressure in the fifth pressure chamber exceeding the third predetermined value when the selector valve element is situated at the fifth position, and the fourth storing means for storing energizing force stores an energizing force, which is less than a fourth predetermined value, to move the selector valve element from the sixth position to the seventh position due to a fluid pressure in the fourth pressure chamber exceeding the fourth predetermined value when the selector valve element is situated at the sixth position.

According to a yet further embodiment, the present invention comprises:

a third main port communicating with an inlet port is further formed in a second housing, the third main port communicates with a fifth pressure chamber when the selector valve element is situated between the fifth and seventh positions and communicates with a fourth pressure chamber when the selector valve element is situated between sixth and eighth positions, and the channel selector valve further comprises second driving means for moving the selector valve element either from the fifth position to the eighth position or from the sixth position to the seventh position when the difference between a pressure of fluid in a second pressure chamber and that in a third pressure chamber cancels out.

According to another embodiment of the present invention in which the second driving means has third and fourth storing means for storing energizing force, the third storing means for storing energizing force stores an energizing force, which is less than a third predetermined value, to move the selector valve element from a fifth position to an eighth position due to a fluid pressure in a fifth pressure chamber exceeding a third predetermined value when the selector valve element is situated at a fifth position, and the fourth storing means for storing energizing force stores an energizing force, which is less than a fourth predetermined value, to move the selector valve element from a sixth position to a seventh position due to a fluid pressure in a fourth pressure chamber exceeding the fourth predetermined value when the selector valve element is situated at the sixth position.

According to a further embodiment of the present invention the driving means comprises:

a third drive mechanism to move a movable member from one position out of first and second positions to an opposite position; and a fourth drive mechanism to move the movable member from the opposite position to the one position, wherein one drive mechanism out of third and fourth drive mechanisms employs a change in physical quantity of the interior of the housing due to fluid introduced into the interior of the housing at least as a part of the motive power, while an opposite drive mechanism employs an energizing force that is applied to the movable member by energizing means received in the interior of the housing at least as a part of the motive power.

A still further embodiment of the present invention comprises a latch mechanism that selectively controls a movement of a movable member from one position out of first and second positions toward an opposite position.

According to a further embodiment of the present invention a latch mechanism selectively performs a first and second states, in the first state, a movement of a movable member to an opposite position by a driving means is controlled at a first position, and in the second state, a movement of the movable member from the one position to the opposite position by the driving means is allowed.

According to another embodiment of the present invention a latch mechanism comprises a latch piece that moves in the housing following a movement of a movable member between first and second positions, and in a first state of the latch mechanism, a movement of the latch piece is controlled, thereby a movement of the movable member is controlled at the one position.

The present invention further provides a method of driving a channel selector valve wherein when a movable member, a movement of which to an opposite position is controlled by a latch mechanism and situated at one position, is moved to an opposite position, the movable member is once moved by a driving means in a direction of moving from the opposite position to the one position, then is moved from the one position to the opposite position, and when the movable member situated at the opposite position is moved to the one position, the movable member is once moved by the driving means in a direction of moving from the one position to the opposite position, then is moved from the opposite position to the one position.

According to another embodiment of the present invention the channel selector valve further comprises:

a valve-opening member that moves from a valve-closing position to a valve-opening position by the motive power while a third drive mechanism generates the motive power;

a pilot path that is opened from a valve closing state thereof by the valve-opening member moved from the valve-closing position to the valve-opening position;

an attenuation mechanism acting when the pilot path is open, which attenuates the motive power generated by a fourth drive mechanism so as to prevent the movable member from moving from the opposite position to the one position; and a second latch mechanism to selectively control a movement of the valve-opening member from the valve-closing position to the valve-opening position.

According to a further embodiment of the present invention as described in a second latch mechanism alternately repeats a third and fourth states, in the third state, a movement of the valve-opening member to a valve-opening position is controlled at a valve-closing position, and in the fourth state, a movement of the valve-opening member from the valve-closing position to the valve-opening position is allowed.

The present invention further provides a method of driving a channel selector valve as described above wherein when a movable member situated at one position is moved to an opposite position, a generation of the motive power by a third drive mechanism is once halted, then the generation thereof by the third drive mechanism is started again and then, the motive power generated by the third drive mechanism is maintained to be a predetermined value exceeding the motive power, which is generated by the fourth drive mechanism and attenuated by the attenuation mechanism, and when the movable member situated at the opposite position is moved to the one position, a generation of the motive power by the third drive mechanism is halted, then the movable member is moved from the opposite position to the one position by the fourth drive mechanism.

According to a still further embodiment of the present invention a driving means comprises a communication pipe that always communicates a second pressure chamber to a first selector port outside the housing.

According to a yet further embodiment of the present invention a driving means comprises a state-holding mechanism to hold a movable member, which is moved from a first position to a second position, at the second position.

According to a further embodiment of the present invention a state-holding mechanism comprises:

a state-holding selector valve provided in a second pressure chamber, which by a selecting action of a second selector valve element selects either a first state or a second state, in said first state the second pressure chamber communicates with the exterior of the housing through a first introducing port and in said second state the second pressure chamber communicates with the exterior of the housing through a second introducing port; and energizing means for energizing the selector valve, which energizes the second selector valve element so that the state-holding selector valve in the second state selects the first state, a movable member allows the energizing means for energizing the selector valve to energize the second selector valve element when the movable member is situated at a first position, while the movable member makes the second selector valve element act a selection so that the state-holding selector valve selects the second state against an energizing by the energizing means for energizing the selector valve when the movable member is situated at a second position.

According to a further embodiment of the present invention an energizing means energizes a movable member in a direction of moving from a second position to a first position, and a pressure of fluid, which is introduced from the exterior of the housing into a first space by way of an inlet port, acts on the movable member in a direction of moving from the first position to the second position.

The present invention also provides a method of driving a channel selector valve as described above wherein when a movable member moves from a first position to a second position, a pressure of fluid introduced into a first space from the exterior of the housing by way of an inlet port is set higher than a predetermined value, so that a force, which is applied to the movable member by fluid existing in the first space in a direction from the first position to the second position, is set stronger than a force, which is applied to the movable member by fluid existing in the place to which a second pressure chamber is communicated in a direction from the second position to the first position, after the movable member has moved from the first position to the second position, a pressure of fluid existing in the first space and a pressure of fluid existing in the second pressure chamber are set so that the movable member is kept staying at the second position.

According to another embodiment of the present invention the element component described above is an electrically-driven expansion valve provided in the refrigerating cycle and the change in physical quantity is a change in pressure of fluid due to a change in an opening ratio of the electrically-driven expansion valve.

According to a further embodiment of the present invention the element component described above is a compressor provided in the refrigerating cycle and the change in physical quantity is a change in a frequency of a mechanical oscillation generated by the compressor.

According to a still further embodiment of the present invention the element component described above is a heat exchanger provided in the refrigerating cycle and the change in physical quantity is a change in pressure of fluid due to a change in the amount of heat exchange by the heat exchanger.

According to a further embodiment of the present invention the housing is cylindrical, at least two selector ports are formed at a valve seat situated at one end of the housing in a direction of a central axis of the housing, a movable member is constructed by a main valve element, which is received in the housing and rotative around the central axis, the main valve element is provided with communication means for selectively communicating a selector port out of the two selector ports to the main port, the main valve element rotates and displaces around the central axis so as to move between first and second positions, when the main valve element is situated at the first position, a first selector port out of the two selector ports is communicated to the main port by the communication means, and when the main valve element is situated at the second position, a second selector port out of the two selector ports is communicated to the main port by the communication means.

According to a still further embodiment of the present invention at least one port out of an inlet port and an outlet port is formed at a valve seat, an end surface of a main valve element in a direction of a central axis sits down on the valve seat, said end surface is provided with second communication means for selectively communicating said one port to a first selector port out of the two selector ports, when the main valve element is situated at the first position, the second communication means communicates the second selector port to said one port, and when the main valve element is situated at the second position, the second communication means communicates the first selector port to said one port.

According to a yet further embodiment of the present invention an opposite port is formed at an opposite end of the housing in a direction of the central axis, and a communication means has a communication channel that communicates one end surface side of a main valve element to an opposite end surface side of the main valve element in the interior of the housing.

According to a still further embodiment, the present invention further comprises conversion means for converting a moving direction, which converts a movement of a main valve element in a direction of a central axis with respect to the housing into a movement in a rotational direction around the central axis, wherein the main valve element is movable in a direction of the central axis in the interior of the housing, and a driving means makes the main valve element have a reciprocating motion in a direction of the central axis with respect to the housing.

According to one embodiment of the present invention a conversion means for converting a moving direction comprises:

a cam groove that is provided in one of a main valve element and a housing, and extends over a whole circumference of a rotational direction; and a cam follower pin that is provided in another out of the main valve element and the housing, and moves in a cam groove, the cam groove has a first and second cam grooves continuing with each other in the rotational direction, said first cam groove is formed inclined so as to part from the valve seat in a direction of the central axis as being displaced in the rotational direction, while said second cam groove is formed inclined so as to move nearer to the valve seat in a direction of the central axis as being displaced in the rotational direction.

According to another embodiment of the present invention a cam groove is provided in the housing, the housing comprises an outer housing and an inner housing received in the outer housing, the inner housing comprises a first half and a second half divided in a direction of the central axis in a state that the inner housing is received in the outer housing, and each guide, which constitutes the cam groove in a state that an end of the first half and an end of the second half are joined with each other, is formed at the respective ends of the first and second halves.

According to another embodiment of the present invention at least one port out of an inlet port and an outlet port is formed at the valve seat, second communication means is formed at an end surface of a main valve element, the end surface faces the valve seat, said second communication means selectively communicates the opposite port to a first selector port out of two selector ports in a state that the end surface sits down on the valve seat, when the main valve element is situated at a first position, the second selector port is communicated to the opposite port by the second communication means of the main valve element, and the end surface of which sits down on the valve seat, and when the main valve element is situated at a second position, the first selector port is communicated to the opposite port by the second communication means of the main valve element, and the end surface of which sits down on the valve seat.

According to a still further embodiment of the present invention in which the opposite port is formed at an opposite end side of the housing in a direction of the central axis, and the communication means comprises:

a communication channel that communicates one end surface side of the main valve element to an opposite end surface side of the main valve element in the housing;

a subvalve that opens and closes the communication channel;

subvalve energizing means for energizing the subvalve toward a direction of closing; and valve opening means for opening the subvalve against an energizing force by the subvalve energizing means in a state that the one end surface of the main valve element sits down on the valve seat.

According to a still further embodiment of the present invention the housing is disposed so that the opposite end of the housing is situated lower than one end of the housing in a direction of the central axis, and a driving means employs an own weight of a main valve element at least as a part of the motive power.

According to a yet further embodiment of the present invention a driving means employs an energizing force by energizing means for energizing a main valve element, which energizes the main valve element to part from a valve seat in a direction of a central axis, as a part of the motive power.

According to another embodiment of the present invention a driving means comprises second energizing means for energizing a main valve element, which energizes the main valve element to move nearer to a valve seat in a direction of a central axis.

According to a further embodiment of the present invention a driving means comprises energizing means for energizing a main valve element, which energizes the main valve element to part from a valve seat in a direction of a central axis, due to a resultant force of an energizing force by a energizing means for energizing the main valve element and an energizing force by a second energizing means for energizing the main valve element, a cam follower pin is situated at an intermediate position of a cam groove except end portions of one end side and an opposite end side of the housing in a direction of the central axis, and the main valve element is situated at a neutral position halfway within a reciprocating motion in a direction of the central axis when the cam follower pin is situated at the intermediate position.

According to a further embodiment of the present invention an end portion of one end side of the housing in a direction of a central axis a cam groove is provided with a groove that continues to a join, at which one end of a first cam groove being situated at the one end side of the housing is connected to one end of a second cam groove, the groove is formed so that one end surface of the main valve element sits down on a valve seat in a state that the cam follower pin is situated at the groove, the groove is disposed being displaced to a lower course than the join in the rotational direction, and when the main valve element moves in the direction away from the valve seat in a direction of the central axis, a movement of the cam follower pin is controlled from the groove to a cam groove out of the first and second cam grooves, which is situated at the upper course than the groove in the rotational direction.

According to another embodiment of the present invention an end portion of an opposite end side of a housing in a direction of a central axis out of a cam groove is provided with a second groove that continues to a join, at which an opposite end of a first cam groove being situated at the opposite end side of the housing is connected to an opposite end of the second cam groove, the second groove is formed so that a main valve element is the farthest away from a valve seat in a state that the cam follower pin is situated at the second groove, the second groove is disposed being displaced to the lower course than a second join in the rotational direction, and when the main valve element moves in the direction nearer to the valve seat in a direction of the central axis, a movement of the cam follower pin is controlled from the second groove to a cam groove out of the first and second cam grooves, which is situated at the upper course than the second groove in the rotational direction.

According to another embodiment of the present invention slide means for decreasing a sliding resistance between the housing and a main valve element is provided therebetween.

The present invention further provides a compressor with a channel selector valve as described above comprises:

a compressor housing having an inlet, which is connected to the outlet port;

a low pressure chamber that is provided in the interior of the compressor housing and communicates with the inlet;

a high pressure chamber that is provided in the interior of the compressor housing and partitioned off from the low pressure chamber; and a compressing section that is provided in the interior of the compressor housing, compresses fluid introduced into the low pressure chamber from the inlet, and guides the fluid into the high pressure chamber, wherein a part of the compressor housing partitioning the high pressure housing therein is integrally formed with a part of the housing having the inlet port therein, thereby the interior of the part of the housing communicates with the high pressure chamber.

The present invention further provides a device for controlling a refrigerating cycle which controls a channel selector valve communicated to the refrigerating cycle, characterized in that:

the device controls at least one of a plurality of functional components communicated to the refrigerating cycle so as to control the refrigerating cycle; and the device controls the channel selector valve by controlling the functional components.

The present invention further provides a device for controlling a refrigerating cycle which controls a channel selector valve communicated to the refrigerating cycle, characterized in that:

the device controls at least one of a plurality of functional components communicated to the refrigerating cycle so as to control the refrigerating cycle; and the device generates a non-electrical motive power by controlling the functional components and passively controls the channel selector valve by employing the motive power.

The present invention further provides a device for controlling a refrigerating cycle which controls a channel selector valve communicated to the refrigerating cycle, comprising:

a microcomputer that controls at least one of a plurality of functional components communicated to the refrigerating cycle so as to control the refrigerating cycle; and a control program, by which the microcomputer performs a processing that controls the functional components so as to generate a non-electrical motive power for passively controlling the channel selector valve.

The present invention also provides a device for controlling a refrigerating cycle which controls a channel selector valve communicated to the refrigerating cycle, characterized in that:

the device controls at least one of a plurality of functional components communicated to the refrigerating cycle so as to control the refrigerating cycle;

the non-electrical motive power generated by controlling the functional components is a physical quantity or a rate of change in a physical quantity generated by the refrigerating cycle; and the device passively controls the channel selector valve by the physical quantity or the rate of change in a physical quantity.

The present invention also provides a device for controlling a refrigerating cycle which controls a channel selector valve communicated to the refrigerating cycle, comprising:

a microcomputer that controls at least one of a plurality of functional components communicated to the refrigerating cycle so as to control the refrigerating cycle; and a control program, by which the microcomputer performs a processing that controls the functional components so as to allow the refrigerating cycle to generate a physical quantity or a rate of change in a physical quantity as a non-electrical motive power for passively controlling the channel selector valve.

The present invention further provides a device for controlling a refrigerating cycle wherein a physical quantity, which is a base for controlling functional components to generate the non-electrical motive power, is a parameter selected from the group consisting of a pressure, temperature, rate of flow, voltage, current, electrical frequency and mechanical oscillation frequency with respect to a control of the refrigerating cycle.

The present invention further provides a device for controlling a refrigerating cycle wherein a physical quantity, which is the non-electrical motive power and is generated by the refrigerating cycle, is a pressure, differential pressure or rate of flow with respect to fluid existing in the channel selector valve, and the rate of change in a physical quantity, which is the non-electrical motive power and is generated by the refrigerating cycle, is a rate of change in pressure, rate of change in differential pressure or rate of change in rate of flow with respect to the fluid.

The present invention further provides a device for controlling a refrigerating cycle which controls a channel selector valve communicated to the refrigerating cycle, comprising a control section that receives input signals sent from an operation command section for commanding an operational condition of the refrigerating cycle and a physical quantity detector section for detecting a physical quantity generated by the refrigerating cycle, wherein the control section sends output signals to a driving section that drives a drive source of at least one of a plurality of functional components communicated to the refrigerating cycle so as to control said functional component, and the device generates a non-electrical motive power by controlling the refrigerating cycle and passively controls the channel selector valve by the motive power.

The present invention also provides a device for controlling a refrigerating cycle wherein a control section controls at least one of a plurality of functional components communicated to the refrigerating cycle so as to start an operation of the refrigerating cycle, thereby controlling a channel selector valve in a state corresponding to the start of an operation, which is commanded by the operation command section.

The present invention also provides a device for controlling a refrigerating cycle wherein a control section starts to operate a compressor communicated to the refrigerating cycle in a direction of inverse rotation when the control section decides to select a channel selector valve on the basis of a command of the operation command section.

The present invention also provides a device for controlling a refrigerating cycle wherein a control section controls at least one of a plurality of functional components communicated to the refrigerating cycle so as to operate the refrigerating cycle, thereby controlling a channel selector valve in a state corresponding to the operation, which is commanded by the operation command section.

The present invention further provides a device for controlling a refrigerating cycle wherein a control section controls at least one of a plurality of functional components communicated to the refrigerating cycle so as to halt an operation of the refrigerating cycle, thereby controlling a channel selector valve in a state corresponding to the halt of the operation, which is commanded by the operation command section.

The present invention further provides a device for controlling a refrigerating cycle wherein a channel selector valve is constructed in a manner that a movable member moves so as to select a channel, and the control section comprises at least one unit selected from the group consisting of: a memory unit for memorizing position data of the movable member of the channel selector valve; a comparison unit and a judge unit for comparing and judging, respectively, the position data and operation command data; and a learning unit learning on the basis of physical quantity data by a control of functional components and control data of a channel selector valve.

The present invention also provides a device for controlling a refrigerating cycle wherein a control section receives input signals, performs a predetermined processing and judges whether a channel is to be changed or not to be changed by a channel selector valve, then confirms a position on the basis of present position data, then sends the output signals to a driving section so as to control the functional components in the refrigerating cycle, then receives new input signals after a predetermined period of time, confirms a position of a movable member, and sets position data of said position as new present position data when said position is changed to a new position.

The present invention also provides a device for controlling a refrigerating cycle wherein a control section confirms a position of a movable member by at least one temperature detection means for detecting temperature, at least one pressure detection means for detecting pressure, at least one magnetism detection means for detecting magnetism, at least one current detection means for detecting current or a combination thereof after a predetermined period of time, and then installs position data corresponding to said position into a memory unit of the control section.

The present invention further provides a device for controlling a refrigerating cycle which controls a channel selector valve that is communicated to a refrigerating cycle and selects a channel by a movement of a movable member, which device comprises:

a microcomputer that controls at least one of a plurality of functional components communicated to the refrigerating cycle so as to control the refrigerating cycle; and a control program, by which the microcomputer performs a processing consisting of the steps of:

receiving input signals;

confirming a position by taking out present position data of a movable member installed in a memory unit;

carrying out an operation to decide whether the movable member is to be moved of not to be moved, comparing, and judging;

selecting and deciding a driving section;

outputting drive signals to the driving section selected and decided;

judging a position of the movable member by input signals after a predetermined period of time, with or without moving a position of the movable member by a physical quantity generated by at least one functional component that is selected and decided in said step of selecting and deciding or a rate of the physical quantity; and installing position data of a position of the movable member into the memory unit when said position is changed to a new position, in order to control the driving section for driving the functional component so that the position of the movable member is to be moved or not to be moved.

The present invention further provides a device for controlling a refrigerating cycle which controls a channel selector valve communicated to the refrigerating cycle, which device comprises:

a control section that receives input signals sent from an operation command section for commanding an operation state of the refrigerating cycle and from a physical quantity detector section for detecting a physical quantity generated by the refrigerating cycle, wherein the control section sends output signals to a driving section that drives a drive source of at least one of a plurality of functional components communicated to the refrigerating cycle so as to control said functional component and to control the refrigerating cycle, and when judging to select a channel by using the channel selector valve on the basis of a command of the operation command section, the control section sends output signals to a driving section for driving a power source of a compressor so as to start an operation of the compressor of the refrigerating cycle and starts an operation of the refrigerant cycle so as to generate a motive power exceeding a first predetermined motive power, thereby a channel selector valve is passively controlled.

The present invention further provides a device for controlling a refrigerating cycle which controls a channel selector valve communicated to the refrigerating cycle, which device comprises:

a control section that receives input signals sent from an operation command section for commanding an operation state of the refrigerating cycle and from a physical quantity detector section for detecting a physical quantity generated by the refrigerating cycle, wherein the control section sends output signals to a driving section that drives a drive source of at least one of a plurality of functional components communicated to the refrigerating cycle so as to control said functional component and to control the refrigerating cycle, and when judging to select a channel by using the channel selector valve on the basis of a command of the operation command section, the control section sends output signals to a driving section for driving a power source of a compressor so as to start an operation of the compressor in a direction of inverse rotation and starts an operation of the refrigerant cycle so as to generate a motive power exceeding a third predetermined motive power, thereby a channel selector valve is passively controlled.

The present invention also provides a device for controlling a refrigerating cycle as described above wherein a channel selector valve selects a channel by moving a movable member between first and second positions in response to an internal motive power, a control section memorizes position data corresponding to the first or second position of the movable member in a memory unit thereof, the control section starts an operation of the refrigerating cycle when the position data indicates the second or first position, halts the operation of the refrigerating cycle with renewing position data in a memory unit to the first or second position, respectively, after a first predetermined period of time, and keeps the operation of the refrigerating cycle standby during a third predetermined period of time.

The present invention further provides a device for controlling a refrigerating cycle as described above wherein the control section operates a compressor in a specific frequency immediately after starting the operation of the compressor and starts an operation of the refrigerating cycle so that a motive power exceeding a first predetermined motive power is generated as an internal motive power of the channel selector valve.

The present invention also provides a device for controlling a refrigerating cycle as described above wherein the control section starts an operation of the compressor with a first predetermined capacity.

The present invention further provides a device for controlling a refrigerating cycle as described above wherein the control section starts an operation of the compressor with a second predetermined capacity so that a motive power lower than a first predetermined motive power is generated as an internal motive power of the channel selector valve, then operates the refrigerating cycle for a fourth predetermined period of time, then halts the operation of the refrigerating cycle for a fifth predetermined period of time, and then starts an operation of the compressor with a first predetermined capacity so that a motive power exceeding a first predetermined motive power is generated as an internal motive power of the channel selector valve.

The present invention also provides a device for controlling a refrigerating cycle as described above wherein the control section sends output signals to a throttle device driving section so that an opening ratio of a throttle device of the refrigerating cycle is almost fully opened or almost fully closed.

The present invention also provides a device for controlling a refrigerating cycle as described above wherein the control section sends output signals to a heat exchanger motor driving section so that a heat exchanger motor of the refrigerating cycle is kept halted.

The present invention also provides a device for controlling a refrigerating cycle as described above wherein once the control section starts an operation of the compressor, the control section sends output signals to the compressor driving section after a first predetermined period of time and drives the power source of the compressor so that a motive power exceeding a second predetermined motive power is generated, thereby operating the refrigerating cycle.

The present invention further provides a device for controlling a refrigerating cycle as described above wherein once the control section starts an operation of the compressor, the control section sends output signals to the throttle device driving section so as to set the opening ratio of the throttle device a predetermined opening ratio after a first predetermined period of time.

The present invention further provides a device for controlling a refrigerating cycle as described above wherein once the control section starts an operation of the compressor, the control section sends output signals to the heat exchanger motor driving section after a second predetermined period of time so as to start an operation of the heat exchanger motor, sends output signals to the compressor driving section so as to generate a motive power lower than a first predetermined motive power, and drives the power source of the compressor so as to generate a motive power exceeding a second predetermined motive power, thereby operating the refrigerating cycle.

The present invention also provides a device for controlling a refrigerating cycle as described above wherein when the control section performs a predetermined processing and judges to select a channel by the channel selector valve or to halt an operation of the refrigerating cycle, the control section sends output signals to the compressor driving section: to drive the power source of the compressor with a third predetermined capacity so as to generate a motive power lower than a second predetermined motive power; or to halt the operation of the compressor, thereby halting the operation of the refrigerating cycle.

The present invention also provides a device for controlling a refrigerating cycle as described above wherein when the control section performs a predetermined processing and judges to select a channel by the channel selector valve or to halt an operation of the refrigerating cycle, the control section sends output signals to the compressor driving section to halt the operation of the compressor, then keeps the refrigerating cycle standby for a third predetermined period of time, then sends output signals to the compressor driving section to start the operation of the compressor, then renews position data in a memory unit to a first or second position after a first predetermined period of time, thereby halting the operation of the compressor again.

The present invention further provides a device for controlling a refrigerating cycle as described above wherein when positional data memorized by a memory unit of the control section indicate a first or second position, the control section starts an operation of the refrigerating cycle so that a motive power exceeding a first predetermined motive power is generated as an internal motive power of the channel selector valve.

The present invention also provides a device for controlling a channel selector valve communicating with a refrigerating cycle, which device comprises:

a control section that receives input signals sent from an operation command section for commanding an operation state of the refrigerating cycle and from a physical quantity detector section for detecting a -physical quantity generated by the refrigerating cycle, wherein the control section sends output signals to a driving section that drives a drive source of at least one of a plurality of functional components communicated to the refrigerating cycle so as to control said functional component and to control the refrigerating cycle, and when judging not to select a channel by using the channel selector valve on the basis of a command of the operation command section, the control section sends output signals to a driving section for driving a power source of a compressor so as to start an operation of the compressor of the refrigerating cycle and starts an operation of the refrigerant cycle so as to generate a motive power lower than a first predetermined motive power, thereby a channel selector valve is passively controlled.

The present invention further provides a device for controlling a refrigerating cycle as described above wherein the control section starts an operation of the compressor with a second predetermined capacity.

The present invention also provides a device for controlling a refrigerating cycle which controls a channel selector valve communicated to the refrigerating cycle, the device comprising:

a control section that receives input signals sent from an operation command section for commanding an operation state of the refrigerating cycle and from a physical quantity detector section for detecting a physical quantity generated by the refrigerating cycle, wherein the control section sends output signals to a driving section that drives a drive source of at least one of a plurality of functional components communicated to the refrigerating cycle so as to control said functional component and to control the refrigerating cycle, and when judging not to select a channel by using the channel selector valve on the basis of a command of the operation command section, the control section sends output signals to a driving section for driving a power source of a compressor so as to start an operation of the compressor of the refrigerating cycle and starts an operation of the refrigerant cycle so as to generate a motive power exceeding a first predetermined motive power, thereby the channel selector valve is passively controlled.

The present invention also provides a device for controlling a refrigerating cycle as described above wherein when the control section performs a predetermined processing and judges to halt an operation of the refrigerating cycle, the control section sends output signals to the compressor driving section so as to halt the operation of the compressor, then keeps the refrigerating cycle standby for a third predetermined period of time without renewing position data in a memory unit.

According to a channel selector valve of the present invention a channel selection of fluid by the channel selector valve is performed by employing non-electric motive power generated when a control section controls a physical quantity of the fluid.

According to one embodiment of channel selector valve of the present invention a channel selection of fluid by the channel selector valve is passively performed using motive power generated by a non-electrically-driven drive source provided separately from the channel selector valve.

According to another channel selector valve of the present invention at least one of element components in a refrigerating cycle having the channel selector valve generates a motive power, by which a channel selection of fluid by the channel selector valve is passively performed.

According to another channel selector valve of the present invention a change in physical quantity generated in a refrigerating cycle due to an action of at least one element component in the refrigerating cycle constitutes at least a part of a motive power that is used for a channel selection of fluid by the channel selector valve.

According to a further embodiment of a channel selector valve of the present invention when at least one change among changes in pressure, differential pressure and flow rate of fluid in the channel selector valve arising from an action of an element component in the refrigerating cycle takes place, the change as a change in a physical quantity arising in the refrigerating cycle is used for a selection of a channel by the channel selector valve.

According to a further embodiment of a channel selector valve of the present invention a selection of a place where a main port formed in the housing is communicated to through the interior of the housing between two selector ports is achieved by moving a movable member between the first and second positions by driving means that uses non-electric motive power generated when a control section controls a physical quantity of the fluid.

According to another embodiment of the channel selector valve of the present invention a motive power, which is used for selecting a channel of fluid by a channel selector valve, includes a change in a physical quantity generated due to an action of at least one of element components in a refrigerating cycle, thereby a channel selection of the fluid is passively performed by using the motive power.

According to another embodiment of a channel selector valve of the present invention when at least one change among changes in pressure, differential pressure and flow rate of fluid in the channel selector valve, which is generated by an action of at least one element component in the refrigerating cycle, takes place, the change as a change in physical quantity generated in the refrigerating cycle is used for a selection of a channel by the channel selector valve.

According to another embodiment of a channel selector valve of the present invention the channel selector valve is constructed as a four-way selector valve.

According to a further embodiment of a channel selector valve of the present invention a first selector port of a first three-way selector valve is connected to a second selector port of a second three-way selector valve, while a second selector port of the first three-way selector valve is connected to a first selector port of the second three-way selector valve, a main port of the first three-way selector valve is an inlet port formed in the housing, through which fluid introduced from the exterior to the interior of the housing of the first three-way selector valve passes, while a main port of the second three-way selector valve is an outlet port formed in the housing, through which the fluid discharged from the interior to the exterior of the housing of the second three-way selector valve passes, then, a movable member of the second three-way selector valve moves to a second position when the movable member of the first three-way selector valve moves to the first position, while the movable member of the second three-way selector valve moves to a first position when the movable member of the first three-way selector valve moves to the second position, thereby the channel selector valve is constituted as a four-way selector valve by the first and second three-way selector valves.

According to a further embodiment of a channel selector valve of the present invention when a difference between a pressure of fluid at a first selector port and that at a second selector port cancels out, a movable member of a first three-way selector valve situated at a first position is moved to a second position by a first drive mechanism of the first three-way selector valve, while a movable member of the first three-way selector valve situated at the second position is moved to the first position by a second drive mechanism.

According to another embodiment of a channel selector valve of the present invention in a first three-way selector valve, when a fluid pressure at a main port exceeds a first predetermined value, a movable member is situated at a first position by the fluid pressure, thereby the main port communicates with a first selector port and an energizing force is stored in a first storing means for storing energizing force, while when a fluid pressure at the main port is lower than a first predetermined value, the movable member is moved from the first position to a fourth position against the fluid pressure at the main port by the energizing force stored in the first storing means for storing energizing force, thereby a place where the main port is communicated to is switched from the first selector port to the second selector port.

Then, in a state that the movable member is situated at the fourth position, when the fluid pressure at the main port exceeds a second predetermined value, the movable member is moved from the fourth position to the second position by the fluid pressure and an energizing force is stored in the second storing means for storing energizing force, while when a fluid pressure at the main port is lower than the second predetermined value, the movable member is moved from the second position to a third position against the fluid pressure at the main port by the energizing force stored in the second storing means for storing energizing force, thereby a place where the main port is communicated to is switched from the second selector port to the first selector port.

According to another embodiment of a channel selector valve of the present invention out of an inlet port formed in the housing, through which fluid introduced from the exterior to the interior of the housing passes, and an outlet port, through which the fluid discharged from the interior to the exterior of the housing passes, the inlet port is set to be a main port, then, when a movable member is situated at a first position, the inlet port and a first selector port are communicated with each other inside the housing, while the outlet port and a second selector port are communicated with each other inside the housing, on the other hand, when the movable member is situated at a second position, the inlet port and the second selector port are communicated with each other inside the housing, while the outlet port and the first selector port are communicated with each other inside the housing.

According to a further embodiment of a channel selector valve of the present invention a movable member is moved between first and second positions by changing a difference between a pressure of fluid introduced from the exterior of the housing and a pressure of fluid discharged to the exterior of the housing by using a motive power generated by a non-electrically-driven drive, thereby a linear slide-type four-way selector valve is constructed by a channel selector valve.

According to a further embodiment of a method of driving the channel selector valve of the present invention when there is no difference between a pressure of fluid in a first space and a pressure of fluid in a second pressure chamber, a movable member energized by an energizing means is situated at a first position, thereby a first selector port is set to be a place where the fluid, which is introduced from the exterior of the housing to the first space by way of an inlet port, is discharged to, while a second selector port is set to be a place where the fluid, which is discharged from a second space to the exterior of the housing by way of an outlet port, is introduced from.

When a pressure of the fluid, which is introduced from the exterior of the housing to the first space of the first pressure chamber by way of the inlet port, is raised so that a force, which exceeds a resultant force of the energizing force by the energizing means and a force that the fluid in the second pressure chamber acts on the movable member, is acted on the movable member from the first pressure chamber side, the movable member situated at the first position by the energizing force by the energizing means moves to a second position against the energizing force by the energizing means, thereby the second selector port is set to be a place where the fluid, which is introduced from the exterior of the housing to the first space by way of the inlet port, is discharged to, while the first selector port is set to be a place where the fluid, which is discharged from the second space to the exterior of the housing by way of the outlet port, is introduced from.

Then, when the movable member moves from the first position to the second position, since a pressure of the fluid in the second pressure chamber is compressed to become high, a pressure of the fluid, which is introduced from the exterior of the housing into the first space of the first pressure chamber by way of the inlet port, is set high so that the force, which exceeds a resultant force of the energizing force by the energizing means and a force that the fluid in the second pressure chamber acts on the movable member, is acted on the movable member from the first pressure chamber side, thereby the movable member moved from the first position is held at the second position.

According to another embodiment of a channel selector valve of the present invention when a force acted on a movable member from a first pressure chamber side by a pressure of the fluid, which is introduced into a first space of the housing by way of a inlet port, is equal to or lower than a resultant force of the energizing force by the energizing means, a force that the fluid in a second pressure chamber acts on the movable member and a static friction force between a valve seat and the movable member, the movable member stays at a first position.

Therefore, a first selector port is set to be a place where the fluid, which is introduced from the exterior of the housing to the first space by way of the inlet port, is discharged to, while a second selector port is set to be a place where the fluid, which is discharged from a second space to the exterior of the housing by way of an outlet port, is introduced from.

On the other hand, when a force acted on the movable member from the first pressure chamber side by a pressure of the fluid, which is introduced into the first space of the housing by way of the inlet port, exceeds a resultant force of the energizing force by the energizing means, a force that the fluid in the second pressure chamber acts on the movable member and a static friction force between the valve seat and the movable member, the movable member moves to the second position against the energizing force by the energizing means.

Therefore, the second selector port is set to be a place where the fluid, which is introduced from the exterior of the housing to the first space by way of the inlet port, is discharged to, while the first selector port is set to be a place where the fluid, which is discharged from the second space to the exterior of the housing by way of the outlet port, is introduced from.

Then, after the movable member moves to the second position, when a force acted on the movable member from the first pressure chamber side by a pressure of the fluid, which is introduced into the first space of the housing by way of the inlet port, exceeds a force, which is resulted by subtracting a static friction force between the valve seat and the movable member from a resultant force consisting of the energizing force by the energizing means and a force that the fluid in the second pressure chamber acts on the movable member, the movable member keeps staying at the second position against the energizing force by the energizing means.

According to a further embodiment of a method of driving the channel selector valve of the present invention when the channel selector valve is driven, if a movable member moves from a first position to a second position, the fluid in a second pressure chamber is compressed to give a change in pressure with respect to fluid in a first space, however, since the first space communicates with the second pressure chamber through an equalizing path, a pressure of fluid in the first space becomes close to that in the second pressure chamber.

Then, the force acted on the movable member by the fluid in the first space soon becomes equal to the resultant force consisting of the energizing force by the energizing means and the force that the fluid in the second pressure chamber acts on the movable member, then becomes even lower than that, resulting in that the movable member is ready to move toward the first position from the second position, however, the static friction force between the valve seat and the movable member acts against the energizing force by the energizing means even after a difference between the pressure of the fluid in the first space and that in the second pressure chamber decreases, thereby the movable member is held at the second position by the static friction force.

According to a further embodiment of a channel selector valve of the present invention when a physical quantity in the housing is changed by the fluid, which is introduced from the exterior into the interior of the housing by way of an inlet port of the housing, the change in physical quantity is utilized as at least a part of a motive power for moving a movable member between a first and second position, by third and fourth drive mechanisms.

According to a further embodiment of a channel selector valve of the present invention when a selector valve element of a pilot valve is situated at a fifth position, an outlet port communicates with a third pressure chamber through a second main port of the pilot valve and a fourth pressure chamber, while when the selector valve element of the pilot valve is situated at a sixth position, the outlet port communicates with a second pressure chamber through a second main port of the pilot valve and the fifth pressure chamber.

Therefore, if a pressure of the fluid at an inlet port from which the fluid is introduced exceeds a pressure of the fluid at the outlet port from which the fluid is discharged, the selector valve element of the pilot valve is moved between the fifth and sixth position so that either the second pressure chamber or the third pressure chamber, placed sandwiching the first pressure chamber with each other, is selected as a chamber, a fluid pressure of which is lower than that in the first space of the first pressure chamber, thereby a direction of the movable member to move by a difference in pressure of the fluid is selected between a direction from a first position to a second position and that from the second position to the first position.

According to a further embodiment of a channel selector valve of the present invention when a difference between a pressure of fluid in a second pressure chamber and that in a third pressure chamber cancels out, a selector valve element is moved from one to another between fifth and sixth positions by second driving means.

According to another embodiment of a channel selector valve of the present invention when a selector valve element of a pilot valve is situated at a seventh position, a second main port communicating with an outlet port communicates with a fourth pressure chamber communicating with a third pressure chamber, thereby the outlet port communicates with the third pressure chamber through the pilot valve.

In this state, when a pressure of the fluid in a first space of a first pressure chamber communicating with an inlet port increases to exceed a pressure of the fluid in the third pressure chamber communicating with the outlet port, a movable member moves so that the volume of the third pressure chamber decreases, resulting in that the volume of a second pressure chamber increases, in other words, the movable member moves from a second position to a first position, then the third pressure chamber is isolated from the fourth pressure chamber by a first subvalve while the second pressure chamber is communicated to a fifth pressure chamber by a second subvalve.

Then, a pressure of the fluid in the second pressure chamber communicating with a first space by a first equalizing path increases in response to an increases in that in the first space, thereby when a pressure of the fluid in the fifth pressure chamber communicating with the second pressure chamber increases and exceeds a third predetermined value, the selector valve element situated at the seventh position moves to a fifth position and an energizing force is stored in a third storing means for storing energizing force.

Thereafter, when a pressure of the fluid in the second or fifth pressure chamber becomes lower than a third predetermined value due to a decrease in a pressure of the fluid in the first space, the selector valve element is moved from the fifth position to an eighth position against a pressure of the fluid in the fifth pressure chamber by an energizing force of the third storing means for storing energizing force, thereby a second main port communicating with the outlet port communicates with the fifth pressure chamber communicating with the second pressure chamber, resulting in that the outlet port communicates with the second pressure chamber through the pilot valve.

In this state, when a pressure of the fluid in the first space of the first pressure chamber communicating with the inlet port increases to exceed a pressure of the fluid in the second pressure chamber communicating with the outlet port, the movable member moves so that the volume of the second pressure chamber decreases, resulting in that the volume of the third pressure chamber increases, in other words, the movable member moves from a first position to a second position, then the third pressure chamber is communicated to the fourth pressure chamber by a first subvalve while the second pressure chamber is isolated from the fifth pressure chamber by a second subvalve.

Then, a pressure of the fluid in the third pressure chamber communicating with the first space by a second equalizing path increases in response to an increases in that in the first space, thereby when a pressure of the fluid in the fourth pressure chamber communicating with the third pressure chamber increases and exceeds a fourth predetermined value, the selector valve element situated at the eighth position moves to a sixth position and an energizing force is stored in a fourth storing means for storing energizing force.

Thereafter, when a pressure of the fluid in the third or fourth pressure chamber becomes lower than a fourth predetermined value due to a decrease in a pressure of the fluid in the first space, the selector valve element is moved from the sixth position to the seventh position against a pressure of the fluid in the fourth pressure chamber by an energizing force of the fourth storing means for storing energizing force, thereby the second main port communicating with the outlet port communicates with the fourth pressure chamber communicating with the third pressure chamber, resulting in that the outlet port communicates with the third pressure chamber through the pilot valve.

Therefore, in this state, when a pressure of the fluid in the first space of the first pressure chamber communicating with the inlet port increases to exceed a pressure of the fluid in the third pressure chamber communicating with the outlet port, the movable member moves from the second position to the first position.

According to a further embodiment of a channel selector valve of the present invention when a difference between a pressure of fluid in a second pressure chamber and that in a third pressure chamber cancels out, a selector valve element is moved from one to another between a fifth and sixth positions by second driving means.

When the selector valve element of a pilot valve is situated at the fifth position, the inlet port communicates with a second pressure chamber through a third main port of the pilot valve and a fifth pressure chamber, while when the selector valve element of the pilot valve is situated at a sixth position, the inlet port communicates with the third pressure chamber through a third main port of the pilot valve and a fourth pressure chamber.

According to another embodiment of a channel selector valve of the present invention when a selector valve element of a pilot valve is situated at a seventh position, a third main port communicating with a inlet port communicates with a fifth pressure chamber communicating with a second pressure chamber, thereby the inlet port communicates with the second pressure chamber through the pilot valve.

In this state, when a pressure of the fluid in a first space of a first pressure chamber communicating with the inlet port increases, a movable member moves so that the volume of the second pressure chamber increases, resulting in that the volume of a third pressure chamber decreases, in other words, the movable member moves from a second position to a first position.

Then, a pressure of the fluid in the second pressure chamber communicating with the first space by a first equalizing path increases in response to an increases in that in the first space, thereby when a pressure of the fluid in the fifth pressure chamber communicating with the second pressure chamber increases and exceeds a third predetermined value, the selector valve element situated at the seventh position moves to a fifth position and an energizing force is stored in a third storing means for storing energizing force.

Thereafter, when a pressure of the fluid in the second or fifth pressure chamber becomes lower than a third predetermined value due to a decrease in a pressure of the fluid in the first space, the selector valve element is moved from the fifth position to an eighth position against a pressure of the fluid in the fifth pressure chamber by an energizing force of the third storing means for storing energizing force, thereby a third main port communicating with the inlet port communicates with a fourth pressure chamber communicating with the third pressure chamber, resulting in that the inlet port communicates with the third pressure chamber through the pilot valve.

In this state, when a pressure of the fluid in the first space of the first pressure chamber communicating with the inlet port increases, the movable member moves so that the volume of the third pressure chamber increases, resulting in that the volume of the second pressure chamber decreases, in other words, the movable member moves from the first position to the second position.

Then, a pressure of the fluid in the third pressure chamber communicating with the first space by a second equalizing path increases in response to an increases in that in the first space, thereby when a pressure of the fluid in the fourth pressure chamber communicating with the third pressure chamber increases and exceeds a fourth predetermined value, the selector valve element situated at the eighth position moves to the sixth position and an energizing force is stored in a fourth storing means for storing energizing force.

Thereafter, when a pressure of the fluid in the third or fourth pressure chamber becomes lower than a fourth predetermined value due to a decrease in a pressure of the fluid in the first space, the selector valve element is moved from the sixth position to the seventh position against a pressure of the fluid in the fourth pressure chamber by an energizing force of the fourth storing means for storing energizing force, thereby the third main port communicating with the inlet port communicates with the fifth pressure chamber communicating with the second pressure chamber, resulting in that the inlet port communicates with the second pressure chamber through the pilot valve.

Therefore, in this state, when a pressure of the fluid in the first space of the first pressure chamber communicating with the inlet port increases, the movable member moves from the second position to the first position.

According to another embodiment of a channel selector valve of the present invention when an internal pressure of the housing is changed by the fluid, which is introduced from the exterior of the housing into the interior thereof through an inlet port of the housing, one drive mechanism out of third and fourth drive mechanisms of the driving means moves a movable member between first and second positions by employing a change in physical quantity in the housing as at least a part of a motive power.

When the movable member is moved by the one drive mechanism, an energizing force is stored in the energizing means received in the housing, then another drive mechanism out of the third and fourth drive mechanisms moves the movable member between the first and second positions by employing the energizing force stored in the energizing means as at least a part of a motive power.

According to another embodiment of a channel selector valve of the present invention a latch mechanism selectively controls a movement of a movable member, which is moved by a driving means from one position to another position between the first and second positions, thereby the movable member situated at either the first or second position is stayed at one position or moved to another position selectively.

According to another embodiment of a channel selector valve of the present invention a latch mechanism performs a first state, in which a movable member that is moved from one position to another position between the first and second positions by a driving means is held at the one position, while the latch mechanism performs a second state, in which the movable member that is allowed to move from one position to another position between the first and second positions moves from the one position to the another position.

According to a further embodiment of a channel selector valve of the present invention when a movement of a latch piece is controlled, a movement of a movable member, to which the latch piece follow, is controlled at one position.

According to a further embodiment of a method of driving the channel selector valve of the present invention before a movable member is moved from one position to another position by the driving means, the movable member is once moved in a direction of moving from another position to one position, then a control of a movement of the movable member at the one position by a latch mechanism is removed, thereby allowing the movable member to move from the one position to the another position.

Moreover, when the movable member is moved from the one position toward the another position after the movable member is moved from the another position to the one position by the driving means, a movement of the movable member is controlled by the latch mechanism, thereby the movable member is held at the one position.

According to another embodiment of a channel selector valve of the present invention when a third drive mechanism generates a motive power in order to move a movable member of a channel selector valve from one position to another position between first and second positions, a valve-opening member is about to move from a valve-closing position to a valve-opening position by motive power, thereby this movement of the valve-opening member is selectively controlled by a second latch mechanism.

Here, when the second latch mechanism controls a movement of the valve-opening member, since the valve-opening member is held at a valve-closing position and does not move to the valve-opening position, the pilot valve is held in its closed state and an attenuation mechanism does not act, thereby a motive power generated by a fourth drive mechanism is not attenuated and a movement of the movable member from the another position to the one position between the first and second positions by the motive power generated by the fourth drive mechanism is prohibited.

To the contrary, when the second latch mechanism does not control a movement of the valve-opening member from the valve-closing position to the valve-opening position, the valve-opening member moves from the valve-closing position to the valve-opening position, the pilot valve is opened by this valve-opening member that has moved to the valve-opening position, thereby the attenuation mechanism acts so as to attenuate the motive power generated by the fourth drive mechanism and a movement of the movable member from the another position to the one position between the first and second positions by the motive power generated by the fourth drive mechanism is allowed.

According to another embodiment of a channel selector valve of the present invention if a second latch mechanism alternately repeats third and fourth states, when a movable member is moved from one position to another position by a motive power generated by a third drive mechanism, a state that a movement of the movable member from the another position to the one position by a motive power generated by a fourth drive mechanism is allowed and a state that a movement of the movable member from the another position to the one position by a motive power generated by the fourth drive mechanism is prohibited are alternately produced.

According to a further embodiment of a method of driving the channel selector valve of the present invention when a drive source of a third drive mechanism is allowed to generate a motive power again after the generation of a motive power by a drive source of the third drive mechanism is halted, a second latch mechanism is transferred between a state in which a movement of a valve-opening member from a valve-closing position to a valve-opening position is controlled and a state in which said control is removed, thereby the system can be transferred from one state, in which a movable member can move from the another position to the one position by using a motive power generated by a fourth drive mechanism, to another state in which the movable member cannot move from the another position to the one position, or the system can be transferred from the another state to the one state.

According to a further embodiment of a channel selector valve of the present invention if a movable member keeps staying at a first position, a place where the fluid, which is introduced from the exterior of the housing into a first space by way of an inlet port, is discharged to a first selector port, in addition, a place where the fluid, which is discharged from a second space to the exterior of the housing by way of an outlet port, is introduced from is still a second selector port, therefore a pressure of the fluid in a second pressure chamber communicating with the first selector port by way of the communication pipe becomes equal to a pressure of the fluid in the first space communicating with the first selector port or that at the inlet port.

Therefore, as long as a force applied to a movable member from the first pressure chamber side due to a pressure of the fluid introduced into the first space of the housing by way of the inlet port is lower than a resultant force of the energizing force by the energizing means and a force that the fluid in the second pressure chamber acts on the movable member, or is lower than a force consisting of said resultant force and a static friction force between the seat valve and the movable member, the movable member keeps staying at a first position, consequently, a place, to which the inlet port or the outlet port is communicated, is not selected (i.e. not changed).

To the contrary, when a force applied to the movable member from the first pressure chamber side due to a pressure of the fluid introduced into the first space of the housing by way of the inlet port exceeds a resultant force of the energizing force by the energizing means and a force that the fluid in the second pressure chamber acts on the movable member, or exceeds a force consisting of said resultant force and a static friction force between the seat valve and the movable member, the movable member moves from the first position to a second position, thereby a place where the fluid, which is introduced from the exterior of the housing into the first space by way of the inlet port, is discharged to is selected to be the second selector port, in addition, a place where the fluid, which is discharged from the second space to the exterior of the housing by way of the outlet port, is introduced from is selected to be the first selector port.

Therefore, a pressure of the fluid in the second pressure chamber communicating with the first selector port by way of the communication pipe becomes equal to a pressure of the fluid at the outlet port communicating with the first selector port, then said pressure becomes different from a pressure of the fluid at the inlet port communicating with the first space.

Consequently, as long as a pressure of the fluid at the inlet port is thereafter kept so that a force applied to the movable member from the first pressure chamber side due to a difference between a pressure of the fluid at the outlet port and that at the inlet port exceeds a resultant force consisting of the energizing force by the energizing means and a force that the fluid in the second pressure chamber acts on the movable member, or exceeds a force, which is resulted by subtracting a static friction force between the valve seat and the movable member from said resultant force consisting of the energizing force by the energizing means and a force that the fluid in the second pressure chamber acts on the movable member, the movable member keeps staying at the second position against an energizing force by the energizing means, thereby a place to which the inlet port or the outlet port is communicated is kept as selected (i.e. as changed).

Then, after the movable member has moved to the second position, when a pressure of the fluid at the inlet port decreases so that a force applied to the movable member from the first pressure chamber side due to a difference between a pressure of the fluid at the outlet port and that at the inlet port is lower than a resultant force consisting of the energizing force by the energizing means and a force that the fluid in the second pressure chamber acts on the movable member, or is lower than a force, which is resulted by subtracting a static friction force between the valve seat and the movable member from said resultant force consisting of the energizing force by the energizing means and a force that the fluid in the second pressure chamber acts on the movable member, the movable member moves from the second position to the first position by an energizing force of the energizing means.

Thereby, a place where the fluid, which is introduced from the exterior of the housing into the first space by way of the inlet port, is discharged to is selected to be a first selector port, in addition, a place where the fluid, which is discharged from a second space to the exterior of the housing by way of the outlet port, is introduced from is selected to be the second selector port.

According to a further embodiment of a channel selector valve of the present invention if a movable member is moved from a first position to a second position so that a channel of the fluid is selected by the channel selector valve using a motive power generated by a non-electrically-driven drive source, the movable member is held at the second position by a state-holding mechanism.

According to another embodiment of a channel selector valve of the present invention when a movable member is situated at a first position, an energizing of a second selector valve element by energizing means for energizing the selector valve is allowed, thereby a state-holding selector valve is set in a first state in which a second pressure chamber is communicated to the exterior of the housing through a first introducing port, while when the movable member is situated at the second position, against the energizing by the energizing means for energizing the selector valve, the state-holding selector valve is set in a second state in which the second pressure chamber is communicated to the exterior of the housing through a second introducing port.

Whether the movable member is situated at the first position or a second position depends upon whether a force applied to the movable member from a first space side is higher or not than a force applied to the movable member from the second pressure chamber side, as a result of taking the following forces into consideration, said following forces are a force applied to the movable member by the fluid in the first space, a force applied to the movable member by the fluid flowed into the second pressure chamber, a static friction force between a valve seat and the movable member, and an energizing force by the energizing means.

Therefore, when the movable member is situated at the first position, as long as a pressure of the fluid at an inlet port communicating with the first space is set so that a force applied to the movable member from the second pressure chamber side, which depends on a pressure of the fluid at a place to which the first introducing port communicating with the second pressure chamber is communicated, exceeds a force applied to the movable member from the first space side, the movable member keeps staying at the first position, thereby a first selector port out of two selector ports formed in the housing communicates with the inlet port through the first space, while a second selector port out of the two selector ports communicates with an outlet port through a second space.

On the other hand, when a pressure of the fluid in the first space increases so that a force applied to the movable member from the first space side exceeds a force applied to the movable member from the second pressure chamber side, which depends on a pressure of the fluid at a place to which a first introducing port communicating with the second pressure chamber is communicated, the movable member moves from the first position to the second position in the housing, thereby the first selector port out of the two selector ports formed in the housing communicates with the outlet port through the first space, while the second selector port out of the two selector ports communicates with the inlet port through the second space, and a place to which the second pressure chamber is communicated is selected from the first introducing port to the second introducing port.

Here, if a pressure of the fluid in a place to which the second introducing port is communicated is set lower to some extent than that in a place to which the first introducing port is communicated, even when a pressure of the fluid in the first space decreases to some extent, a force applied to the movable member from the first space side exceeds a force applied to the movable member from the second pressure chamber side, thereby the movable member keeps staying at the second position.

However, when a pressure of the fluid in the first space markedly decreases so that a force applied to the movable member from the second pressure chamber side exceeds a force applied to the movable member from the first space side, the movable member moves from the second position to the first position in the housing, thereby the first selector port out of the two selector ports formed in the housing communicates with the inlet port through the first space, while the second selector port out of the two selector ports communicates with the outlet port through the second space, and a place to which the second pressure chamber is communicated is selected from the second introducing port to the first introducing port.

Since a pressure of the fluid in a place to which the first introducing port is communicated is set higher to some extent than that in a place to which the second introducing port is communicated, even when a pressure of the fluid in the first space is kept very low after the movable member has moved from the second position to the first position, a force applied to the movable member from the second pressure chamber side exceeds a force applied to the movable member from the first space side, thereby the movable member keeps staying at the first position.

According to a further embodiment of a channel selector valve of the present invention when a movable member is situated at a first position, as long as a force applied to the movable member by the fluid in a first space is lower than a resultant force of energizing force by an energizing means and a force applied to the movable member by the fluid, which flowed into a second pressure chamber from a place to which a first introducing port is communicated, or is lower than a force consisting of said resultant force and a static friction force between a seat valve and the movable member, the movable member keeps staying at the first position.

On the other hand, a pressure of the fluid in the first space increases so that a force applied to the movable member by the fluid in the first space exceeds a resultant force of the energizing force by the energizing means and a force applied to the movable member by the fluid, which flowed into the second pressure chamber from a place to which the first introducing port is communicated, or exceeds a force consisting of said resultant force and a static friction force between the seat valve and the movable member, the movable member moves from the first position to a second position in the housing.

Here, if a pressure of the fluid in a place to which a second introducing port is communicated is set lower to some extent than that in a place to which the first introducing port is communicated, even when a pressure of the fluid in the first space decreases to some extent, a force applied to the movable member from the first space side exceeds a resultant force consisting of the energizing force by the energizing means and a force applied to the movable member by the fluid flowed into the second pressure chamber, or exceeds a force, which is resulted by subtracting a static friction force between the valve seat and the movable member from said resultant force consisting of the energizing force by the energizing means and a force applied to the movable member by the fluid flowed into the second pressure chamber, thereby the movable member keeps staying at the second position.

Since a pressure of the fluid in a place to which the first introducing port is communicated is set higher to some extent than that in a place to which the second introducing port is communicated, even when a pressure of the fluid in the first space is kept very low after the movable member has moved from the second position to the first position, a resultant force consisting of the energizing force by the energizing means and a force applied to the movable member by the fluid flowed into the second pressure chamber, or a force, which is resulted by subtracting a static friction force between the valve seat and the movable member from said resultant force consisting of the energizing force by the energizing means and a force applied to the movable member by the fluid flowed into the second pressure chamber, exceeds a force applied to the movable member from the first space side, thereby the movable member keeps staying at the first position.

According to another embodiment of a method of driving the channel selector valve of the present invention when the channel selector valve is driven, a pressure of fluid introduced into a first space from the exterior of the housing by way of an inlet port is set higher than a predetermined value, so that a force, which is applied to a movable member by fluid existing in a first space in a direction from a first position to a second position, is set stronger than a force, which is applied to the movable member by fluid existing in a place to which a second pressure chamber is communicated in a direction from the second position to the first position, thereby the movable member moves from the first position to the second position, in addition thereafter, a pressure of fluid existing in the first space and a pressure of fluid existing in the second pressure chamber are set so that the movable member is kept staying at the second position.

According to another embodiment of a channel selector valve of the present invention an opening ratio of an electrically-driven expansion valve in a refrigerating cycle is changed to change a pressure of fluid in the refrigerating cycle, thereby a balance, between a force that the fluid in the channel selector valve is applied to a movable member to move from a first position to a second position and a force that the fluid in the channel selector valve is applied to the movable member to move from the second position to the first position, changes, thereby the movable member moves between the first and second positions.

According to another embodiment of a channel selector valve of the present invention when a frequency of an oscillation generated by a compressor in a refrigerating cycle is changed, a member that responds only to a specific frequency produces a change in condition, then a pressure of the fluid in a second pressure chamber changes, thereby a balance, between a force that the fluid in the channel selector valve is applied to a movable member to move from a first position to a second position and a force that the fluid in the channel selector valve is applied to the movable member to move from the second position to the first position, changes, thereby the movable member moves between the first and second positions.

According to a further embodiment of a channel selector valve of the present invention a heat-exchange capacity by a heat exchanger in a refrigerating cycle is adjusted and a difference in fluid pressure is changed by a difference in amount of heat exchange by the heat exchanger, then a pressure of the fluid in the refrigerating cycle changes, thereby a balance, between a force that the fluid in the channel selector valve is applied to a movable member to move from a first position to a second position and a force that the fluid in the channel selector valve is applied to the movable member to move from the second position to the first position, changes, thereby the movable member moves between the first and second positions.

According to a further embodiment of a channel selector valve of the present invention a rotary-type four-way selector valve is constructed by the channel selector valve, in which when a main valve element as a movable member rotates around the central axis in the housing so as to move between a first and second positions, a place to which an inlet port as a main port is communicated by communication means provided in the main valve element is selected between a first selector port and a second selector port out of two selector ports provided at an end side of the housing.

According to another embodiment of a channel selector valve of the present invention one port formed on a valve seat out of an inlet port and an outlet port communicates with a first selector port of a valve seat when a main valve element is situated at a first position, while communicates with a second selector port of the valve seat when the main valve element is situated at a second position, not by communication means but by second communication means formed at one end surface of the main valve element that sits down on the valve seat.

According to another embodiment of a channel selector valve of the present invention by a communication channel for communicating one end surface side of a main valve element to another end surface side thereof, when the main valve element is situated at a first position, a second selector port formed on a valve seat at one end side of the housing communicates with another port formed at another end side of the housing, while when the main valve element is situated at a second position, the second selector port formed on the valve seat at one end side of the housing communicates with a first selector port formed on the valve seat.

According to another embodiment of a channel selector valve of the present invention when a main valve element is moved in a direction of the central axis of the housing by a driving means, this movement is transformed into a rotation around the central axis of the housing by conversion means of moving direction, thereby the main valve element is rotated between first and second positions.

According to a further embodiment of a channel selector valve of the present invention while a main valve element moves in a direction of the central axis of the housing, in the inside of a cam groove provided in one out of the main valve element and the housing, a cam follower pin provided in another out of the main valve element and the housing moves, thereby a movement of the main valve element in a direction of the central axis of the housing is transformed into a rotation around the central axis of the housing.

Then, the cam groove has a first and second cam grooves continuing with each other in the rotational direction of the main valve element, since the first cam groove is formed inclined so as to part from a valve seat in a direction of the central axis as being displaced in the rotational direction, while the second cam groove is formed inclined so as to move nearer to the valve seat in a direction of the central axis as being displaced in the rotational direction, when the main valve element proceeds and returns in a direction of the central axis of the housing, the main valve element rotates between the first and second positions, with the cam follower pin being guided along the first and second cam grooves.

According to another embodiment of a channel selector valve of the present invention a cam follower pin formed on a main valve element is disposed between a first and second half of an inner housing, then each end of the first and second half is joined together, thereby the main valve element is received in the inner housing and by the inner housing the main valve element is movable in a direction of the central axis of the housing and is supported rotatably around the central axis.

According to a further embodiment of a channel selector valve of the present invention when a main valve element, which is moved in a direction of the central axis by a driving means, rotates around the central axis of the housing with its movement being transformed by conversion means of moving direction, one end surface of the main valve element sits down on a valve seat only when situating at a first or a second position, thereby one port of the valve seat selectively communicates with one out of a first selector port and a second selector port of the valve seat, by second communication means formed at one end surface of the main valve element.

According to a further embodiment of a channel selector valve of the present invention when a main valve element is situated at a first or second position where one end surface of the main valve element sits down on a valve seat, a communication channel is opened by a subvalve opened by a valve-opening means, then one end surface side of the main valve element communicates with another end surface side thereof, and by this communication channel another port, which is formed at another end side of the housing and forms a main port, communicates with a second selector port formed on the valve seat when the main valve element is situated at the first position, while communicates with a first selector port formed on the valve seat when the main valve element is situated at the second position.

According to another embodiment of a channel selector valve of the present invention when a main valve element sat down on a valve seat is moved in a direction away from the valve seat by a driving means, an own weight of the main valve is utilized as at least a part of non-electric motive power.

According to a further embodiment of a channel selector valve of the present invention when a main valve element sat down on a valve seat is moved in a direction away from the valve seat by a driving means, an energizing force stored in the energizing means for energizing the main valve element is utilized as at least a part of non-electric motive power.

According to a further embodiment of a channel selector valve of the present invention when a main valve element away from a valve seat is moved in a direction nearer to the valve seat by a driving means, an energizing force stored in the second energizing means for energizing the main valve element is utilized as at least a part of non-electric motive power.

According to another embodiment of a channel selector valve of the present invention when a pressure of the fluid at one port exceeds that at another port, a main valve element, situated at an intermediate position by a resultant force of an energizing force of an energizing means for energizing the main valve element and that of a second energizing means for energizing the main valve element, moves in the direction away from a valve seat with rotating against an energizing force of a second energizing means for energizing the main valve element.

To the contrary, when a pressure of the fluid at one port is lower than that at another port, the main valve element situated at a neutral position, one end surface of which is away from the valve seat, moves in the direction nearer to the valve seat with rotating against the energizing force of the energizing means for energizing the main valve element.

According to another embodiment of a channel selector valve of the present invention whether a cam follower pin, situated at an intermediate position of the cam groove, is in a first cam groove or in a second cam groove, when a pressure of the fluid at one port is lower than that at another port, a main valve element situated at the neutral position moves in a direction nearer to the valve seat, then the cam follower pin moves to the groove by way of either one end of the first cam groove or that of the second cam groove, thereby the main valve element rotates to be situated at either a first or second position.

Then, in a state that the cam follower pin is situated in the groove, when a state that a pressure of the fluid at the one port is lower than that at the another port is canceled, the cam follower pin situated in the groove moves to another end side of the cam groove by way of one end of the cam groove out of the first and second cam grooves, which is situated at a down stream side in the direction of the rotation, thereby the main valve element rotates around the central axis from the first or second position and the main valve element moves away from the valve seat to be situated at the neutral position.

According to another embodiment of a channel selector valve of the present invention whether a cam follower pin, situated at an intermediate position of a cam groove, is in a first cam groove or in a second cam groove, when a pressure of the fluid at one port is higher than that at another port, a main valve element situated at the neutral position moves in the direction away from a valve seat, then the cam follower pin moves to the second groove by way of either another end of the first cam groove or that of the second cam groove, thereby the main valve element rotates to be situated at an intermediate position between the first and second positions around the central axis.

Then, in a state that the cam follower pin is situated in the second groove, when a state that a pressure of the fluid at the one port is higher than that at the another port is canceled, the cam follower pin situated in the second groove moves to another end side of the cam groove by way of one end of the cam groove out of the first and second cam grooves, which is situated at a down stream side in the direction of the rotation, thereby the main valve element rotates around the central axis from the intermediate position between the first and second positions and the main valve element moves nearer to the valve seat to be situated at the neutral position.

According to a further embodiment of a channel selector valve of the present invention when a main valve element moves in a direction of the central axis or rotates around the central axis with respect to the housing, a sliding resistance between the housing and the main valve element is reduced by slide means.

According to another embodiment of a compressor with the channel selector valve of the present invention a compressor housing part, in which a high pressure chamber from which a fluid compressed by a compressing section of the compressor is introduced is formed, is integrally formed with a housing part, in which an inlet port is provided, out of the housing of the channel selector valve thereby the compressor housing is integrated with the housing of the channel selector valve.

According to a further embodiment of a device for controlling a refrigerating cycle of the present invention a channel selector valve is controlled by controlling the functional components for controlling the operation of a refrigerating cycle.

According to another embodiment of a device for controlling a refrigerating cycle of the present invention a functional component is controlled to control an operation of a refrigerating cycle, thereby generating a non-electrical motive power, by which a channel selector valve is passively controlled.

According to a further embodiment of a device for controlling a refrigerating cycle of the present invention a microcomputer, which controls an operation of a refrigerating cycle, a functional component is controlled to control an operation of the refrigerating cycle, thereby generating a non-electrical motive power, by which a channel selector valve is passively controlled.

According to a further embodiment of a device for controlling a refrigerating cycle of the present invention a functional component is controlled to control an operation of a refrigerating cycle, thereby a physical quantity or a rate of change in a physical quantity is generated as a non-electrical motive power, by which a channel selector valve is passively controlled.

According to another embodiment of a device for controlling a refrigerating cycle of the present invention a microcomputer, controls an operation of a refrigerating cycle, a functional component is controlled to control an operation of the refrigerating cycle, thereby a physical quantity or a rate of change in the physical quantity is generated as a non-electrical motive power, by which a channel selector valve is passively controlled.

According to another embodiment of a device for controlling a refrigerating cycle of the present invention in order to generate a non-electrical motive power for controlling a channel selector valve, a functional component is controlled on the basis of a physical quantity, which concerns with a control of an operation of a refrigerating cycle, selected from the group consisting of a pressure, temperature, rate of flow, voltage, current, electrical frequency and mechanical oscillation frequency.

According to a further embodiment of a device for controlling a refrigerating cycle of the present invention the physical quantity, which is a non-electrical motive power and is generated by a refrigerating cycle, is a pressure, differential pressure or rate of flow with respect to fluid existing in a channel selector valve, and a rate of change in a physical quantity, which is the non-electrical motive power and is generated by the refrigerating cycle, is a rate of change in pressure, rate of change in differential pressure or rate of change in rate of flow with respect to the fluid.

According to another embodiment of a device for controlling a refrigerating cycle of the present invention an operational condition of a refrigerating cycle is commanded from an operation command section and a physical quantity generated by the refrigerating cycle is detected in a physical quantity detector section, then a control section receives input signals sent from an operation command section and a physical quantity detector section. Then, the control section sends output signals to a driving section that drives a drive source of at least one of a plurality of functional components communicated to the refrigerating cycle so as to control said functional component, and the device generates a non-electrical motive power by controlling the refrigerating cycle and passively controls the channel selector valve by said motive power.

According to another embodiment of a device for controlling a refrigerating cycle of the present invention a control section controls at least one of a plurality of functional components communicated to a refrigerating cycle so as to start an operation of the refrigerating cycle, thereby controlling the channel selector valve in a state corresponding to the start of an operation, which is commanded by the operation command section.

According to a further embodiment of a device for controlling a refrigerating cycle of the present invention a control section starts to operate a compressor communicated to a refrigerating cycle in a direction of inverse rotation when the control section decides to select a channel selector valve on the basis of a command of an operation command section, thereby a channel is selected by the channel selector valve.

According to another embodiment of a device for controlling a refrigerating cycle of the present invention a control section controls at least one of a plurality of functional components communicated to a refrigerating cycle so as to operate the refrigerating cycle, thereby controlling a channel selector valve in a state corresponding to the operation, which is commanded by the operation command section.

According to a further embodiment of a device for controlling a refrigerating cycle of the present invention a control section controls at least one of a plurality of functional components communicated to a refrigerating cycle so as to halt an operation of the refrigerating cycle, thereby controlling a channel selector valve in a state corresponding to the halt of the operation, which is commanded by the operation command section.

According to a further embodiment of a device for controlling a refrigerating cycle of the present invention a channel selector valve is constructed in a manner that a movable member moves so as to select a channel, and a control section comprises at least one unit selected from the group consisting of: a memory unit for memorizing position data of a movable member of a channel selector valve; a comparison unit and a judge unit for comparing and judging, respectively, position data and operation command data; and a learning unit learning on the basis of physical quantity data by a control of functional components and control data of the channel selector valve.

According to a further embodiment of a device for controlling a refrigerating cycle of the present invention a control section receives the input signals, performs a predetermined processing and judges whether a channel is to be changed or not to be changed by a channel selector valve, then confirms a position on the basis of present position data, then sends a output signals to a driving section so as to control the functional components in a refrigerating cycle, then receives new input signals after a predetermined period of time, confirms a position of a movable member, and sets position data of said position as new present position data when said position is changed to a new position.

According to another embodiment of a device for controlling a refrigerating cycle of the present invention a control section confirms a position of a movable member by at least one temperature detection means, at least one pressure detection means, at least one magnetic detection means, at least one current detection means or a combination thereof after a predetermined period of time, and then installs position data corresponding to said position into a memory unit of a control section.

According to another embodiment of a device for controlling a refrigerating cycle of the present invention a microcomputer that controls a refrigerating cycle is used, thereby controlling at least one of a plurality of functional components communicated to the refrigerating cycle so as to control the refrigerating cycle, and in order to control a driving section for driving a functional component so that the position of a movable member is to be moved or not to be moved, the microcomputer performs a processing consisting of the steps of:

receiving input signals; confirming a position by taking out present position data of a movable member installed in a memory unit; carrying out an operation to decide whether the movable member is to be moved of not to be moved, comparing, and judging; selecting and deciding a driving section; outputting drive signals to the driving section selected and decided; judging a position of the movable member by input signals after a predetermined period of time, with or without moving a position of the movable member by a physical quantity generated by at least one functional component that is selected and decided in said step of selecting and deciding or a rate of the physical quantity; and installing position data of a position of the movable member into the memory unit when said position is changed to a new position.

According to a further embodiment of a device for controlling a refrigerating cycle of the present invention an operational condition of a refrigerating cycle is commanded from an operation command section and a physical quantity generated by the refrigerating cycle is detected in a physical quantity detector section, then a control section receives input signals sent from a operation command section and a physical quantity detector section. Then, the control section sends output signals to a driving section that drives a drive source of at least one of a plurality of functional components communicated to the refrigerating cycle so as to control said functional component for controlling an operation of the refrigerating cycle, and when judging to select a channel by using the channel selector valve on the basis of a command of the operation command section, the control section sends output signals to a driving section for driving a power source of a compressor so as to start an operation of the compressor of the refrigerating cycle and starts an operation of the refrigerant cycle so as to generate a motive power exceeding a first predetermined motive power, thereby the channel selector valve is passively controlled.

According to a further embodiment of a device for controlling a refrigerating cycle of the present invention an operational condition of a refrigerating cycle is commanded from an operation command section and a physical quantity generated by the refrigerating cycle is detected in a physical quantity detector section, then a control section receives input signals sent from a operation command section and a physical quantity detector section. Then, the control section sends output signals to a driving section that drives a drive source of at least one of a plurality of functional components communicated to the refrigerating cycle so as to control said functional component for controlling an operation of the refrigerating cycle, and when judging to select a channel by using a channel selector valve on the basis of a command of the operation command section, the control section sends output signals to a driving section for driving a power source of a compressor so as to start an operation of the compressor in a direction of inverse rotation and starts an operation of the refrigerant cycle so as to generate a motive power exceeding a third predetermined motive power, thereby the channel selector valve is passively controlled.

According to another embodiment of the device for controlling a refrigerating cycle of the present invention a channel selector valve selects a channel by moving a movable member between first and second positions in response to an internal motive power, a control section memorizes position data corresponding to the first or second position of the movable member in a memory unit thereof, the control section starts an operation of a refrigerating cycle when the position data indicates the second or first position, halts the operation of the refrigerating cycle with renewing position data in the memory unit to the first or second position, respectively, after a first predetermined period of time, and keeps the operation of the refrigerating cycle standby during a third predetermined period of time.

According to another embodiment of a device for controlling a refrigerating cycle of the present invention a control section operates a compressor in a specific frequency immediately after starting operation of the compressor and starts an operation of a refrigerating cycle so that a motive power exceeding a first predetermined motive power is generated as an internal motive power of the channel selector valve.

According to another embodiment of a device for controlling a refrigerating cycle of the present invention a control section starts an operation of a compressor with a first predetermined capacity.

According to a further embodiment of a device for controlling a refrigerating cycle of the present invention a control section starts an operation of a compressor with a second predetermined capacity so that a motive power lower than a first predetermined motive power is generated as an internal motive power of a channel selector valve, then operates the refrigerating cycle for a fourth predetermined period of time, then halts the operation of the refrigerating cycle for a fifth predetermined period of time, and then starts an operation of the compressor with a first predetermined capacity so that a motive power exceeding a first predetermined motive power is generated as an internal motive power of the channel selector valve.

According to a further embodiment of a device for controlling a refrigerating cycle of the present invention a control section sends output signals to a throttle device driving section so that an opening ratio of a throttle device of a refrigerating cycle is almost fully opened or almost fully closed.

According to a further embodiment of a device for controlling a refrigerating cycle of the present invention a control section sends output signals to a heat exchanger motor driving section so that a heat exchanger motor of a refrigerating cycle is kept halted.

According to another embodiment of a device for controlling a refrigerating cycle of the present invention once a control section starts an operation of a compressor, the control section sends output signals to a compressor driving section after a first predetermined period of time and drives a power source of the compressor so that a motive power exceeding a second predetermined motive power is generated, thereby operating the refrigerating cycle.

According to another embodiment of a device for controlling a refrigerating cycle of the present invention once a control section starts an operation of a compressor, the control section sends output signals to a throttle device driving section so as to set the opening ratio of the throttle device a predetermined opening ratio after a first predetermined period of time.

According to a further embodiment of a device for controlling a refrigerating cycle of the present invention once a control section starts an operation of a compressor, the control section sends output signals to a heat exchanger motor driving section after a second predetermined period of time so as to start an operation of a heat exchanger motor, sends output signals to a compressor driving section so as to generate a motive power lower than a first predetermined motive power, and drives a power source of a compressor so as to generate a motive power exceeding a second predetermined motive power, thereby operating the refrigerating cycle.

According to a further embodiment of a device for controlling a refrigerating cycle of the present invention when a control section performs a predetermined processing and judges to select a channel by a channel selector valve or to halt an operation of a refrigerating cycle, the control section sends output signals to a compressor driving section: to drive a power source of a compressor with a third predetermined capacity so as to generate a motive power lower than a second predetermined motive power; or to halt the operation of the compressor, thereby halting the operation of the refrigerating cycle.

According to another embodiment of a device for controlling a refrigerating cycle of the present invention when a control section performs a predetermined processing and judges to select a channel by a channel selector valve or to halt an operation of a refrigerating cycle, the control section sends output signals to a compressor driving section to halt the operation of a compressor, then keeps the refrigerating cycle standby for a third predetermined period of time, then sends output signals to the compressor driving section to start the operation of the compressor, then renews position data in a memory unit to a first or second position after a first predetermined period of time, thereby halting the operation of the compressor again.

According to another embodiment of a device for controlling a refrigerating cycle of the present invention when positional data memorized by a memory unit of a control section indicate a first or second position, the control section starts an operation of a refrigerating cycle so that a motive power exceeding a first predetermined motive power is generated as an internal motive power of a channel selector valve.

According to a further embodiment of a device for controlling a refrigerating cycle of the present invention an operational condition of a refrigerating cycle is commanded from an operation command section and a physical quantity generated by the refrigerating cycle is detected in a physical quantity detector section, then a control section receives input signals sent from an operation command section and a physical quantity detector section. Then, the control section sends output signals to a driving section that drives a drive source of at least one of a plurality of functional components communicated to the refrigerating cycle so as to control said functional component for controlling an operation of the refrigerating cycle, and when judging not to select (i.e. not to switch) a channel by using a channel selector valve on the basis of a command of the operation command section, the control section sends output signals to a driving section for driving a power source of a compressor so as to start an operation of the compressor of the refrigerating cycle and starts an operation of the refrigerant cycle so as to generate a motive power lower than a first predetermined motive power, thereby the channel selector valve is passively controlled.

According to a further embodiment of a device for controlling a refrigerating cycle of the present invention a control section starts an operation of a compressor with a second predetermined capacity.

According to another embodiment of a device for controlling a refrigerating cycle of the present invention an operational condition of a refrigerating cycle is commanded from an operation command section and a physical quantity generated by the refrigerating cycle is detected in a physical quantity detector section, then a control section receives input signals sent from an operation command section and a physical quantity detector section. Then, the control section sends output signals to a driving section that drives a drive source of at least one of a plurality of functional components communicated to the refrigerating cycle so as to control said functional component for controlling an operation of the refrigerating cycle, and when judging not to select (i.e. not to switch) a channel by using a channel selector valve on the basis of a command of the operation command section, the control section sends output signals to a driving section for driving a power source of a compressor so as to start an operation of the compressor of the refrigerating cycle and starts an operation of the refrigerant cycle so as to generate a motive power exceeding a first predetermined motive power, thereby the channel selector valve is passively controlled.

According to another embodiment of a device for controlling a refrigerating cycle of the present invention when a control section performs a predetermined processing and judges to halt an operation of a refrigerating cycle, the control section sends output signals to a compressor driving section so as to halt the operation of a compressor, then keeps the refrigerating cycle standby for a third predetermined period of time without renewing position data in a memory unit.

BRIEF DESCRIPTION OF THE DRAWINGS

FIG. 44 is a development of a cam groove of FIG. 39.

FIG. 54 is a sectional view of a channel selector valve according to a nineteenth embodiment of the present invention, which can be employed as the rotary channel selector valve of FIG. 35.

FIG. 55 is a side view of a rotating central shaft of FIG. 54.

FIG. 56 is a development of a cam groove of FIG. 55.

FIG. 57 is an enlarged sectional view of a primary part of a main valve element of FIG. 54.

BEST MODE FOR CARRYING OUT THE INVENTION

In the following, the channel selector valve and the method of driving the same according to the present invention will be explained with reference to the attached drawings.

Figure 1:
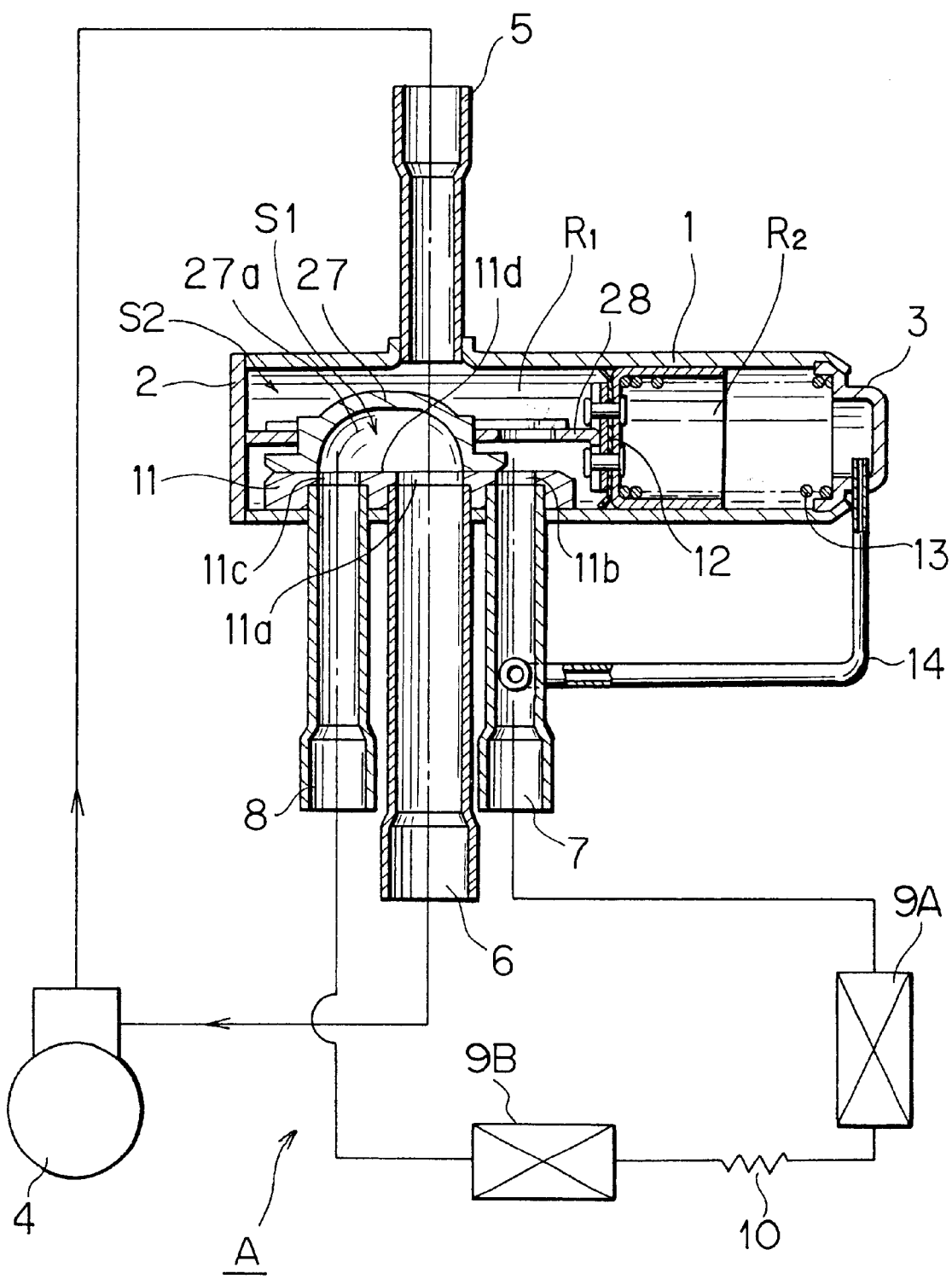
FIG. 1 is a view illustrating a schematic constitution of a refrigerating cycle employing a channel selector valve according to a first embodiment of the present invention.

FIG. 1 is a view illustrating a schematic constitution of a refrigerating cycle employing a channel selector valve according to a first embodiment of the present invention. The channel selector valve according to the first embodiment constitutes a refrigerating cycle A together with a compressor 4, an indoor heat exchanger 9A, an outdoor heat exchanger 9B and a throttle 10 of an electrically-driven expansion valve or a capillary tube, wherein the throttle 10 is provided between the indoor heat exchanger 9A and the outdoor heat exchanger 9B.

The channel selector valve according to the first embodiment, an operating state of which in the heating mode is shown in FIG. 1 with a sectional view thereof, has a cylindrical reversing valve housing 1, to both ends of which stoppers 2 and 3 are firmly fixed. An outlet pipe 5 communicating with an outlet (not shown in the figure) of the compressor 4 is connected to one side of the periphery of the reversing valve housing 1, while an inlet pipe 6 communicating with an inlet (not shown in the figure) of the compressor 4 and two pipes 7 and 8 disposed at both sides of the inlet pipe 6 in an axial direction of the reversing valve housing 1 are connected to an opposite side of the periphery of the reversing valve housing 1, wherein the pipes 7 and 8 constitute the refrigerating cycle A together with the channel selector valve and the compressor 4 and are connected to two heat exchangers 9A and 9B disposed indoors and outdoors, respectively, which are utilized reversibly as a condenser or an evaporator.

Inner ends of the inlet pipe 6 and the pipes 7 and 8 are connected to three through holes 11a, 11b and 11c on a selector valve seat 11 firmly fixed in the reversing valve housing 1, respectively, and a continuous smooth surface 11d is formed on the inner side of the valve seat 11.

In the reversing valve housing 1, there is provided a piston cylinder 12 (corresponding to the movable member) between the valve seat 11 and the stopper 3, which partitions the reversing valve housing 1 into a high pressure chamber $R_1$ (corresponding to the first pressure chamber) and a pressure-transducing chamber $R_2$ (corresponding to the second pressure chamber). There is provided a compression spring 13 (corresponding to energizing means) between the piston cylinder 12 and the stopper 3, thereby the piston cylinder 12 is always energized toward the high pressure chamber $R_1$.

On the valve seat 11, there is provided a slide valve 27 having a communication cavity 27a, which is joined to the piston cylinder 12 in use of a connecting shaft 28 and slides on the smooth surface 11d in response to the movement of the piston 12 in the reversing valve housing 1, thereby the through hole 11a corresponding to the inlet pipe 6 alternatively communicates with the through hole 11b or 11c, each of which puts the through hole 11a therebetween and corresponds to the respective pipe 7 or 8 for the respective heat exchanger.

Figure 2:
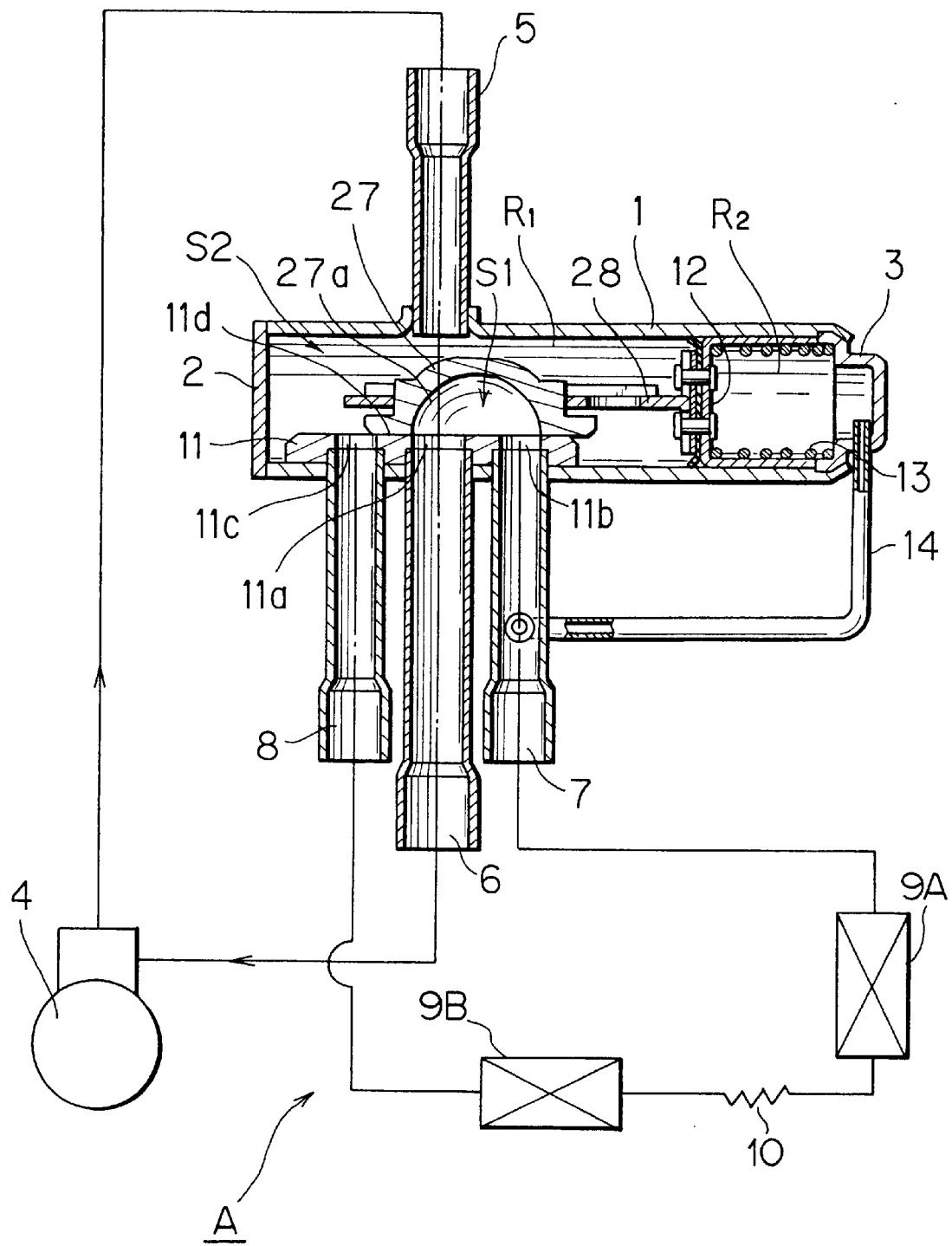
FIG. 2 is a view illustrating a schematic constitution of a refrigerating cycle, in which a sectional view of the channel selector valve of FIG. 1 in a cooling mode is shown.

FIG. 2 is a view illustrating a schematic constitution of a refrigerating cycle, in which a sectional view of the channel selector valve in a cooling mode is shown.

That is, the piston cylinder 12 can move between a first position and a second position: at said first position, the piston cylinder 12 is prevented from moving further toward the stopper 2 because an end of the connecting shaft 28 abuts on the stopper 2 as shown in FIG. 1; and at said second position, the piston cylinder 12 is prevented from moving further toward the stopper 3 because the piston cylinder 12 abuts on the stopper 3 as shown in FIG. 2.

As shown in FIG. 1, when the piston cylinder 12 is at the first position, the slide valve 27 communicates the through hole 11a corresponding to the inlet pipe 6 to the through hole 11c corresponding to the pipe 8 through a low-pressure side closed space (hereinafter, a closed space) S1 (corresponding to the second space), which is formed in the high pressure chamber $R_1$ by the cavity 27a and the smooth surface 11d of the valve seat 11, while the through hole 11b corresponding to the pipe 7 communicates with the outlet pipe 5 through a high pressure side closed space (hereinafter, a high pressure space) S2 (corresponding to the first space), which is formed in the high pressure chamber $R_1$ by the slide valve 27 and isolated from the closed space S1.

Then, as shown in FIG. 2, when the piston cylinder 12 is at the second position, the slide valve 27 communicates the through hole 11a corresponding to the inlet pipe 6 to the through hole 11b corresponding to the pipe 7 through the closed space S1, while the through hole 11c corresponding to the pipe 8 communicates with the outlet pipe 5 through the high pressure space S2.

Further, an end of a channel 14 (corresponding to the communication pipe) is connected to the stopper 3, while the opposite end of the channel 14 is connected to the pipe 7 by way of the outside of the reversing valve housing 1, whereby the pressure-transducing chamber $R_2$ always communicates with the pipe 7 through the channel 14.

As to the first embodiment, the reversing valve housing 1 and the stoppers 2 and 3 constitute the housing described in the claims of this specification, a portion of the reversing valve housing 1, to which the outlet pipe 5 connected to the outlet of the compressor 4 is connected, corresponds to the inlet port described in the claims of this specification, while the through hole 11a on the valve seat 11, to which the inlet pipe 6 connected to the inlet of the compressor 4 is connected, corresponds to the outlet port described in the claims of this specification.

Further, as to the channel selector valve according to the first embodiment, the through holes 11b and 11c of the valve seat 11, to which the pipe 7 connected to the indoor heat exchanger 9A and the pipe 8 connected to the outdoor heat exchanger 9B are connected respectively, correspond to the two selector ports described in the claims of this specification.

In the following, an operation of the channel selector valve according to the first embodiment constructed as described above will be explained.

When the operation of the compressor 4 is halted, as shown in FIG. 1, the piston cylinder 12 energized by the compression spring 13 is at the first position, the inlet pipe 6 communicates with the pipe 8 through the closed space S1, while the outlet pipe 5 communicates with the pipe 7 through the high pressure space S2.

When the compressor 4 starts to operate, a refrigerant discharged from the compressor 4 flows into the high pressure space S2 through the outlet pipe 5. At that time, if a force F1 (hereinafter, forward drive force) applied to the piston cylinder 12 from the high pressure chamber $R_1$ due to the pressure of the refrigerant is equal to or less than the resultant force F2+Fs+Ff, the piston cylinder 12 does not move from the first position, wherein F2 (hereinafter, backward drive force) is the force applied to the piston cylinder 12 from the pressure-transducing chamber $R_2$ due to the pressure of the refrigerant in the pressure-transducing chamber $R_2$, Fs is the energizing force by the compression spring 13, and Ff is the static friction force between the smooth surface 11d of the valve seat 11 and the slide valve 27.

On the other hand, if the forward drive force F1 is greater than the resultant force F2+Fs+Ff, the piston cylinder 12 moves from the first position to the second position as shown in FIGS. 1 and 2, respectively.

If the piston cylinder 12 does not move from the first position, as shown in FIG. 1, the inlet pipe 6 keeps communicating with the pipe 8 through the closed space S1, while the outlet pipe 5 keeps communicating with the pipe 7 through the high pressure space S2.

Then, since the pipe 7 communicating with the high pressure space S2 always communicates with the pressure-transducing chamber $R_2$ through the channel 14, the pressure of the refrigerant in the high pressure chamber $R_1$ becomes equal to that of the refrigerant in pressure-transducing chamber $R_2$.

Consequently, as long as the pressure of the refrigerant discharged from the compressor 4 is restrained so that the forward drive force F1 is equal to or less than the resultant force F2+Fs+Ff, the piston cylinder 12 keeps staying at the first position, thereby the inlet pipe 6 keeps communicating with the pipe 8 through the closed space S1, while the outlet pipe 5 keeps communicating with the pipe 7 through the high pressure space S2.

To the contrary, when the piston cylinder 12 moves from the first position to the second position, as shown in FIG. 2, the outlet pipe 5 communicates with the pipe 8 through the high pressure space S2, while the inlet pipe 6 communicates with the pipe 7 through the closed space S1.

Then, the pressure of the refrigerant in the high pressure chamber $R_1$, which becomes equal to that of the refrigerant at the outlet of the compressor 4 since the pressure-transducing chamber $R_2$ always communicates with the inlet pipe 6 through the pipe 7 and the channel 14, becomes greater than the pressure of the refrigerant in the pressure-transducing chamber $R_2$, which becomes equal to that of the refrigerant at the inlet of the compressor 4 since the pressure-transducing chamber $R_2$ communicates with the inlet of the compressor 4, by a difference between an outlet pressure and an inlet pressure of the refrigerant due to an operation of the compressor 4.

Consequently, as long as the pressure of the refrigerant discharged from the compressor 4 is kept high so that the forward drive force F1 is greater than a force F2+Fs−Ff, the piston cylinder 12 keeps staying at the second position, thereby the outlet pipe 5 keeps communicating with the pipe 8 through the high pressure space S2, while the inlet pipe 6 keeps communicating with the pipe 7 through the closed space S1.

Therefore, if the refrigerant, the pressure of which is such that the forward drive force F1 is equal to or less than the resultant force F2+Fs+Ff, flows into the high pressure space S2 through the outlet pipe 5 upon start of operation of the compressor 4, the piston cylinder 12 is situated at the first position as shown in FIG. 1.

To the contrary, if the refrigerant, the pressure of which is such that the forward drive force F1 is greater than the resultant force F2+Fs+Ff, flows into the high pressure space S2 through the outlet pipe 5 upon start of operation of the compressor 4, the piston cylinder 12 is situated at the second position as shown in FIG. 2.

Then afterward, the pressure of the refrigerant, which is discharged from the compressor and flows into the high pressure space S2 through the outlet pipe 5, is lowered by, for example, stopping the operation of the compressor 4 so that the forward drive force F1 is equal to or less than the force F2+Fs−Ff, the piston cylinder 12 moves from the second position to the first position.

Therefore, when the refrigerating cycle A is operated in the heating mode, the number of revolution of the compressor 4 upon start of its operation is restrained to keep the pressure of the refrigerant discharged from the compressor 4 low so that the forward drive force F1 is equal to or less than the resultant force F2+Fs+Ff, thereby the piston cylinder 12 is kept staying at the first position even after start of the operation of the compressor 4.

On the other hand, when the refrigerating cycle A is operated in the cooling mode, the number of revolution of the compressor 4 upon start of its operation is raised to increase the pressure of the refrigerant discharged from the compressor 4 so that the forward drive force F1 is greater than the resultant force F2+Fs+Ff, thereby the piston cylinder 12 is moved from the first position to the second position upon start of the operation of the compressor 4.

Then, once the piston cylinder 12 is moved to the second position, as long as the forward drive force F1 is greater than the force F2+Fs−Ff, the piston cylinder 12 is kept staying at the second position even if the number of revolution of the compressor 4 is lowered, thereby the refrigerating cycle A is kept being operated in the cooling mode.

Thus, according to the first embodiment, the piston cylinder 12 that partitions the interior of the reversing valve housing 1 into the high pressure chamber $R_1$ and the pressure-transducing chamber $R_2$ is moved between the first and second positions, and the slide valve 27 joined to the piston cylinder 12 is slided on the smooth surface 11d of the valve seat 11, thereby the closed space S1, formed by the cavity 27a of the slide valve 27 and the smooth surface 11d, communicates the through hole 11a corresponding to the inlet pipe 6 to either the through hole 11b corresponding to the pipe 7 or the through hole 11c corresponding to the pipe 8. In order to achieve the above operation, the following constitution is employed as to the channel selector valve.

That is, the channel 14 always communicates the pipe 7 to the pressure-transducing chamber $R_2$ outside the reversing valve housing 1, and when the piston cylinder 12 is situated at the first position, the pressure of the refrigerant in the pressure-transducing chamber $R_2$ is set equal to that of the refrigerant in the high pressure space S2 of the high pressure chamber $R_1$ that communicates with the pressure-transducing chamber $R_2$ through the pipe 7 and the channel 14, thereby the piston cylinder 12 is kept at the first position.

To the contrary, when the piston cylinder 12 is situated at the second position, the pressure of the refrigerant in the pressure-transducing chamber $R_2$ is set equal to that of the refrigerant at the inlet pipe 6 that communicates with the pressure-transducing chamber $R_2$ through the pipe 7 and the channel 14, i.e. that of the.refrigerant at the inlet of the compressor 4 so that the pressure of the refrigerant in the pressure-transducing chamber $R_2$ is lower than that of the refrigerant in the high pressure chamber $R_1$, the piston cylinder 12 is kept at the second position due to a difference between the pressure of the refrigerant in the high pressure chamber $R_1$ and that of the refrigerant in pressure-transducing chamber $R_2$.

Therefore, the heating mode, in which the refrigerant discharged from the compressor 4 is supplied to the indoor heat exchanger 9A by way of the pipe 7, and the cooling mode, in which the refrigerant discharged from the compressor 4 is supplied to the outdoor heat exchanger 9B by way of the pipe 8, can be selected by changing the pressure of the discharged refrigerant upon start of operation of the compressor 4 and the selected state can be maintained without using any exclusive power source such as an electromagnetic solenoid.

According to the first embodiment, the indoor heat exchanger 9A is connected to the pipe 7 while the outdoor heat exchanger 9B is connected to the pipe 8, and when the piston cylinder 12 is energized by the compression spring 13 to be situated at the first position, the outlet pipe 5 communicates with the indoor heat exchanger 9A through the high pressure space S2 and the pipe 7 while the inlet pipe 6 communicates with the outdoor heat exchanger 9B through the closed space S1 and the pipe 8, therefore, the following advantage is obtained when the refrigerating cycle A is used mainly in the heating mode.

That is, upon start of operation of the refrigerating cycle A in the cooling mode, the pressure of the refrigerant discharged from the compressor 4 upon start of operation of the compressor 4 is set high so that the forward drive force F1 becomes greater than the resultant force F2+Fs+Ff, thereby the piston cylinder 12 is moved from the first position to the second position.

However, when the refrigerating cycle A is started to operate in the heating mode, which is more frequently employed than the cooling mode, the piston cylinder 12 is situated at the first position, then the operation of the refrigerating cycle A in the heating mode is started, thereafter the piston cylinder 12 is still kept being situated at the first position, thereby the refrigerating cycle A can be maintained in operation in the heating mode without raising the pressure of the discharged refrigerant upon start of operation of the compressor 4 up to as high as the pressure required upon start of operation of the refrigerating cycle A in the cooling mode. Therefore, the advantage described above can be obtained.

Figure 3:
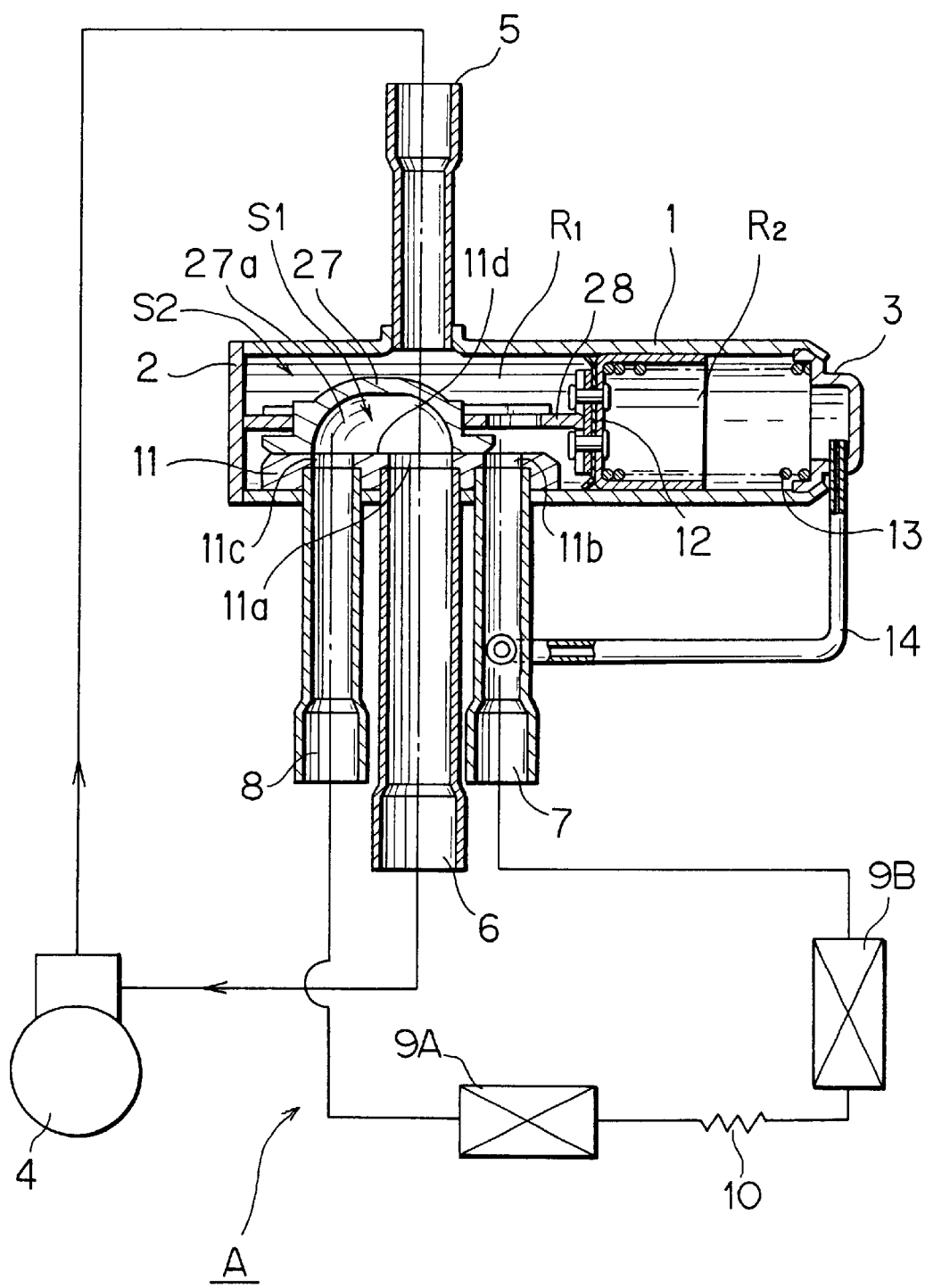
FIG. 3 is a view illustrating a schematic constitution of a refrigerating cycle employing a channel selector valve according to a second embodiment of the present invention.

In contrast with the first embodiment, FIG. 3 is a view illustrating a schematic constitution of a refrigerating cycle employing a channel selector valve according to a second embodiment of the present invention. As to the second embodiment, the outdoor heat exchanger 9B is connected to the pipe 7 while the indoor heat exchanger 9A is connected to the pipe 8, and when the piston cylinder 12 is energized by the compression spring 13 to be situated at the first position, the outlet pipe 5 communicates with the outdoor heat exchanger 9B through the high pressure space S2 and the pipe 7 while the inlet pipe 6 communicates with the indoor heat exchanger 9A through the closed space S1 and the pipe 8, therefore, the following advantage is obtained when the refrigerating cycle A is used mainly in the cooling mode.

That is, upon start of operation of the refrigerating cycle A in the heating mode, the pressure of the refrigerant discharged from the compressor 4 upon start of operation of the compressor 4 is set high so that the forward drive force F1 becomes greater than the resultant force F2+Fs+Ff, thereby the piston cylinder 12 is moved from the first position to the second position.

However, when the refrigerating cycle A is started to operate in the cooling mode, which is more frequently employed than the heating mode, the piston cylinder 12 is situated at the first position, then the operation of the refrigerating cycle A in the cooling mode is started, thereafter the piston cylinder 12 is still kept being situated at the first position, thereby the refrigerating cycle A can be maintained in operation in the cooling mode without raising the pressure of the discharged refrigerant upon start of operation of the compressor 4 up to as high as the pressure required upon start of operation of the refrigerating cycle A in the heating mode. Therefore, the advantage described above can be obtained.

Figure 4:
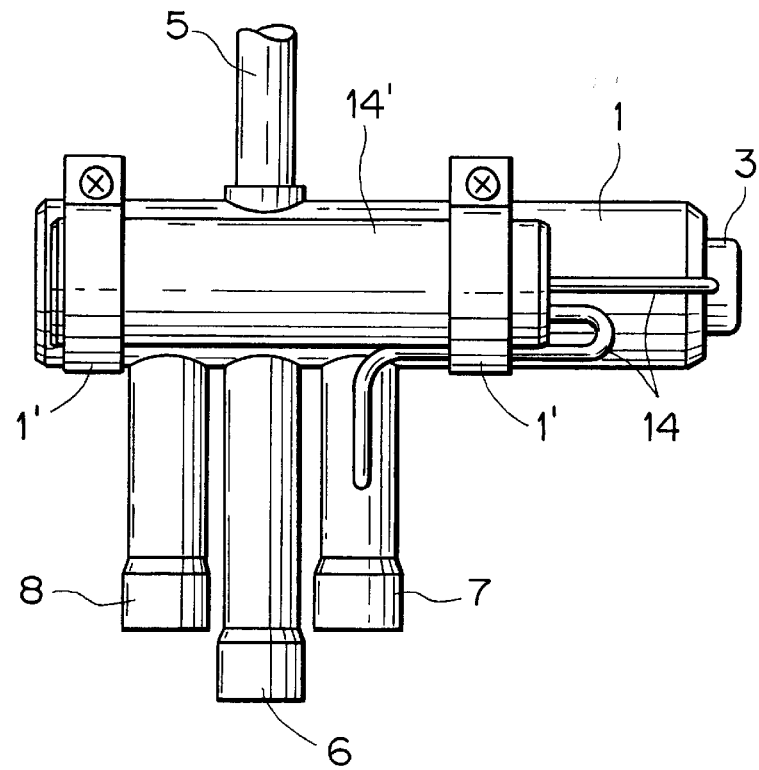
FIG. 4 is a front view illustrating a modified example of a channel selector valve according to the first or second embodiment of the present invention.
Figure 5:
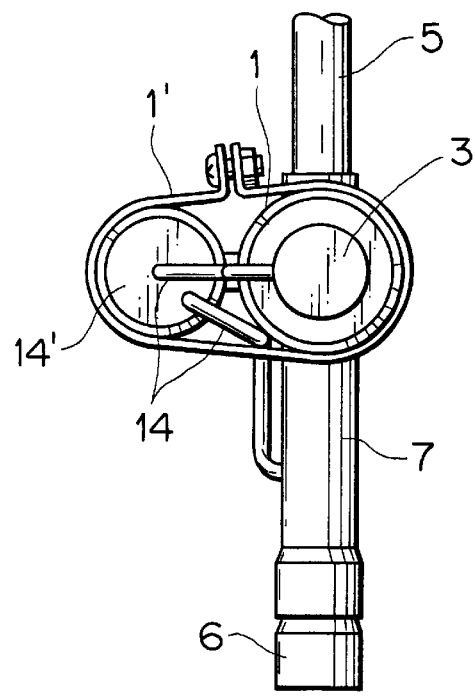
FIG. 5 is a side view of the channel selector valve of FIG. 4.

As to the above channel selector valve according to the first and second embodiments, as shown in FIG. 4 (front view) and FIG. 5 (side view), a delay chamber 14', the inner diameter of which is larger than that of the channel 14, may be provided so that a period of time, required for the refrigerant pressure in the pressure-transducing chamber $R_2$ to be equal to the pressure in the high pressure space S2 with which the pressure-transducing chamber $R_2$ communicates through the pipe 7 and the channel 14, is made longer by another period of time required for the delay chamber 14' to be filled with the refrigerant when the pressure of the refrigerant discharged from the compressor 4 is raised so that the forward drive force F1 is higher than the resultant force F2+Fs+Ff.

The delay chamber 14' described above gives an advantage that the piston cylinder 12 can easily move from the first position to the second position since a differential pressure between the refrigerant in the high pressure chamber $R_1$ and that in the pressure-transducing chamber $R_2$ is easily occurred because the refrigerant pressure in the pressure-transducing chamber $R_2$ does not increase in a short period time even if the refrigerant pressure in the high pressure space S2 is raised.

The structure of the delay chamber 14' is not limited to that shown in FIGS. 4 and 5, in which the delay chamber 14' is attached to the reversing valve housing 1 by a belt 1'.

In the following, a channel selector valve according to a third embodiment of the present invention will be explained with reference to FIGS. 6 and 7.

Figure 6:
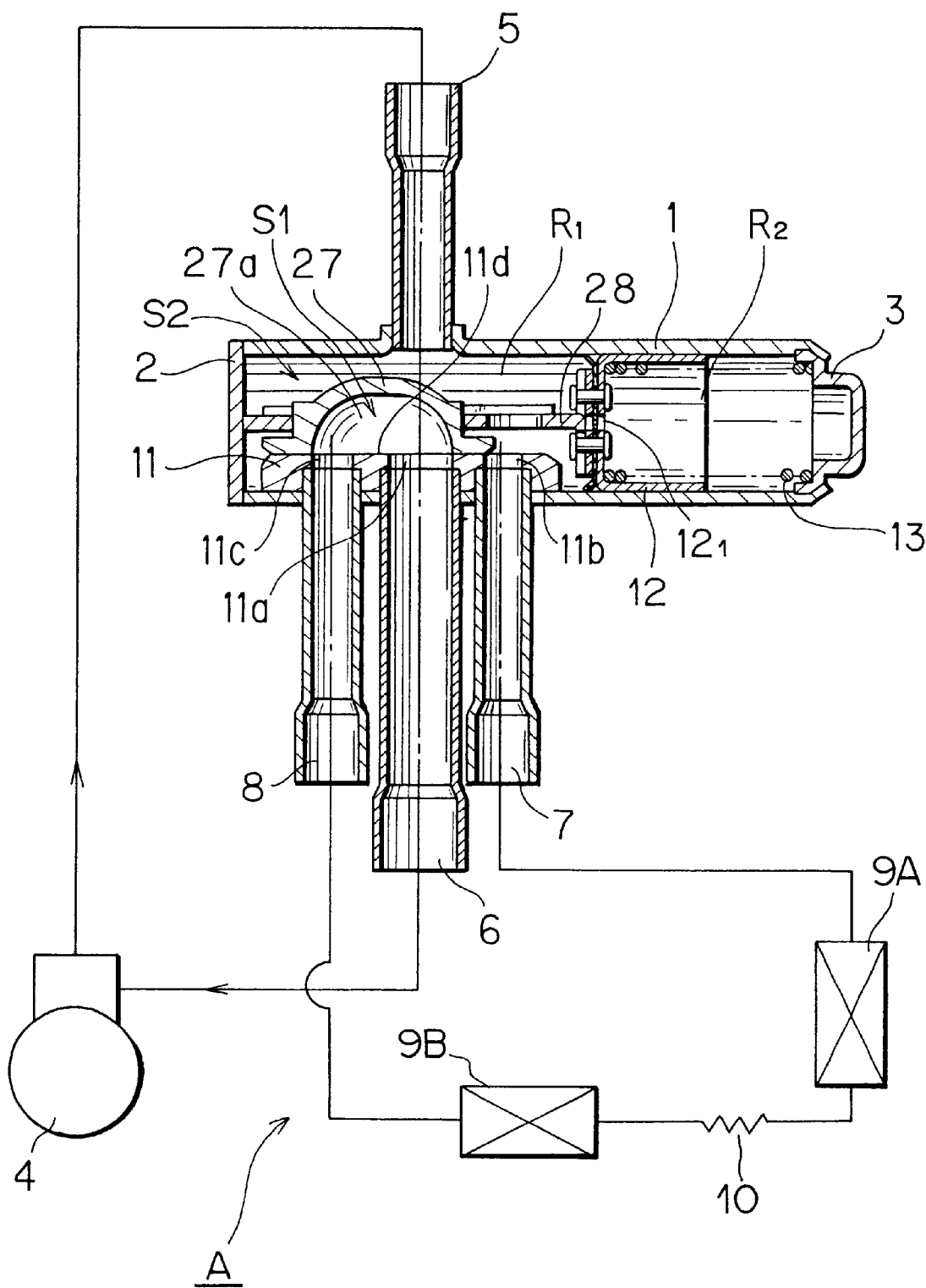
FIG. 6 is a view illustrating a schematic constitution of a refrigerating cycle employing a channel selector valve according to a third embodiment of the present invention.

FIG. 6 is a view illustrating a schematic constitution of a refrigerating cycle employing a channel selector valve according to the third embodiment of the present invention, in which the same abbreviation numerals with those used for the corresponding identical members or parts of the channel selector valve according to the first embodiment shown in FIG. 1 are used.

The channel selector valve according to the third embodiment, a state in operation in the hearting mode of which is shown in FIG. 6 by its sectional view, is different from the channel selector valve according to the first embodiment in a point that the channel 14 always communicating the pressure-transducing chamber $R_2$ to the pipe 7 by way of the outside of the reversing valve housing 1 is omitted.

Furthermore, the channel selector valve according to the third embodiment shown in FIG. 6 is different from the channel selector valve according to the first embodiment shown in FIG. 1 in a point that the piston cylinder 12 is provided with a through hole 12, (corresponding to an equalizing path), the inner diameter of which is designed in such a manner that a flow rate of the refrigerant flowing through the through hole 12, is much smaller than that of the refrigerant flowing through the pipe 7 or 8, thereby the high pressure chamber $R_1$ always communicates with the pressure-transducing chamber $R_2$ through the through hole 12, in the reversing valve housing 1.

The channel selector valve according to the third embodiment is similar to that according to the first embodiment in points that: the housing described in claims of the channel selector valve comprises the reversing valve housing 1 and the stoppers 2 and 3; a part of the reversing valve housing 1, to which the outlet pipe 5 communicating with the outlet of the compressor 4 is connected, corresponds to the inlet port described in claims; the through hole 11a of the valve seat 11, to which the inlet pipe 6 communicating with the inlet of the compressor 4 is connected, corresponds to the outlet port described in claims; and through holes 11b and 11c of the valve seat 11, to which the pipes 7 and 8 connecting with the indoor and outdoor heat exchangers 9A and 9B, respectively, are connected, correspond to the respective two selector ports described in claims.

In the following, an operation of the channel selector valve according to the third embodiment constructed as described above will be explained.

As shown in FIG. 6, when the operation of the compressor 4 is halted, the piston cylinder 12 is at the first position due to the energizing force Fs of the compression spring 13, thereby the inlet pipe 6 communicates with the pipe 8 through the closed space S1 and the outlet pipe 5 communicates with the pipe 7 through the high pressure space S2.

When the compressor 4 starts to operate, if the forward drive force F1 is equal to or less than the resultant force F2+Fs+Ff, the piston cylinder 12 does not move and stays at the first position, therefore the inlet pipe 6 keeps communicating with the pipe 8 through the closed space S1 and the outlet pipe 5 keeps communicating with the pipe 7 through the high pressure space S2.

In this situation, the pressure of the refrigerant in the high pressure chamber $R_1$ increases due to the refrigerant flowed into the high pressure space S2 from the compressor 4 through the outlet pipe 5 and exceeds the pressure of the refrigerant in the pressure-transducing chamber $R_2$, while the refrigerant gradually flows into the pressure-transducing chamber $R_2$ from the high pressure space S2 through the through hole 12, of the piston cylinder 12, as a result when the time passes, the pressure of the refrigerant in the high pressure space S2 becomes equal to that of the refrigerant in the pressure-transducing chamber $R_2$.

Therefore, as long as the pressure of the refrigerant discharged from the compressor 4 is restrained so that the forward drive force F1 is equal to or less than the resultant force F2+Fs+Ff, the piston cyliner 12 keeps staying at the first position, as a result, the outlet pipe 5 keeps communicating with the pipe 7 through the high pressure space S2 and the inlet pipe 6 keeps communicating with the pipe 8 through the closed space S1.

Figure 7:
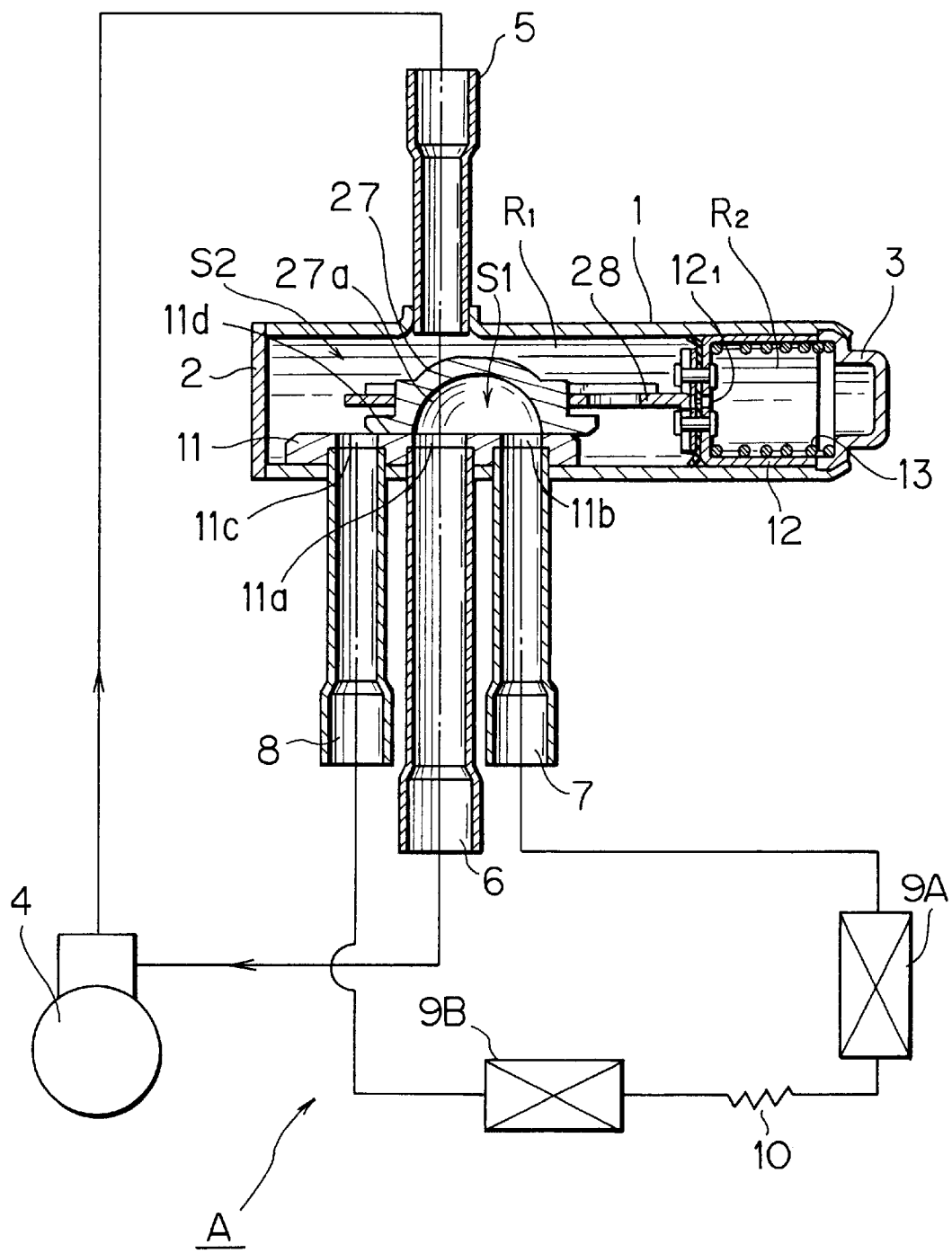
FIG. 7 is a view illustrating a schematic constitution of a refrigerating cycle, in which a sectional view of the channel selector valve of FIG. 6 in a cooling mode is shown.

To the contrary, when the forward drive force F1 exceeds the resultant force F2+Fs+Ff, the piston cylinder 12 moves from the first position, as shown in FIG. 7 illustrating a schematic constitution of a refrigerating cycle in which a sectional view of the channel selector valve in a cooling mode is shown, the piston cylinder 12 abuts on the stopper 3, thereby the piston cylinder 12 is situated at the second position by being restricted its further movement toward the stopper 3, that is, the outlet pipe 5 communicates with the pipe 8 through the high pressure space S2 and the inlet pipe 6 communicates with the pipe 7 through the closed space S1.

Thereafter, if the compressor 4 is kept in operation with keeping a difference between the high and low pressures so that the static friction force Ff exceeds the energizing force Fs due to the compression spring 13, the piston cylinder 12 keeps staying at the second position.

Similarly to the function of the channel selector valve according to the first embodiment, by employing the channel selector valve according to the third embodiment, the heating mode, in which the refrigerant discharged from the compressor 4 is supplied to the indoor heat exchanger 9A by way of the pipe 7, and the cooling mode, in which the refrigerant discharged from the compressor 4 is supplied to the outdoor heat exchanger 9B by way of the pipe 8, can be selected by changing the pressure of the discharged refrigerant upon start of operation of the compressor 4 and the selected state can be maintained without using any exclusive power source such as an electromagnetic solenoid.

According to the third embodiment, the indoor heat exchanger 9A is connected to the pipe 7 while the outdoor heat exchanger 9B is connected to the pipe 8, and when the piston cylinder 12 is energized by the compression spring 13 to be situated at the first position, the outlet pipe 5 communicates with the indoor heat exchanger 9A through the high pressure space S2 and the pipe 7 while the inlet pipe 6 communicates with the outdoor heat exchanger 9B through the closed space S1 and the pipe 8, therefore, the advantage that is the same with that of the channel selector valve according to the first embodiment is obtained when the refrigerating cycle A is used mainly in the heating mode.

Figure 8:
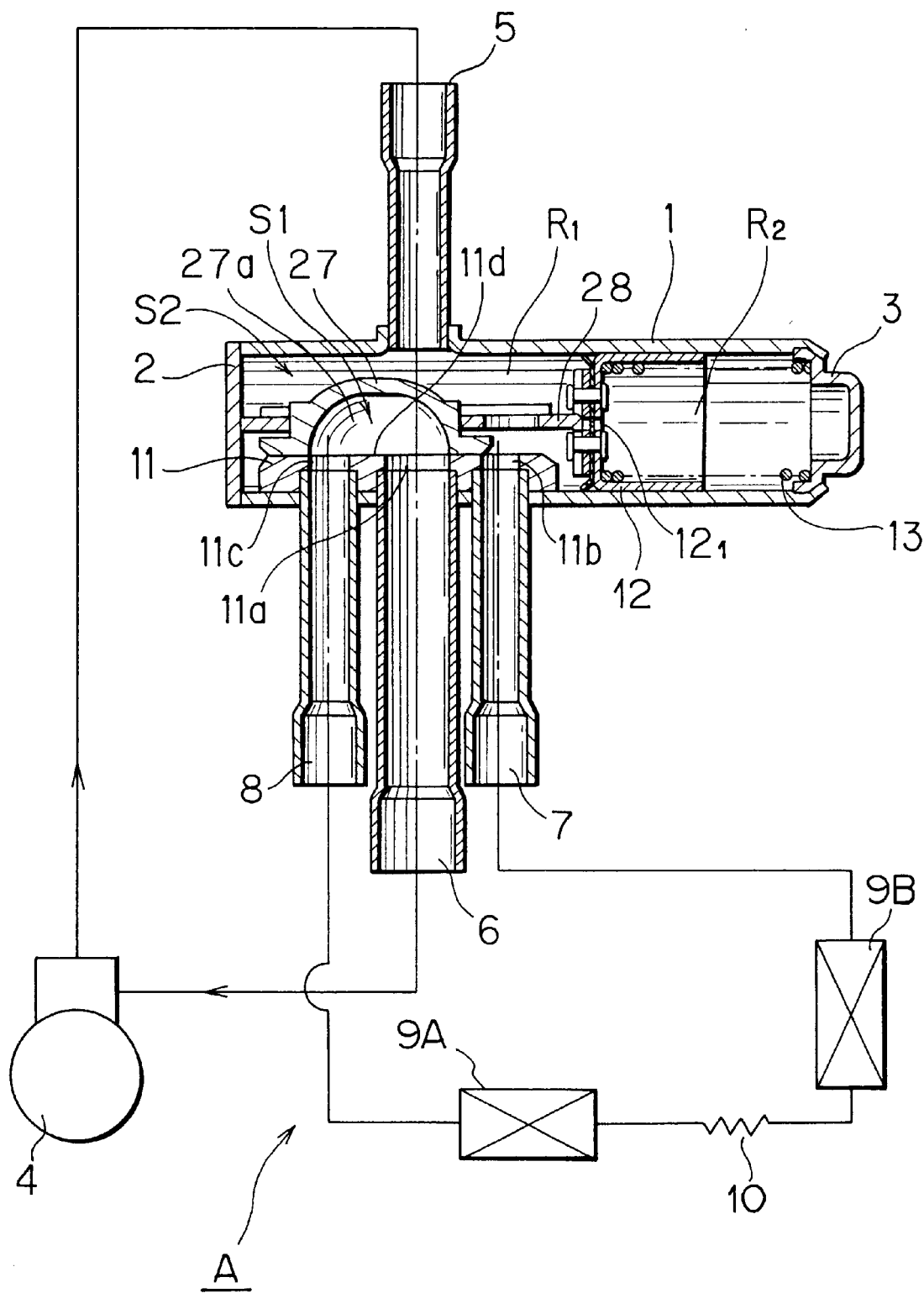
FIG. 8 is a view illustrating a schematic constitution of a refrigerating cycle employing a channel selector valve according to a fourth embodiment of the present invention.

In contrast with the third embodiment, FIG. 8 is a view illustrating a schematic constitution of a refrigerating cycle employing a channel selector valve according to a fourth embodiment of the present invention. As to the fourth embodiment, the outdoor heat exchanger 9B is connected to the pipe 7 while the indoor heat exchanger 9A is connected to the pipe 8, and when the piston cylinder 12 is energized by the compression spring 13 to be situated at the first position, the outlet pipe 5 communicates with the outdoor heat exchanger 9B through the high pressure space S2 and the pipe 7 while the inlet pipe 6 communicates with the indoor heat exchanger 9A through the closed space S1 and the pipe 8, therefore, the advantage that is the same with that of the channel selector valve according to the second embodiment is obtained when the refrigerating cycle A is used mainly in the cooling mode.

As to each channel selector valve according to the first to fourth embodiments, when the compressor 4 is in operation, a pressure of the refrigerant discharged from the compressor 4 flowing into the high pressure space S2 through the outlet pipe 5 is higher than another pressure of the refrigerant in the closed space S1 communicating with the inlet of the compressor 4 through the inlet pipe 6 whether the piston cylinder 12 is at the first position or the second position, therefore, the slide valve 27 is pressed onto the valve seat 11 by a force corresponding to a difference between these two pressures of the refrigerant.

Consequently, when the compressor 4 is in operation, a static friction force between the slide valve 27 and the smooth surface 11d of the valve seat 11 increases by a quantity corresponding to the difference in pressure between the refrigerant in the high pressure space S2 and that in the closed space S1, which is a basis for a force to press the slide valve 27 onto the valve seat 11.

Therefore, when the piston cylinder 12 is moved between the first and second positions in order to switch the operation mode of the refrigerating cycle A between the heating mode and the cooling mode, preferably, the static friction force between the slide valve 27 and the smooth surface 11d of the valve seat 11 is reduced or removed by reducing or removing the difference in pressure between the refrigerant in the high pressure space S2 and that in the closed space S1 through, for example, a tentative stop of the operation of the compressor 4.

In the above third or fourth embodiment, the equalizing path is constituted by the through hole $12_1$ of the piston cylinder 12. However, the equalizing path provided for the movable member is not limited to the through hole described above and may be a path formed between the other member or may be constituted in combination with a path and a through hole.

In the following, a channel selector valve according to a fifth embodiment of the present invention will be explained with reference to FIGS. 9 to 14.

Figure 9:
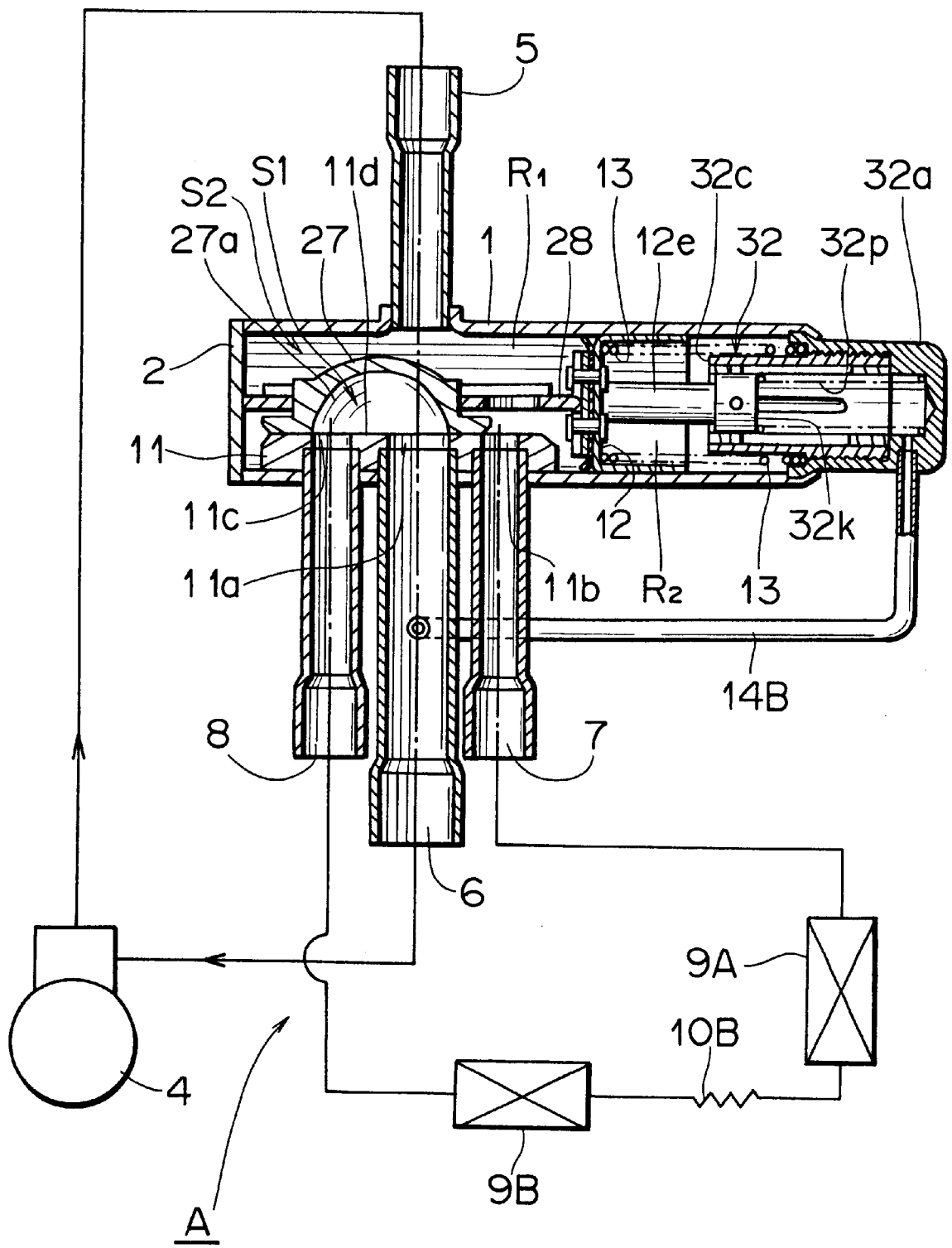
FIG. 9 is a view illustrating a schematic constitution of a refrigerating cycle employing a channel selector valve according to a fifth embodiment of the present invention.

FIG. 9 is a view illustrating a schematic constitution of a refrigerating cycle employing a channel selector valve according to the fifth embodiment of the present invention, in which the same abbreviation numerals with those used for the corresponding identical members or parts of the channel selector valve according to the first embodiment shown in FIG. 1 are used.

The channel selector valve according to the fifth embodiment, a state in operation in the hearting mode of which is shown in FIG. 9 by its sectional view, constitutes the refrigerating cycle A together with the compressor 4, the indoor heat exchanger 9A, the outdoor heat exchanger 9B and the capillary tube 10B that is provided between the indoor heat exchanger 9A and the outdoor heat exchanger 9B.

The channel selector valve according to the fifth embodiment is different from the channel selector valve according to the first embodiment shown in FIG. 1 in a point that the reversing valve housing 1 is provided with a latch mechanism 32 (corresponding to the latch mechanism described in claims 25 to 28) at one end thereof, which includes a seal housing 32a that seals one end of the reversing valve housing 1 instead of the stopper 3.

Figure 10:
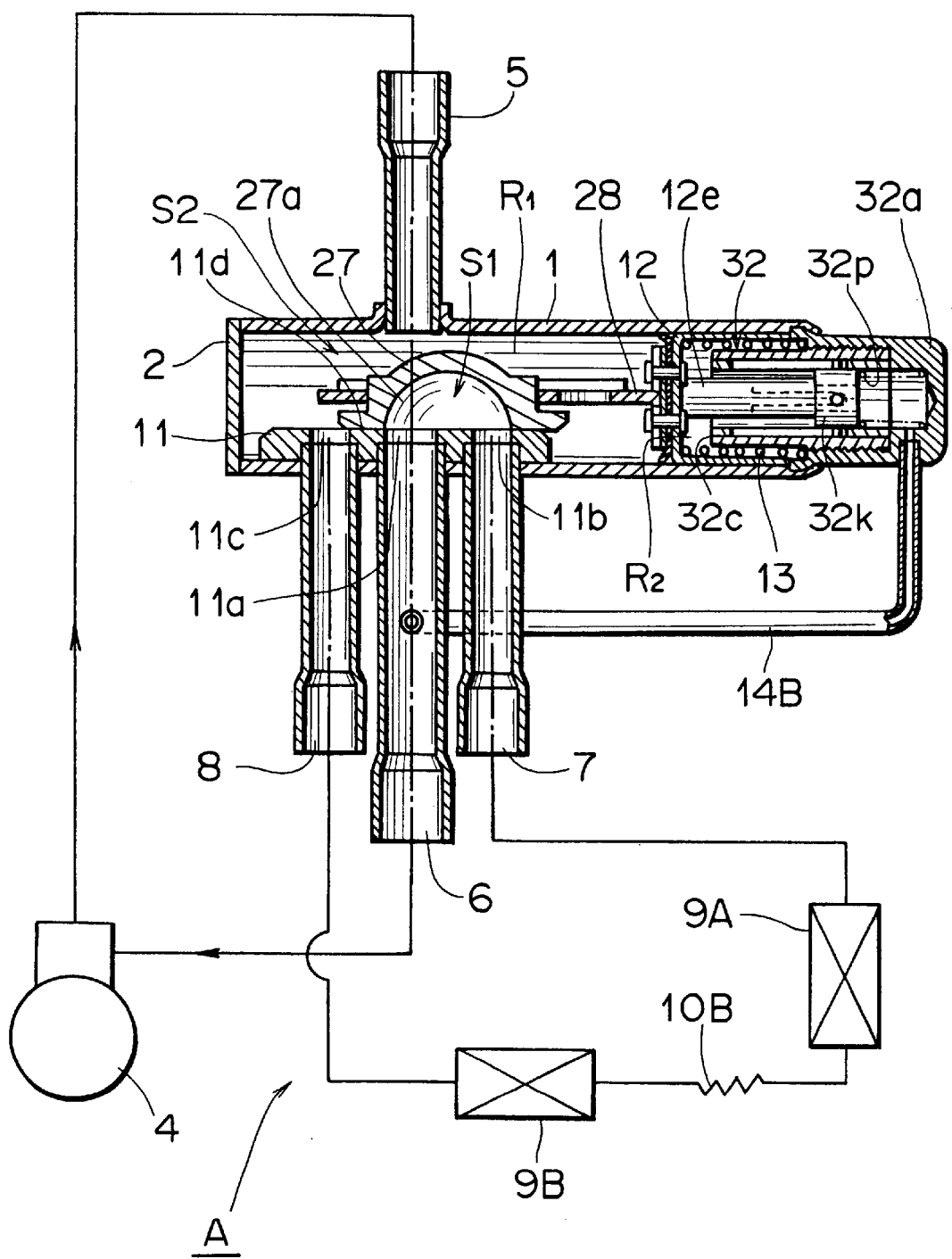
FIG. 10 is a view illustrating a schematic constitution of a refrigerating cycle, in which a sectional view of the channel selector valve of FIG. 9 in a cooling mode is shown.

As to the channel selector valve according to the fifth embodiment, the piston cylinder 12 can move between a first position and a second position: at said first position, the piston cylinder 12 is prevented from moving further toward the stopper 2 because an end of the connecting shaft 28 abuts on the stopper 2 as shown in FIG. 9; and at said second position, the piston cylinder 12 is prevented from moving further toward the seal housing 32a because the piston cylinder 12 abuts on the seal housing 32a as shown in FIG. 10. FIG. 10 is a view illustrating a schematic constitution of a refrigerating cycle, in which a sectional view of the channel selector valve of FIG. 9 in a cooling mode is shown.

The latch mechanism 32 comprises the seal housing 32a, a guide cylinder 32c received in the seal housing 32a, a part of which protrudes toward the inside of the pressure-transducing chamber $R_2$ of the reversing valve housing 1, a latch piece 32k, and a coil spring 32p.

Figure 11:
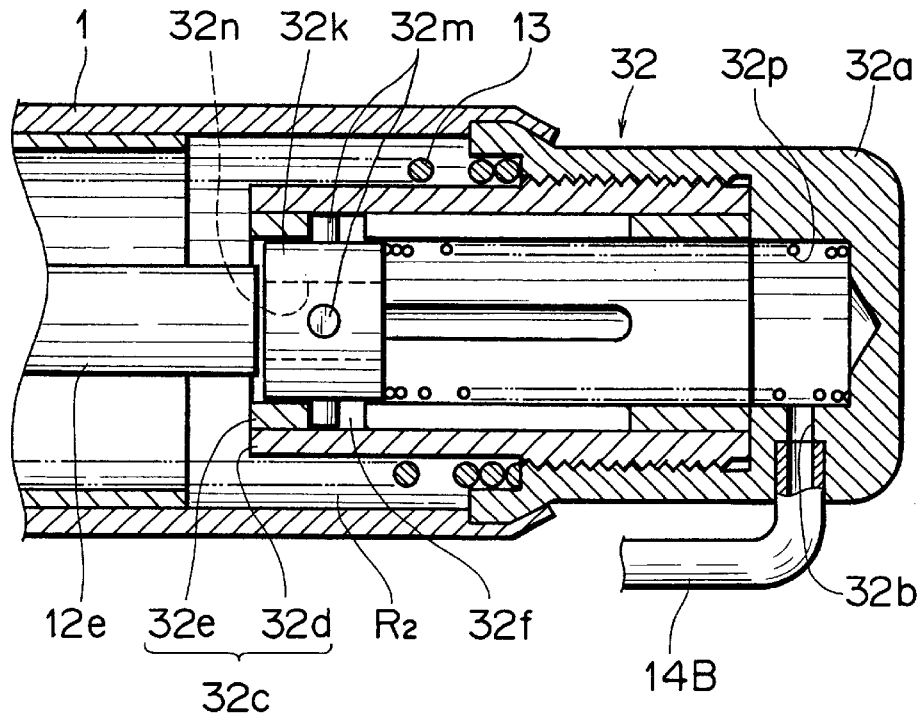
FIG. 11 is an enlarged sectional view of a primary part of a latch mechanism of FIG. 9.

The seal housing 32a has a hollow cylindrical shape with one end open and the opposite end closed, as shown in FIG. 11 (an enlarged sectional view of a primary part of a latch mechanism of FIG. 9), at a periphery near the closed end of the seal housing 32a, there is provided a port 32b for communicating the interior of the seal housing 32a with the exterior thereof, to which a channel 14B connected to the inlet pipe 6 is connected.

The guide cylinder 32c consists of two layers, i.e. an outer cylinder 32d and an inner cylinder 32e in which a cam groove 32f for the latch action is formed.

Figure 12:
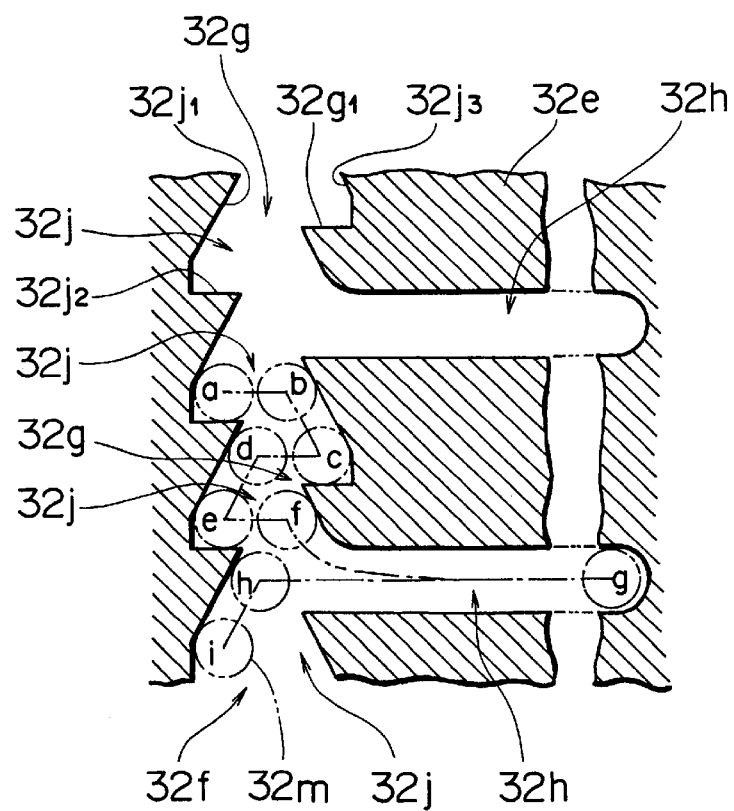
FIG. 12 is an enlarged development of a primary part of an inner cylinder of FIG. 11.

FIG. 12 is an enlarged development of a primary part of an inner cylinder 32e. As shown in FIG. 12, the cam groove 32f is formed in a shape of a deformed saw blade, in which shallow grooves 32g and deep grooves 32h are arranged in a circumferential direction of the inner cylinder 32e at intervals of 90° and a connection groove 32j connects the shallow groove 32g with the adjoining deep groove 32h.

The latch piece 32k has a flat cylindrical shape and its diameter is formed so that the latch piece 32k is movable in an axial direction within the inner cylinder 32e of the guide cylinder 32c. At each circumferential position located in a circumferential direction of the latch piece 32k at intervals of 90°, a respective cam follower pin 32m that can be inserted into the cam groove 32f of the inner cylinder 32e is formed. Inside the latch piece 32k, a through hole 32n is formed throughout both ends thereof.

The coil spring 32p is provided between the latch piece 32k and the closed opposite end of the seal housing 32a, by an elastic force of which the latch piece 32k is energized toward the open end of the seal housing 32a.

As to the latch mechanism 32, the cam follower pin 32m of the latch piece 32k energized by the elastic force of the coil spring 32p is guided by a first inclined plane $32j_1$ of the connection groove 32j of the cam groove 32f so as to abut on a stopper plane $32j_2$ so that the latch piece 32k is situated at a deregulation position of the inner cylinder 32e, that is, in the vicinity of the end of the inner cylinder 32e at the high pressure chamber $R_1$ side.

When the cam follower pin 32m of the latch piece 32k situated at the deregulation position abuts on the stopper plane $32j_2$ by way of the first inclined plane $32j_1$ of the connection groove 32j facing the deep groove 32h, that is, when the cam follower pin 32m is situated at a position "a" in a locus of the cam follower pin 32m shown with an imaginary lines (i.e. alternate long and short dash lines or alternate long and two short dashes lines) in FIG. 12, the latch piece 32k is moved toward the closed end of the seal housing 32a against the elastic force by the coil spring 32p, thereby the latch mechanism 32 performs the following action.

That is, the cam follower pin 32m is guided by the stopper plane $32j_2$ so as to move from the position "a" to a position "b", then guided by a second inclined plane $32j_3$ of the connection groove 32j facing the stopper plane $32j_2$ so as to move from the position "b" to a position "c", thereby the cam follower pin 32m abuts on a stopper plane $32g_1$ of the shallow groove 32g.

Figure 13:
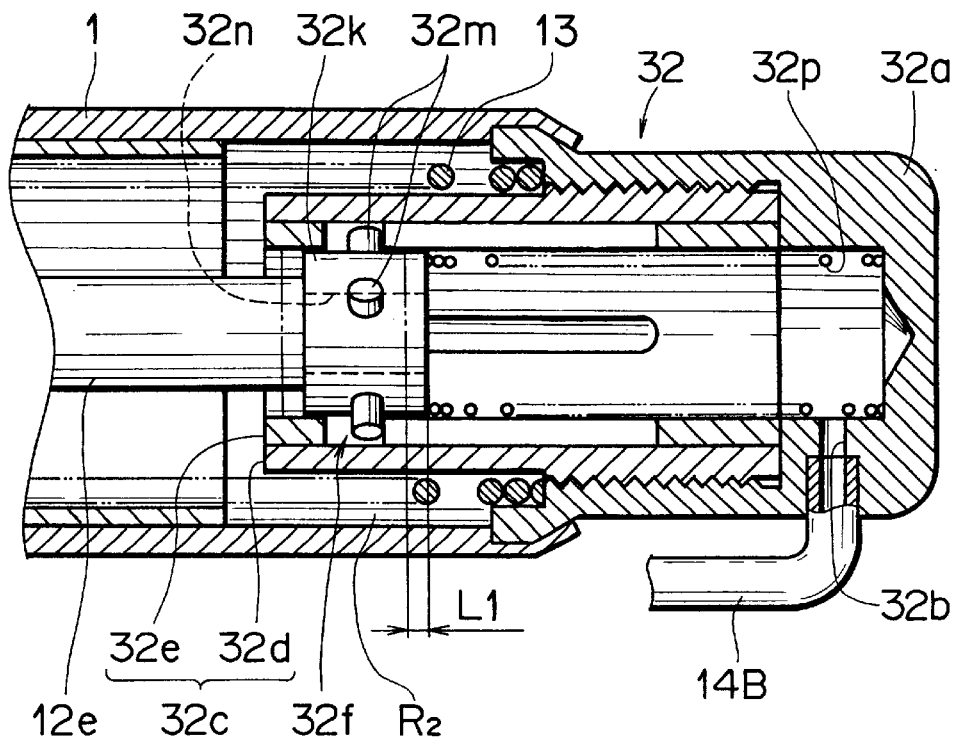
FIG. 13 is an enlarged sectional view of a primary part of a latch mechanism of FIG. 9.

Then, in this state, as long as a force to move the latch piece 32k toward the closed end of the seal housing 32a affects the latch piece 32k, as shown in FIG. 12, the movement of the latch piece 32k is restrained at a first regulation position where is a first stroke L1 off from the deregulation position, shown with an imaginary line (i.e. alternate long and two short dashes line) in FIG. 13, toward the closed end of the seal housing 32a.

When the cam follower pin 32m of the latch piece 32k situated at the deregulation position abuts on the stopper plane $32j_2$ by way of the first inclined plane $32j_1$ of the connection groove 32j facing the shallow groove 32g, that is, when the cam follower pin 32m is situated at a position "e" in a locus of the cam follower pin 32m shown with an imaginary lines (i.e. alternate long and short dash lines or alternate long and two short dashes lines) in FIG. 12, the latch piece 32k is moved toward the closed end of the seal housing 32a against the elastic force by the coil spring 32p, thereby the latch mechanism 32 performs the following action.

That is, the cam follower pin 32m is guided by the stopper plane $32j_2$ so as to move from the position "e" to a position "f", then guided by the second inclined plane $32j_3$ of the connection groove 32j facing the stopper plane $32j_2$ so as to move from the position "f" to a position "g", thereby the cam follower pin 32m reaches an end of the deep groove 32h.

Figure 14:
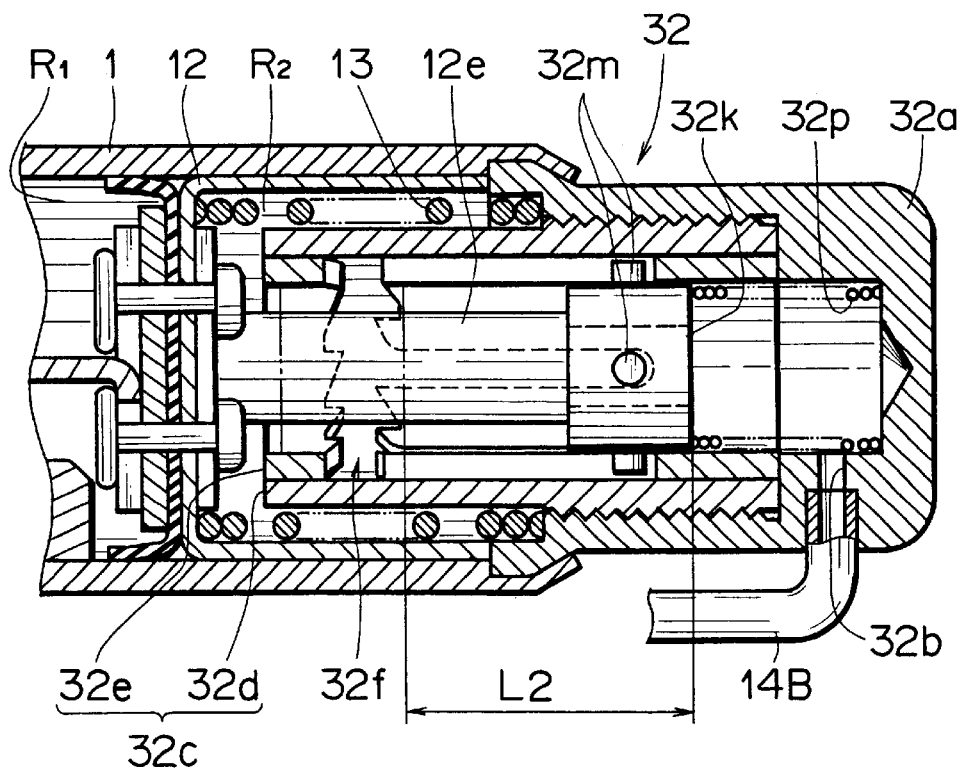
FIG. 14 is an enlarged sectional view of a primary part of a latch mechanism of FIG. 9.

Then, as long as a force to move the latch piece 32k toward the closed end of the seal housing 32a affects the latch piece 32k, as shown in FIG. 14, the movement of the latch piece 32k is restrained at a second regulation position where is a second stroke L2 off from the deregulation position, shown with an imaginary line (i.e. alternate long and two short dashes line) in FIG. 14, toward the closed end of the seal housing 32a.

Here, the second stroke L2 is set a little longer than a distance between the first position and the second position of the piston cylinder 12, while the first stroke L1 is set much shorter than said distance.

In the state that the movement of the latch piece 32k is restrained at the first regulation position, when a force to move the latch piece 32k toward the closed end of the seal housing 32a does not affect, the cam follower pin 32m of the latch piece 32k energized by the elastic force of the coil spring 32p is guided by the first inclined plane $32j_1$ of the connection groove 32j of the cam groove 32f so as to move from a position "d" to a position "e" in FIG. 12 and abuts on the stopper plane $32j_2$, thereby the latch piece 32k comes back to the deregulation position shown in FIG. 11.

Similarly, in the state that the movement of the latch piece 32k is restrained at the second regulation position, when a force to move the latch piece 32k toward the closed end of the seal housing 32a does not affect, the cam follower pin 32m of the latch piece 32k energized by the elastic force of the coil spring 32p is guided by the first inclined plane $32j_1$ of the connection groove 32j of the cam groove 32f so as to move from a position "h" to a position "i" in FIG. 12 and abuts on the stopper plane $32j_2$, thereby the latch piece 32k comes back to the deregulation position shown in FIG. 11.

Furthermore, the latch mechanism 32 is constituted so that the pressure-transducing chamber $R_2$ communicates with the channel 14B through the port 32b, the interior of the seal housing 32a and the through hole 32n of the latch piece 32k no matter where the latch piece 32k is situated at the deregulation position, the first regulation position or the second regulation position.

In the channel selector valve according to the fifth embodiment, as shown in FIG. 11 and so on, a pin 12e is provided on an end of the piston cylinder 12 at the pressure-transducing chamber $R_2$ side, which is formed so that an end of the pin 12e is a little spaced from an end of the latch piece 32k situated at the deregulation position thereof as shown in FIG. 11.

As to the channel selector valve according to the fifth embodiment, the reversing valve housing 1, the stopper 2 and the seal housing 32a of the latch mechanism 32 constitute the housing described in claims of the present invention, a part of the reversing valve housing 1, to which the outlet pipe 5 connected to the outlet of the compressor 4 is connected, corresponds to the inlet port described in claims, and the through hole 11a of the valve seat 11, to which the inlet pipe 6 connected to the inlet of the compressor 4 is connected, corresponds to the outlet port described in claims.

Furthermore, as to the channel selector valve according to the fifth embodiment, through holes 11b and 11c of the valve seat 11, to which the pipes 7 and 8 connecting with the indoor and outdoor heat exchangers 9A and 9B, respectively, are connected, correspond to the respective two selector ports described in claims.

In the following, an operation of the channel selector valve according to the fifth embodiment constructed as described above will be explained.

When the operation of the compressor 4 is halted, as shown in FIG. 9, the piston cylinder 12 energized by the compression spring 13 is at the first position, the inlet pipe 6 communicates with the pipe 8 through the closed space S1, while the outlet pipe 5 communicates with the pipe 7 through the high pressure space S2.

In this state, although the pin 12e of the piston cylinder 12 abuts on the latch piece 32k, the latch piece 32k is energized by the coil spring 32p to be situated at the deregulation position shown in FIG. 11.

When the compressor 4 starts to operate, the refrigerant discharged from the compressor 4 flows into the high pressure space S2 through the outlet pipe 5, while the refrigerant pressure in the pressure-transducing chamber $R_2$, which communicates with the channel 14B through the port 32b of the latch mechanism 32, the interior of the seal housing 32a and the through hole 32n of the latch piece 32k, becomes equal to the refrigerant pressure in the inlet pipe 6 connected to the channel 14B.

Therefore, the pressure of the refrigerant flowed into the high pressure space S2 exceeds the refrigerant pressure in the pressure-transducing chamber $R_2$ by a difference between the discharge pressure and the suction pressure of the refrigerant due to the compressor 4, thereby the forward drive force F1 exceeds the resultant force F2+Fs+Ff.

Consequently, the piston cylinder 12 tends to move from the first position to the second position in the reversing valve housing 1, then the pin 12e of the piston cylinder 12 pushes the latch piece 32k and then, the latch piece 32k tends to move toward the closed end of the seal housing 32a against the energizing force by the coil spring 32p.

Here, when the cam follower pin 32m guided by the first inclined plane $32j_1$ of the connection groove 32j moves from the position "d" to the position "e" in FIG. 12, that is, when the latch piece 32k is at the deregulation position after coming back from the first regulation position, thereafter, the latch piece 32k moves toward the closed end of the seal housing 32a while the cam follower pin 32m is guided by the second inclined plane $32j_3$ to reach the position "g", i.e. the end of the deep groove 32h, by way of the position "e" and the position "f" in FIG. 12, thereby the latch piece 32k reaches the second regulation position as shown in FIG. 14.

Therefore, a move stroke of the latch piece 32k toward the closed end of the seal housing 32a becomes equal to the second stroke L2, as a result, the piston cylinder 12 reaches the second position after leaving the first position as shown in FIG. 10.

On the other hand, when the cam follower pin 32m guided by the first inclined plane $32j_1$ of the connection groove 32j moves from the position "h" to the position "i" in FIG. 12, that is, when the latch piece 32k is at the deregulation position after coming back from the second regulation position, thereafter, the latch piece 32k moves toward the closed end of the seal housing 32a while the cam follower pin 32m is guided by the second inclined plane $32j_3$ to move from the position "b" in FIG. 12 to the position "c" where the cam follower pin 32m abuts on the stopper plane $32g_1$ of the shallow groove 32g, thereby the movement of the latch piece 32k is restrained at the first regulation position as shown in FIG. 13.

Therefore, a move stroke of the latch piece 32k toward the closed end of the seal housing 32a becomes equal to the first stroke L1, as a result, even if the piston cylinder 12 tends to move from the first position thereof, the movement of the piston cylinder 12 is restrained by the latch piece 32k, the movement of which is restrained at the first regulation position, thereby the piston cylinder 12 hardly moves and keeps staying at the first position as shown in FIG. 9.

That is, the latch piece 32k, restrained its movement toward the closed end of the seal housing 32a at the first regulation position, substantially keeps the piston cylinder 12 that pushes the latch piece 32k by the pin 12e from moving toward the second position, i.e. keeps the piston cylinder 12 staying at the first position, therefore, the outlet pipe 5 keeps communicating with the pipe 7 through the high pressure space S2 while the inlet pipe 6 keeps communicating with the pipe 8 through the closed space S1.

To the contrary, when the piston cylinder 12 reaches the second position after pushing the latch piece 32k up to the second regulation position by the pin 12e, as shown in FIG. 10, the outlet pipe 5 communicates with the pipe 8 through the high pressure space S2 while the inlet pipe 6 communicates with the pipe 7 through the closed space S1.

When the compressor 4 starts to operate, the piston cylinder 12 that tends to move from the first position to the second position pushes the latch piece 32k, which comes back to the deregulation position from the second regulation position, by a pin 12e toward the closed end of the seal housing 32a, as shown in FIG. 13, the movement of the latch piece 32k is restrained at the first regulation position by the latch mechanism 32, therefore, the piston cylinder 12 hardly moves toward the second position and keeps staying at the first position as shown in FIG. 9.

Thereafter, the pressure of the refrigerant, which is discharged from the compressor 4 and flows into the high pressure space S2 through the outlet pipe 5, is reduced by stopping the operation of the compressor 4 or the like so that the forward drive force F1 is equal to or less than the force F2+Fs−Ff, the latch piece 32k situated at the first regulation position moves toward the high pressure chamber $R_1$ by an energizing force due to the coil spring 32p and comes back to the deregulation position as shown in FIG. 11.

On the other hand, when the compressor 4 starts to operate, the piston cylinder 12 that tends to move from the first position to the second position pushes the latch piece 32k, which is at the deregulation position after coming back from the first regulation position, by a pin 12e toward the closed end of the seal housing 32a, as shown in FIG. 14, the latch piece 32k reaches the second regulation position, therefore, the piston cylinder 12 reaches the second position as shown in FIG. 10.

Thereafter, the pressure of the refrigerant, which is discharged from the compressor 4 and flows into the high pressure space S2 through the outlet pipe 5, is reduced by stopping the operation of the compressor 4 or the like so that the forward drive force F1 is equal to or less than the force F2+Fs−Ff, the latch piece 32k situated at the second regulation position moves toward the high pressure chamber $R_1$ by an energizing force due to the coil spring 32p and comes back to the deregulation position as shown in FIG. 11.

Therefore, when the refrigerating cycle A is operated in the heating mode, the latch piece 32k can be set at the deregulation position after coming back from the second regulation position, then the compressor 4 is started to operate, thereby the piston cylinder 12 can be kept at the first position during the operation of the compressor 4.

On the other hand, when the refrigerating cycle A is operated in the cooling mode, the latch piece 32k can be set at the deregulation position after coming back from the first regulation position, then the compressor 4 is started to operate, thereby the piston cylinder 12 can be moved from the first position to the second position immediately after the operation of the compressor 4.

Once the piston cylinder 12 finishes to move to the second position, as long as the forward drive force F1 exceeds the force F2+Fs−Ff, the piston cylinder 12 is kept staying at the second position even if the number of revolution of the compressor 4 is reduced, thereby the refrigerating cycle A is kept operating in the cooling mode.

Thus, in the fifth embodiment, the pressure-transducing chamber $R_2$ of the reversing valve housing 1 always communicates with the inlet pipe 6, and the move stroke of the latch piece 32k, which is pushed by a pin 12e of the piston cylinder 12 that moves from the first position to the second position, is set to be either the second stroke L2 corresponding to the second regulation position, which allows the piston cylinder 12 to reach the second position, or the first stroke L1 corresponding to the first regulation position, which does not allow the piston cylinder 12 to reach the second position, with being alternately controlled by the latch mechanism 32.

The latch piece 32k can be set at the deregulation position after coming back from the second regulation position, then the compressor 4 is started to operate, thereby the piston cylinder 12 can be kept at the first position. Further, the latch piece 32k can be set at the deregulation position after coming back from the first regulation position, then the compressor 4 is started to operate, thereby the piston cylinder 12 can be moved from the first position to the second position, and thereafter, the piston cylinder 12 can be kept at the second position as long as the operation of the compressor 4 is not halted.

Therefore, the heating mode, in which the refrigerant discharged from the outlet pipe 5 is supplied to the indoor heat exchanger 9A by way of the pipe 7, and the cooling mode, in which the refrigerant discharged from the outlet pipe 5 is supplied to the outdoor heat exchanger 9B by way of the pipe 8, can be selected by controlling the number of times of the operation start of the compressor 4 and the selected state can be maintained without using any exclusive power source such as an electromagnetic solenoid.

Figure 15:
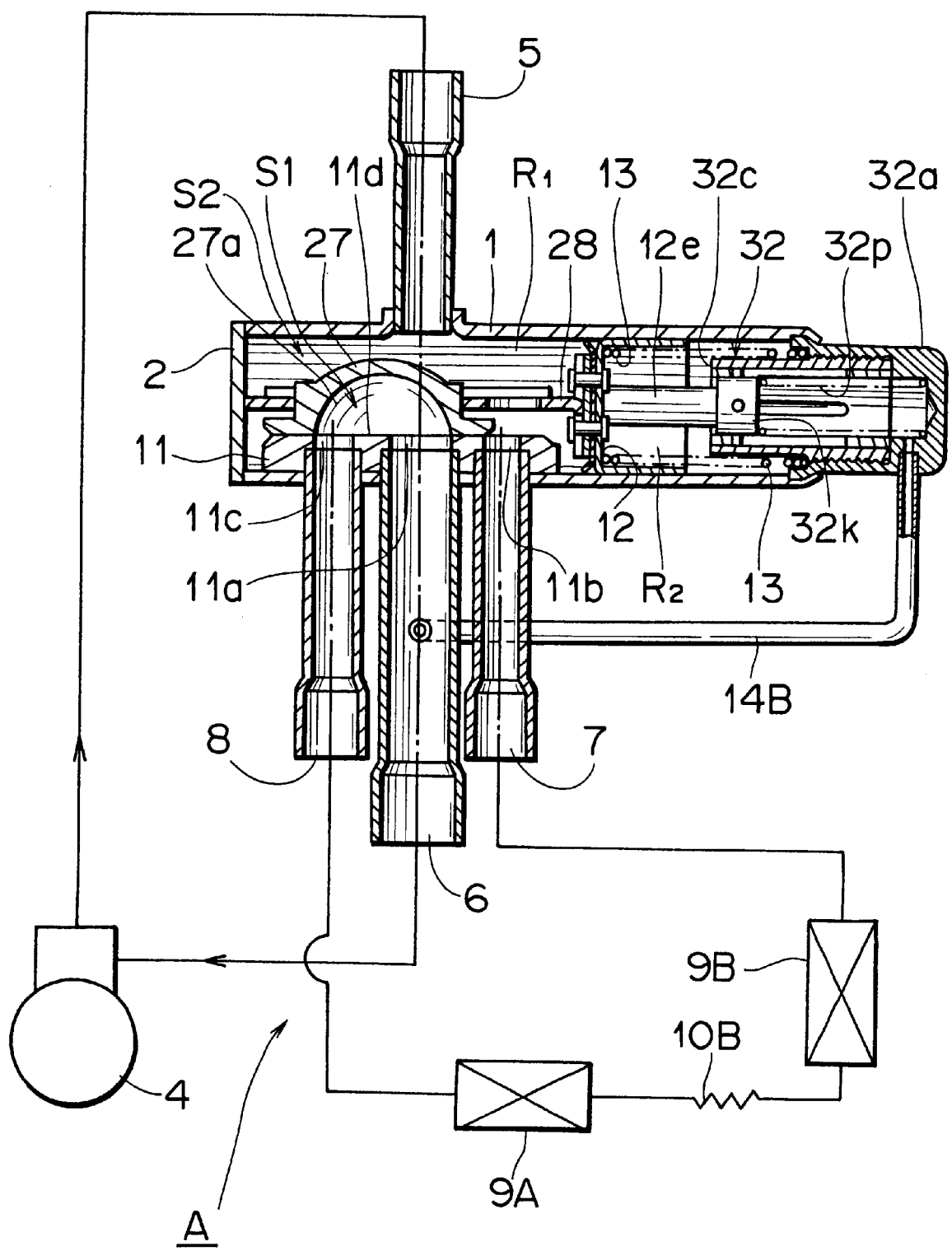
FIG. 15 is a view illustrating a schematic constitution of a refrigerating cycle employing a channel selector valve according to a sixth embodiment of the present invention.

In contrast with the fifth embodiment, FIG. 15 is a view illustrating a schematic constitution of a refrigerating cycle employing a channel selector valve according to a sixth embodiment of the present invention. As to the sixth embodiment, the outdoor heat exchanger 9B is connected to the pipe 7 while the indoor heat exchanger 9A is connected to the pipe 8, and when the piston cylinder 12 is restrained by the latch mechanism 32 and situated at the first position, the outlet pipe 5 communicates with the outdoor heat exchanger 9B through the high pressure chamber $R_1$ and the pipe 7 while the inlet pipe 6 communicates with the indoor heat exchanger 9A through the closed space S1 and the pipe 8.

The latch mechanism 32 is not limited to such a mechanism that the latch piece 32k alternately moves between the second and first regulation positions by way of the deregulation position as described above, instead, a mechanism in which the second and first regulation positions are randomly selected by using a torque driver may be employed.

Figure 16:
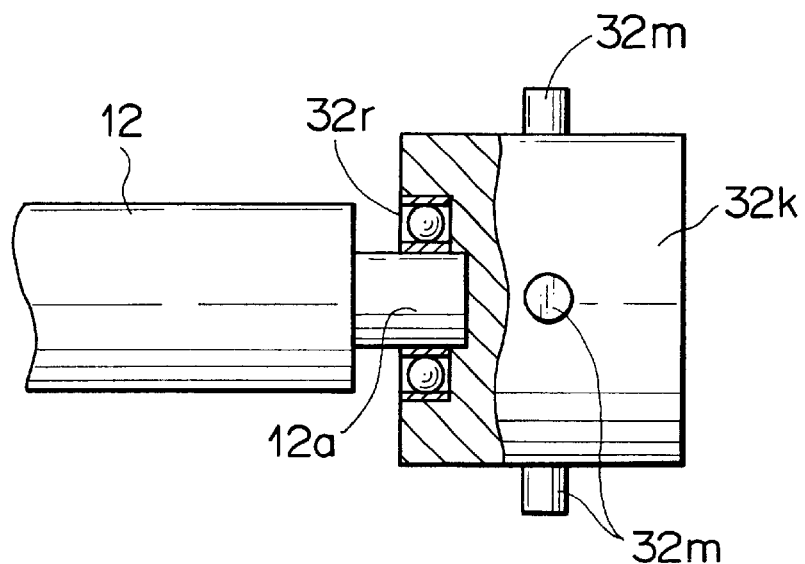
FIG. 16 is a view illustrating a schematic constitution of a latch mechanism usable instead of the latch mechanism of FIG. 9 or 15.
Figure 17:
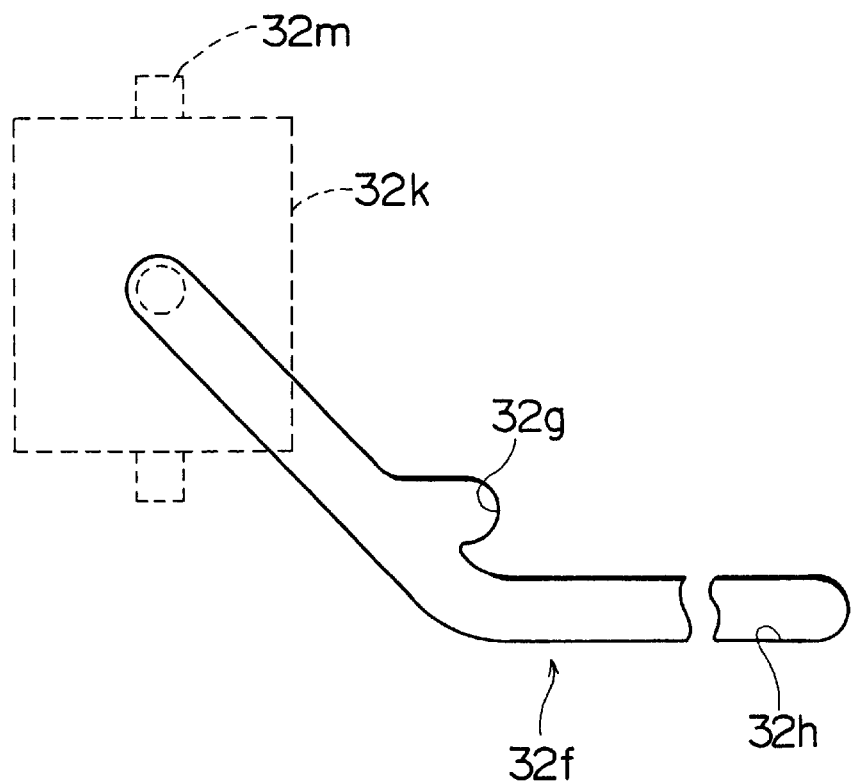
FIG. 17 is a development of a cam groove, along which a cam follower pin of FIG. 16 moves.

FIG. 16 is a view illustrating a schematic constitution of a latch mechanism usable instead of the latch mechanism described above. FIG. 17 is a development of a cam groove, along which a cam follower pin of FIG. 16 moves. As shown in FIG. 16, an end 12a of the pin 12e of the piston cylinder 12 is inserted into a bearing 32r of the latch piece 32k so as to rotatively connect the latch piece 32k with the pin 12e, and as shown in FIG. 17, the cam groove 32f, along which the cam follower pin 32m of the latch piece 32k moves, is formed as a limited path inclined with respect to an axial direction of the inner cylinder 32e, thereby forming the shallow groove 32g in the middle of the limited path and the deep groove 32h at an end of the limited path.

With the construction mentioned above, the pressure of the refrigerant, which is discharged from the compressor 4 and flows into the high pressure space S2 through the outlet pipe 5, is raised so as to increase a moving rate of the piston cylinder 12 from the first position to the second position, then the latch piece 32k has a large rotation moment and then, the cam follower pin 32m reaches the deep groove 32h at the end of the cam groove 32f after passing through the shallow groove 32g, thereby the piston cylinder 12 is situated at the second position.

On the contrary, the pressure of the refrigerant, which is discharged from the compressor 4 and flows into the high pressure space S2 through the outlet pipe 5, is reduced so as to decrease a moving rate of the piston cylinder 12 from the first position to the second position, then the latch piece 32k has only a small rotation moment and then, the cam follower pin 32m cannot pass through the shallow groove 32g and stays at the shallow groove 32g, thereby the piston cylinder 12 stays at the first position since its movement toward the second position is restrained.

Then, whether the cam follower pin 32m is situated at either the shallow groove 32g or the deep groove 32h, when the operation of the compressor 4 is halted, the latch piece 32k comes back to its original position (i.e. a light end of its locus in FIG. 17) due to an energizing force by the coil spring 32p, thereafter, when the compressor 4 is started to operate, the cam follower pin 32m can move to either the shallow groove 32g or the deep groove 32h depending upon the pressure of the discharged refrigerant.

With the construction mentioned above, the piston cylinder 12 can be situated at the desired position out of the first and second positions only by increasing or decreasing the pressure of the refrigerant discharged from the compressor 4, furthermore, when the cam follower pin 32m is moved from the shallow groove 32g to the deep groove 32h or from the deep groove 32h to the shallow groove 32g, the operation of the compressor 4 is neither needed to be started nor needed to be halted in order to rotate the latch piece 32k for resetting the present position, resulting in an advantage for the operation.

In the following, a channel selector valve according to a seventh embodiment of the present invention will be explained with reference to FIGS. 18 to 22.

Figure 18:
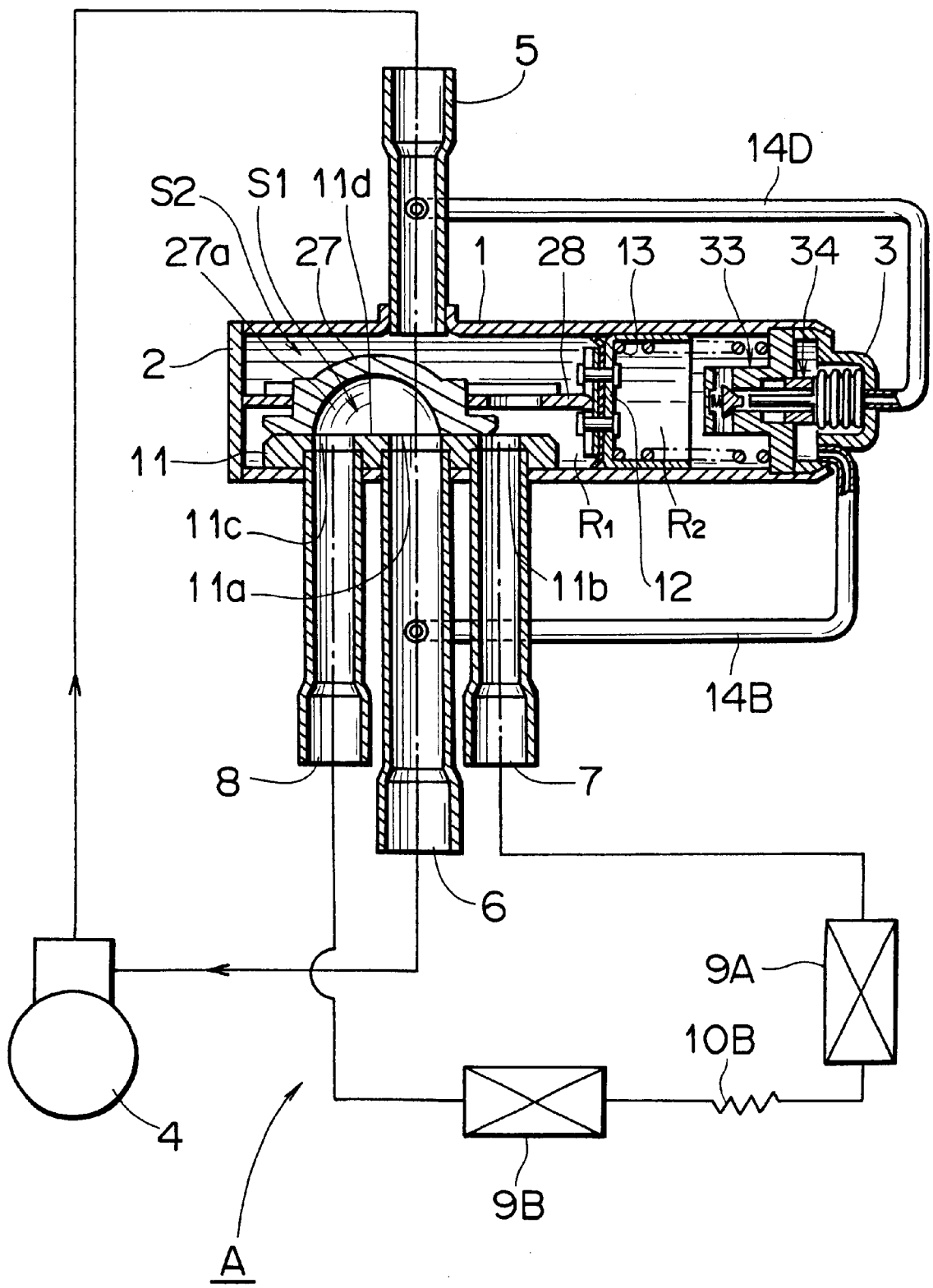
FIG. 18 is a view illustrating a schematic constitution of a refrigerating cycle employing a channel selector valve according to a seventh embodiment of the present invention.

FIG. 18 is a view illustrating a schematic constitution of a refrigerating cycle employing a channel selector valve according to the seventh embodiment of the present invention, in which the same abbreviation numerals with those used for the corresponding identical members or parts of the refrigerating cycle according to the fifth embodiment shown in FIG. 9 are used.

The channel selector valve according to the seventh embodiment, a state in operation in the hearting mode of which is shown in FIG. 18 by its sectional view, is different from the channel selector valve according to the fifth embodiment shown in FIG. 9 in a point that instead of the latch mechanism 32, there is provided a pilot valve mechanism 33 having another latch mechanism 34 (corresponding to the second latch mechanism described in claims 29 and 30), a constitution of which is similar to the latch mechanism 32, and the stopper 3 instead of the seal housing 32a of the latch mechanism 32 seals one end of the reversing valve housing 1.

Figure 19:
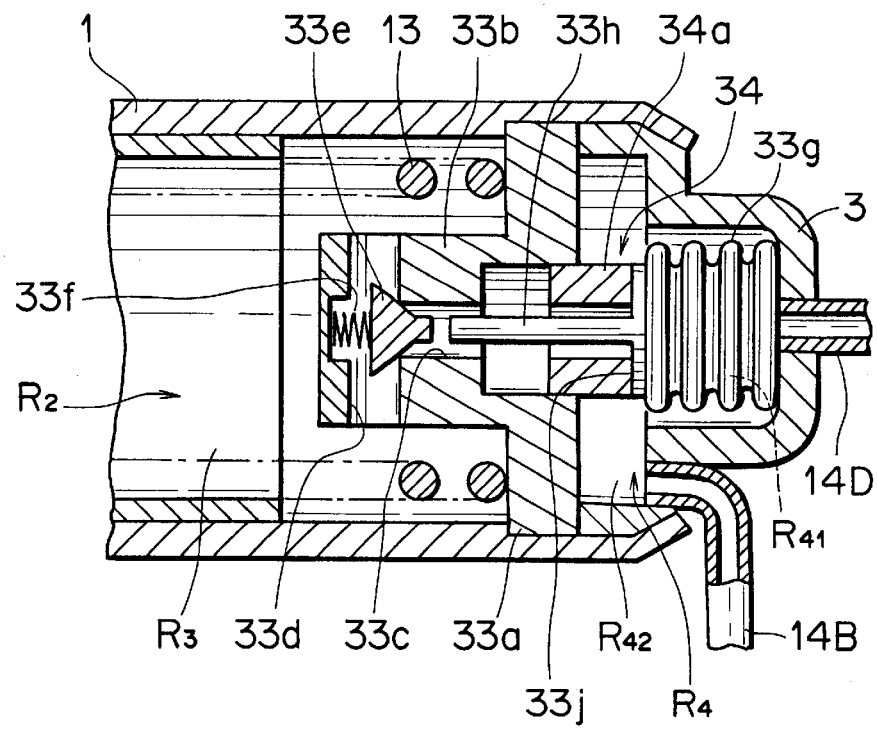
FIG. 19 is an enlarged sectional view of a primary part of a pilot valve mechanism of FIG. 18.

FIG. 19 is an enlarged sectional view of a primary part of the pilot valve mechanism of FIG. 18. As shown in FIG. 19, the pilot valve mechanism 33 comprises: a diaphragm 33a for partitioning the interior of the pressure-transducing chamber $R_2$ into a main chamber $R_3$ near the high pressure chamber $R_1$ for allowing the piston cylinder 12 to move between the first and second positions and a sub chamber $R_4$ near the stopper 3; a valve block 33b integrally formed with the diaphragm 33a; a pilot valve element 33e (corresponding to the pilot valve described in claim 29) received into the valve block 33b; a bellows 33g disposed in the sub chamber $R_4$; and a pin 33h for retracting (i.e. for opening or closing) the pilot valve element 33e.

In the interior of the valve block 33b, there are provided a pilot path 33c with its one end open to the sub chamber $R_4$ and an open path 33d being open to the main chamber $R_3$ extending from the opposite end of the pilot path 33c to a circumferential surface of the valve block 33b, while the pilot valve element 33e is disposed at a crossing between the pilot path 33c and the open path 33d and energized by the coil spring 33f from the opposite end of the pilot path 33c toward the one end thereof so as to close the pilot path 33c.

The bellows 33g is fixed on an inner face of the stopper 3 at one end thereof and expands or contracts so as to allow an opposite end thereof to move nearer to or away from the diaphragm 33a or the valve block 33b. The bellows 33g partitions the interior space of the sub chamber $R_4$ into a first space $R_{41}$ (i.e. a space inside of the bellows 33g) and a second space $R_{42}$ (i.e. a space outside of the bellows 33g).

The first space $R_{41}$ always communicates with the outlet pipe 5 through a channel 14D connected from the outside of the reversing valve housing 1 by way of the stopper 3 and one end of the bellows 33g, while the second space $R_{42}$ always communicates with the inlet pipe 6 through a channel 14B connected from the outside of the reversing valve housing 1 by way of the stopper 3.

The pin 33h arises from a plate 33j fixed at the opposite end of the bellows 33g and inserted into the pilot path 33c from an end thereof.

Although the latch mechanism 34 is not shown in detail in FIGS. 18 and 19, it comprises elements corresponding to the guide cylinder 32c, the latch piece 32k and the coil spring 32p of the latch mechanism 32 of the channel selector valve according to the fifth and sixth embodiments. In detail, an element corresponding to the guide cylinder 32c of the latch mechanism 32 is formed near one end of the valve block 33b, while an element corresponding to the coil spring 32p of the latch mechanism 32 is not shown in FIGS. 18 and 19.

Figure 20:
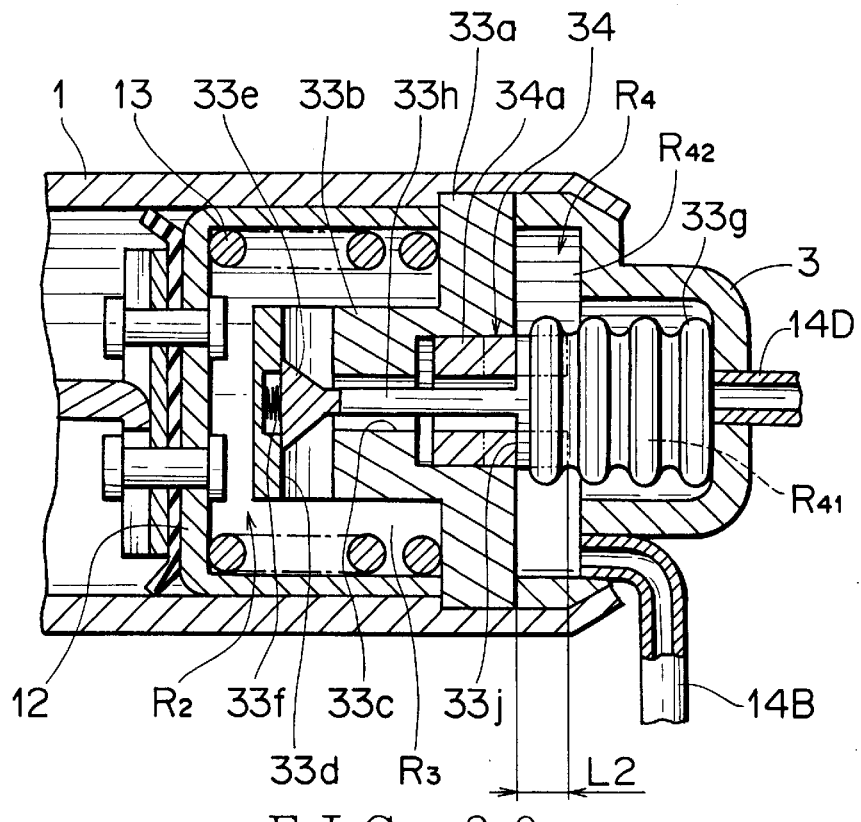
FIG. 20 is an enlarged sectional view of a primary part of a pilot valve mechanism of FIG. 18.

The latch piece 34a of the latch mechanism 34 of the seventh embodiment, which corresponds to the latch piece 32k of the latch mechanism 32, is formed slidable with respect to the one end of the valve block 33b, wherein a deregulation position of the latch piece 34a is a position where the latch piece 34a protrudes from the one end of the valve block 33b toward the sub chamber $R_4$ as shown in FIG. 19, while a second regulation position of the latch piece 34a is a position where the latch piece 34a is moved from the deregulation position, shown in FIG. 20 with imaginary lines (alternate long and two short dashes lines), toward the one end of the valve block 33b by a second stroke L2, that is, where an end face of the latch piece 34a is the same plane with that of the one end of the valve block 33b, as shown in FIG. 20.

Figure 21:
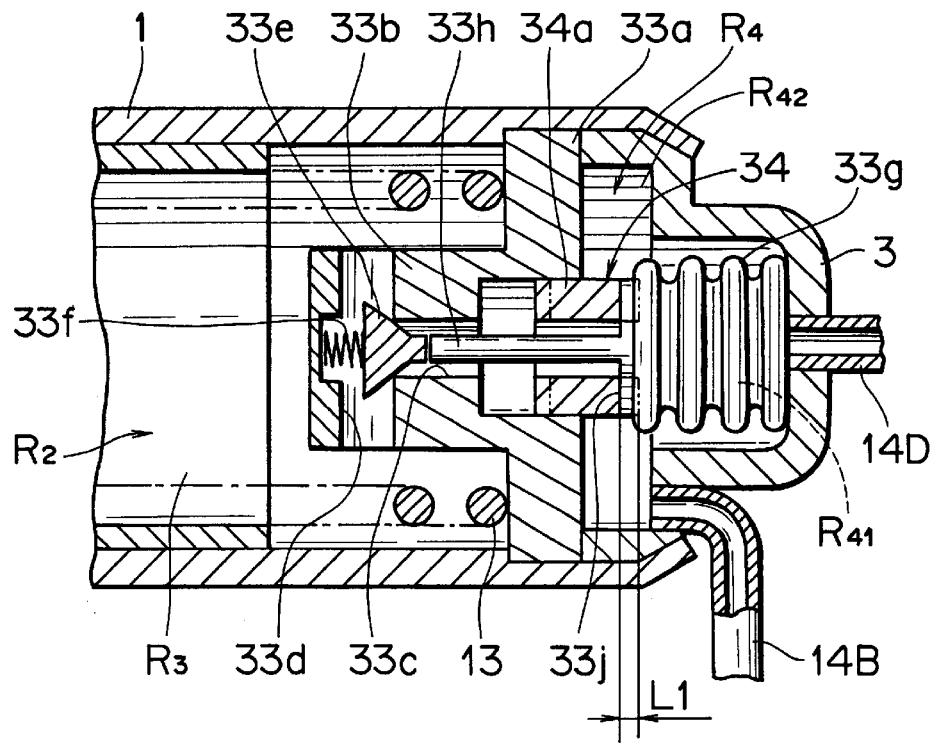
FIG. 21 is an enlarged sectional view of a primary part of a pilot valve mechanism of FIG. 18.

As shown in FIG. 21, a first regulation position of the latch piece 34a is a position where the latch piece 34a is moved from the deregulation position, shown in FIG. 21 with imaginary lines (alternate long and two short dashes lines), toward the one end of the valve block 33b by a first stroke L1, which is shorter than the second stroke L2, that is, where an end face of the latch piece 34a is a little shifted from the deregulation position toward the one end of the valve block 33b.

In the pilot valve mechanism 33 with the latch mechanism 34 constructed as describe above, when the bellows 33g is compressed, the end face of the latch piece 34a situated at the deregulation position abuts on the plate 33j and the pin 33h is apart from the pilot valve element 33e, thereby the pilot path 33c is closed by the pilot valve element 33e.

In the pilot valve mechanism 33., when the bellows 33g expands and the plate 33j pushes the latch piece 34a situated at the deregulation position and also when the latch piece 34a has come back to the deregulation position from the second regulation position, the latch piece 34a pushed by the plate 33j is kept from moving further at the first regulation position where the latch piece 34a has moved from the deregulation position toward the one end of the valve block 33b by the first stroke, that is, the pin 33h of the plate 33j, the move of which is restrained by the latch piece 34a situated at the first regulation position, is kept being apart from the pilot valve element 33e, thereby the pilot path 33c is kept closed by the pilot valve element 33e.

Further, in the pilot valve mechanism 33, when the bellows 33g expands and the plate 33j pushes the latch piece 34a situated at the deregulation position and also when the latch piece 34a has come back to the deregulation position from the first regulation position, the latch piece 34a pushed by the plate 33j reaches the second regulation position where the latch piece 34a is moved from the deregulation position toward the one end of the valve block 33b by the second stroke L2, then the pin 33h of the plate 33j comes in contact with the pilot valve element 33e, allowing the pilot valve element 33e to be apart from the opposite end of the pilot path 33c by overcoming an energizing force due to the coil spring 33f, thereby the pilot path 33c is opened by the pilot valve element 33e.

As shown in FIG. 19, in the channel selector valve according to the seventh embodiment, the diaphragm 33a of the pilot valve mechanism 33 receives an end of a compression spring 13 instead of the seal housing 32a of the fifth or sixth embodiment.

In the channel selector valve according to the seventh embodiment, the pilot path described in claim 29 consists of the pilot path 33c and the open path 33d, while the valve opener described in claim 29 consists of the pin 33h and the plate 33j.

Further, the channel selector valve according to the seventh embodiment is constituted similarly to that according to the fifth embodiment shown in FIG. 9, except the points mentioned above, while the channel selector valve according to the seventh embodiment is different from that according to the fifth embodiment in a point that the housing described in claims consists of the reversing valve housing 1 and the stoppers 2 and 3.

In addition, the channel selector valve according to the seventh embodiment is similar to that according to the fifth embodiment in points that: a part of the reversing valve housing 1, to which the outlet pipe 5 communicating with the outlet of the compressor 4 is connected, corresponds to the inlet port described in claims; the through hole 11a of the valve seat 11, to which the inlet pipe 6 communicating with the inlet of the compressor 4 is connected, corresponds to the outlet port described in claims; and through holes 11b and 11c of the valve seat 11, to which the pipes 7 and 8 connecting with the indoor and outdoor heat exchangers 9A and 9B, respectively, are connected, correspond to the respective two selector ports described in claims.

In the following, an operation of the channel selector valve according to the seventh embodiment constructed as described above will be explained.

When the operation of the compressor 4 is halted, as shown in FIG. 18, the piston cylinder 12 energized by the compression spring 13 is situated at the first position, the inlet pipe 6 communicates with the pipe 8 through the closed space S1, and the outlet pipe 5 communicates with the pipe 7 through the high pressure space S2.

In this situation, the pilot valve element 33e energized by the coil spring 33f closes the pilot path 33c, therefore, the main chamber $R_3$ of the pressure-transducing chamber $R_2$ does not communicate with the sub chamber $R_4$.

When the compressor 4 starts to operate, the refrigerant discharged from the compressor 4 flows into the high pressure space S2 through the outlet pipe 5, then a pressure of an inner space of the bellows 33g communicating with the outlet pipe 5 through the channel 14D, that is, an inner pressure of the first space $R_{41}$, becomes equal to the pressure of the refrigerant in the outlet pipe 5, while an inner pressure of the second space $R_{42}$ becomes equal to the pressure of the refrigerant in the inlet pipe 6, with which the second space $R_{42}$ communicates through the channel 14B.

Then, since the inner pressure of the first space $R_{41}$ exceeds that of the second space $R_{42}$, the bellows 33g expands, then the plate 33j moves toward the diaphragm 33a in the sub chamber $R_4$ so as to reduce the second space $R_{42}$, thereby the plate 33j moves the latch piece 34a, situated at the deregulation position and protruding toward the inside of the sub chamber $R_4$ from the diaphragm 33a, in a retreating direction from the inside of the sub chamber $R_4$ as shown in FIG. 19.

At this time, if the movement of the latch piece 34a by the plate 33j takes place after the latch pieced 34a has come back from the first regulation position to the deregulation position, the movement of the latch piece 34a in the retreating direction is restrained at the second regulation position by the latch mechanism 34, therefore, a stroke of the latch piece 34a in the retreating direction becomes equal to the second stroke L2.

As a result, as shown in FIG. 20, the pin 33h, connected to the plate 33j and inserted into the pilot path 33c, comes in contact with the pilot valve element 33e, then the pilot valve element 33e is moved being apart from the opposite end of the pilot path 33c by overcoming an energizing force due to the coil spring 33f, thereby the pilot path 33c opens.

As a result, the main chamber $R_3$ communicates with the second space $R_{42}$ of the sub chamber $R_4$ through the pilot path 33c and the open path 33d, then the main chamber $R_3$ communicates with the inlet pipe 6, which always communicates with the second space $R_{42}$, thereby an inner pressure of the main chamber $R_3$ becomes equal to the pressure of the refrigerant in the inlet pipe 6, which is much lower than the pressure of the refrigerant flowed into the high pressure space S2.

Figure 22:
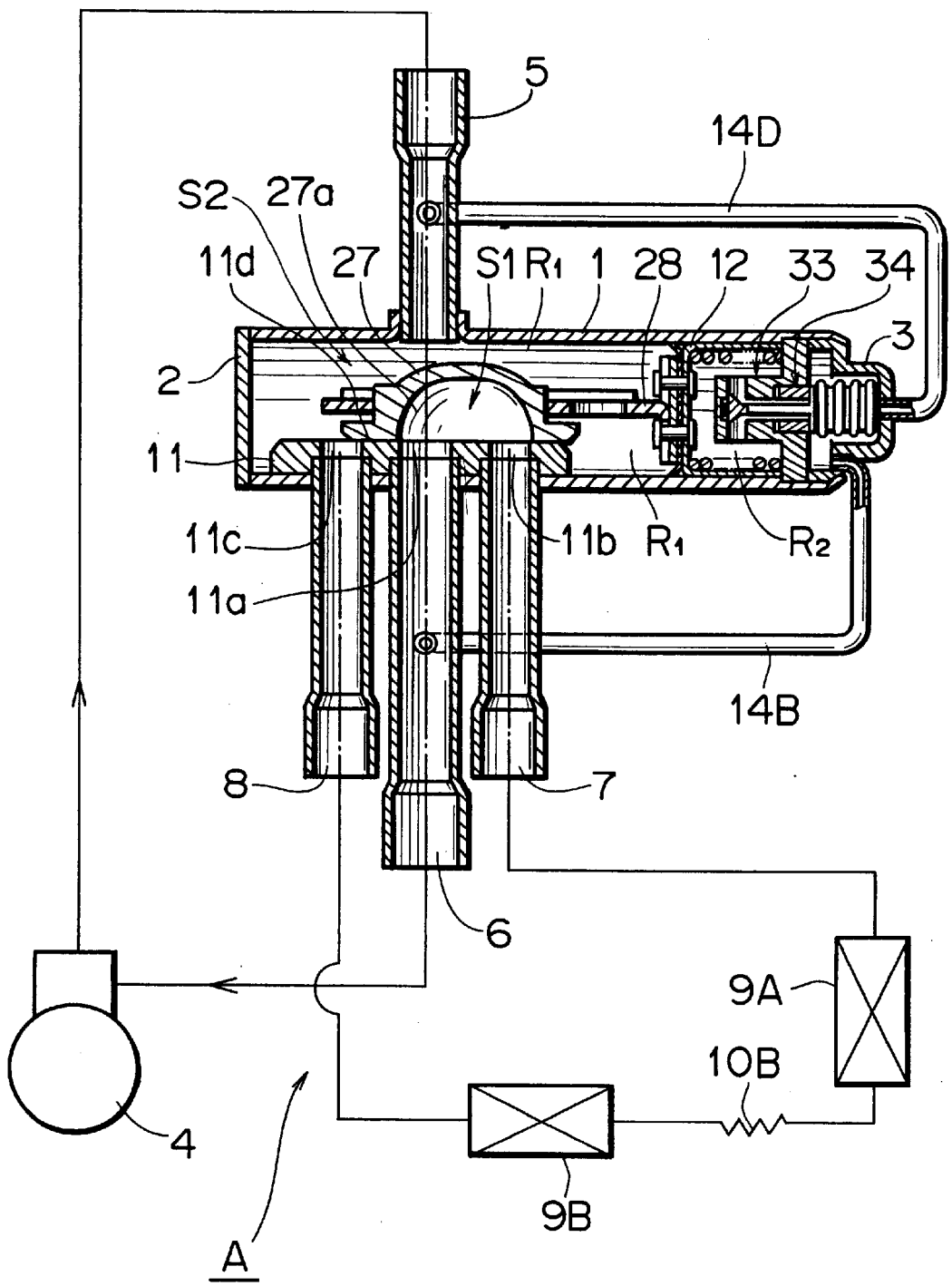
FIG. 22 is a view illustrating a schematic constitution of a refrigerating cycle, in which a sectional view of the channel selector valve of FIG. 18 in a cooling mode is shown.

Therefore, the pressure of the refrigerant in the main chamber $R_3$ of the pressure-transducing chamber $R_2$ becomes less than the pressure of the refrigerant in the high pressure chamber $R_1$, then the piston cylinder 12 moves from the first position to the second position in the main chamber $R_3$ as shown in FIG. 22 (cooling mode), wherein the outlet pipe 5 communicates with the pipe 8 through the high pressure space S2, while the inlet pipe 6 communicates with the pipe 7 through the closed space S1.

To the contrary, if the movement of the latch piece 34a in the retreating direction by the plate 33j takes place after the latch pieced 34a has come back from the second regulation position to the deregulation position, the movement of the latch piece 34a in the retreating direction is restrained at the first regulation position, therefore, a stroke of the latch piece 34a in the retreating direction becomes equal to the first stroke L1.

As a result, as shown in FIG. 21, since the pin 33h can not come into contact with the pilot valve element 33e and is kept apart therefrom, the pilot valve element 33e keeps closing the pilot path 33c due to the energizing force by the coil spring 33f, therefore, the main chamber $R_3$ is kept insulated from the second space $R_{42}$ of the sub chamber $R_4$ and the piston cylinder 12 is kept staying at the first position, thereby the outlet pipe 5 communicates with the pipe 7 through the high pressure space S2, while the inlet pipe 6 communicates with the pipe 8 through the closed space S1.

That is, when the latch piece 34a, which has come back to the deregulation position from the second regulation position, is moved in the retreating direction due to the movement of the plate 33j upon starting of the operation of the compressor 4, as shown in FIG. 21, the movement of the latch piece 34a is restrained at the first regulating position due to the latch mechanism 34, then the pilot valve element 33e energized by the coil spring 33f closes the pilot path 33c, thereby the piston cylinder 12 keeps staying at the first position as shown in FIG. 18.

Thereafter, the inner pressure of the first space $R_{41}$, exceeding the inner pressure of the second space $R_{42}$ of the sub chamber $R_4$, is reduced so as to be close to the inner pressure of the second space $R_{42}$, by tentatively halting the operation of the compressor 4 and the like, thereby the first space $R_{41}$ is reduced and the second space $R_{42}$ is expanded.

As a result, as shown in FIG. 19, the latch piece 34a situated at the first regulation position by the plate 33j advances into the inside of the sub chamber $R_4$ and comes back to the deregulation position, while the plate 33j is moved in the direction away from the diaphragm 33a by the latch piece 34a.

To the contrary, when the latch piece 34a, which has come back to the deregulation position from the first regulation position, is moved in the retreating direction due to the movement of the plate 33j upon starting of the operation of the compressor 4, the movement of the latch piece 34a is restrained only at the second regulating position, therefore, the pilot valve element 33e is moved in the direction away from the opposite end of the pilot path 33c by the pin 33h connected to the plate 33j, by overcoming the energizing force due to the coil spring 33f, thereby the pilot path 33c is opened and the piston cylinder 12 is situated at the second position as shown in FIG. 22.

Again thereafter, the inner pressure of the first space $R_{41}$, exceeding the inner pressure of the second space $R_{42}$ of the sub chamber $R_4$, is reduced so as to be close to the inner pressure of the second space $R_{42}$, by tentatively halting the operation of the compressor 4 and the like, thereby the first space $R_{41}$ is reduced and the second space $R_{42}$ is expanded. As a result, as shown in FIG. 19, the latch piece 34a situated at the second regulation position by the plate 33j advances into the inside of the sub chamber $R_4$ and comes back to the deregulation position, while the plate 33j is moved in the direction away from the diaphragm 33a by the latch piece 34a.

Then, the pin 33h connected to the plate 33j is apart from the pilot valve element 33e and then, the pilot valve element 33e, which has been moved in the direction away from the opposite end of the pilot path 33c by the pin 33h, closes the pilot path 33c by the energizing force due to the coil spring 33f, thereby the piston cylinder 12 moves from the second position to the first position as shown in FIG. 18.

The channel selector valve according to the seventh embodiment constracted as described above gives a similar effect with that of the channel selector valve according to the fifth embodiment.

Figure 23:
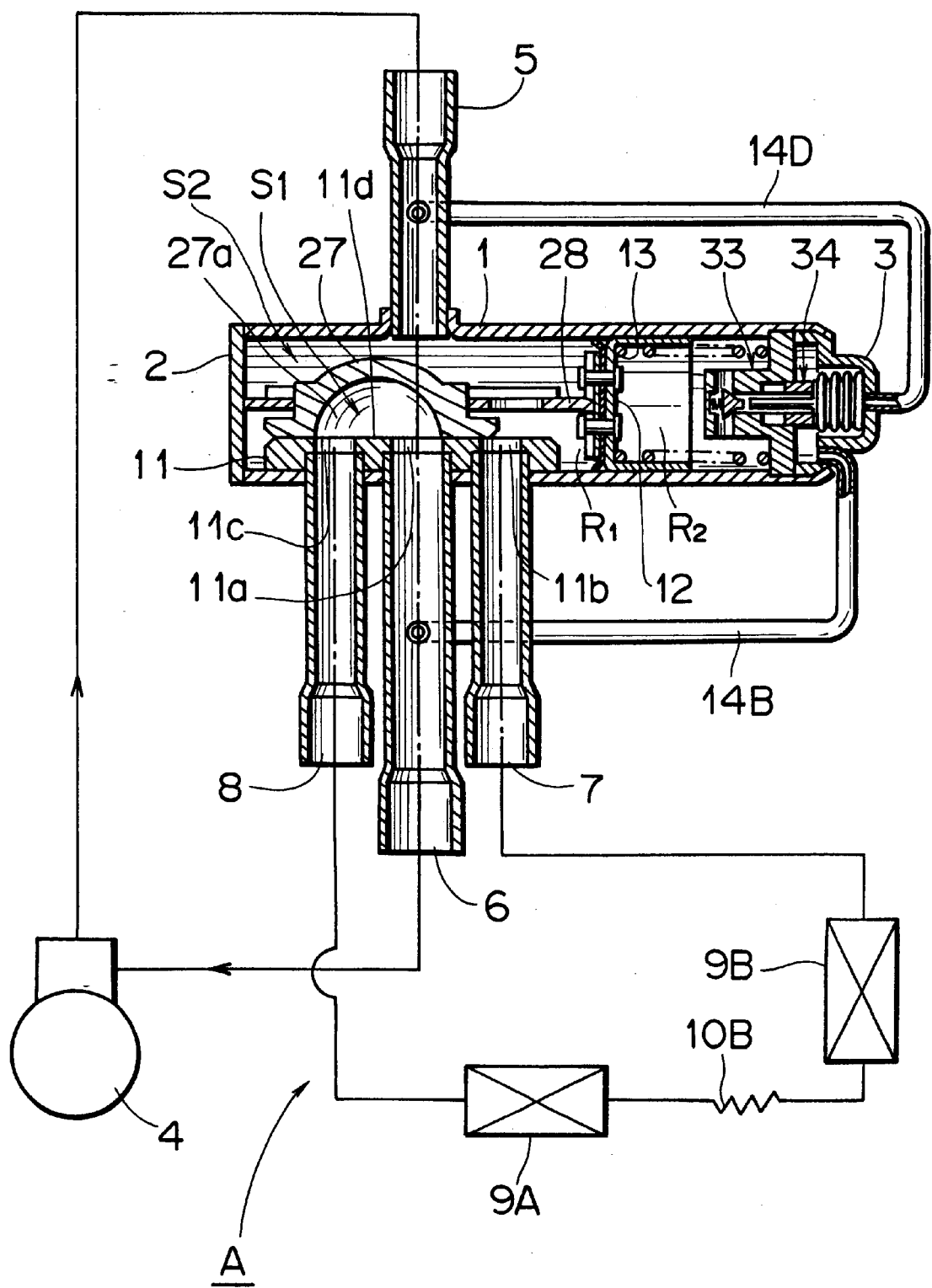
FIG. 23 is a view illustrating a schematic constitution of a refrigerating cycle employing a channel selector valve according to a eighth embodiment of the present invention.

In contrast with the seventh embodiment, FIG. 23 is a view illustrating a schematic constitution of a refrigerating cycle employing a channel selector valve according to a eighth embodiment of the present invention. As to the eighth embodiment, the outdoor heat exchanger 9B is connected to the pipe 7 while the indoor heat exchanger 9A is connected to the pipe 8, and when the piston cylinder 12 is restrained by the latch mechanism 32 and situated at the first position, the outlet pipe 5 communicates with the outdoor heat exchanger 9B through the high pressure space S2 and the pipe 7 while the inlet pipe 6 communicates with the indoor heat exchanger 9A through the closed space S1 and the pipe 8.

In the following, a channel selector valve, in which the channel is selected by controlling an opening ratio of an electrically-driven expansion valve, according to a ninth embodiment of the present invention will be explained with reference to FIGS. 24 to 27.

Figure 24:
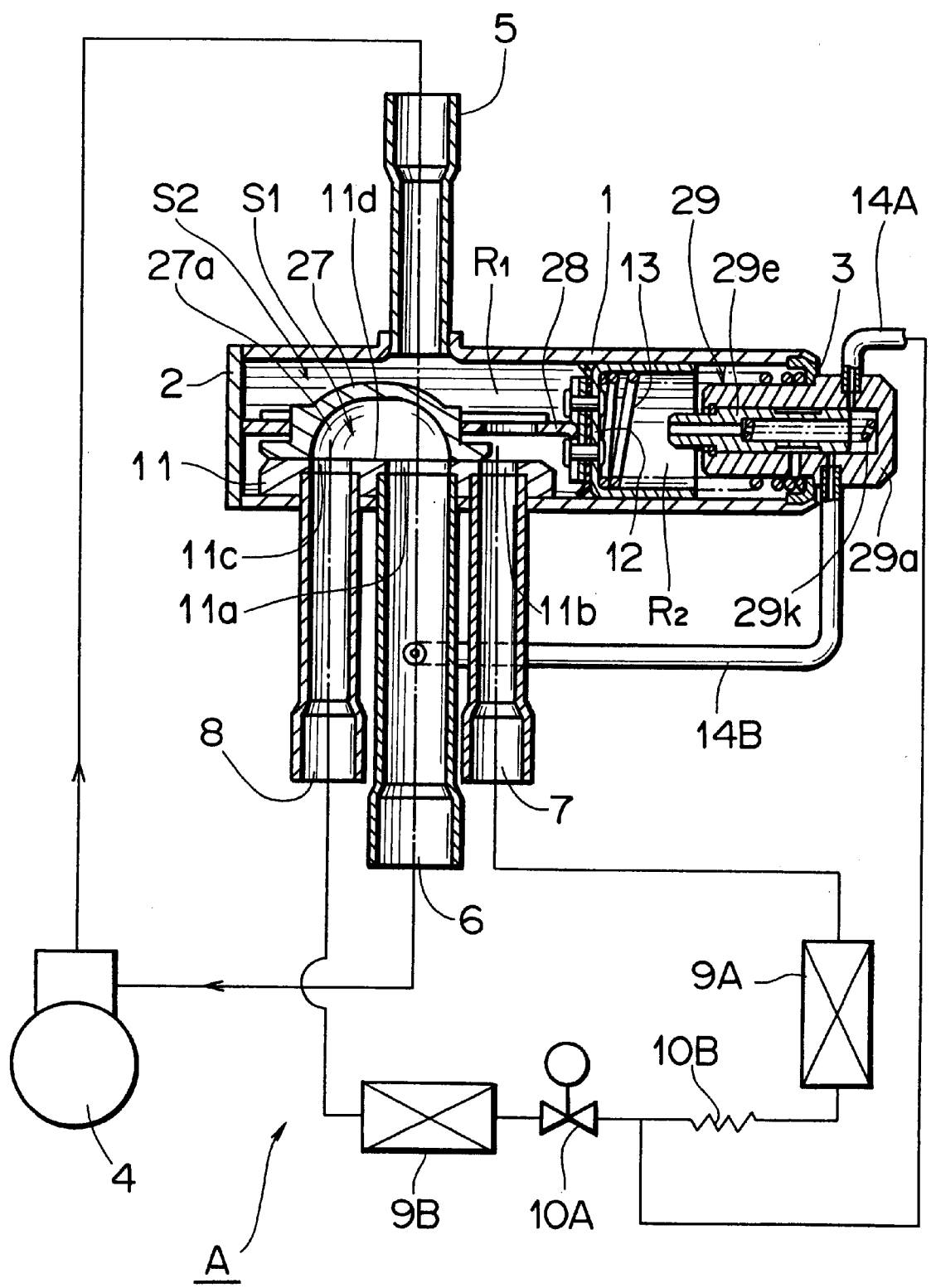
FIG. 24 is a view illustrating a schematic constitution of a refrigerating cycle employing a channel selector valve according to a ninth embodiment of the present invention.

FIG. 24 is a view illustrating a schematic constitution of a refrigerating cycle employing a channel selector valve according to the ninth embodiment of the present invention, in which the same abbreviation numerals with those used for the corresponding identical members or parts of the refrigerating cycle according to the first embodiment shown in FIG. 1 are used.

The channel selector valve according to the ninth embodiment, a state in operation in the hearting mode of which is shown in FIG. 24 by its sectional view, constitutes the refrigerating cycle A together with the compressor 4, the indoor heat exchanger 9A, the outdoor heat exchanger 9B, an electrically-driven expansion valve 10A and a capillary tube 10B, wherein the electrically-driven expansion valve 10A and the capillary tube 10B are provided between the indoor heat exchanger 9A and the outdoor heat exchanger 9B.

The channel selector valve according to the ninth embodiment is different from that according to the first embodiment shown in FIG. 1 in a point that a part of a housing 29a of a state-holding selector valve 29 is inserted into the inside of the reversing valve housing 1 through a stopper 3 that seals one end of the reversing valve housing 1.

Figure 25:
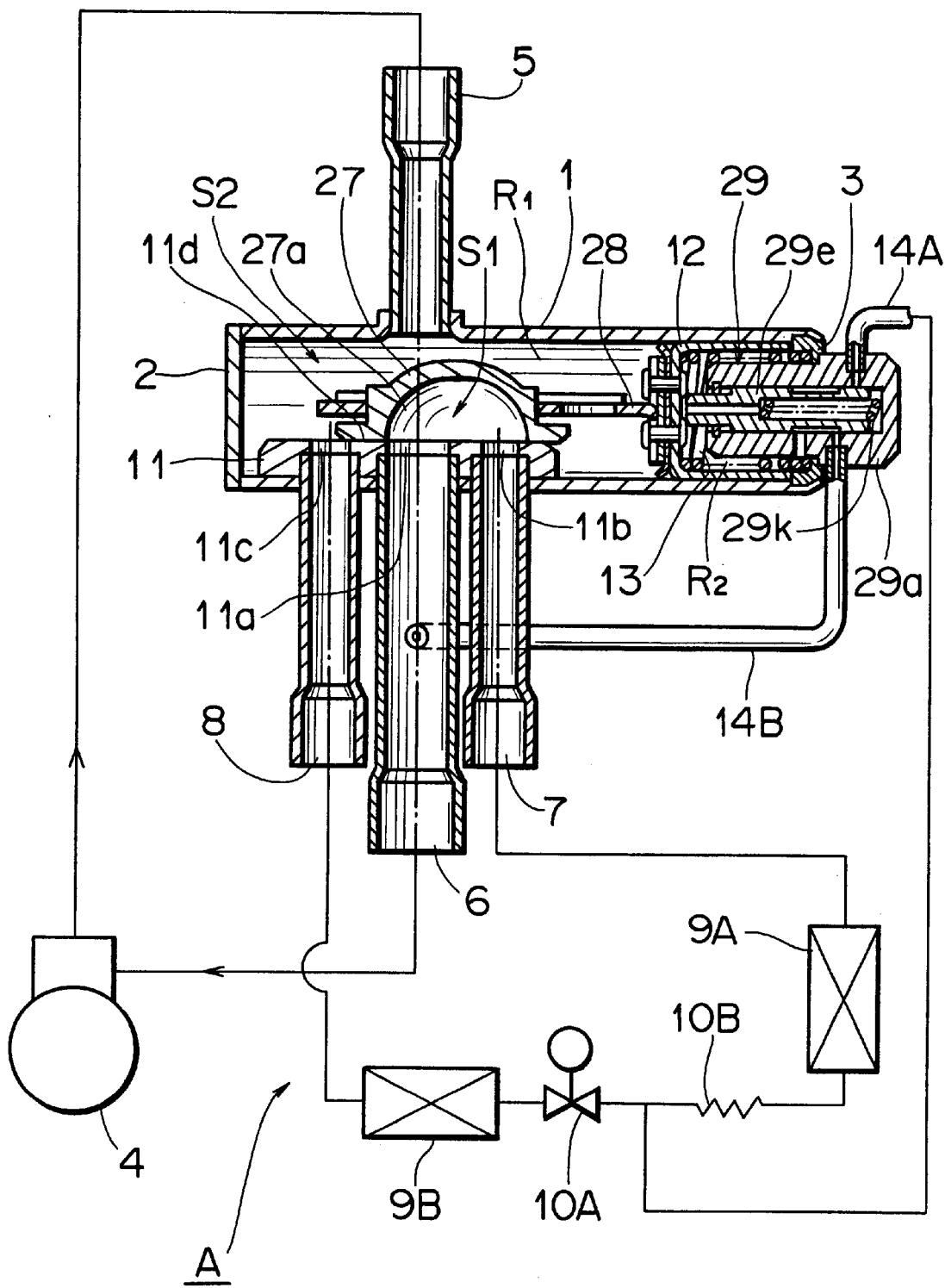
FIG. 25 is a view illustrating a schematic constitution of a refrigerating cycle, in which a sectional view of the channel selector valve of FIG. 24 in a cooling mode is shown.

In the channel selector valve according to the ninth embodiment, as shown in FIG. 25, i.e. a view illustrating a schematic constitution of a refrigerating cycle in which a sectional view of the channel selector valve of FIG. 24 in a cooling mode is shown, the piston cylinder 12 can move between a second position where the piston cylinder abuts on the stopper 3 to be restrained from moving further toward the stopper 3 and a first position where an end of a connecting shaft 28 abuts on a stopper 2 so that the piston cylinder 12 is restrained from moving further toward the stopper 2.

As shown in FIG. 24, the state-holding selector valve 29 comprises the housing 29a, a selector valve element 29e received in the housing 29a (corresponding to the second selector valve element) and a coil spring 29k (corresponding to energizing means for energizing the selector valve).

Figure 26:
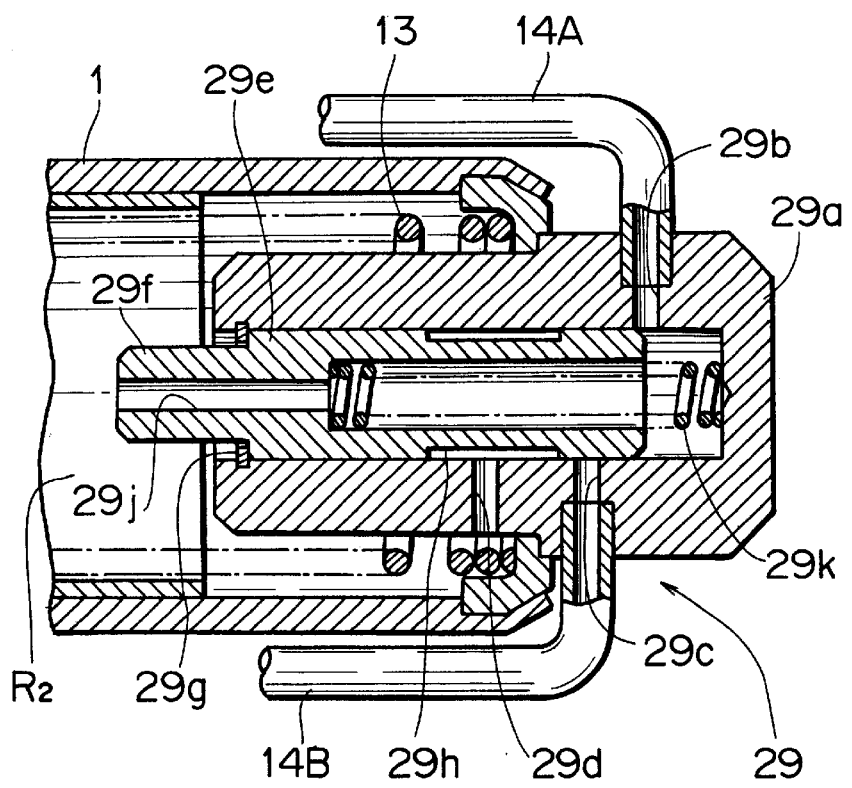
FIG. 26 is an enlarged sectional view of a primary part of a state-holding selector valve of FIG. 24.

As shown in FIG. 26, the housing 29a has a cylindrical shape with its one end closed and an open end of the housing 29a is inserted into the inside of the pressure-transducing chamber $R_2$ of the reversing valve housing 1, and a first port 29b for communicating the interior of the housing 29a to the exterior thereof is provided near the closed end of the housing 29a.

The first port 29b is connected to a channel 14A from the outside of the housing 29a and as shown in FIG. 24, the channel 14A is connected to a position situated between the electrically-driven expansion valve 10A and the capillary tube 10B.

As shown in FIG. 26, a second port 29c for communicating the interior of the housing 29a to the exterior thereof is provided at a position where is a little nearer to the stopper 2 than the position of the first port 29b.

The second port 29c is connected to a channel 14B from the outside of the housing 29a and as shown in FIG. 24, the channel 14B is connected to an inlet pipe 6.

Further, as shown in FIG. 26, a third port 29d for communicating the interior of the housing 29a to the pressure-transducing chamber $R_2$ is provided at the same circumferential position with that of the second port 29c.

The selector valve element 29e has an outer diameter corresponding to an inner diameter of the housing 29a, a pin 29f is formed at an end of the selector valve element 29e, and the pin 29f passes through a stopper ring 29g engaged with the housing 29a and protrudes toward the outside of an open end of the housing 29a.

Further, a ring-shaped groove 29h is formed on a circumferential surface of the selector valve element 29e and a through hole 29j is formed passing through the inside of the selector valve element 29e and the pin 29f.

One end of the coil spring 29k is inserted into the through hole 29j of the selector valve element 29e and locked at a level difference in the through hole 29j, while an opposite end of the coil spring 29k is abuts on the closed end of the housing 29a. The coil spring 29k energizes the selector valve element 29e toward a direction in which a level difference between the selector valve element 29e and the pin 29f abuts on the stopper ring 29g, that is, a direction in which the selector valve element 29e protrudes toward the pressure-transducing chamber $R_2$ from the open end of the housing 29a.

As to the state-holding selector valve 29, in a first state that the level difference between the selector valve element 29e and the pin 29f abuts on the stopper ring 29g due to the energizing force by the coil spring 29k, the selector valve element 29e is situated at a position where is nearer to the open end of the housing 29a than the first port 29b, the first port 29b communicates with the pressure-transducing chamber $R_2$ through the through hole 29j, and the ring-shaped groove 29h connects only to the third port 29d so that the second port 29c is closed by the circumferential surface of the selector valve element 29e.

Figure 27:
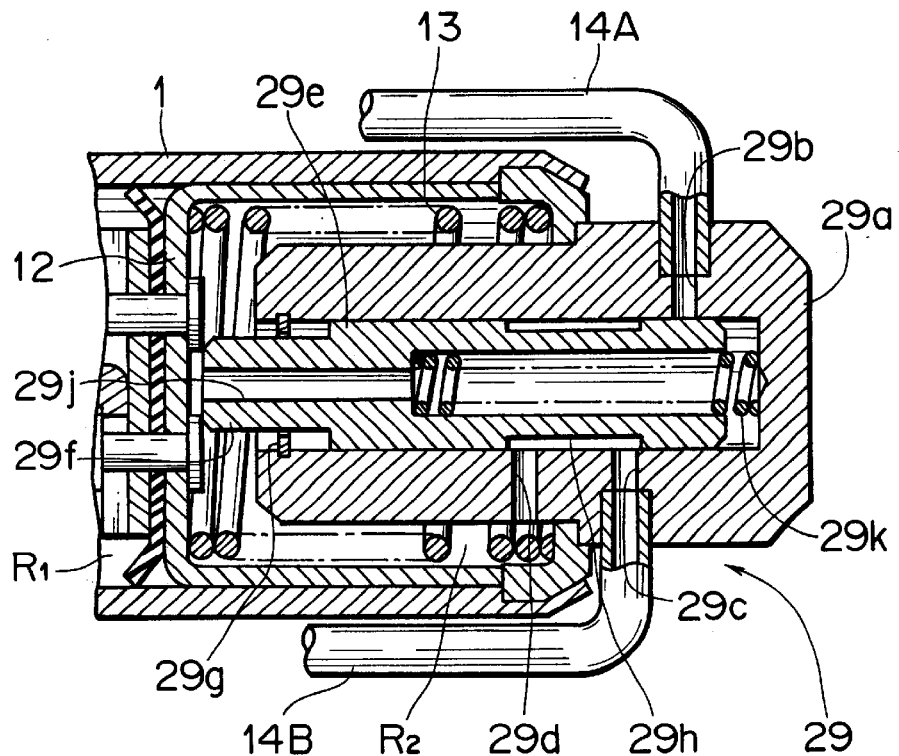
FIG. 27 is an enlarged sectional view of a primary part of a state-holding selector valve of FIG. 24.

Further, as to the state-holding selector valve 29, as shown in FIG. 27, in a second state that the level difference between the selector valve element 29e and the pin 29f is apart from the stopper ring 29g toward the closed end of the housing 29a, the first port 29b is closed by the circumferential surface of the selector valve element 29e, the ring-shaped groove 29h connectes to both the second port 29c and the third port 29d so that the second port 29c communicates with the pressure-transducing chamber $R_2$ through the ring-shaped groove 29h and the third port 29d.

In the following, an operation of the channel selector valve according to the ninth embodiment constracted as described above will be explained.

When the operation of the compressor 4 is halted, as shown in FIG. 24, the piston cylinder 12 is situated at the first position by energizing the compression spring 13, then the inlet pipe 6 communicates with the pipe 8 through the closed space S1 while the outlet pipe 5 communicates with the pipe 7 through the high pressure space S2.

This situation corresponds to the first state of the state-holding selector valve 29, in which the selector valve element 29e is energized by the coil spring 29k so that the channel 14A communicates with the pressure-transducing chamber $R_2$ through the first port 29b, then the pressure-transducing chamber $R_2$ communicates with a position situated between the electrically-driven expansion valve 10A and the capillary tube 10B in the refrigerating cycle A, to which the channel 14A is connected.

Therefore, when the compressor 4 starts to operate, if the refrigerant pressure, at the position situated between the electrically-driven expansion valve 10A and the capillary tube 10B in the refrigerating cycle A, is much the same with the pressure of the refrigerant flowed into the high pressure space S2, that is, if the forward drive force F1 is equal to or less than the resultant force F2+Fs+Ff, the piston cylinder 12 stays at the first position.

Then, since the piston cylinder 12 stays at the first position, as shown in FIG. 26, the selector valve element 29e is kept to be energized by the coil spring 29k, as a result, the state-holding selector valve 29 keeps its first state, in which the pressure-transducing chamber $R_2$ communicates with the channel 14A.

Therefore, even after the compressor 4 starts to operate, as long as the pressure of the refrigerant discharged from the compressor 4 and the refrigerant pressure at the position situated between the electrically-driven expansion valve 10A and the capillary tube 10B are set so that the forward drive force F1 is equal to or less than the resultant force F2+Fs+Ff, the piston cylinder 12 keeps staying at the first position, as a result, the inlet pipe 6 keeps communicating with the pipe 8 through the closed space S1 while the outlet pipe 5 keeps communicating with the pipe 7 through the high pressure space S2.

To the contrary, if the refrigerant pressure, at the position situated between the electrically-driven expansion valve 10A and the capillary tube 10B in the refrigerating cycle A, is much lower than the pressure of the refrigerant flowed into the high pressure space S2, that is, if the forward drive force F1 exceeds the resultant force F2+Fs+Ff, the piston cylinder 12 moves from the first position and situated at the second position as shown in FIG. 25.

When the piston cylinder 12 moves to the second position, the piston cylinder 12 pushes the pin 29f toward the closed end of the housing 29a, as shown in FIG. 27, the selector valve element 29e is in selecting operation by the pin 29f against the energizing force due to the coil spring 29k, then the state-holding selector valve 29 is changed to be in the second state in which the pressure-transducing chamber $R_2$ communicates with the channel 14B from the first state in which the pressure-transducing chamber $R_2$ communicates with the channel 14A.

Then, the pressure-transducing chamber $R_2$ communicates with the inlet pipe 6 to which the channel 14B is connected and the refrigerant pressure in the pressure-transducing chamber $R_2$ becomes equal to the pressure of the refrigerant in the inlet pipe 6, which is much lower than the pressure of the refrigerant flowed into the high pressure space S2.

Therefore, the refrigerant pressure in the high pressure chamber $R_1$ exceeds the refrigerant pressure in the pressure-transducing chamber $R_2$ by a difference between the refrigerant pressure in the outlet pipe 5 and the refrigerant pressure in the inlet pipe 6, thereby the piston cylinder 12 keeps staying at the second position.

Then, since the piston cylinder 12 keeps staying at the second position, through the selecting operation of the selector valve element 29e against the energizing force due to the coil spring 29k, by the pin 29f pushed by the piston cylinder 12, the state-holding selector valve 29 is maintained in the second state, in which the pressure-transducing chamber $R_2$ communicates with the channel 14B.

That is, when the compressor 4 starts to operate, if the refrigerant pressure, at the position situated between the electrically-driven expansion valve 10A and the capillary tube 10B in the refrigerating cycle A, is set so that the resultant force F2+Fs+Ff is equal to or more than the forward drive force F1, as shown in FIG. 24, the piston cylinder 12 keeps staying at the first position and the state-holding selector valve 29 is maintained in the first state.

To the contrary, when the compressor 4 starts to operate, if the refrigerant pressure, at the position situated between the electrically-driven expansion valve 10A and the capillary tube 10B in the refrigerating cycle A, is set so that the resultant force F2+Fs+Ff is less than the forward drive force F1, as shown in FIG. 25, the piston cylinder 12 moves from the first position to the second position and the state-holding selector valve 29 is changed from the first state to the second state, thereby the piston cylinder 12 is kept staying at the second position.

Thereafter, the pressure of the refrigerant, which is discharged from the compressor 4 and flows into the high pressure space S2 through the outlet pipe 5, is reduced by stopping the operation of the compressor 4 or the like so that the forward drive force F1 is equal to or less than the force F2+Fs−Ff, thereby the piston cylinder 12 moves from the second position to the first position as shown in FIG. 24.

When the piston cylinder 12 is moved from the second position to the first position, the energizing force due to the coil spring 29k affects the selector valve element 29e, which has been in its action by the pin 29f, then the state-holding selector valve 29 is changed to be in the first state in which the pressure-transducing chamber $R_2$ communicates with the channel 14A from the second state in which the pressure-transducing chamber $R_2$ communicates with the channel 14B.

Therefore, when the refrigerating cycle A is operated in the heating mode, the refrigerant pressure, at the position situated between the electrically-driven expansion valve 10A and the capillary tube 10B in the refrigerating cycle A, is set high by controlling the electrically-driven expansion valve 10A into its closed side upon starting of operation of the compressor 4 so that the resultant force F2+Fs+Ff is equal to or more than the forward drive force F1, thereby the piston cylinder 12 is kept staying at the first position.

On the other hand, when the refrigerating cycle A is operated in the cooling mode, the refrigerant pressure, at the position situated between the electrically-driven expansion valve 10A and the capillary tube 10B in the refrigerating cycle A, is set low by controlling the electrically-driven expansion valve 10A into its open side upon starting of operation of the compressor 4 so that the resultant force F2+Fs+Ff is less than the forward drive force F1, thereby the piston cylinder 12 is moved from the first position to the second position right after the operation of the compressor 4.

Then, once the piston cylinder 12 is moved to the second position, as long as the forward drive force F1 is greater than the force F2+Fs−Ff, the piston cylinder 12 is kept staying at the second position even if the opening ratio of the electrically-driven expansion valve 10A is throttled, thereby the piston cylinder 12 is kept staying at the second position and the refrigerating cycle A is kept being operated in the cooling mode.

Thus, in the ninth embodiment, there is provided the state-holding selector valve 29, by which the pressure-transducing chamber $R_2$ of the reversing valve housing 1 is selectively connected to either the position situated between the electrically-driven expansion valve 10A and the capillary tube 10B in the refrigerating cycle A or the inlet pipe 6 through the channel 14A or 14B.

Therefore, the heating mode, in which the refrigerant discharged from the compressor 4 is supplied to the indoor heat exchanger 9A by way of the pipe 7, and the cooling mode, in which the refrigerant discharged from the compressor 4 is supplied to the outdoor heat exchanger 9B by way of the pipe 8, can be selected by a change in the pressure of the discharged refrigerant or by a change in the pressure of the refrigerant at the position situated between the electrically-driven expansion valve 10A and the capillary tube 10B upon start of operation of the compressor 4 and the selected state can be maintained, without using any exclusive power source such as an electromagnetic solenoid.

According to the ninth embodiment, since a power for the selection operation of the channel selector valve is obtained from a change in the refrigerant pressure in the high pressure chamber $R_1$ of the reversing valve housing 1 and in the pressure-transducing chamber $R_2$ by controlling the open ratio of the electrically-driven expansion valve 10A, there is no necessity of using an electrically-driven drive source such as an electromagnetic solenoid, which has been explained in the prior art section of the present specification.

In the following, a channel selector valve, in which the channel is selected by a change in a oscillational frequency generated by a compressor, according to a tenth embodiment of the present invention will be explained with reference to FIGS. 28 and 29.

Figure 28:
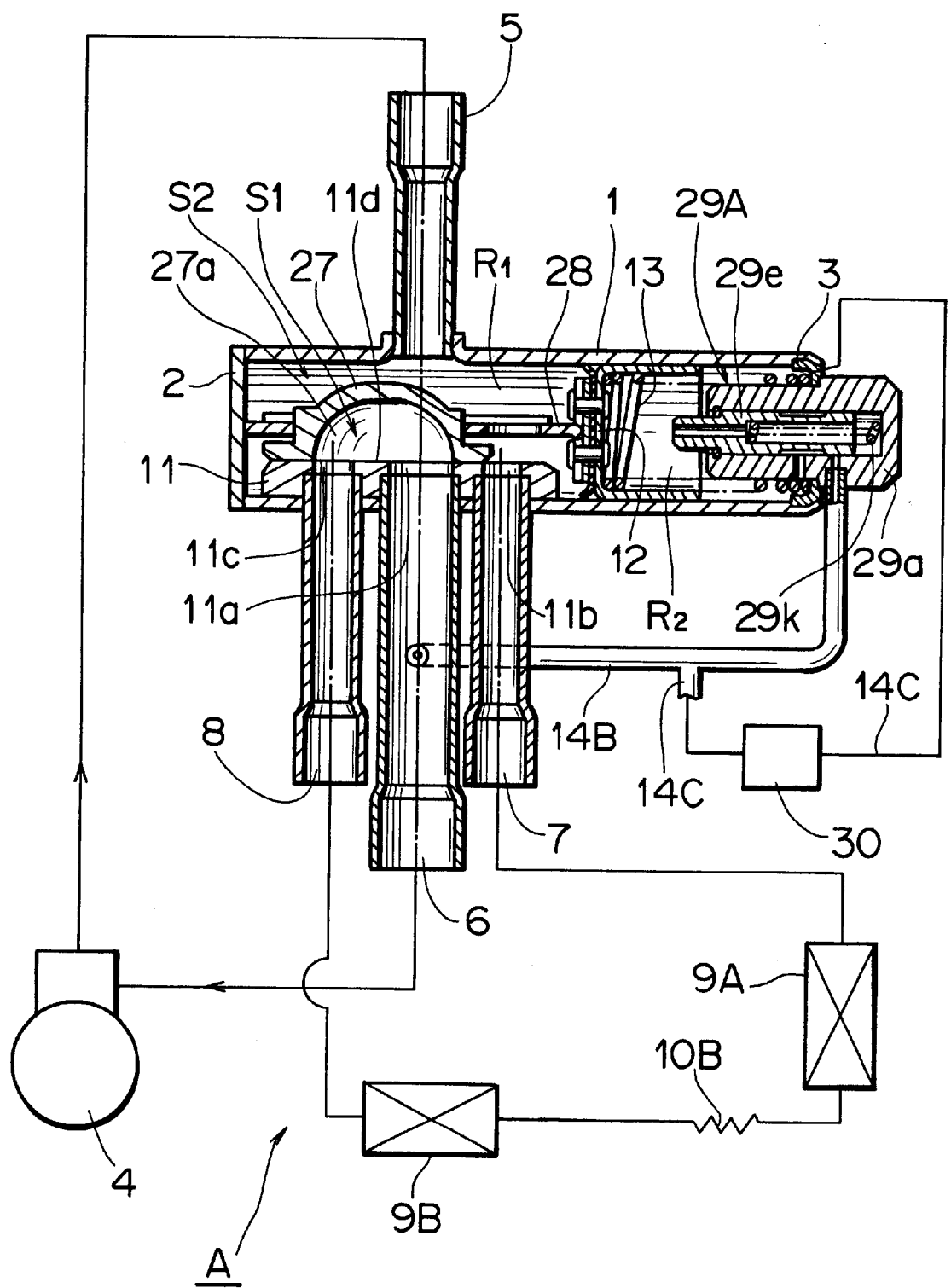
FIG. 28 is a view illustrating a schematic constitution of a refrigerating cycle employing a channel selector valve according to a tenth embodiment of the present invention.

FIG. 28 is a view illustrating a schematic constitution of a refrigerating cycle employing the channel selector valve according to the tenth embodiment of the present invention, in which the same abbreviation numerals with those used for the corresponding identical members or parts of the refrigerating cycle according to the ninth embodiment shown in FIG. 24 are used.

As shown in FIG. 28, the channel selector valve according to the tenth embodiment is different from the channel selector valve according to the ninth embodiment shown in FIG. 24 in points that a state-holding selector valve 29A without the first port 29b (of the state-holding selector valve 29) is employed instead of the state-holding selector valve 29, that a channel 14C diverged from the channel 14B is connected to the pressure-transducing chamber $R_2$ through the stopper 3 from the outside of the reversing valve housing 1, and that a pilot oscillation valve 30 is provided in the channel 14C.

Figure 29:
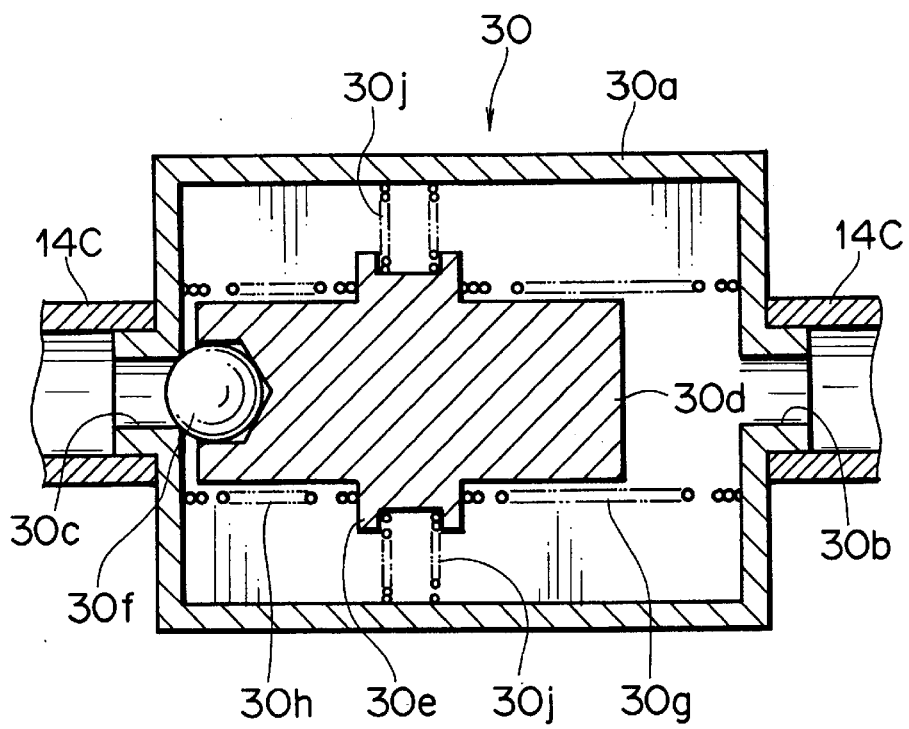
FIG. 29 is an enlarged sectional view of a pilot oscillating valve of FIG. 28.

As shown in FIG. 29, the pilot oscillation valve 30 comprises a housing 30a, an oscillator 30d received in the housing 30a, a ball valve 30f received in the oscillator 30d, and coil springs 30g, 30h and 30j.

A first port 30b, which communicates the interior of the pressure-transducing chamber $R_2$ to the interior of the housing 30a, is formed at one end surface of the housing 30a, while a second port 30c communicating with the channel 14B is formed at an opposite end surface of the housing 30a.

The oscillator 30d has a flange 30e at the center in the length direction of its cross section and the coil springs 30g and 30h are provided at both sides of the oscillator 30d in the length direction of its cross section, wherein the coil spring 30g is provided between the flange 30e and the one end surface of the housing 30a, while the coil spring 30h is provided between the flange 30e and the opposite end surface of the housing 30a.

The coil springs 30j are provided between the flange 30e and an inner wall of the housing 30a with leaving a space in the circumferential direction of the housing 30a, while the ball valve 30f is partially buried in an end surface of the oscillator 30d, said end surface being situated at the opposite end surface of the housing 30a.

The oscillator 30d is movable in directions of three dimensions by the coil springs 30g, 30h and 30j and supported by elastic forces of the coil springs 30g, 30h and 30j so as to come back to a standard position where the ball valve 30f closes the second port 30c.

According to the pilot oscillation valve 30 constructed as mentioned above, when an oscillation having a specific frequency is generated in the housing 30a, the oscillator 30d resonates because a balance among the elastic forces of the coil springs 30g, 30h and 30j is lost, thereby the oscillator 30d periodically moves on a specific three-dimensional locus and the ball valve 30f opens the second port 30c.

On the other hand, according to the pilot oscillation valve 30, when an oscillation having a different frequency from the specific frequency is generated in the housing 30a or when no oscillation takes place in the housing 30a, the oscillator 30d is situated at the standard position by the elastic forces of the coil springs 30g, 30h and 30j so that the ball valve 30f keeps closing the second port 30c.

In the following, an operation of the channel selector valve according to the tenth embodiment constructed as described above will be explained.

When the operation of the compressor 4 is halted, as shown in FIG. 28, the piston cylinder 12 is situated at the first position, the inlet pipe 6 communicates with the pipe 8 while the outlet pipe 5 communicates with the pipe 7, then in this situation the oscillator 30d of the pilot oscillation valve 30 is situated at the standard position and the ball valve 30f closes the second port 30c.

Then, when the compressor 4 starts to operate, an oscillation of the compressor 4 is propagated to the reversing valve housing 1, the stopper 3 and the housing 30a through the inlet valve 6 and the channel 14C, thereby the housing 30a oscillates with a frequency corresponding to the oscillation of the compressor 4.

If the oscillation of the housing 30a has not the specific frequency, the oscillator 30d is situated at the standard position and the ball valve 30f closes the second port 30c, that is, the pressure-transducing chamber $R_2$ is isolated from the inlet pipe 6, therefore, the piston cylinder 12 is kept staying at the first position as long as the forward drive force F1 is equal to or less than the resultant force F2+Fs+Ff.

If the piston cylinder 12 is kept staying at the first position, the selector valve element 29e is kept energized by the coil spring 29k, therefore, the state-holding selector valve 29 keeps staying in the first state, in which the pressure-transducing chamber $R_2$ is isolated from the channel 14B and the refrigerant pressure in the pressure-transducing chamber $R_2$ does not change, thereby the piston cylinder 12 keeps staying at the first position.

On the contrary, if the oscillation of the housing 30a has the specific frequency, the oscillator 30d resonates and the ball valve 30f opens the second port 30c, then the pressure-transducing chamber $R_2$ communicates with the inlet pipe 6 of the compressor 4 through the pilot oscillation valve 30 and the channel 14C, thereby the refrigerant pressure in the pressure-transducing chamber $R_2$ becomes equal to the refrigerant pressure in the inlet pipe 6, which is much lower than the pressure of the refrigerant flowed into the high pressure space S2.

Therefore, the forward drive force F1 exceeds the resultant force F2+Fs+Ff, as a result, the piston cylinder 12 moves from the first position to the second position.

When the piston cylinder 12 moves from the first position to the second position, the pin 29f, which is pushed toward the closed end of the housing 29a by the piston cylinder, makes the selector valve element 29e be in selecting operation against the energizing force due to the coil spring 29k, then the state-holding selector valve 29 changes its state from the first state to the second state so as to communicate the pressure-transducing chamber $R_2$ to the channel 14B, that is, the pressure-transducing chamber $R_2$ communicates with the inlet pipe 6 through a different path from the path of the pilot oscillation valve 30 and the channel 14C.

Therefore, thereafter, even if the oscillation of the compressor 4 changes, that is, the oscillation frequency of the housing 30a is changed from the specific frequency and the oscillator 30d comes back to the standard position and then the ball valve 30f closes the second port 30c, the refrigerant pressure in the pressure-transducing chamber $R_2$ is kept equal to the refrigerant pressure in the inlet pipe 6, thereby the piston cylinder 12 keeps staying at the second position.

Further, thereafter, if the pressure of the refrigerant flowed into the high pressure space S2 from the compressor 4 through the outlet pipe 5 is reduced by tentatively halting the operation of the compressor 4 and the like so as to move the piston cylinder 12 from the second position to the first position, the state-holding selector valve 29 changes its state from the second state to the first state by the energizing force due to the coil spring 29k, said energizing force affecting the selector valve element 29e that has been made be in selecting operation by the pin 29f, thereby the oscillator 30d comes back to the standard position and the ball valve 30f keeps closing the second port 30c.

Consequently, when the refrigerating cycle A is operated in the heating mode, the number of revolution of the compressor 4 upon start of its operation is set so that the housing 30a oscillates with a frequency, which is different from the specific frequency, by the oscillation of the compressor 4 propagated through the reversing valve housing 1, stopper 3, the inlet pipe 6 and the channel 14C, thereby the piston cylinder 12 can be kept staying at the first position.

On the other hand, when the refrigerating cycle A is operated in the cooling mode, the number of revolution of the compressor 4 upon start of its operation is set so that the housing 30a oscillates with the specific frequency by the oscillation of the compressor 4 propagated through the reversing valve housing 1, stopper 3, the inlet pipe 6 and the channel 14C, thereby the piston cylinder 12 can be moved from the first position to the second position right after the operation of the compressor 4.

Then, once the piston cylinder 12 is moved to the second position, as long as the compressor 4 keeps operating, the piston cylinder 12 is kept staying at the second position even if the oscillation of the compressor 4 changes and the oscillation frequency of the housing 30a changes from the specific frequency, thereby the refrigerating cycle A is kept operating in the cooling mode.

The channel selector valve according to the tenth embodiment constructed as described above gives a similar effect with that according to the ninth embodiment.

According to the tenth embodiment, since a power for the selection operation of the channel selector valve is obtained from a change in the refrigerant pressure in the high pressure chamber $R_1$ of the reversing valve housing 1 and in the pressure-transducing chamber $R_2$ by the pilot oscillation valve 30, in which the pilot oscillation valve 30 opens or closes depending upon a change in the frequency of the oscillation generated by the compressor 4, therefore similarly to the ninth embodiment, there is no necessity of using an electrically-driven drive source such as an electromagnetic solenoid, which has been explained in the prior art section of the present specification.

In addition, according to the tenth embodiment, upon starting of the operation of the compressor 4 there is no necessity of adjusting the pressure of the refrigerant, which is introduced into the pressure-transducing chamber $R_2$ through the channel 14A by opening or closing of the electrically-driven expansion valve 10A in the refrigerating cycle A, said adjusting is needed in the ninth embodiment, therefore, the constitution of the channel selector valve according to the tenth embodiment becomes simple since there is no electrically-driven expansion valve 10A needed in the refrigerating cycle A, thereby the selector operation of the channel selector valve for selecting the heating and cooling modes can be more easily performed.

In the ninth and tenth embodiments, the piston cylinder 12 may be provided with a pin instead of providing the selector valve element 29e with the pin 29f.

In the following, a channel selector valve, in which the channel is selected by adjusting a heat-exchange capacity by heat exchangers, according to a eleventh embodiment of the present invention will be explained with reference to FIGS. 30 and 31.

Figure 30:
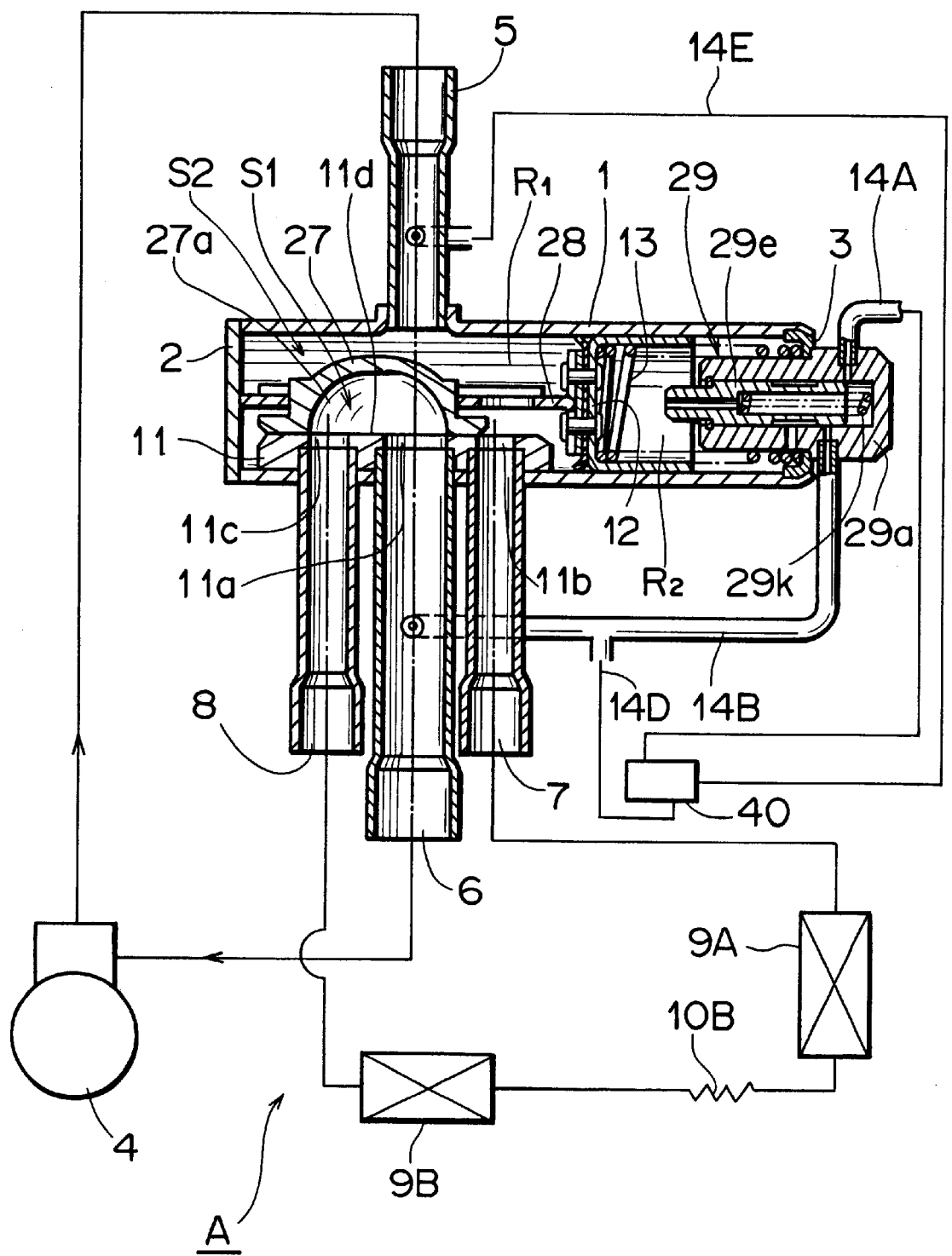
FIG. 30 is a view illustrating a schematic constitution of a refrigerating cycle employing a channel selector valve according to a eleventh embodiment of the present invention.

FIG. 30 is a view illustrating a schematic constitution of a refrigerating cycle employing the channel selector valve according to the eleventh embodiment of the present invention, in which the same abbreviation numerals with those used for the corresponding identical members or parts of the refrigerating cycle according to the ninth embodiment shown in FIG. 24 are used.

As shown in FIG. 30, the channel selector valve according to the eleventh embodiment is different from the channel selector valve according to the ninth embodiment shown in FIG. 24 in points that the electrically-driven expansion valve 10A is omitted and that a differential pressure selector valve 40 is provided between the outlet pipe 5 and the inlet pipe 6.

Figure 31:
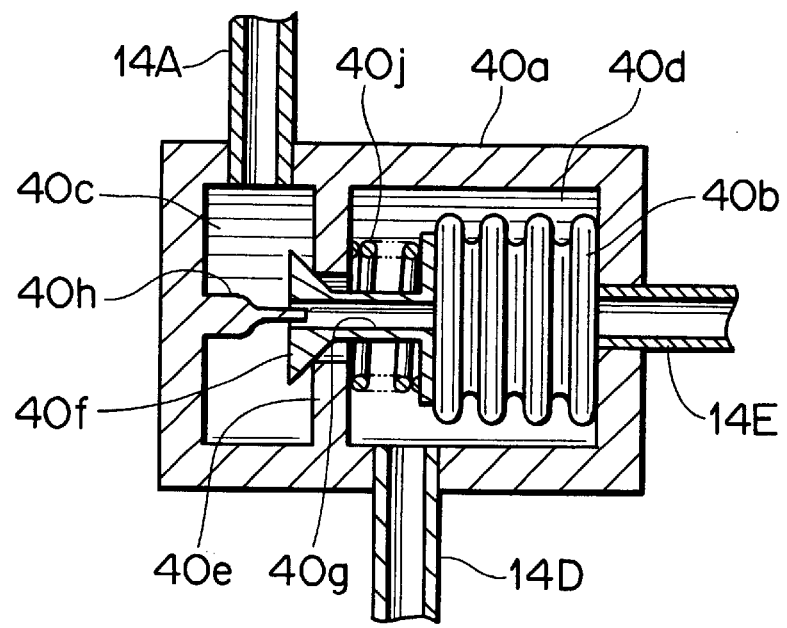
FIG. 31 is an enlarged sectional view of a differential pressure selector valve of FIG. 30.

As shown in FIG. 31, the differential pressure selector valve 40 comprises the housing 40a, a bellows 40b received in the housing 40a, a valve element 40f for opening or closing a valve port 40e that partitions the housing 40a into a first chamber 40c and a second chamber 40d by expansion and contraction of the bellows 40b, and a pilot valve 40h, which opens or closes a pilot path 40g that passes through the valve element 40f and communicates with the interior of the bellows 40b, by opening and closing action of the valve element 40f, wherein the bellows 40b is energized by a coil spring 40j in a direction of expansion and contraction of the bellows 40b, and the valve element 40f is energized toward a direction of closing the valve port 40e by the energized force.

The first chamber 40c is connected to the channel 14A, the second chamber 40d communicates with the inlet pipe 6 through the channel 14D, and the interior of the bellows 40b communicates with the outlet pipe 5 through the channel 14E.

In the following, an operation of the channel selector valve according to the eleventh embodiment will be explained. The bellows 40b, into which the refrigerant is introduced from the outlet pipe 5 through the channel 14E, keeps its contracted state as long as a differential pressure between the refrigerant in the bellows 40b and the refrigerant in the second chamber 40d, which is introduced from the inlet pipe 6 through the channel 14D, is equal to or lower than the energizing force by the coil spring 40j, then the valve element 40f keeps closing the valve port 40e, on the other hand, when said differential pressure exceeds the energizing force by the coil spring 40j, the bellows 40b expands and the valve element 40f opens the valve port 40e.

Here, if a differential pressure of the refrigerant, which exceeds the energizing force by the coil spring 40j, is defined as a differential pressure threshold Pk, Pk is determined from a relation with the energizing force by the coil spring 40j, however usually, the differential pressure of the refrigerant is not set to be Pk, that is, a usual differential pressure of the refrigerant is kept to be lower than the energizing force by the coil spring 40j.

When the refrigerating cycle A is operated in the heating mode, the differential pressure of the refrigerant is controlled to be lower than the energizing force by the coil spring 40j, thereby the valve element 40f closes the valve port 40e and the refrigerant discharged from the compressor 4 is introduced into the pressure-transducing chamber $R_2$ through the outlet pipe 5, the channel 14E, the interior of the bellows 40b, the pilot path 40g of the valve element 40f, and the channel 14A, thereby the refrigerant pressure in the high pressure chamber $R_1$ is made to be equal to the refrigerant pressure in the pressure-transducing chamber $R_2$, therefore the piston cylinder 12 is made situated at the first position.

On the other hand, when the refrigerating cycle A is operated in the cooling mode, the differential pressure of the refrigerant is once controlled to be Pk that is higher than the energizing force by the coil spring 40j, thereby the valve element 40f opens the valve port 40e due to the expansion of the bellows 40b and the pilot valve 40h closes the pilot path 40g, then the pressure-transducing chamber $R_2$ communicates with the inlet pipe 6 through the channel 14A, the valve port 40e, the channel 14D and then, the refrigerant pressure in the pressure-transducing chamber $R_2$ is made lower than the refrigerant pressure in the high pressure chamber $R_1$, thereby the piston cylinder 12 is moved from the first position to the second position.

Once the piston cylinder 12 is moved to the second position, thereafter, the piston cylinder 12 is kept staying at the second position by the state-holding selector valve 29, therefore the cooling mode is maintained even if the refrigerant pressure is controlled to be lower than the energizing force by the coil spring 40j.

In order to control the refrigerant pressure to be the differential pressure threshold Pk, the easiest method is to change a heat-exchange capacity of the indoor heat exchanger 9A and the outdoor heat exchanger 9B. For example, if an operation of an air blower of the indoor heat exchanger 9A or the outdoor heat exchanger 9B is halted, the thermal conduction therein is impeded and the efficiency of heat exchange is decreased, as a result, the refrigerant pressure increases while the pressure of the refrigerant sucked into the compressor 4 is lowered, thereby the differential pressure of the refrigerant is easily made to be Pk.

The channel selector valve according to the eleventh embodiment constructed as described above gives a similar effect with that according to the ninth or tenth embodiment.

According to the eleventh embodiment, since a power for the selection operation of the channel selector valve is obtained by changing the differential pressure between the refrigerant in the high pressure chamber $R_1$ of the reversing valve housing 1 and the refrigerant in the pressure-transducing chamber $R_2$, due to the change in the refrigerant pressure generated by the change in the efficiency of heat exchange in the indoor heat exchanger 9A or the outdoor heat exchanger 9B, therefore, similarly to the channel selector valve according to the ninth or tenth embodiment, there is no necessity of using an electrically-driven drive source such as an electromagnetic solenoid, which has been explained in the prior art section of the present specification.

In the following, a channel selector valve according to a twelfth embodiment of the present invention, in which a selection operation is performed by two three-way selector valves, will be explained with reference to FIG. 32.

Figure 32:
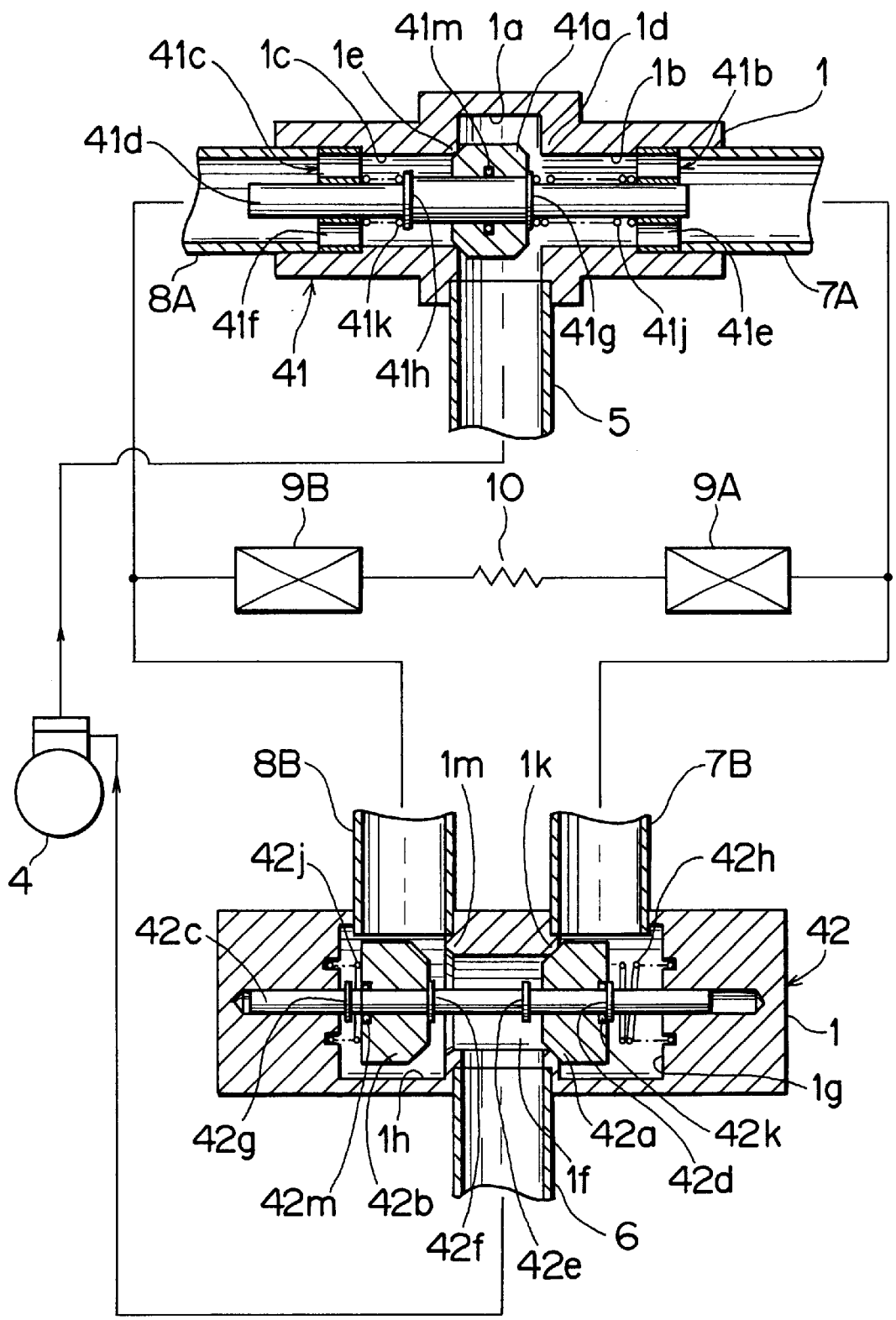
FIG. 32 is a view illustrating a schematic constitution of a refrigerating cycle employing a channel selector valve according to a twelveth embodiment of the present invention.

FIG. 32 is a view illustrating a schematic constitution of a refrigerating cycle employing a channel selector valve according to the twelfth embodiment of the present invention, in which the same abbreviation numerals with those used for the corresponding identical members or parts of the channel selector valve according to the first embodiment shown in FIG. 1 are used.

The channel selector valve according to the twelfth embodiment, a state in operation in the hearting mode of which is shown in FIG. 32 by its sectional view, is different from the channel selector valve according to the first embodiment shown in FIG. 1 in points that a four-way selector valve is constituted by two three-way selector valves, i.e. a first three-way selector valve 41 and a second three-way selector valve 42, which are connected in parallel to a series circuit comprising an indoor heat exchanger 9A, a throttle 10 and an outdoor heat exchanger 9B and that the two three-way selector valves, i.e. a first three-way selector valve 41 and a second three-way selector valve 42 are connected to a compressor 4.

As shown in FIG. 32, the first three-way selector valve 41 comprises a reversing valve housing 1 (corresponding to a housing), an outlet pipe 5, pipe 7A and pipe 7B, which are connected to the reversing valve housing 1, and a piston 41a (corresponding to a movable member) that allows the outlet pipe 5 to communicate with either the pipe 7A or the pipe 7B through the interior of the reversing valve housing 1.

The reversing valve housing 1 of the first three-way selector valve 41 has a cylindrical shape, in which a large diameter cylinder 1a is sandwiched by two small diameter cylinders 1b and 1c, wherein the pipes 7A and 7B are connected to the small diameter cylinder 1b and 1c, respectively, and the outlet pipe 5 is connected to the large diameter cylinder 1a.

In the interior of the small diameter cylinders 1b and 1c, there are provided bearings 41b and 41c, respectively, by which a slide shaft 41d is supported rotatively and slidably in an axial direction, in addition, there are provided channels 41e and 41f passing through between each end of the bearings 41b and 41c, respectively.

On a circumferential surface of the slide shaft 41d, there are put stoppers 41g and 41h (for example, E-rings) in the axial direction with leaving a space therebetween, then a coil spring 41j (corresponding to second storing means for storing energizing force) is provided between the stoppers 41g and the bearing 41b, while a coil spring 41k (corresponding to first storing means for storing energizing force) is provided between the stoppers 41h and the bearing 41c, said coil springs 41j and 41k being put on the slide shaft 41d.

The piston 41a is formed to have a diameter, which is larger than that of the small diameter cylinders 1b and 1c but smaller than that of the large diameter cylinder 1a, and is received in the large diameter cylinder 1a. The piston 41a is put on the slide shaft 41d so as to be slidable in the axial direction of the slide shaft 41d between the stopper 41g and the stopper 41h, then there is provided an O-ring 41m for sealing between the piston 41a and the slide shaft 41d.

The outlet pipe 5 is connected to an outlet (not shown in the figure) of the compressor 4, the pipe 7A is connected to the indoor heat exchanger 9A while the pipe 8A is connected to the outdoor heat exchanger 9B.

In the first three-way selector valve 41 thus formed, when a force larger than an elastic force of the coil spring 41k is applied on an end surface of the slide shaft 41d at the small diameter cylinder 1b side, the slide shaft 41d moves toward the small diameter cylinder 1c side.

Then, the piston 41 a moves to the first position where the piston 41 a pushed by the stopper 41g closes a valve port 1e, which is formed by a level difference between the large diameter cylinder 1a and the small diameter cylinder 1c, and opens a valve port 1d, which is formed by a level difference between the large diameter cylinder 1a and the small diameter cylinder 1b, thereby the outlet pipe 5 communicates with the pipe 7A through the channel 41e of the bearing 41b.

When the piston 41a is at the first position, the coil spring 41k is pressed by the stopper 41h to be compressed, thereby the coil spring 41k is in a state that the coil spring 41k stores an energized force to move the slide shaft 41d toward the small diameter cylinder 1b side.

Then, in a state shown in FIG. 32, if a force applied on the end surface of the slide shaft 41d at the small diameter cylinder 1b side is removed, the stopper 41h is pushed by the elastic force of the coil spring 41k so that the slide shaft 41d moves toward the small diameter cylinder 1b side.

Then, by a sliding resistance between the O-ring 41m and the slide shaft 41d, the piston 41a together with the slide shaft 41d moves to the second position where the piston 41a opens the valve port 1e and closes the valve port 1d, thereby the outlet pipe 5 communicates with the pipe 8A through the channel 41f of the bearing 41c.

However, in a state that the slide shaft 41d merely moves toward the small diameter cylinder 1b side by the elastic force of the coil spring 41k, the piston 41a does not move with relation to the slide shaft 41d, therefore, the piston 41a abuts on the stopper 41g and is apart from the stopper 41h, while the coil spring 41j extends.

Then, when a force larger than the elastic force of the coil spring 41j is applied on an end surface of the slide shaft 41d at the small diameter cylinder 1c side, only the slide shaft 41d moves toward the small diameter cylinder 1b side until the stopper 41h abuts on the piston 41a, thereby the stopper 41g is apart from the piston 41a toward the small diameter cylinder 1b side.

Then, the coil spring 41j is pressed by the stopper 41g to be compressed, thereby the coil spring 41j is in a state that the coil spring 41j stores an energized force to move the slide shaft 41d toward the small diameter cylinder 1c side.

Then, in this state, if a force applied on the end surface of the slide shaft 41d at the small diameter cylinder 1c side is removed, the slide shaft 41d moves toward the small diameter cylinder 1c side by the elastic force of the coil spring 41j.

Then, by a sliding resistance between the O-ring 41m and the slide shaft 41d, the piston 41a together with the slide shaft 41d moves to the first position where the piston 41a closes the valve port 1e and opens the valve port 1d, thereby the outlet pipe 5 communicates with the pipe 7A through the channel 41e of the bearing 41b.

However, in a state t hat the slide shaft 41d merely moves toward the small diameter cylinder 1c side by the elastic force of the coil spring 41j, the piston 41a does not move with relation to the slide shaft 41d, therefore, the piston 41a abuts on the stopper 41h and is apart from the stopper 41g, while the coil spring 41k extends.

Then, when a force larger than the elastic force of the coil spring 41k is applied on an end surface of t he slide shaft 41d at the small diameter cylinder 1b side, only the slide shaft 41d moves toward the small diameter cylinder 1c side until the stopper 41g abuts on the piston 41a, thereby the stopper 41h is apart from the piston 41a toward the small diameter cylinder 1c side.

Then, the coil spring 41k is pressed b y the stopper 41g to be compressed, thereby the coil spring 41k comes back to the state shown in FIG. 32, in which the coil spring 41k stores an energized force to move the slide shaft 41d toward the small diameter cylinder 1b side.

On the other hand, the second three-way selector valve 42 comprises a reversing valve housing 1 (corresponding to a housing), an inlet pipe 6, pipe 7B and pipe 8B, which are connected to the reversing valve housing 1, and two pistons 42a and 42b (corresponding to a movable member) that allows the inlet pipe 6 to communicate with either the pipe 7B or the pipe 8B through the interior of the reversing valve housing 1.

The reversing valve housing 1 of the second three-way selector valve 42 has a cylindrical shape, in which a small diameter cylinder 1f is sandwiched by two large diameter cylinders 1g and 1h, wherein the pipes 7B and 8B are connected to the small diameter cylinder 1g and 1h, respectively, and the inlet pipe 6 is connected to the small diameter cylinder 1f.

In the reversing valve housing 1, there is provided a slide shaft 42c movable in a thrust direction, on which stoppers 42d, 42e, 42f and 42g (for example, E-rings) are put in the axial direction with leaving as pace therebetween.

Each piston 42a and 42b is formed to have a diameter, which is larger than that of the small diameter cylinder 1f but smaller than that of the large diameter cylinders 1g and 1h, the pistons 42a and 42b are received in the large diameter cylinders 1g and 1h, respectively. The piston 42a is put on the slide shaft 42c so as to be slidable in the axial direction of the slide shaft 42c between the stopper 42d and the stopper 42e, while the piston 42b is put on the slide shaft 42c so as to be slidable in the axial direction of the slide shaft 42c between the stopper 42f and the stopper 42g.

In the large diameter cylinder 1g, there is received a coil spring 42h for energizing the piston 42a toward the large diameter cylinder 1h side, while in the large diameter cylinder 1h, there is received a coil spring 42j for energizing the piston 42b toward the large diameter cylinder 1g side, wherein there are provided O-rings 42k and 42m for sealing between each piston 42a and 42b and the slide shaft 42c.

The inlet pipe 6 is connected to a inlet (not shown in the figure) of the compressor 4, the pipe 7B is connected to the indoor heat exchanger 9A and the pipe 7A of the first three-way selector valve 41, while the pipe 8B is connected to the outdoor heat exchanger 9B and the pipe 8A of the first three-way selector valve 41.

In the second three-way selector valve 42 constructed as described above, when a force stronger than an elastic force by the coil spring 42j is applied to the slide shaft 42c from the large diameter cylinder 1g side, the slide shaft 42c pushed by the stopper 42d slides toward the large diameter cylinder 1h side.

Then, the piston 42b pushed by the stopper 42f moves to the second position where the piston 42b opens a valve port 1m formed by a level difference between the small diameter cylinder 1f and the large diameter cylinder 1h, while the piston 42a moves to the second position where the piston 42a closes a valve port 1k formed by a level difference between the small diameter cylinder 1f and the large diameter cylinder 1g by a sliding resistance between the O-ring 42k and the slide shaft 42c, thereby the inlet pipe 6 is communicated to the pipe 8B.

Then, at the second position of the piston 42a, the coil spring 42j is pressed by the piston 42b to be compressed, thereby the coil spring 42j is in a state that the coil spring 42j stores an energized force to move the piston 42b toward the large diameter cylinder 1g side.

Then, in the second three-way selector valve 42, in the state shown in FIG. 32, if a force applied to the slide shaft 42c from the large diameter cylinder 1g side is removed, the piston 42b is pressed by the elastic force of the coil spring 42j and moves toward the first position where the piston 42b closes the valve port 1m, that is, the slide shaft 42c moves toward the large diameter cylinder 1g side.

Then, until the slide shaft 42c is on a half way of moving toward the large diameter cylinder 1g side, due to the sliding resistance between the O-ring 42k and the slide shaft 42c, the piston 42a together with the slide shaft 42c moves to the first position where the piston 42a opens the valve port 1k, thereby the inlet pipe 6 is communicated to the pipe 7B.

Then, in this state, if the slide shaft 42c moves further toward the large diameter cylinder 1g side, an elastic force stronger than the sliding resistance between the O-ring 42k and the slide shaft 42c acts from the coil spring 42h to the piston 42a. Due to this elastic force, the piston 42a stops at the first position, while only the slide shaft 42c moves toward the large diameter cylinder 1g side, then the stopper 42d that has abutted on the piston 42a is away from the piston 42a, while the stopper 42e that has been away from the piston 42a comes in contact with the piston 42a.

In this state, if a force stronger than the elastic force by the coil spring 42h is applied from the large diameter cylinder 1h side to the slide shaft 42c, the piston 42a is pressed by the stopper 42e to move toward the large diameter cylinder 1g side, thereby the coil spring 42h is pressed by the piston 42a to be compressed and the coil spring 42h is in a state that the coil spring 42h stores the energizing force to move the piston 42a toward the large diameter cylinder 1h side.

At the same time, since at the first position where the piston 42b closes the valve port 1m the piston 42b is controlled from moving further toward the large diameter cylinder 1g side, the stopper 42f that has abutted on the piston 42b is away from the piston 42b, while the stopper 42g that has been away from the piston 42b comes in contact with the piston 42b.

In this state, if the force applied from the large diameter cylinder 1h side to the slide shaft 42c is removed, the piston 42a is pressed by the elastic force of the coil spring 42h, thereby the piston 42a moves to the second position where the piston 42a closes the valve port 1k and the slide shaft 42c moves toward the large diameter cylinder 1h side.

Then, until the slide shaft 42c is on a half way of moving toward the large diameter cylinder 1h side, due to the sliding resistance between the O-ring 42m and the slide shaft 42c, the piston 42b together with the slide shaft 42c moves to the second position where the piston 42b opens the valve port 1m, thereby the inlet pipe 6 is communicated to the pipe 8B.

Then, in this state, if the slide shaft 42c moves further toward the large diameter cylinder 1h side, an elastic force stronger than the sliding resistance between the O-ring 42m and the slide shaft 42c acts from the coil spring 42j to the piston 42b. Due to this elastic force, the piston 42b stops at the second position, while only the slide shaft 42c moves toward the large diameter cylinder 1h side, then the stopper 42g that has abutted on the piston 42b is away from the piston 42b, while the stopper 42f that has been away from the piston 42b comes in contact with the piston 42b.

In this state, if a force stronger than the elastic force by the coil spring 42j is applied from the large diameter cylinder 1g side to the slide shaft 42c, the piston 42b is pressed by the stopper 42f to move toward the large diameter cylinder 1h side, thereby the coil spring 42j is pressed by the piston 42b to be compressed and the coil spring 42j is in a state that the coil spring 42j stores the energizing force to move the piston 42b toward the large diameter cylinder 1g side.

At the same time, since at the second position where the piston 42a closes the valve port 1k the piston 42a is controlled from moving further toward the large diameter cylinder 1h side, the stopper 42e that has abutted on the piston 42a is away from the piston 42a, while the stopper 42d that has been away from the piston 42a comes in contact with the piston 42a, thereby coming back to the state shown in FIG. 32.

In the following, an operation of the channel selector valve according to the twelfth embodiment constructed as described above will be explained.

When the operation of the compressor 4 is halted, the coil springs 41j and 41k of the first three-way selector valve 41 as well as the coil springs 42h and 42j of the second three-way selector valve 42 are all extended and are in a state to have no energizing force, that is, the piston 41a of the first three-way selector valve 41 and the piston 42a of the second three-way selector valve 42 are located at each same positions with those during an ex-operation of the compressor 4.

In a state that the piston 41 a of the first three-way selector valve 41 is at the first position and the pistons 42a and 42b of the second three-way selector valve 42 are at their second position, when the compressor 4 starts to operate, a high pressure refrigerant discharged from the compressor 4 flows into the large diameter cylinder 1a of the first three-way selector valve 41 through the outlet pipe 5 and then, further flows into the indoor heat exchanger 9A through the valve port 1d, the channel 41e of the bearing 41b and the pipe 7A.

Then, the refrigerant flowed into the indoor heat exchanger 9A flows into the pipe 8B of the second three-way selector valve 42 by way of the throttle 10, the outdoor heat exchanger 9B, and then, flows back to the inlet of the compressor 4 by way of the valve port 1m and the inlet pipe 6, thereby the refrigerating cycle A is in the heating mode.

At this time, in the first three-way selector valve 41, since the refrigerant pressure in the pipe 7A communicating with the outlet of the compressor 4 is higher than that in the pipe 8A communicating with the inlet of the compressor 4 through the second three-way selector valve 42, the slide shaft 41d is pressed toward the small diameter cylinder 1c side by a force stronger than the elastic force of the coil spring 41k causing the coil spring 41k to be compressed, thereby the coil spring 41k stores the energizing force to energize the slide shaft 41d toward the small diameter cylinder 1b side.

On the other hand, in the second three-way selector valve 42, since the refrigerant pressure in the pipe 7B communicating with the outlet of the compressor 4 through the first three-way selector valve 41 is higher than that in the pipe 8B communicating with the inlet of the compressor 4, the slide shaft 42c is applied by a force stronger than the elastic force of the coil spring 42j from the large diameter cylinder 1g side, causing the piston 42b to be pressed toward the large diameter cylinder 1h side and the coil spring 42j to be compressed, thereby the coil spring 42j stores the energizing force to energize the piston 42b toward the large diameter cylinder 1g side.

Thereafter, when the operation of the compressor 4 is halted, in the first three-way selector valve 41, the piston 41a together with the slide shaft 41d moves toward the small diameter cylinder 1b side by the energizing force stored in the coil spring 41k, thereby the piston 41a is situated at the second position.

On the other hand, in the second three-way selector valve 42, by the energizing force stored in the coil spring 42j, the piston 42b moves toward the large diameter cylinder 1g side and is situated at the first position, while the slide shaft 42c and the piston 42a move together with the piston 42b, thereby the piston 42a is situated at the first position.

In this state, when the compressor 4 starts to operate, a high pressure refrigerant discharged from the compressor 4 flows into the large diameter cylinder 1a of the first three-way selector valve 41 through the outlet pipe 5 and then, further flows into the outdoor heat exchanger 9B through the valve port 1e, the channel 41f of the bearing 41c and the pipe 8A.

Then, the refrigerant flowed into the outdoor heat exchanger 9B flows into the pipe 7B of the second three-way selector valve 42 by way of the throttle 10, the indoor heat exchanger 9A, and then, flows back to the inlet of the compressor 4 by way of the valve port 1k and the inlet pipe 6, thereby the refrigerating cycle A is in the cooling mode.

At this time, in the first three-way selector valve 41, since the refrigerant pressure in the pipe 8A communicating with the outlet of the compressor 4 is higher than that in the pipe 7A communicating with the inlet of the compressor 4 through the second three-way selector valve 42, the slide shaft 41d is pressed toward the small diameter cylinder 1b side by a force stronger than the elastic force of the coil spring 41j causing the coil spring 41j to be compressed, thereby the coil spring 41j stores the energizing force to energize the slide shaft 41d toward the small diameter cylinder 1c side.

On the other hand, in the second three-way selector valve 42, since the refrigerant pressure in the pipe 8B communicating with the outlet of the compressor 4 through the first three-way selector valve 41 is higher than that in the pipe 7B communicating with the inlet of the compressor 4, the slide shaft 42c is applied by a force stronger than the elastic force of the coil spring 42h from the large diameter cylinder 1h side, causing the piston 42a to be pressed toward the large diameter cylinder 1g side and the coil spring 42h to be compressed, thereby the coil spring 42h stores the energizing force to energize the piston 42a toward the large diameter cylinder 1h side.

Thereafter, when the operation of the compressor 4 is halted, in the first three-way selector valve 41, the piston 41a together with the slide shaft 41d moves toward the small diameter cylinder 1c side by the energizing force stored in the coil spring 41j, thereby the piston 41a is situated at the first position.

On the other hand, in the second three-way selector valve 42, by the energizing force stored in the coil spring 42h, the piston 42a moves toward the large diameter cylinder 1h side and is situated at the second position, while the slide shaft 42c and the piston 42b move together with the piston 42a, thereby the piston 42b is situated at the second position.

Thus, according to the twelfth embodiment, the four-way selector valve, which selects the channel of the refrigerant in the refrigerating cycle A, is constituted by the first three-way selector valve 41 and the second three-way selector valve 42, which select a path of the refrigerant upon halting of the operation of the compressor 4 by using the energizing force that is stored during the operation of the compressor 4.

Therefore, the heating mode, in which the refrigerant discharged from the outlet pipe 5 is supplied to the indoor heat exchanger 9A by way of the pipe 7A of the first three-way selector valve 41, and the cooling mode, in which the refrigerant discharged from the outlet pipe 5 is supplied to the outdoor heat exchanger 9B by way of the pipe 8A of the first three-way selector valve 41, can be selected by controlling the number of times of the operation start of the compressor 4 and the selected state can be maintained without using any exclusive power source such as an electromagnetic solenoid.

Moreover, according to the twelfth embodiment, since the selection of communication for the outlet pipe 5 of the first three-way selector valve 41 and the inlet pipe 6 of the second three-way selector valve 42 is performed according to a start and halt of the operation of the compressor 4, neither power source for an electric drive nor control by an electric signal for selecting the channel of the refrigerant is needed, therefore, the channel selector valve according to the twelfth embodiment is advantageous.

In the following, a channel selector valve according to a thirteenth embodiment of the present invention, in which a selection operation is performed by a four-way selector valve that uses a three-way selector valve as a pilot valve thereof, will be explained with reference to FIG. 33.

Figure 33:
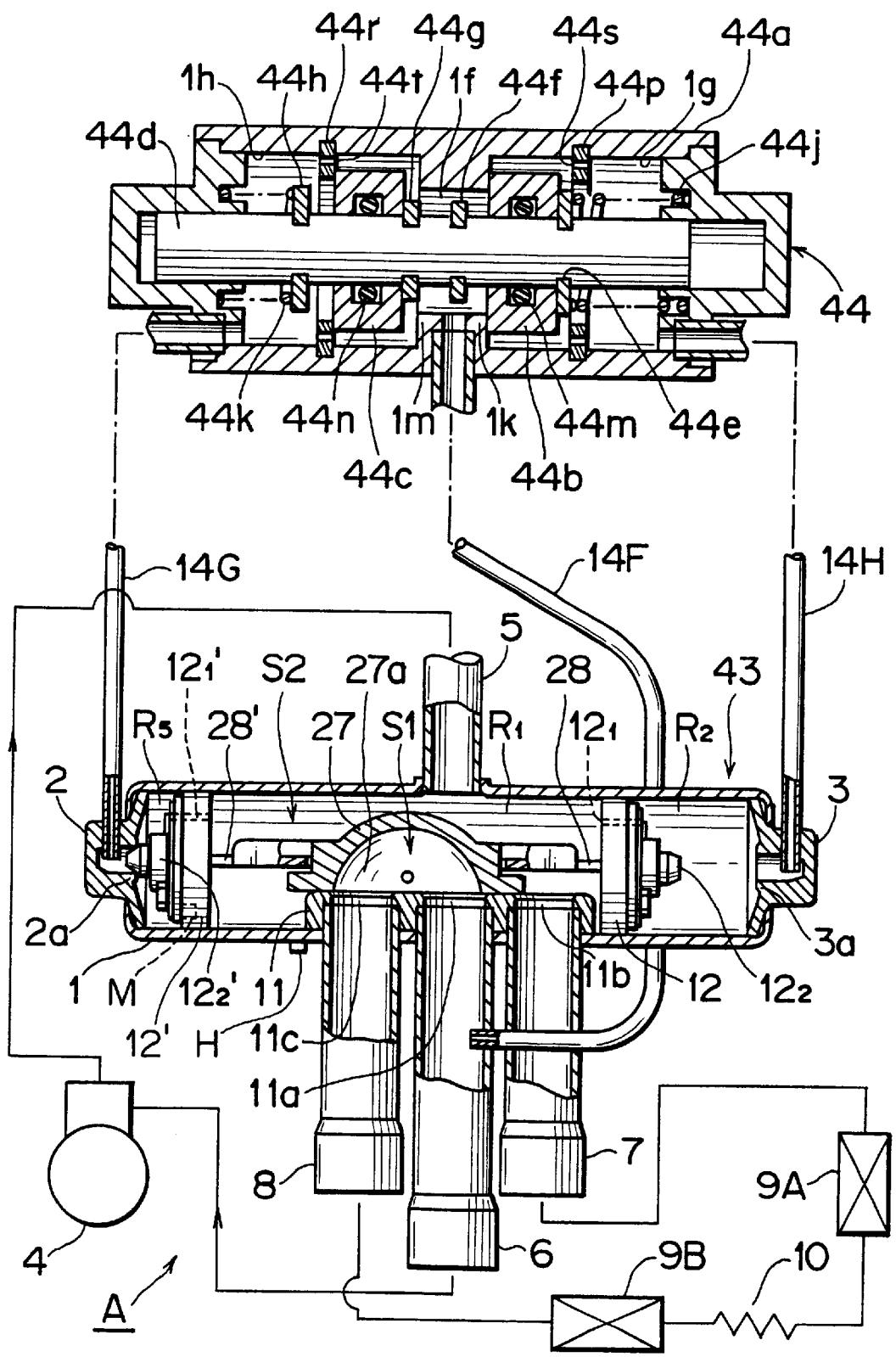
FIG. 33 is a view illustrating a schematic constitution of a refrigerating cycle employing a channel selector valve according to a thirteenth embodiment of the present invention.

FIG. 33 is a view illustrating a schematic constitution of a refrigerating cycle A employing the channel selector valve according to the thirteenth embodiment of the present invention, in which the same abbreviation numerals with those used for the corresponding identical members or parts of the channel selector valve according to the third embodiment shown in FIG. 6 are used.

The channel selector valve according to the thirteenth embodiment, an operational state of which in the heating mode is shown by a sectional view in FIG. 33, comprises a slide-type four-way selector valve 43 and a three-way selector valve (corresponding to the pilot valve) 44 that functions as a pilot valve for the slide-type four-way selector valve 43.

The slide-type four-way selector valve 43 is different from the channel selector valve according to the third embodiment shown in FIG. 6 in points that a second piston cylinder 12' forming a second pressure-transducing chamber (corresponding to the third pressure chamber) $R_5$, which faces a pressure-transducing chamber $R_2$ with putting a high pressure chamber $R_1$ therebetween, is provided between a valve seat 11 and a stopper 2 in a reversing valve housing 1, that a second connecting shaft 28' connects a slide valve 27 to the second piston cylinder 12', and that the compression spring 13, which energizes a piston cylinder 12 to move from the second position toward the first position, is omitted.

In the slide-type four-way selector valve 43, there are provided a through hole (corresponding to the first equalizing path) $12_1$' in the piston cylinder 12 and a second through hole (corresponding to the second equalizing path) $12_1$' in the second piston cylinder 12'. The high-pressure chamber $R_1$ always communicates with the second pressure-transducing chamber $R_5$ through the second through hole $12_1$'.

One end of a channel 14F is connected to an inlet pipe 6 that is connected to an inlet of the compressor 4, then a valve seat 2a is formed on the stopper 2 to which one end of a channel 14G is connected from the outside, while a valve seat 3a is formed on a stopper 3 to which one end of a channel 14H is connected from the outside.

In the piston cylinder 12, there is provided a subvalve (corresponding to the first subvalve) $12_2$, which is apart from the valve seat 3a of the stopper 3 when the piston cylinder 12 is at the first position as shown in FIG. 33 and communicates the channel 14H to the pressure-transducing chamber $R_2$, while in the second piston cylinder 12' there is provided a second subvalve $12_2$', which sits on the valve seat 2a of the stopper 2 when the piston cylinder 12 is at the first position as shown in FIG. 33 and makes the channel 14G insulated from the second pressure-transducing chamber $R_5$.

To the contrary, when the piston cylinder 12 is at the second position, that is, the inlet pipe 6 communicates with the pipe 7 through a closed space S1 while the outlet pipe 5 communicates with the pipe 8 through a high pressure space S2, the subvalve $12_2$ sits on the valve seat 3a of the stopper 3 so as to make the channel 14H insulated from the pressure-transducing chamber $R_2$ while the second subvalve $12_2$' is apart from the valve seat 2a of the stopper 2 so as to communicate the channel 14G to the second pressure-transducing chamber $R_5$.

In the slide-type four-way selector valve 43, the piston cylinder 12 and the second piston cylinder 12' constitute the movable member described in the claims.

The three-way selector valve 44 is provided outside of the slide-type four-way selector valve 43 and comprises a housing (corresponding to the second housing) 44a, to which each end of the channels 14F, 14G and 14H is connected, and two pistons (corresponding to the selector valve element) 44b and 44c, which make the channel 14F communicate with either the channel 14G or the channel 14H by a selector operation.

The housing 44a has a cylindrical shape, in which a small diameter cylinder 1f is sandwiched by two large diameter cylinders 1g and 1h, to which each opposite end of the channels 14H and 14G are connected, respectively, while the channel 14F is connected to the small diameter cylinder 1f.

In the housing 44a, there is provided a slide shaft 44d movable in a thrust direction, on which stoppers 44e, 44f, 44g and 44h (for example, E-rings) are put in the axial direction with leaving a space therebetween.

An outer diameter of each of pistons 44b and 44c is formed larger than an inner diameter of the small diameter cylinder 1f and smaller than an inner diameter of the large diameter cylinder 1g and 1h, the pistons 44b and 44c are received in the large diameter cylinders 1g and 1h, respectively. The pistons 44b and 44c are attached to the slide shaft 44d so that the piston 44b can slide in an axial direction of the slide shaft 44d between the stoppers 44e and 44f, while the piston 44c can slide in an axial direction of the slide shaft 44d between the stoppers 44g and 44h.

A coil spring 44j, which energizes the slide shaft 44d toward the large diameter cylinder 1h side through the stopper 44e, is received in the large diameter cylinder 1g, while a coil spring 44k, which energizes the slide shaft 44d toward the large diameter cylinder 1g side through the stopper 44h, is received in the large diameter cylinder 1h. O-rings 44m and 44n for sealing are provided between the slide shaft 44d and the pistons 44b and 44c, respectively.

In the large diameter cylinder 1g, there is provided a ring-shaped stopper 44p, an inner diameter of which is larger than an outer diameter of the stopper 44e and smaller than an outer diameter of the piston 44b, while in the large diameter cylinder 1h, there is provided a ring-shaped stopper 44r, an inner diameter of which is larger than an outer diameter of the stopper 44h and smaller than an outer diameter of the piston 44c.

As shown in FIG. 33, in the stopper 44r there is provided a through hole 44t that allows the both sides of the stopper 44r to communicate with each other when the piston 44c abuts on the stopper 44r, likewise a the stopper 44p is provided with a through hole 44s.

In the three-way selector valve 44 thus constructed, when a force stronger than an elastic force of the coil spring 44k is applied to the slide shaft 44d from the large diameter cylinder 1g side, the slide shaft 44d slides toward the large diameter cylinder 1h side.

Then, the piston 44c is pushed by the stopper 44g to open a valve port 1m formed by a level difference between the small diameter cylinder 1f and the large diameter cylinder 1h and moves to the second position where the piston 44c abuts on the stopper 44r, while the piston 44b is pushed by the stopper 44e to close a valve port 1k formed by a level difference between the small diameter cylinder 1f and the large diameter cylinder 1g and moves to the second position where the piston 44b is apart from the stopper 44p, thereby the channel 14F communicates with the channel 14G through the small diameter cylinder 1f, the large diameter cylinder 1h and the through hole 44t of the stopper 44r.

When the piston 44b is situated at the second position, the coil spring 44k is pressed by the stopper 44h to be compressed, then the coil spring 44k is in a state to store an energizing force to slide the stopper 44h toward the large diameter cylinder 1g side.

As to the three-way selector valve 44, in a state shown in FIG. 33, if a force applied to the slide shaft 44d from the large diameter cylinder 1g side is removed, the slide shaft 44d is pushed by the elastic force of the coil spring 44k through the stopper 44h to move toward the large diameter cylinder 1g side, thereby the piston 44c together with the slide shaft 44d closes the valve port 1m by a sliding resistance between the O-ring 44n and the slide shaft 44d and moves to the first position where the piston 44c is apart from the stopper 44r.

While, by a sliding resistance between the O-ring 44m and the slide shaft 44d that moves toward the large diameter cylinder 1g side, the piston 44b together with the slide shaft 44d opens the valve port 1k and moves to the first position where the piston 44b abuts on the stopper 44p, thereby the channel 14F communicates with the channel 14H through the small diameter cylinder 1f, the large diameter cylinder 1g and the through hole 44s of the stopper 44p.

However, in a state that the slide shaft 44d only has slided toward the large diameter cylinder 1g side by the elastic force of the coil spring 44k, the pistons 44b and 44c do not move relatively with respect to the slide shaft 44d, therefore the piston 44b abuts on the stopper 44e to be apart from the stopper 44f while the piston 44c abuts on the stopper 44g to be apart from the stopper 44h.

In this state, if a force stronger than the elastic force of the coil spring 44j is applied to the slide shaft 44d from the large diameter cylinder 1h side, the slide shaft 44d further moves toward the large diameter cylinder 1g side, thereby the coil spring 44j is pressed by the stopper 44e to be compressed and is in a state to store the energizing force to move the stopper 44e toward the large diameter cylinder 1h side.

At this time, since the piston 44c, situated at the first position where the piston 44c closes the valve port 1m, is controlled to move further toward the large diameter cylinder 1g side, the stopper 44g that has abutted on the piston 44c is away from the piston 44c, while the stopper 44h that has been away from the piston 44c abuts on the piston 44c.

Then, in this state, if a force applied to the slide shaft 44d from the large diameter cylinder 1h side is removed, the slide shaft 44d is pushed by the elastic force of the coil spring 44j through the stopper 44e to move toward the large diameter cylinder 1h side, thereby the piston 44b together with the slide shaft 44d closes the valve port 1k by a sliding resistance between the O-ring 44m and the slide shaft 44d and moves to the second position where the piston 44b is apart from the stopper 44p.

While, by a sliding resistance between the O-ring 44n and the slide shaft 44d that moves toward the large diameter cylinder 1h side, the piston 44c together with the slide shaft 44d opens the valve port 1m and moves to the second position where the piston 44c abuts on the stopper 44r, thereby the channel 14F communicates with the channel 14G through the small diameter cylinder 1f, the large diameter cylinder 1h and the through hole 44t of the stopper 44r.

However, in a state that the slide shaft 44d only has slided toward the large diameter cylinder 1h side by the elastic force of the coil spring 44j, the pistons 44b and 44c do not move relatively with respect to the slide shaft 44d, therefore the piston 44b abuts on the stopper 44f to be apart from the stopper 44e while the piston 44c abuts on the stopper 44h to be apart from the stopper 44g.

In this state, if a force stronger than the elastic force of the coil spring 44k is applied to the slide shaft 44d from the large diameter cylinder 1g side, the slide shaft 44d further moves toward the large diameter cylinder 1h side, thereby the coil spring 44k is pressed by the stopper 44h to be compressed and is in a state to store the energizing force to move the stopper 44h toward the large diameter cylinder 1g side.

At this time, since the piston 44b, situated at the second position where the piston 44b closes the valve port 1k, is controlled to move further toward the large diameter cylinder 1h side, the stopper 44f that has abutted on the piston 44b is away from the piston 44b, while the stopper 44e that has been away from the piston 44b abuts on the piston 44b, thereby coming back to the state shown in FIG. 33.

As to the slide-type four-way selector valve 43, a permanent magnet M is disposed at an inner bottom of the second piston cylinder 12', then a hall device H is disposed at an outer circumferential bottom of the reversing valve housing 1 near the pipe 8. When the piston cylinder 12 and the piston cylinder 12' (the movable member) are at the first position, a magnetic field due to the permanent magnet M is not detected by the hall device H, on the other hand, when the piston cylinder 12 and the piston cylinder 12' are at the second position, a magnetic field due to the permanent magnet M is detected by the hall device H. A signal detected by the hall device H is inputted into a detecting element C3 of a controller C (described later) in FIG. 62, by which it is detected whether the piston cylinder 12 and the second piston cylinder 12' are situated at the first position or the second position.

In the following, an operation of the channel selector valve according to the thirteenth embodiment constructed as described above will be explained.

When the operation of the compressor 4 is halted, the piston cylinder 12 and the second piston cylinder 12' of the slide-type four-way selector valve 43 keep their positions during an ex-operation of the compressor 4, while the pistons 44b and 44c have moved to the second position if they were at the first position during an ex-operation of the compressor 4, on the other hand the pistons 44b and 44c have moved to the first position if they were at the second position during an ex-operation of the compressor 4.

As shown in FIG. 33, in a state that the refrigerating cycle A is in the heating mode, if the operation of the compressor 4 is halted, the piston cylinder 12 of the slide-type four-way selector valve 43 does not move and stays at the first position shown in FIG. 33, while the pistons 44b and 44c of the three-way selector valve 44 move from the second position shown in FIG. 33 to the first position since the force applied to the slide shaft 44d from the large diameter cylinder 1g is removed.

Therefore, the small diameter cylinder 1f of the three-way selector valve 44, which communicates with the inlet pipe 6 through the channel 14F, communicates with the large diameter cylinder 1g through the valve port 1k, which is opened by the piston 44b situated at the first position, while the large diameter cylinder 1g communicates with the pressure-transducing chamber $R_2$ of the slide-type four-way selector valve 43 through the valve seat 3a that is opened by the subvalve $12_2$ and the channel 14H, thereby the inlet pipe 6 communicates with the pressure-transducing chamber $R_2$ through the three-way selector valve 44.

In this state, if the compressor 4 starts to operate, the high pressure refrigerant discharged from the compressor 4 flows into the high pressure space S2 of the slide-type four-way selector valve 43 by way of the outlet pipe 5, then further flows into the indoor heat exchanger 9A through the pipe 7 and then, this refrigerant flows into the closed space S1 through the throttle 10, the outdoor heat exchanger 9B and the pipe 8, then flows back to the inlet of the compressor 4 by way of the inlet pipe 6, thereby the refrigerating cycle A is in the heating mode.

At this time, since an amount of the refrigerant that can pass through the through hole $12_1$ of the piston cylinder 12 is small, an increment in the pressure of the refrigerant in the pressure-transducing chamber $R_2$ of the slide-type four-way selector valve 43 upon starting of the operation of the compressor 4 is small, therefore a difference in the pressure between the refrigerant in the pressure-transducing chamber $R_2$ communicating with the inlet pipe 6 through the three-way selector valve 44 and the refrigerant in the high pressure space S2 becomes large.

Therefore, the piston cylinder 12 and the second piston cylinder 12' of the slide-type four-way selector valve 43 move from the first position shown in FIG. 33 to the second position, the high pressure refrigerant that is discharged from the compressor 4 and flowed into the high pressure space S2 by way of the outlet pipe 5 flows into the outdoor heat exchanger 9B through the pipe 8 and then, this refrigerant flows back to the inlet of the compressor 4 by way of the throttle 10, the indoor heat exchanger 9A, the pipe 7, closed space S1 and the inlet pipe 6, thereby the refrigerating cycle A is in the cooling mode.

At this time, in the slide-type four-way selector valve 43, accompanying with that the piston cylinder 12 and the second piston cylinder 12' move to the second position, the subvalve $12_2$ closes the valve seat 3a that has been opened while the second subvalve $12_2$' opens the valve seat 2a that has been closed, therefore by the high pressure refrigerant flowed from the high pressure space S2 through the through hole $12_1$' of the second piston cylinder 12', the refrigerant pressure in the second pressure-transducing chamber $R_5$ gradually increases.

Then, in the three-way selector valve 44, since the pressure of the refrigerant in the large diameter cylinder 1h that communicates with the second pressure-transducing chamber $R_5$ through the valve seat 2a opened by the second subvalve $12_2$' and the channel 14G is higher than that in the small diameter cylinder 1f that communicates with the inlet pipe 6 through the channel 14F, due to a difference between the pressure of the refrigerant in the large diameter cylinder 1g and that in the large diameter cylinder 1h, a force stronger than the elastic force of the coil spring 44j is applied to the slide shaft 44d from the large diameter cylinder 1h side.

Accordingly, the slide shaft 44d moves toward the large diameter cylinder 1g side, then the coil spring 44j is compressed and stores the energizing force to energize the piston 44c toward the large diameter cylinder 1h side.

Thereafter, when the operation of the compressor 4 is halted, in the three-way selector valve 44, due to the energizing force stored in the coil spring 44j, the pistons 44b and 44c together with the slide shaft 44d move toward the large diameter cylinder 1h side to be situated at the second position, while in the slide-type four-way selector valve 43, the piston cylinder 12 and the second piston cylinder 12' are kept staying at their second position.

Then, the small diameter cylinder 1f of the three-way selector valve 44 communicating with the inlet pipe 6 through the channel 14F communicates with the large diameter cylinder 1h through the valve port 1m that is opened by the piston 44b situated at the second position. The large diameter cylinder 1h communicates with the second pressure-transducing chamber $R_5$ of the slide-type four-way selector valve 43 through the valve seat 2a opened by the second subvalve $12_2$' and the channel 14G, thereby the inlet pipe 6 communicates with the second pressure-transducing chamber $R_5$ through the three-way selector valve 44.

In this state, if the compressor 4 starts to operate, the high pressure refrigerant discharged from the compressor 4 flows into the high pressure space S2 of the slide-type four-way selector valve 43 by way of the outlet pipe 5, then further flows into the outdoor heat exchanger 9B through the pipe 8 and then, this refrigerant flows into the closed space S1 through the throttle 10, the indoor heat exchanger 9A and the pipe 7, then flows back to the inlet of the compressor 4 by way of the inlet pipe 6, thereby the refrigerating cycle A is in the cooling mode.

At this time, since an amount of the refrigerant that can pass through the through hole $12_1$' of the second piston cylinder 12' is small, an increment in the pressure of the refrigerant in the second pressure-transducing chamber $R_5$ of the slide-type four-way selector valve 43 upon starting of the operation of the compressor 4 is small, therefore a difference in the pressure between the refrigerant in the second pressure-transducing chamber $R_5$ communicating with the inlet pipe 6 through the three-way selector valve 44 and the refrigerant in the high pressure space S2 becomes large.

Therefore, the piston cylinder 12 and the second piston cylinder 12' of the slide-type four-way selector valve 43 move from the second position to the first position shown in FIG. 33, the high pressure refrigerant that is discharged from the compressor 4 and flowed into the high pressure space S2 by way of the outlet pipe 5 flows into the indoor heat exchanger 9A through the pipe 7 and then, this refrigerant flows back to the inlet of the compressor 4 by way of the throttle 10, the outdoor heat exchanger 9B, the pipe 8, closed space S1 and the inlet pipe 6, thereby the refrigerating cycle A is in the heating mode.

At this time, in the slide-type four-way selector valve 43, accompanying with that the piston cylinder 12 and the second piston cylinder 12' move to the first position, the subvalve $12_2$ opens the valve seat 3a that has been closed while the second subvalve $12_2$' closes the valve seat 2a that has been opened, therefore by the high pressure refrigerant flowed from the high pressure space S2 through the through hole $12_1$ of the piston cylinder 12, the refrigerant pressure in the pressure-transducing chamber $R_2$ gradually increases.

Then, in the three-way selector valve 44, since the pressure of the refrigerant in the large diameter cylinder 1g that communicates with the pressure-transducing chamber $R_2$ through the valve seat 3a opened by the second subvalve $12_2$ and the channel 14H is higher than that in the small diameter cylinder 1f that communicates with the inlet pipe 6 through the channel 14F, due to a difference between the pressure of the refrigerant in the large diameter cylinder 1g and that in the large diameter cylinder 1h, a force stronger than the elastic force of the coil spring 44k is applied to the slide shaft 44d from the large diameter cylinder 1g side.

Accordingly, the slide shaft 44d moves toward the large diameter cylinder 1h side, then the coil spring 44k is compressed and stores the energizing force to energize the piston 44b toward the large diameter cylinder 1g side.

Thereafter, when the operation of the compressor 4 is halted, in the three-way selector valve 44, due to the energizing force stored in the coil spring 44k, the pistons 44b and 44c together with the slide shaft 44d move toward the large diameter cylinder 1g side to be situated at the first position, while in the slide-type four-way selector valve 43, the piston cylinder 12 and the second piston cylinder 12' are kept staying at the first position.

Thus, according to the thirteenth embodiment, the slide-type four-way selector valve 43, which makes the piston cylinder 12 and the second piston cylinder 12' select to be either the first position or the second position by using a difference between the pressure of the refrigerant in the high pressure space S2 and that in either the pressure-transducing chamber $R_2$ or the second pressure-transducing chamber $R_5$, performs its selector operation by using the three-way selector valve 44, which makes the inlet pipe 6 communicate with either the pressure-transducing chamber $R_2$ or the second pressure-transducing chamber $R_5$ by using the energizing force stored during the operation of the compressor 4.

Therefore, the heating mode, in which the refrigerant discharged from the outlet pipe 5 is supplied to the indoor heat exchanger 9A by way of the pipe 7, and the cooling mode, in which the refrigerant discharged from the outlet pipe 5 is supplied to the outdoor heat exchanger 9B by way of the pipe 8, can be selected by controlling the number of times of the operation start of the compressor 4 and the selected state can be maintained without using any exclusive power source such as an electromagnetic solenoid.

Moreover, according to the thirteenth embodiment, since the selection of communication for the outlet pipe 5 and the inlet pipe 6 of the slide-type four-way selector valve 43 is performed according to a start and halt of the operation of the compressor 4, neither power source for an electric drive nor control by an electric signal for selecting the channel of the refrigerant is needed, therefore, the channel selector valve according to the thirteenth embodiment is advantageous.

In the thirteenth embodiment described above, the present invention is applied to the slide-type four-way selector valve 43, in which the through holes $12_1$ and $12_1$' are provided in the piston cylinder 12 and the second piston cylinder 12', respectively. Instead, the present invention can also be applied to a slide-type four-way selector valve, in which no through hole is provided in the piston cylinder.

In the following, such a channel selector valve mentioned right above according to a fourteenth embodiment of the present invention will be explained with reference to FIG. 34.

Figure 34:
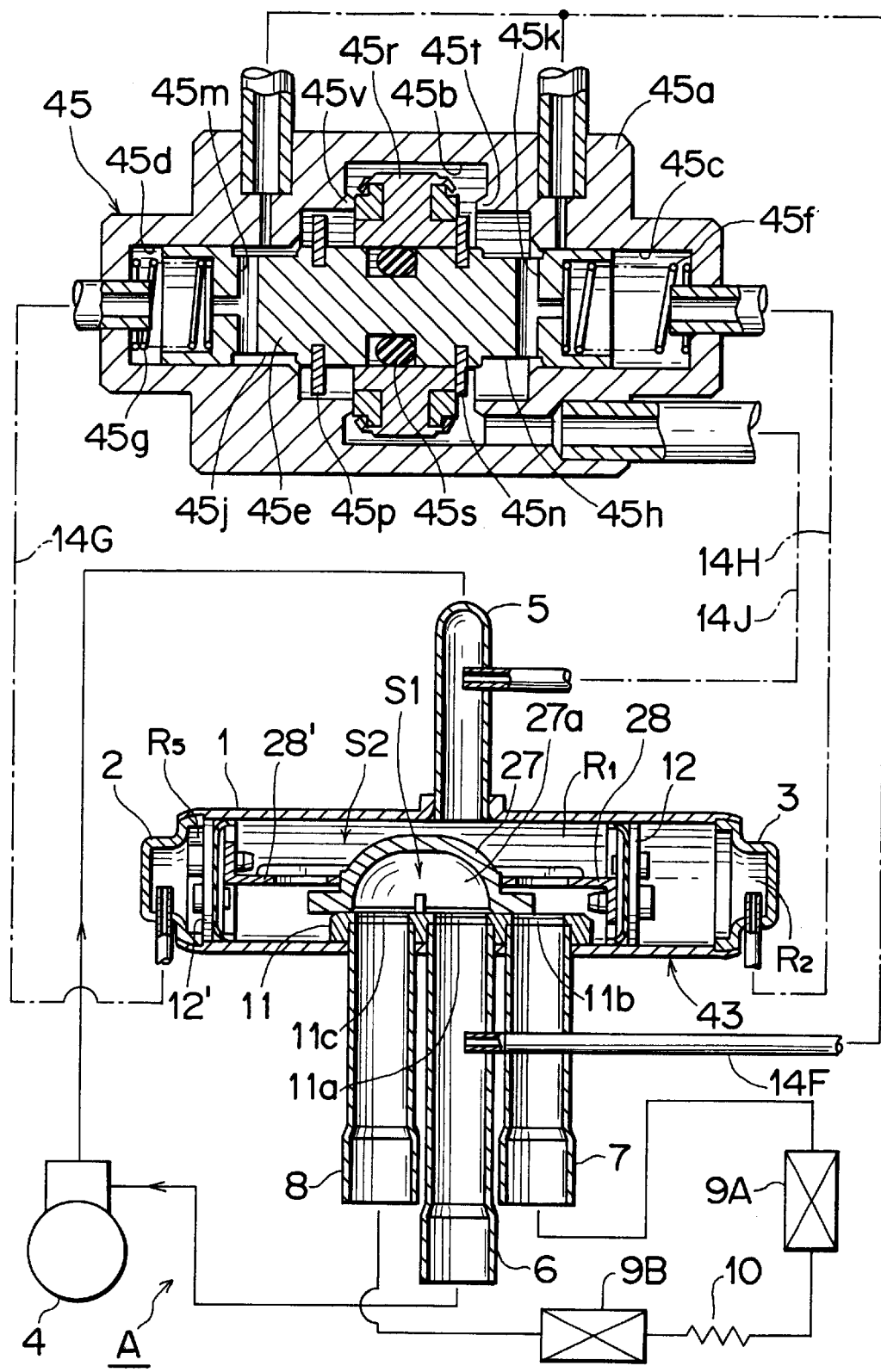
FIG. 34 is a view illustrating a schematic constitution of a refrigerating cycle employing a channel selector valve according to a fourteenth embodiment of the present invention.

FIG. 34 is a view illustrating a schematic constitution of a refrigerating cycle A employing the channel selector valve according to the fourteenth embodiment of the present invention, in which the same abbreviation numerals with those used for the corresponding identical members or parts of the channel selector valve according to the thirteenth embodiment shown in FIG. 33 are used.

The channel selector valve according to the fourteenth embodiment, an operational state in the cooling mode of which is shown in FIG. 34 by its sectional view, is different from the channel selector valve according to the thirteenth embodiment shown in FIG. 33 in points that the through holes $12_1$ and $12_1$' in the piston cylinder 12 and the second piston cylinder 12', respectively, are omitted in the slide-type four-way selector valve 43 and that the subvalves $12_2$ and $12_2$' are also omitted in the slide-type four-way selector valve 43.

Moreover, the channel selector valve according to the fourteenth embodiment is different from the channel selector valve according to the thirteenth embodiment shown in FIG. 33 in points that a three-way selector valve (corresponding to the pilot valve) 45, which functions as a pilot valve of the slide-type four-way selector valve 43, is provided instead of the three-way selector valve 44.

The three-way selector valve 45 comprises a housing (corresponding to the second housing) 45a, to which each one end of channels 14F, 14G and 14H is connected, and a piston (corresponding to the selector valve element) 45r, which makes the channel 14F communicate with either the channel 14G or the channel 14H.

The housing 45a has a cylindrical shape, in which a large diameter cylinder 45b is sandwiched by two small diameter cylinders 45c and 45d, and a slide shaft 45e is received in the housing 45a so as to be movable in a thrust direction.

In the small diameter cylinder 45c, there is received a coil spring (corresponding to fourth storing means for storing energizing force) 45f, which energizes the slide shaft 45e toward the small diameter cylinder 45d side, while in the small diameter cylinder 45d, there is received a coil spring (corresponding to third storing means for storing energizing force) 45g, which energizes the slide shaft 45e toward the small diameter cylinder 45c side.

On a circumferential surface of the slide shaft 45e, there are formed circular grooves 45h and 45j leaving a space therebetween in an axial direction, then one end surface of the slide shaft 45e communicates with the circular groove 45h near said one end surface through a channel 45k formed in the slide shaft 45e, while an opposite end surface of the slide shaft 45e communicates with the circular groove 45j near said opposite end surface through a channel 45m formed in the slide shaft 45e.

In addition, between the circular grooves 45h and 45j of the slide shaft 45e, stoppers 45n and 45p, such as E-rings, are put on the slide shaft 45e leaving a space therebetween in an axial direction.

An outer diameter of the piston 45r is formed larger than an inner diameter of the small diameter cylinders 45c and 45d and smaller than an inner diameter of the large diameter cylinder 45b. The piston 45r is received in the large diameter cylinder 45b and attached to the slide shaft 45e so that the piston 45r can slide in an axial direction of the slide shaft 45e between the stoppers 45n and 45p.

Between the piston 45r and the slide shaft 45e, there is provided an O-ring 45s for sealing.

Each opposite end of the channels 14G and 14H is connected to the respective small diameter cylinders 45c and 45d of the housing 45a so that each opening of the channels 14G and 14H faces the respective end surfaces of the slide shaft 45e, in addition, each opposite end of the channel 14F that is branched off into two ways is connected to the respective small diameter cylinders 45c and 45d of the housing 45a so that each opening of the branched channels faces the circumferential surface of the slide shaft 45e, while an outlet pipe 5 of the slide-type four-way selector valve 43 is connected to the large diameter cylinder 45b through the channel 14J.

In the three-way selector valve 45 thus constructed, as shown in FIG. 34, when a force stronger than an elastic force by a coil spring 45g is applied to an end surface of the slide shaft 45e at the small diameter cylinder 45c side, the slide shaft 45e moves toward the small diameter cylinder 45d side.

Then, the piston 45r is pushed by the stopper 45n to close a valve port 45v formed by a level difference between the small diameter cylinder 45d and the large diameter cylinder 45b and moves to the second position where the piston 45r opens a valve port 45t formed by a level difference between the small diameter cylinder 45c and the large diameter cylinder 45b, thereby the channel 14J communicates with the channel 14H through the large diameter cylinder 45b, the valve port 45t and the small diameter cylinder 45c.

When the piston 45r is at the second position, the opening of the channel 14F connected to the small diameter cylinder 45c is closed by the circumferential surface of the slide shaft 45e, thereby the channel 14F connected to the small diameter cylinder 45c is insulated from the channel 14H, while the opening of the channel 14F connected to the small diameter cylinder 45d faces the circular groove 45j of the slide shaft 45e, thereby the channel 14F connected to the small diameter cylinder 45d communicates with the channel 14G through the circular groove 45j and the channel 45m.

When the piston 45r is at the second position, the coil spring 45g is pushed by the end surface of the slide shaft 45e at the small diameter cylinder 45d side to be compressed and is in a state to store an energizing force to move the slide shaft 45e toward the small diameter cylinder 45c side.

In a state of the three-way selector valve 45 shown in FIG. 34, when the force applied to the end surface of the slide shaft 45e at the small diameter cylinder 45c side is removed, the slide shaft 45e is pressed by the elastic force of the coil spring 45g and moves toward the small diameter cylinder 45c side.

Then, by a sliding resistance between the O-ring 45s and the slide shaft 45e, the piston 45r together with the slide shaft 45e moves to the first position where the piston 45r opens the valve port 45v and closes the valve port 45t, thereby the channel 14J communicates with the channel 14G through the large diameter cylinder 45b, the valve port 45v and the small diameter cylinder 45d.

When the piston 45r is at the first position, the opening of the channel 14F connected to the small diameter cylinder 45c faces the circular groove 45h of the slide shaft 45e, thereby the channel 14F connected to the small diameter cylinder 45c communicates with the channel 14H through the circular groove 45h and the channel 45k, while the opening of the channel 14F connected to the small diameter cylinder 45d is closed by the circumferential surface of the slide shaft 45e, thereby the channel 14F connected to the small diameter cylinder 45d is insulated from the channel 14G.

However, in a state that the slide shaft 45e only has slided toward the small diameter cylinder 45c side by the elastic force of the coil spring 45g, the piston 45r does not move relatively with respect to the slide shaft 45e, therefore the piston 45r abuts on the stopper 45n to be apart from the stopper 45p while the coil spring 45f in the small diameter cylinder 45c is extended.

Then, in this state, if a force stronger than the elastic force by the coil spring 45f is applied to the end surface of the slide shaft 45e at the small diameter cylinder 45d side, only the slide shaft 45e further moves toward the small diameter cylinder 45c side until the stopper 45p abuts on the piston 45r, thereby the stopper 45n is away from the piston 45r toward the small diameter cylinder 45c side.

Then, the coil spring 45f is pushed by the end surface of the slide shaft 45e at the small diameter cylinder 45c side to be compressed and is in a state to store an energizing force to move the slide shaft 45e toward the small diameter cylinder 45d side.

In this state, if the force that has been applied to the end surface of the slide shaft 45e at the small diameter cylinder 45d side is removed, the slide shaft 45e moves toward the small diameter cylinder 45d side by the elastic force of the coil spring 45f.

Then, by a sliding resistance between the O-ring 45s and the slide shaft 45e, the piston 45r together with the slide shaft 45e moves to the second position where the piston 45r closes the valve port 45v and opens the valve port 45t, thereby the channel 14J communicates with the channel 14H through the large diameter cylinder 45b, the valve port 45t and the small diameter cylinder 45c.

When the piston 45r is at the second position, the opening of the channel 14F connected to the small diameter cylinder 45c is closed by the circumferential surface of the slide shaft 45e, thereby the channel 14F connected to the small diameter cylinder 45c is insulated from the channel 14H, while the opening of the channel 14F connected to the small diameter cylinder 45d faces the circular groove 45j of the slide shaft 45e, thereby the channel 14F connected to the small diameter cylinder 45d communicates with the channel 14G through the circular groove 45j and the channel 45m.

However, in a state that the slide shaft 45e only has slided toward the small diameter cylinder 45d side by the elastic force of the coil spring 45f, the piston 45r does not move relatively with respect to the slide shaft 45e, therefore the piston 45r abuts on the stopper 45p to be apart from the stopper 45n while the coil spring 45g in the small diameter cylinder 45d is extended.

Then, in this state, if a force stronger than the elastic force by the coil spring 45g is applied to the end surface of the slide shaft 45e at the small diameter cylinder 45c side, only the slide shaft 45e further moves toward the small diameter cylinder 45d side until the stopper 45n abuts on the piston 45r, thereby the stopper 45p is away from the piston 45r toward the small diameter cylinder 45d side.

Then, the coil spring 45g is pushed by the end surface of the slide shaft 45e at the small diameter cylinder 45d side to be compressed and comes back to the state to store an energizing force to move the slide shaft 45e toward the small diameter cylinder 45c side as shown in FIG. 34.

In the following, an operation of the channel selector valve according to the fourteenth embodiment constructed as described above will be explained.

When the operation of the compressor 4 is halted, the piston cylinder 12 and the second piston cylinder 12' of the slide-type four-way selector valve 43 keep their positions during an ex-operation of the compressor 4, while the piston 45r of the three-way selector valve 45 has moved to the second position if it was at the first position during an ex-operation of the compressor 4, on the other hand the piston 45r has moved to the first position if it was at the second position during an ex-operation of the compressor 4.

As shown in FIG. 34, in a state that the refrigerating cycle A is in the heating mode, if the operation of the compressor 4 is halted, the piston cylinders 12 and the second piston cylinder 12' of the slide-type four-way selector valve 43 do not move and stays at the first position shown in FIG. 34, while the piston 45r of the three-way selector valve 45 move from the second position shown in FIG. 34 to the first position since the force applied to the end surface of the slide shaft 45e at the small diameter cylinder 45c side is removed.

Therefore, the small diameter cylinder 45d of the three-way selector valve 45, which communicates with the second pressure-transducing chamber $R_5$ of the slide-type four-way selector valve 43 through the channel 14G, communicates with the large diameter cylinder 45b through the valve port 45v that is opened by the piston 45r situated at the first position, then the large diameter cylinder 45b communicates with the outlet pipe 5 through the channel 14J, thereby the outlet pipe 5 communicates with the second pressure-transducing chamber $R_5$ through the three-way selector valve 45.

Then, the small diameter cylinder 45c of the three-way selector valve 45, which communicates with the pressure-transducing chamber $R_2$ of the slide-type four-way selector valve 43 through the channel 14H, communicates with the inlet pipe 6 through the channel 45k, the circular groove 45h and the channel 14F, thereby the inlet pipe 6 communicates with the pressure-transducing chamber $R_2$ through the three-way selector valve 45.

In this state, when the compressor 4 starts to operate, a high pressure refrigerant discharged from the compressor 4 flows into the large diameter cylinder 45b of the three-way selector valve 45 through the outlet pipe 5 and the channel 14J, thereby a difference between the pressure of the refrigerant in the small diameter cylinder 45c that communicates with the channel 14F through the channel 45k and the circular groove 45h and the pressure of high pressure refrigerant in the large diameter cylinder 45b becomes large.

Thereby, the coil spring 45f is pushed by the end surface of the slide shaft 45e at the small diameter cylinder 45c side to be compressed, then the coil spring 45f stores an energizing force to slide the slide shaft 45e toward the small diameter cylinder 45d side.

Moreover, since the outlet pipe 5 communicates with the second pressure-transducing chamber $R_5$ through the three-way selector valve 45, the pressure of the refrigerant in the second pressure-transducing chamber $R_5$ increases so as to become equal to that in the high pressure space S2, while, since the inlet pipe 6 communicates with the pressure-transducing chamber $R_2$ through the three-way selector valve 45, the pressure of the refrigerant in the pressure-transducing chamber $R_2$ decreases to increase its difference from the pressure of the refrigerant in the high pressure space S2.

Therefore, the piston cylinder 12 and the second piston cylinder 12' of the slide-type four-way selector valve 43 move from the first position shown in FIG. 34 to the second position, then the high pressure refrigerant, which is discharged from the compressor 4 and flowed into the high pressure space S2 through the outlet pipe 5, flows into the outdoor heat exchanger 9B from the pipe 8, then this refrigerant further flows into the closed space S1 by way of the throttle 10, the indoor heat exchanger 9A and the pipe 7 and then, comes back to the inlet of the compressor 4 through the inlet pipe 6, thereby the refrigerating cycle A is in the cooling mode.

Thereafter, when the operation of the compressor 4 is halted, in the three-way selector valve 45, by the energizing force stored in the coil spring 45f, the piston 45r together with the slide shaft 45e moves toward the small diameter cylinder 45d side to be situated at the second position, while in the slide-type four-way selector valve 43, the piston cylinder 12 and the second piston cylinder 12' are kept staying at the second position.

Therefore, the small diameter cylinder 45c of the three-way selector valve 45, which communicates with the pressure-transducing chamber $R_2$ of the slide-type four-way selector valve 43 through the channel 14H, communicates with the large diameter cylinder 45b through the valve port 45t that is opened by the piston 45r situated at the second position, then the large diameter cylinder 45b communicates with the outlet pipe 5 through the channel 14J, thereby the outlet pipe 5 communicates with the pressure-transducing chamber $R_2$ through the three-way selector valve 45.

Then, the small diameter cylinder 45d of the three-way selector valve 45, which communicates with the second pressure-transducing chamber $R_5$ of the slide-type four-way selector valve 43 through the channel 14G, communicates with the inlet pipe 6 through the channel 45m, the circular groove 45j and the channel 14F, thereby the inlet pipe 6 communicates with the second pressure-transducing chamber $R_5$ through the three-way selector valve 45.

In this state, when the compressor 4 starts to operate, a high pressure refrigerant discharged from the compressor 4 flows into the large diameter cylinder 45b of the three-way selector valve 45 through the outlet pipe 5 and the channel 14J, thereby a difference between the pressure of the refrigerant in the small diameter cylinder 45d that communicates with the channel 14F through the channel 45m and the circular groove 45j and the pressure of high pressure refrigerant in the large diameter cylinder 45b becomes large.

Thereby, the coil spring 45g is pushed by the end surface of the slide shaft 45e at the small diameter cylinder 45d side to be compressed, then the coil spring 45g stores an energizing force to slide the slide shaft 45e toward the small diameter cylinder 45c side.

Moreover, since the outlet pipe 5 communicates with the pressure-transducing chamber $R_2$ through the three-way selector valve 45, the pressure of the refrigerant in the pressure-transducing chamber $R_2$ increases so as to become equal to that in the high pressure space S2, while, since the inlet pipe 6 communicates with the second pressure-transducing chamber $R_5$ through the three-way selector valve 45, the pressure of the refrigerant in the second pressure-transducing chamber $R_5$ decreases to increase its difference from the pressure of the refrigerant in the high pressure space S2.

Therefore, the piston cylinder 12 and the second piston cylinder 12' of the slide-type four-way selector valve 43 move from the second position to the first position shown in FIG. 34, then the high pressure refrigerant, which is discharged from the compressor 4 and flowed into the high pressure space S2 through the outlet pipe 5, flows into the indoor heat exchanger 9A from the pipe 7, then this refrigerant further flows into the closed space S1 by way of the throttle 10, the outdoor heat exchanger 9B and the pipe 8 and then, comes back to the inlet of the compressor 4 through the inlet pipe 6, thereby the refrigerating cycle A is in the heating mode.

Thereafter, when the operation of the compressor 4 is halted, in the three-way selector valve 45, by the energizing force stored in the coil spring 45g, the piston 45r together with the slide shaft 45e moves toward the small diameter cylinder 45c side to be situated at the first position, while in the slide-type four-way selector valve 43, the piston cylinder 12 and the second piston cylinder 12' are kept staying at the first position.

The channel selector valve according to the fourteenth embodiment constracted as described above gives a similar effect with that of the channel selector valve according to the thirteenth embodiment.

In the aforementioned embodiments from the first to the fourteenth embodiment, a channel selector valve constructed by employing a three-way selector valve and a slide-type four-way selector valve has been explained. In the following, an embodiment, in which the present invention is applied to a rotary channel selector valve that performs its channel selector operation by rotation of a main valve element in a valve housing will be explained.

In the following, a schematic constitution of a refrigerating cycle A employing a rotary channel selector valve will be explained with reference to FIG. 35, in which the same abbreviation numerals with those used for the corresponding identical members or parts of the channel selector valve according to the thirteenth embodiment shown in FIG. 33 are used.

Figure 35:
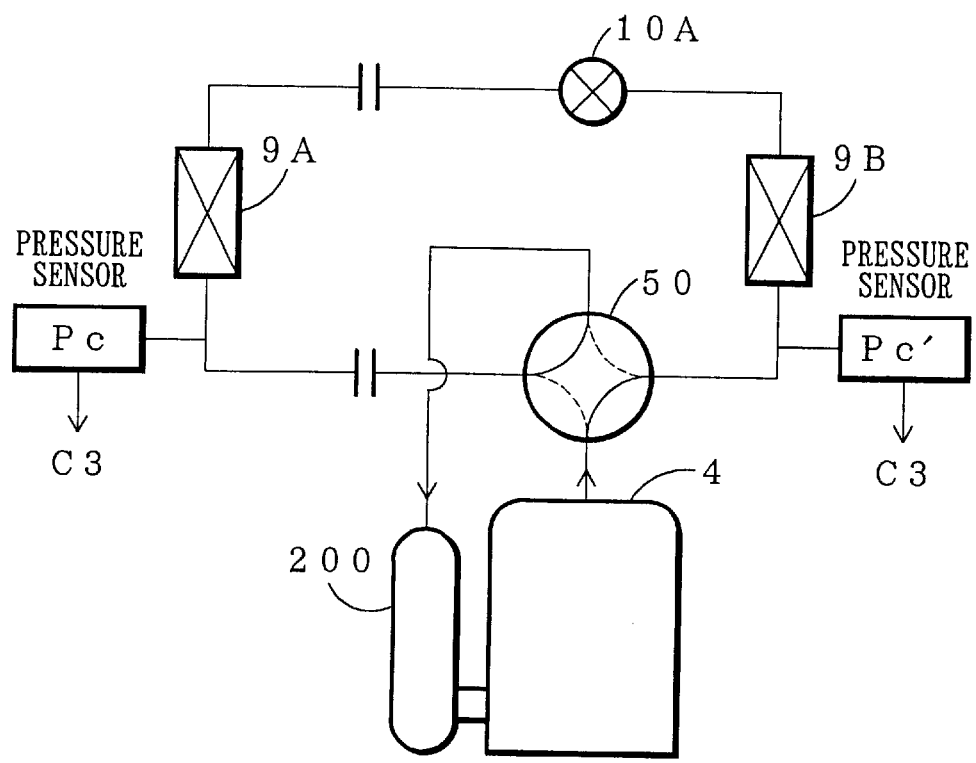
FIG. 35 is a view illustrating a schematic constitution of a refrigerating cycle employing a rotary channel selector valve, to which a channel selector valve of the present invention can be applied.

In FIG. 35, a channel of the refrigerant in the cooling mode is shown by solid lines while that in the heating mode is shown by broken lines. In this refrigerating cycle A, a place where the high pressure refrigerant discharged from the compressor 4 is guided to and a place where the refrigerant to be sucked by the compressor 4 by way of an accumulator 200 is guided from are mutually selected out of the indoor heat exchanger 9A and the outdoor heat exchanger 9B by a rotary four-way selector valve 50, and an electrically-driven expansion valve 10A is provided between the indoor heat exchanger 9A and the outdoor heat exchanger 9B. Pressure sensors Pc and Pc' are disposed at the indoor heat exchanger 9A and the outdoor heat exchanger 9B, respectively, to detect each pressure, thereby a position of the movable member can be detected. These pressure sensors may be disposed at a channel near the rotary four-way selector valve 50.

In the following, a channel selector valve according to a fifteenth embodiment of the present invention, which can be used as the rotary four-way selector valve 50 shown in FIG. 35, will be explained with reference to FIGS. 36 to 45.

Figure 36:
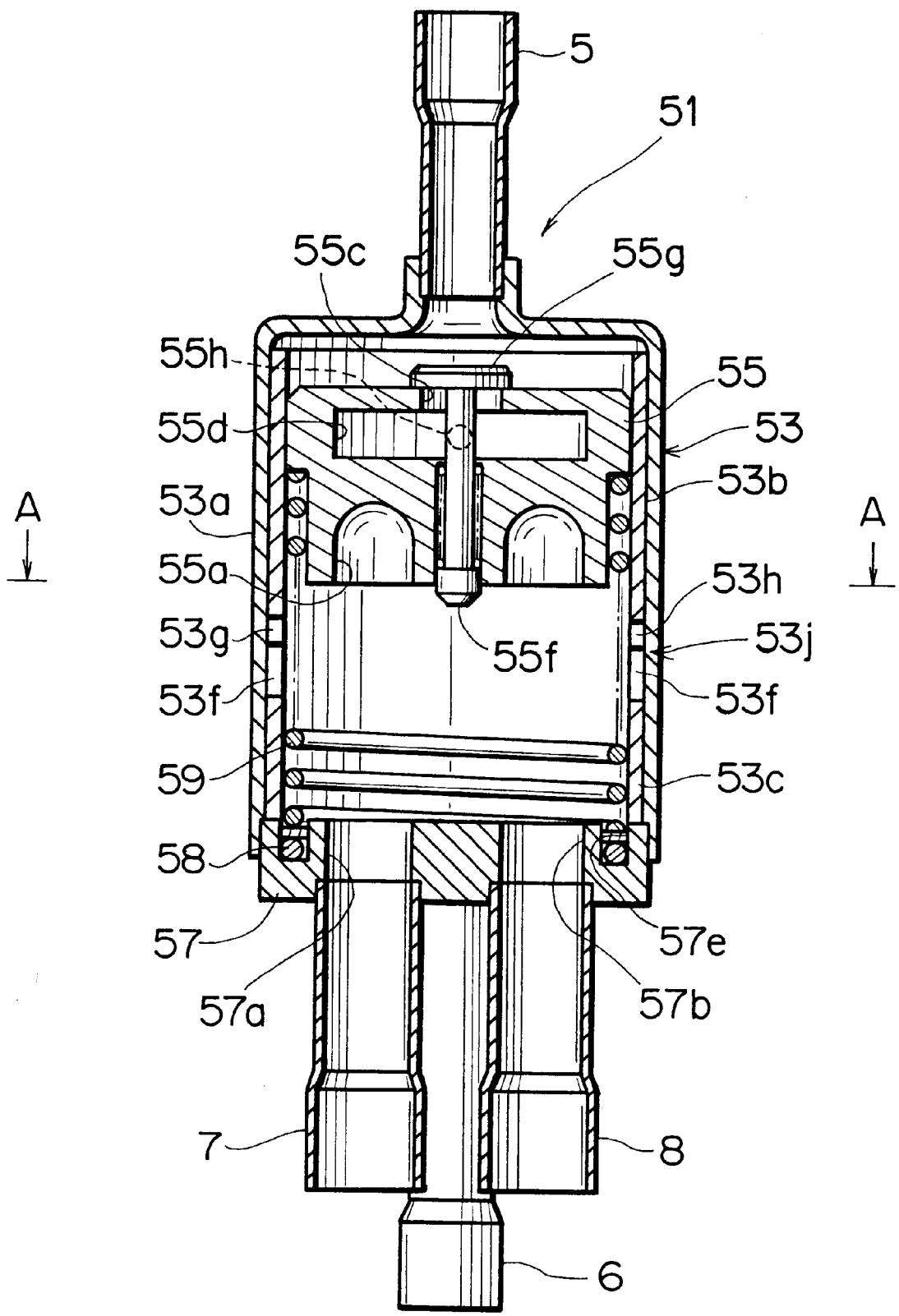
FIG. 36 is a sectional view of a channel selector valve according to a fifteenth embodiment of the present invention, which can be employed as the rotary channel selector valve of FIG. 35.

FIG. 36 is a sectional view of the channel selector valve 51 according to a fifteenth embodiment of the present invention, in which a columnar main valve element 55 is received in a cylindrical valve housing 53 rotatively and movable in a direction of a rotation axis, an open end of the valve housing 53 is closed by a valve seat 57, and a coil spring 59 that energizes the main valve element 55 to be apart from the valve seat 57 is received in the valve housing 53.

In detail, the valve housing 53 consists of an outer housing 53a and two inner housings 53b and 53c upper and lower, out of which the outer housing 53a has a cylindrical shape with one end open and an opposite end closed, the opposite end of the outer housing 53a is connected to the outlet pipe 5.

Figure 37:
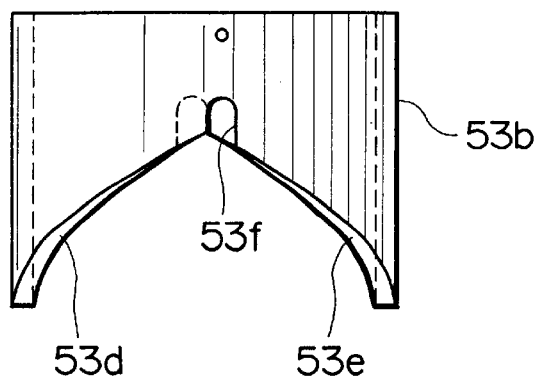
FIG. 37 is a side view of an upper inner housing of FIG. 36.

The inner housings 53b and 53c have a cyrindrical shape and an outer diameter so as to be received inside of the outer housing 53a. As shown in FIG. 37, at one end of the upper inner housing 53b, a first inclined end surface 53d and a second inclined end surface 53e are formed two for each alternately in a circumferential direction of the upper inner housing 53b such that a peak and a valley are continued with a cycle of 90°, while at one end of the second inclined end surface 53e, which constitutes the valley in combination with one end of the first inclined end surface 53d, there is formed a groove 53f extending in an axial direction of the upper inner housing 53b.

Figure 38:
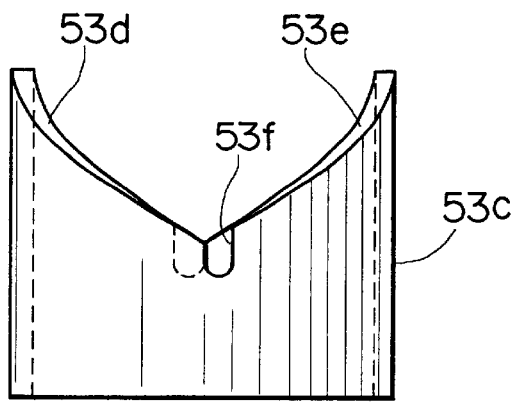
FIG. 38 is a side view of a lower inner housing of FIG. 36.

As shown in FIG. 38, the lower inner housing 53c is constituted up and down symmetrical with respect to the upper inner housing 53b.

Figure 39:
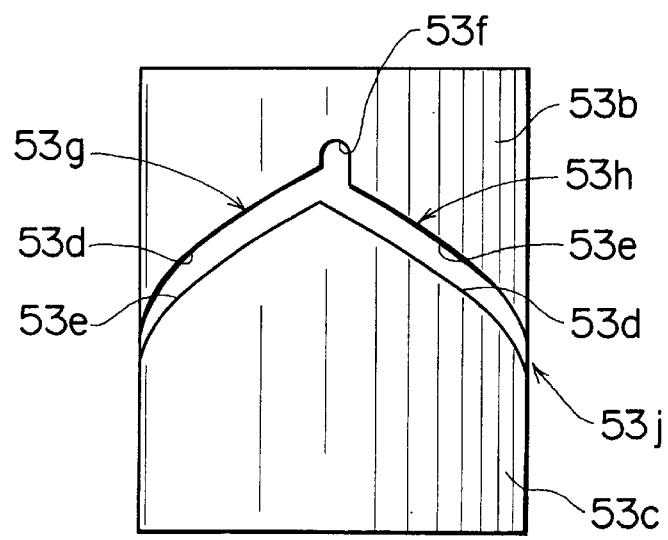
FIG. 39 is a side view of each upper and lower inner housing of FIG. 36 in a state of each of them being inserted in the outer housing of FIG. 36.

Then, as shown in FIG. 39, the upper and lower inner housings 53b and 53c are received in the outer housing 53a on a condition that the ends of them are faced with each other so that the peak fits with the valley.

Then, as shown in FIG. 39, a first cam groove 53g is formed between the first inclined end surface 53d of the upper inner housing 53b and the second inclined end surface 53e of the lower inner housing 53c, likewise a second cam groove 53h is formed between the second inclined end surface 53e of the upper inner housing 53b and the first inclined end surface 53d of the lower inner housing 53c.

Therefore, as shown in FIG. 36, when the upper and lower inner housings 53b and 53c are received in the outer housing 53a to constitute the valve housing 53, a cam groove 53j, consisting of the first and second cam grooves 53g and 53h and the groove 53f, is formed on an inner circumferential surface of the valve housing 53.

Figure 40:
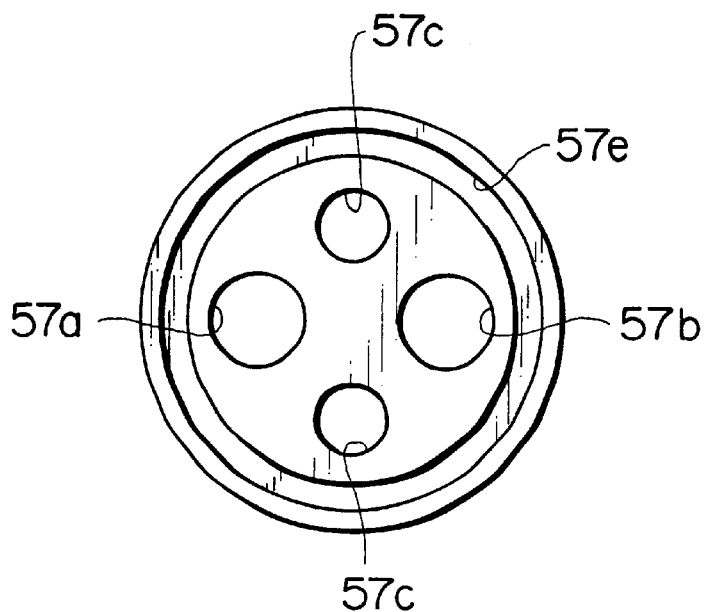
FIG. 40 is a plan view of a valve seat of FIG. 36.

As shown in FIG. 40, in the valve seat 57, there are formed a first selector port 57a to which the pipe 7 is connected from the bottom side and a second selector port 57b to which the pipe 8 is connected from the bottom side, at positions facing with each other sandwiching a center of the valve seat 57, in addition, two ports 57c of the low pressure side are formed at positions shifted by a phase of 90° in a circumferential direction of the valve seat 57 from the first and second selector ports 57a and 57b, then each of two ports 57c of the low pressure side are connected to a respective pipe out of two pipes, which are formed by branching the inlet pipe 6, from the bottom side of the valve seat 57.

As shown in FIG. 40, a ring-shape groove 57e is formed near a periphery of the valve seat 57, into which an end of the coil spring 59 is inserted, then in this ring-shape groove 57e, there is received a thrust bearing (corresponding to slide means) 58 to prevent a pinch between one end of the coil spring 59 and the bottom of the ring-shape groove 57e from occurring and to smooth a rotation of the main valve element 55 with respect to the valve housing 53, when an opposite end of the coil spring 59 adheres to the main valve element 55 and rotates together with the main valve element 55.

Figure 41:
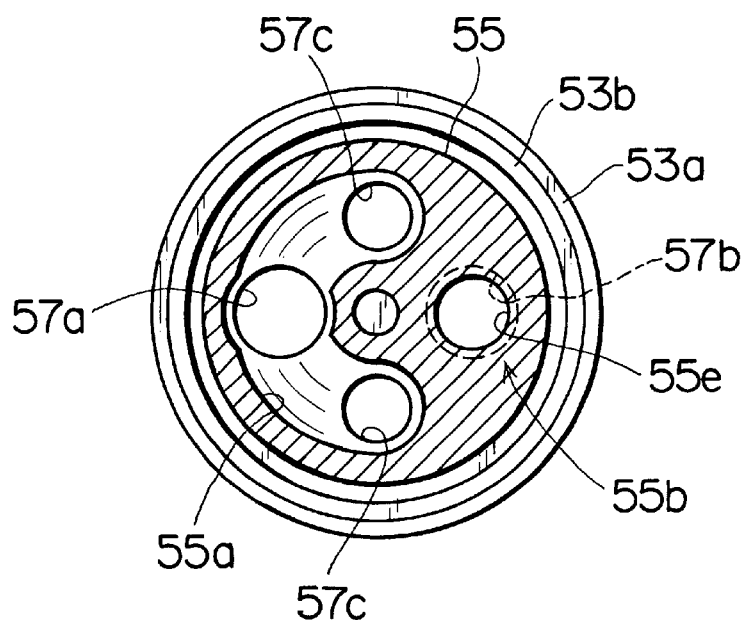
FIG. 41 is a sectional view taken along A—A line of FIG. 36.

As shown in FIG. 41, the main valve element 55 is provided with a low-pressure side communication groove 55a and a high-pressure side communication channel 55b.

The low pressure side communication groove 55a is formed to be opened at an end surface of the main valve element 55 at the valve seat 57 side, and when said end surface abuts on the valve seat 57, at a first rotation position of the main valve element 55, the first selector port 57a and the two ports 57c of the low pressure side communicate with each other by the low pressure side communication groove 55a, while at a second rotation position of the main valve element 55, the second selector port 57b and the two ports 57c of the low pressure side communicate with each other by the low pressure side communication groove 55a.

As shown in FIG. 36, the high pressure side communication channel 55b has a chamber 55d, which is opened at an opposite end to the valve seat 57 side of the main valve element 55 through the valve port 55c, and an inner channel 55e shown in FIG. 41, then this inner channel 55e is opened at an end surface of the main valve element 55 at the valve seat 57 side keeping away from the low pressure side communication groove 55a and communicates with the chamber 55d in the main valve element 55.

Figure 42:
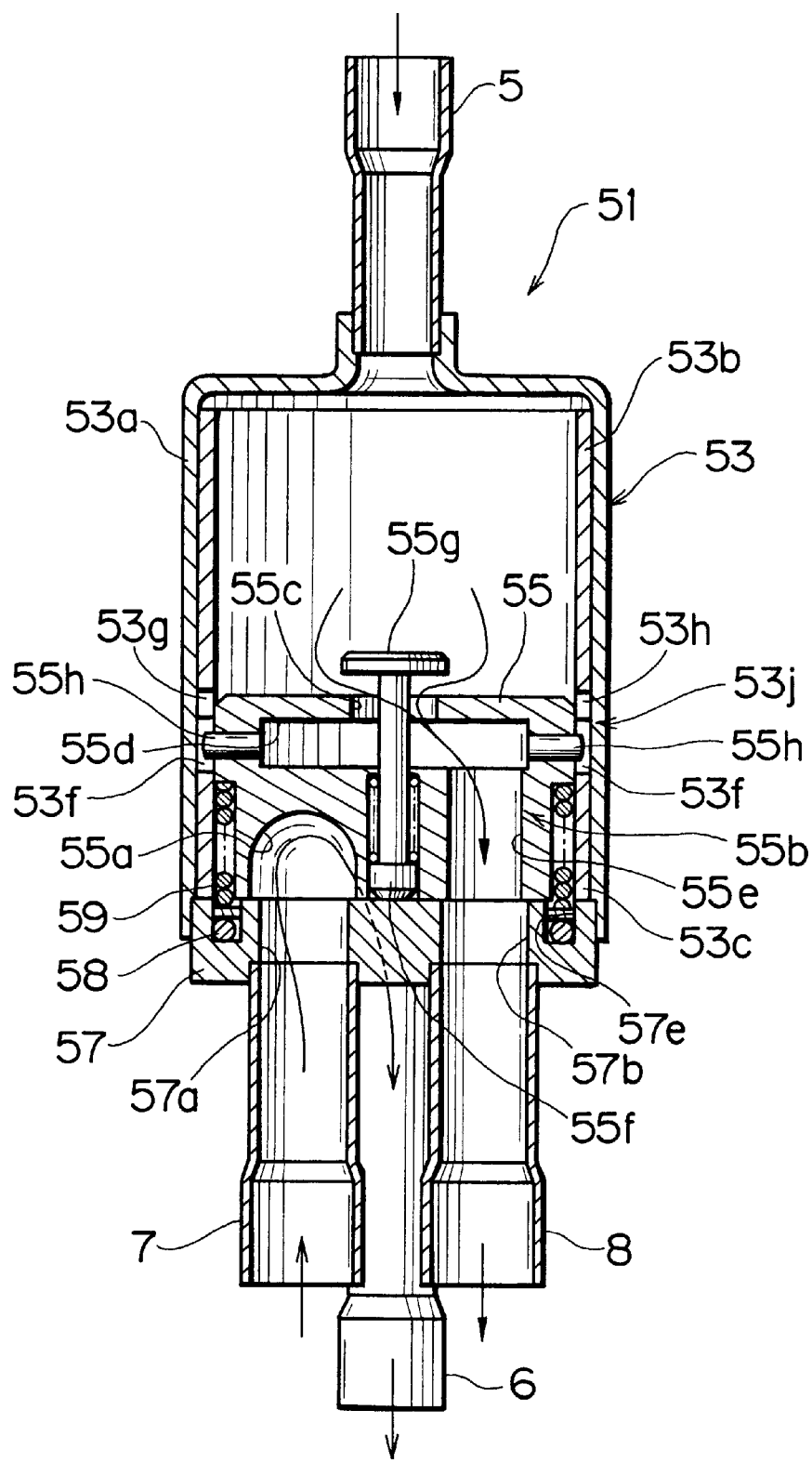
FIG. 42 is a sectional view of a channel selector valve of FIG. 36 in a cooling mode.
Figure 43:
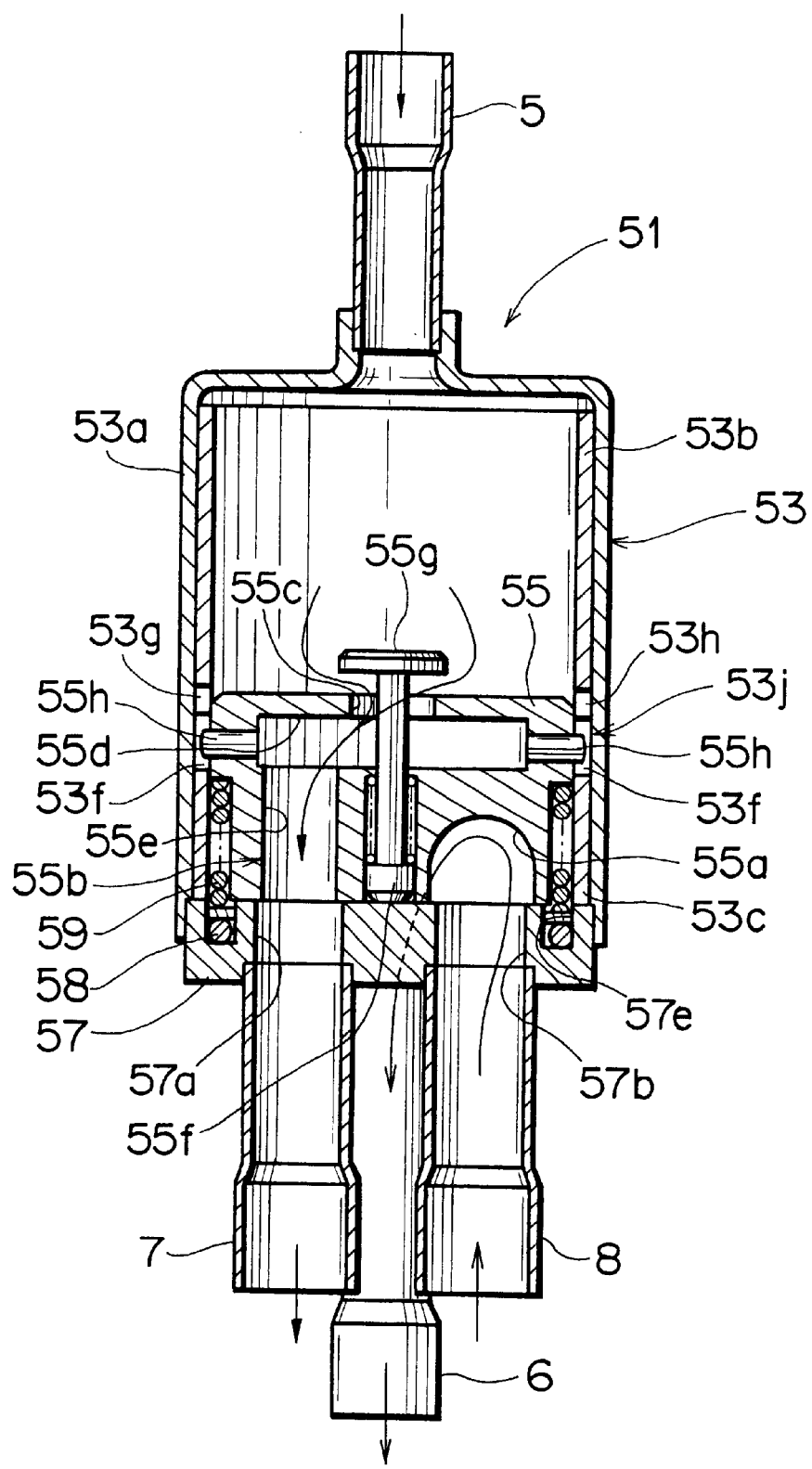
FIG. 43 is a sectional view of a channel selector valve of FIG. 36 in a heating mode.

As shown in FIG. 36, a shaft 55f is inserted into the center of the main valve element 55 to be movable in an axial direction, and when the valve element 55 is apart from the valve seat 57, an assistant valve element 55g attached to an end of the shaft 55f at the valve port 55c side closes the valve port 55c to make the high pressure side communication channel 55b be isolated, then an end of the shaft 55f abuts on the valve seat 57 allowing the assistant valve element 55g to open the valve port 55c when the main valve element 55 is seated on the valve seat 57, as shown in FIGS. 42 and 43, thereby the high pressure side communication channel 55b is in an opened state.

There are provided each guide pin (corresponding to cam follower pins) 55h at a circumferential surface position and a position shifted by a phase of 180° therefrom of the main valve element 55. As shown in FIG. 36, these guide pins 55h are inserted into the cam groove 53j under a condition that the main valve element 55 is received in the valve housing 53.

In the following, an operation of the channel selector valve 51 according to the fifteenth embodiment constructed as described above will be explained.

When the operation of the compressor 4 is halted, as shown in FIG. 36, the main valve element 55 is apart from the valve seat 57 due to the energizing force of the coil spring 59, then the assistant valve element 55g closes the valve port 55c, while the two guide pins 55h of the main valve element 55 are situated at the groove 53f of the upper inner housing 53b, at which divisions of 90° and 270° are shown in FIG. 44, i.e. at which the cam groove 53j of the cam housing 53 is the farthest apart from the valve seat 57.

In FIG. 44, the divisions of angle indicate a rotational position of the guide pin 55h in the cam groove 53j.

Figure 45:
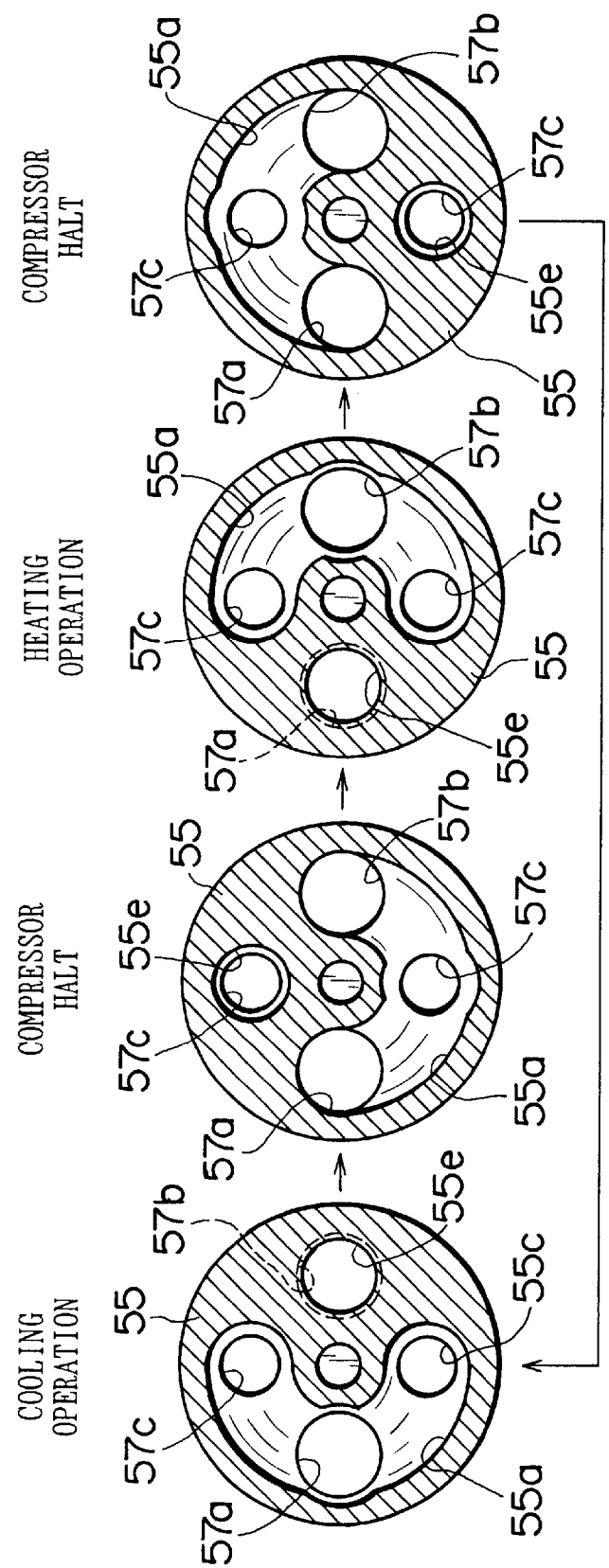
FIG. 45 is a view illustrating a relative positional relationship between a main valve element and a valve seat with respect to their direction of rotation.

In the refrigerating cycle A is in the heating mode, when the operation of the compressor 4 is halted and each guide pin 55h is situated at the groove 53f of the upper inner housing 53b where the divisions of 90° or 270° are shown in FIG. 44, as shown in a figure at the right end of FIG. 45, the low pressure side communication groove 55a of the main valve element 55 faces the first and second selector ports 57a and 57b, respectively, of the valve seat 57.

In this state, when the compressor 4 starts to operate, since the assistant valve element 55g closes the valve port 55c, the high pressure refrigerant flowed into the valve housing 53 from the compressor 4 acts so as to move the main valve element 55 toward the valve seat 57 side against the energizing force of the coil spring 59.

Then, each guide pin 55h situated at the groove 53f of 90° (or 270°) of the upper inner housing 53b moves on the second cam groove 53h along the first inclined end surface 53d of the lower inner housing 53c, then is situated at the groove 53f of the lower inner housing 53c, at which the angle divisions of 180° (or 0°) is shown in FIG. 44.

Then, as each guide pin 55h moves on the second cam groove 53h, the main valve element 55 moves toward the valve seat 57 side with rotating, and when rotates by 90°, as shown in FIG. 42, the main valve element 55 sits down on the valve seat 57 to reach the first position, thereby an end of the shaft 55f abuts on the valve seat 57 allowing the assistant valve element 55g to open the valve port 55c.

In this situation, as shown in a figure at left end of FIG. 45, the low pressure side communication groove 55a faces the first selector port 57a and the two low pressure side ports 57c, while the inner channel 55e faces the second selector port 57b.

Therefore, as shown in FIG. 42, the outlet pipe 5 communicates with the pipe 8 through the high pressure side communication channel 55b and the second selector port 57b, while the inlet pipe 6 communicates with the pipe 7 through the low pressure side communication groove 55a and the two low pressure side ports 57c.

Consequently, the high pressure refrigerant from the compressor 4 flows into the outdoor heat exchanger 9B from the pipe 8 by way of the outlet pipe 5, high pressure side communication channel 55b and the second selector port 57b, then passes through the throttle 10, the indoor heat exchanger 9A, pipe 7, the first selector port 57a, the low pressure side communication groove 55a, the two low pressure side ports 57c and the inlet pipe 6, and finally comes back to the inlet of the compressor 4, thereby the refrigerating cycle A is in the cooling mode.

Thereafter, when the operation of the compressor 4 is halted, the pressure of the refrigerant flowed into the valve housing 53 decreases, thereby the energizing force of the coil spring 59 acts to move the main valve element 55 being away from the valve seat 57.

Then, each guide pin 55h situated at the groove 53f of 180° (or 0°) of the lower inner housing 53 moves on the first cam groove 53g along the first inclined end surface 53d of the upper inner housing 53b, then is situated at the groove 53f of 270° (or 90°) of the upper inner housing 53b.

Then, as each guide pin 55h moves on the first cam groove 53g, the main valve element 55 moves toward the outlet pipe 5 side with rotating in the valve housing 53, and when rotates by 90°, the main valve element 55 reaches a first intermediate position where the main valve element is the farthest away from the valve seat 57, thereby the assistant valve element 55g of the shaft 55f, an end of which is apart from the valve seat 57, closes the valve port 55c.

In this situation, as shown in the second figure from the left of FIG. 45, the low-pressure side communication groove 55a faces the first and second selector ports 57a and 57b, respectively.

In this state, when the compressor 4 starts to operate, each guide pin 55h situated at the groove 53f of 270° (or 90°) of the upper inner housing 53b moves on the second cam groove 53h, then is situated at the groove 53f of 0° (or 180°) of the lower inner housing 53c.

Then, as each guide pin 55h moves on the second cam groove 53h, the main valve element 55 moves toward the valve seat 57 side with rotating in the valve housing 53, and when rotates by 90°, as shown in FIG. 43, the main valve element 55 sits down on the valve seat 57 to reach the second position, thereby an end of the shaft 55f abuts on the valve seat 57 allowing the assistant valve element 55g to open the valve port 55c.

In this situation, as shown in a second figure from the right end of FIG. 45, the low pressure side communication groove 55a faces the second selector port 57b and the two low pressure side ports 57c, while the inner channel 55e faces the first selector port 57a.

Therefore, as shown in FIG. 43, the outlet pipe 5 communicates with the pipe 7 through the high pressure side communication channel 55b and the first selector port 57a, while the inlet pipe 6 communicates with the pipe 8 through the second selector port 57b, the low pressure side communication groove 55a and the two low pressure side ports 57c.

Consequently, the high pressure refrigerant from the compressor 4 flows into the indoor heat exchanger 9A from the pipe 7 by way of the outlet pipe 5, high pressure side communication channel 55b and the first selector port 57a, then passes through the throttle 10, the outdoor heat exchanger 9B, pipe 8, the second selector port 57b, the low pressure side communication groove 55a, the two low pressure side ports 57c and the inlet pipe 6, and finally comes back to the inlet of the compressor 4, thereby the refrigerating cycle A is in the heating mode.

Thereafter, when the operation of the compressor 4 is halted, the pressure of the refrigerant flowed into the valve housing 53 decreases, thereby the energizing force of the coil spring 59 acts to move each guide pin 55h, situated at the groove 53f of 0° (or 180°) of the lower inner housing 53c, on the first cam groove 53g so as to be situated at the groove 53f of 90° (or 270°) of the upper inner housing 53b.

Then, as each guide pin 55h moves on the first cam groove 53g, the main valve element 55 moves toward the outlet pipe 5 side with rotating in the valve housing 53, and when rotates by 90°, as shown in FIG. 36, the main valve element 55 reaches a second intermediate position where the main valve element 55 is the farthest away from the valve seat 57, thereby the assistant valve element 55g of the shaft 55f, an end of which is apart from the valve seat 57, closes the valve port 55c.

Thereby, as shown in a figure at the right end of FIG. 45, the system comes back to an initial state, in which the low pressure communication groove 55a faces the first and second valve ports 57a and 57b, respectively.

Thus according to the channel selector valve 51 of the fifteenth embodiment, by using a differential pressure generated due to the refrigerant flow discharged from the compressor 4 and the energizing force due to the coil spring 59 disposed between the main valve element 55 and the valve seat 57, the main valve element 55 is moved in the direction nearer to or away from the valve seat 57, while each guide pin 55h is moved along the cam groove 53j and the main valve element 55 is allowed to rotate with respect to the valve housing 53, thereby the main valve element 55 is moved between the first and second positions.

Therefore, a place, with which the outlet pipe 5 or the inlet pipe 6 communicates is selected through the low pressure side communication groove 55a and the high pressure side communication channel 55b, is selected between either the first selector port 57a or the second selector port 57b of the valve seat 57, thereby the heating mode, in which the refrigerant discharged from the outlet pipe 5 is supplied to the indoor heat exchanger 9A by way of the pipe 7, and the cooling mode, in which the refrigerant discharged from the outlet pipe 5 is supplied to the outdoor heat exchanger 9B by way of the pipe 8, can be selected by starting and halting the operation of the compressor 4, and the selected state can be maintained without using any exclusive power source such as an electromagnetic solenoid.

Moreover, according to the fifteenth embodiment, since the selection of communication for the outlet pipe 5 and the inlet pipe 6 in the channel selector valve 51 is performed according to a start and halt of the operation of the compressor 4, neither power source for an electric drive nor control by an electric signal for selecting the channel of the refrigerant is needed, therefore, the channel selector valve 51 according to the fifteenth embodiment is advantageous.

In addition, in the channel selector valve 51 according to the fifteenth embodiment, the groove 53f of the cam groove 53j formed in the valve housing 53 is provided not at a junction between an end of the first inclined end surface 53d and an end of the second inclined end surface 53e but at the end of the second inclined end surface 53e, thereby the channel selector valve 51 has an advantage as follows.

That is, when the main valve element 55 moves in the direction nearer to or away from the valve seat 57, each guide pin 55h, which has moved from the first inclined end surface 53d to the groove 53f, is prevented from coming back to the first inclined end surface 53d and is securely moved to the second inclined end surface 53e, then the rotational direction of the main valve element 55 is limited to one direction, thereby the selection of the modes of the refrigerating cycle A can be securely performed by controlling the number of start and halt of the operation of the compressor 4.

Figure 46:
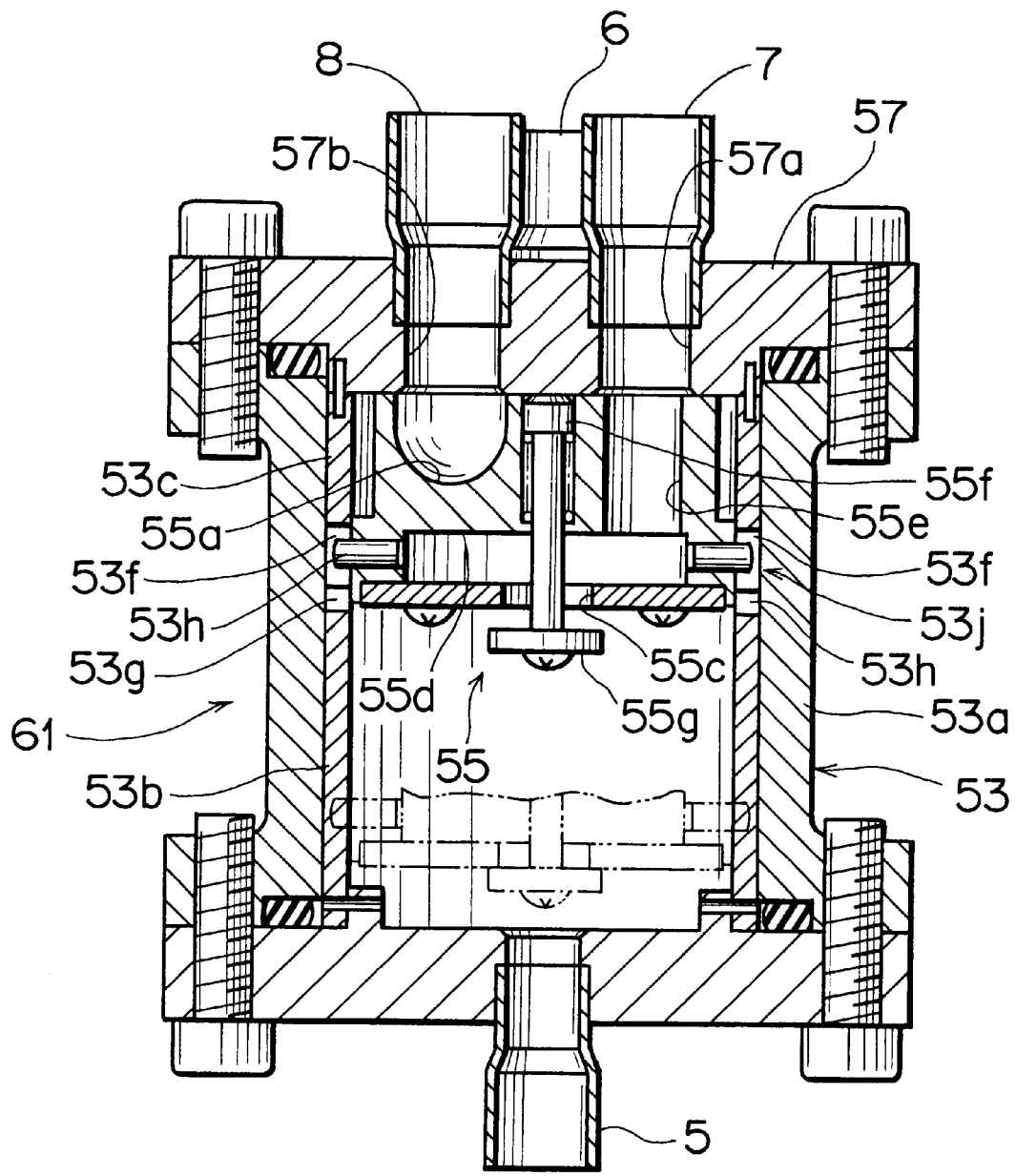
FIG. 46 is a sectional view of a channel selector valve according to a sixteenth embodiment of the present invention, which can be employed as the rotary channel selector valve of FIG. 35.

In the channel selector valve 51 according to the fifteenth embodiment described above, the movement of the main valve element 55 in the direction away from the valve seat 57 is performed by the energizing force of the coil spring 59 disposed between the main valve element 55 and the valve seat 57. Instead, like a channel selector valve 61 according to a sixteenth embodiment of the present invention shown in FIG. 46, a position of the valve housing 53 may be set upside down such that the outlet pipe 5 is situated below in a vertical direction, then the movement of the main valve element 55 in the direction away from the valve seat 57 may be performed by an own weight of the main valve element 55.

If the channel selector valve 61 is constructed as described above, the assistant valve element 55g opens the valve port 55c by an own weight of the shaft 55f even if the main valve element 57 does not sit down on the valve seat 57, after the high pressure refrigerant discharged from the compressor 4 flows into the valve housing 53 through the outlet pipe 5 upon the start of the operation of the compressor 4, the assistant valve element 55g opens the valve port 55c against the own weight of the shaft 55f, by the pressure of the high pressure refrigerant flowed into the valve housing 53, until the main valve element 55 sits down on the valve seat 57.

The channel selector valve 61 according to the sixteenth embodiment constructed as described above gives a similar effect with that of the channel selector valve 51 according to the fifteenth embodiment. Moreover, in the channel selector valve 61 according to the sixteenth embodiment, since the movement of the main valve element 55 in the direction away from the valve seat 57 is performed by an own weight of the main valve element 55, the coil spring 59 can be omitted, resulting in a reduction of the cost of the channel selector valve.

Figure 47:
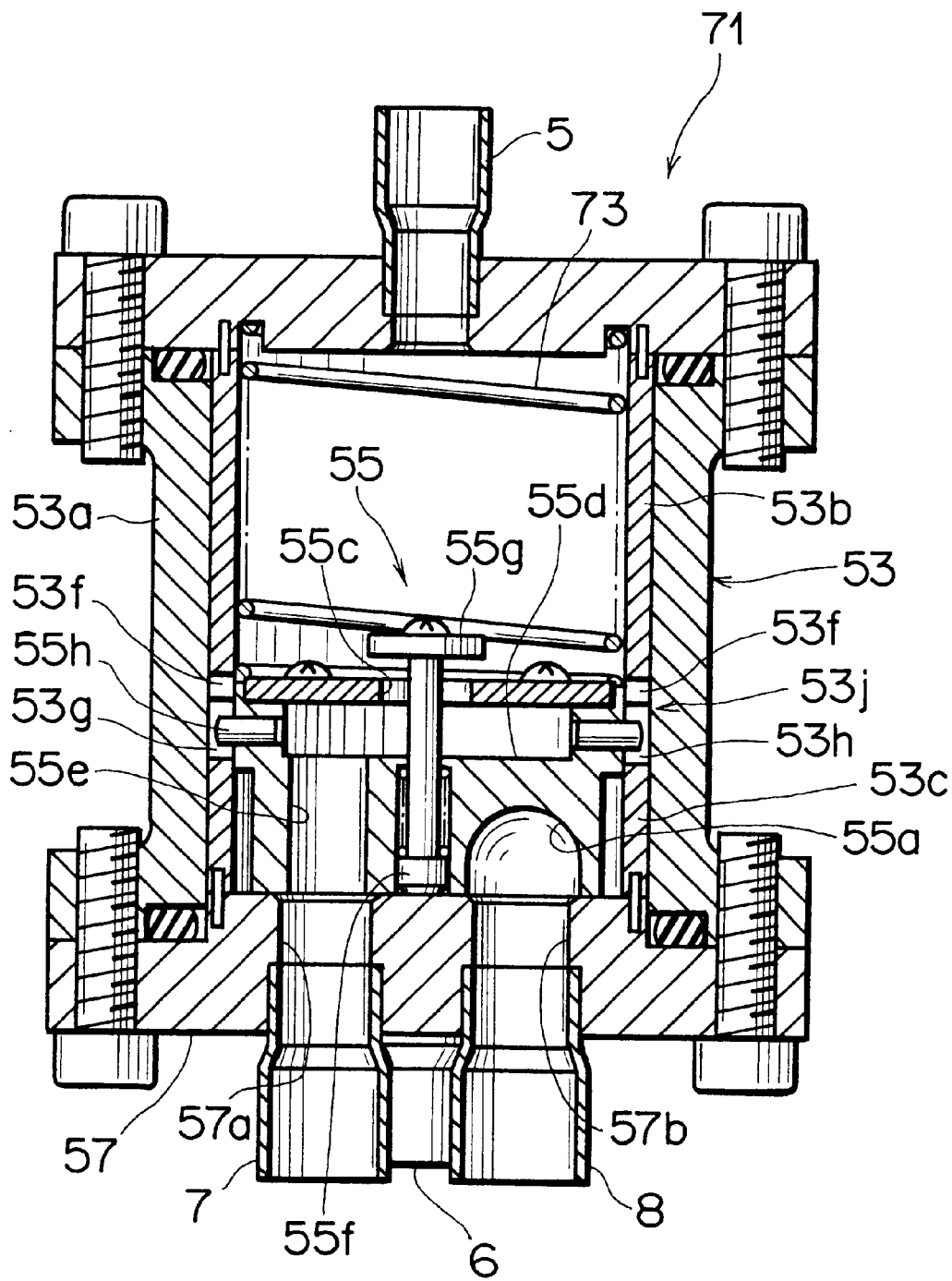
FIG. 47 is a sectional view of a channel selector valve according to a seventeenth embodiment of the present invention, which can be employed as the rotary channel selector valve of FIG. 35.

As shown in FIG. 47, in a channel selector valve 71 according to the seventeenth embodiment of the present invention, the coil spring 59 provided between the main valve element 55 and the valve seat 57, which is employed in the channel selector valve 51 according to the fifteenth embodiment shown in FIG. 36, is replaced by a second coil spring 73 provided between the main valve element 55 and an closed end of the outer housing 53a, to which the outlet pipe 5 is connected, thereby the main valve element 55 is energized toward the valve seat 57 side by an energizing force due to the second coil spring 73.

When the channel selector valve 71 is constructed as described above, the movement of the main valve element 55 between the first and the second positions is performed in such a manner that the compressor 4, the outlet of which is connected to the outlet pipe 5, is operated in a direction of inverse rotation so as to decrease the pressure of the refrigerant existed in a space between the closed end of the outer housing 53a and the main valve element 55, thereby the main valve element 55 is moved in the direction away from the valve seat 57 against the energizing force of the second coil spring 73.

The channel selector valve 71 according to the seventeenth embodiment constructed as described above gives a similar effect with that of the channel selector valve 51 according to the fifteenth embodiment. Moreover, in the channel selector valve 71 according to the seventeenth embodiment, since the main valve element 55 moves between the first and the second positions even if the compressor 4 is not rotated in a normal direction, when the refrigerating cycle A is operated again in the same operational mode with the former mode, no pre-operation of the compressor 4 with the rotation in a normal direction is needed for a channel selection, i.e. the so-called dummy operation of the compressor 4 can be omitted, therefore the channel selector valve 71 is advantageous in this respect.

In the following, a channel selector valve according to a eighteenth embodiment of the present invention, which can be employed as the rotary four-way selector valve 50 shown in FIG. 35, will be explained with reference to FIGS. 48 to 53.

Figure 48:
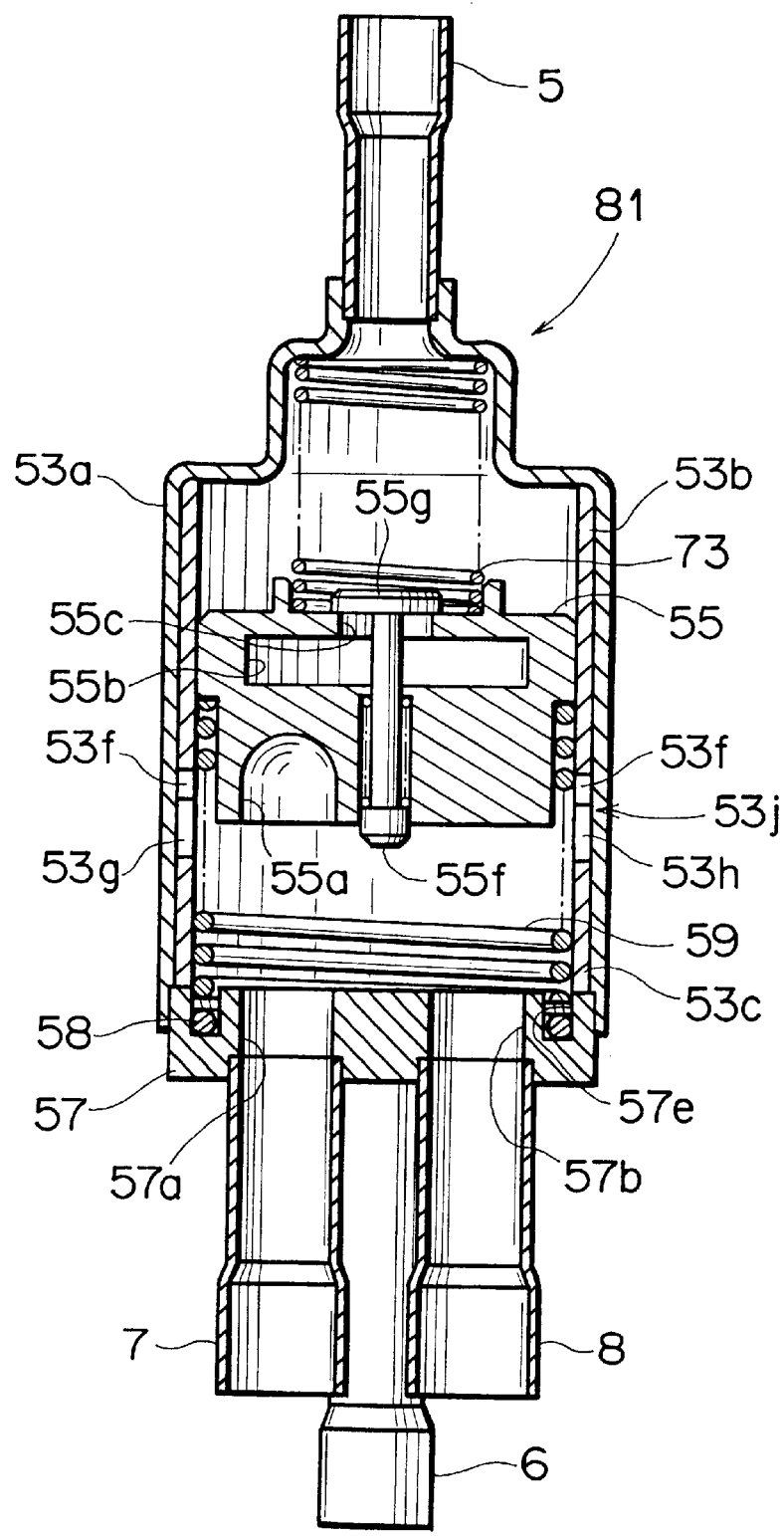
FIG. 48 is a sectional view of a channel selector valve according to a eighteenth embodiment of the present invention, which can be employed as the rotary channel selector valve of FIG. 35.

FIG. 48 is a sectional view of a channel selector valve according to the eighteenth embodiment of the present invention, in which the same abbreviation numerals with those used for the corresponding identical members or parts of the channel selector valve 51 according to the fifteenth embodiment shown in FIG. 36 are used.

The channel selector valve 81 according to the eighteenth embodiment shown in FIG. 48 is different from the channel selector valve 51 according to the fifteenth embodiment shown in FIG. 36 in a point that a second coil spring 73 is provided between the main valve element 55 and an closed end of the outer housing 53a, to which the outlet pipe 5 is connected, so as to energize the main valve element 55 to move in the direction nearer to the valve seat 57, and except this point the channel selector valve 81 is constructed similarly to the channel selector valve 51.

Figure 49:
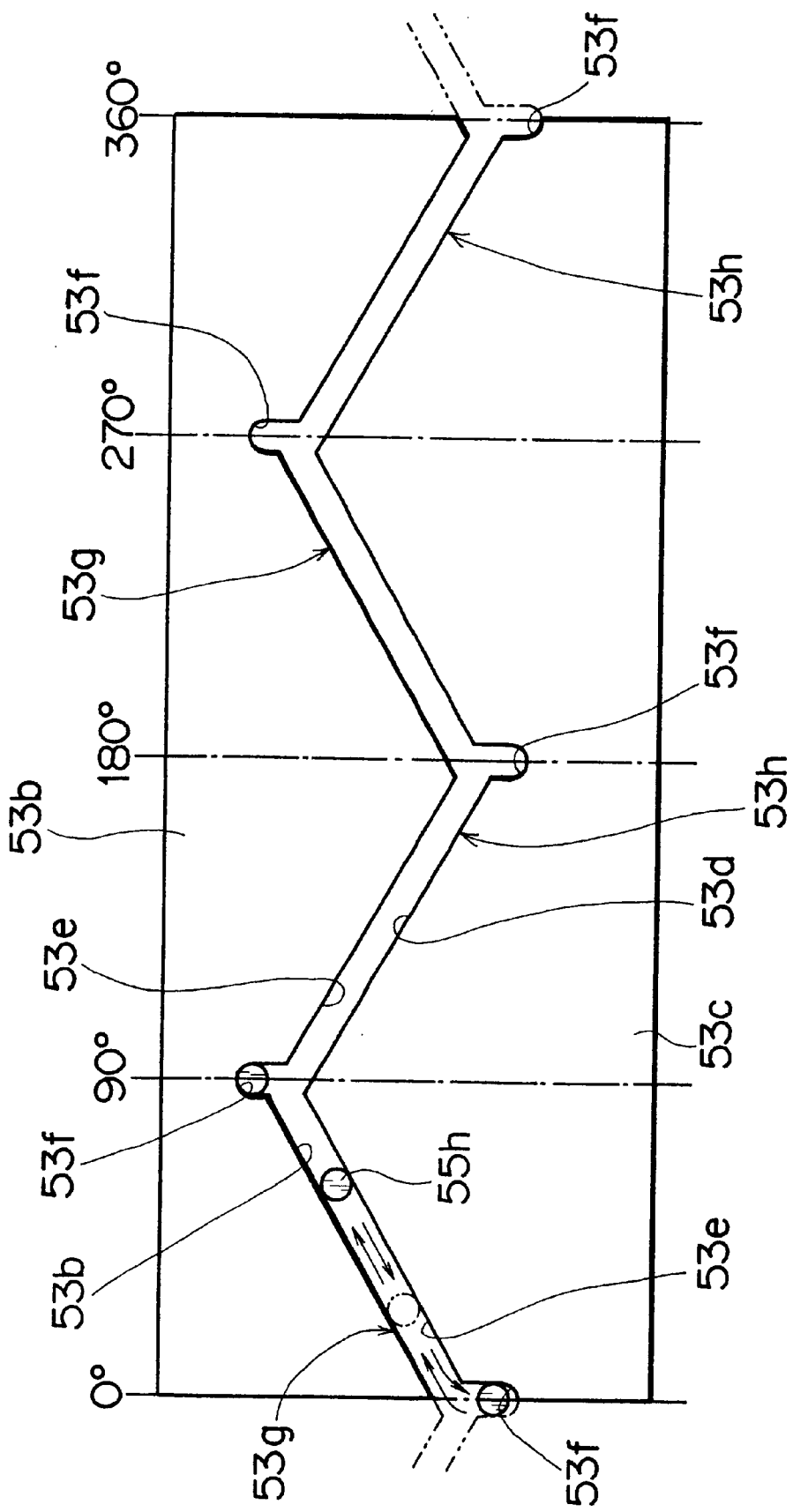
FIG. 49 is a development of a cam groove of FIG. 48.
Figure 51:
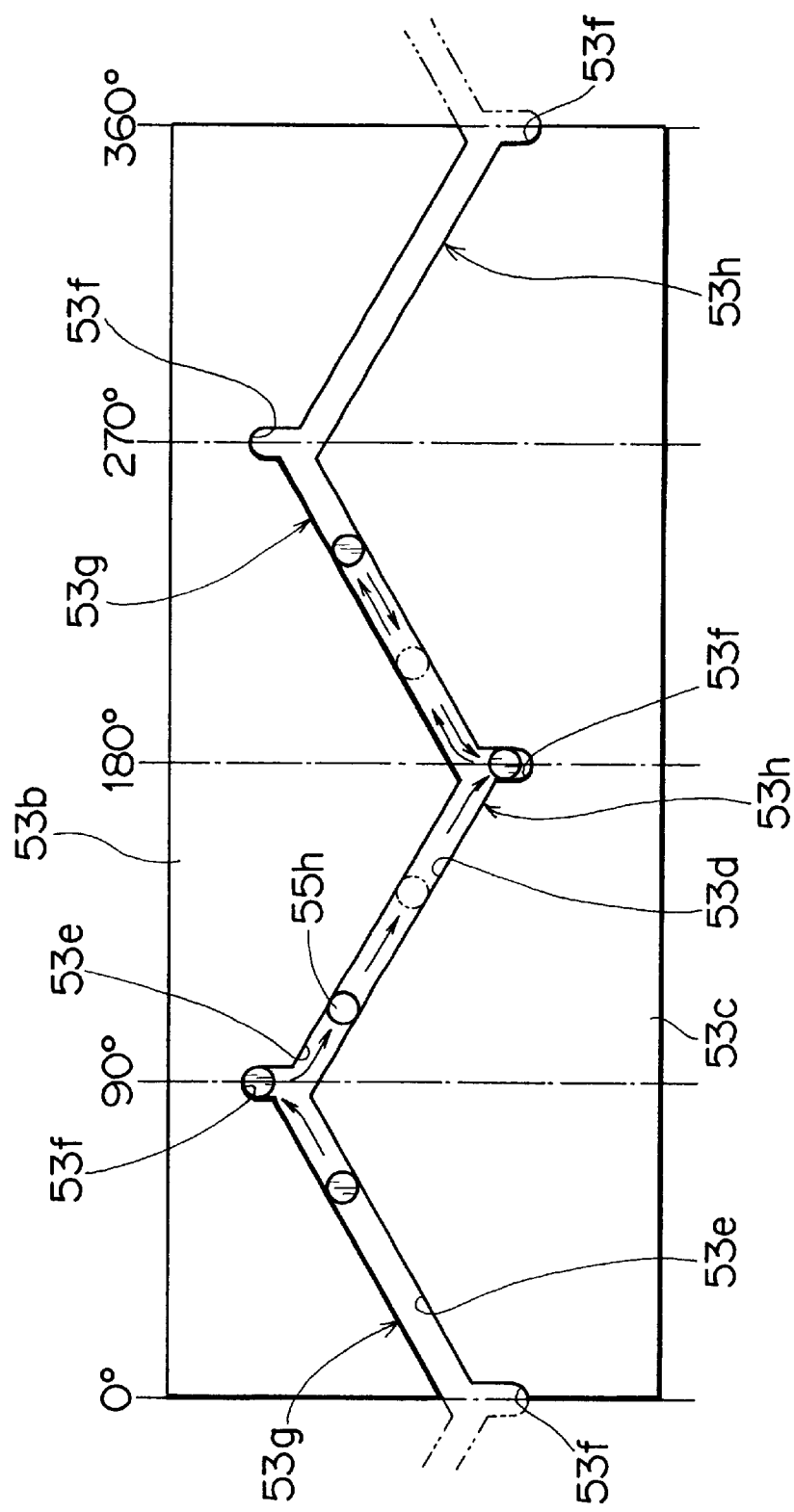
FIG. 51 is a development of a cam groove of FIG. 48.

In the channel selector valve 81 according to the eighteenth embodiment constructed as described above, when the operation of the compressor 4 is halted, the main valve element 55 is situated at an intermediate position in a region of its movement in the direction nearer to or away from the valve seat 57, by a balance between an energizing force due to the coil spring 59 and that due to the second coil spring 73, while each guide pin 55h is situated at an intermediate position between the first cam groove 53g and the second cam groove 53h of the cam groove 53j as shown in FIGS. 49 and 51.

Divisions of angle of FIG. 44 indicate a rotational position of the guide pin 55h of the main valve element 55 in the cam groove 53j.

When the operation of the compressor 4 is halted after the refrigerating cycle A has been in the cooling mode, and assuming that each guide pin is situated at an intermediate position of the first cam groove 53g where is forward by 30° from the groove 53f of the upper inner housing 53b at which a division 90° (or 270°) is shown in FIG. 49, when the compressor 4 starts to operate, the following steps will take place.

That is, since the assistant valve element 55g closes the valve port 55c, the high pressure refrigerant flowed into the valve housing 53 from the compressor 4 acts to move the main valve element 55 toward the valve seat 57 side against the energizing force of the coil spring 59.

Figure 50:
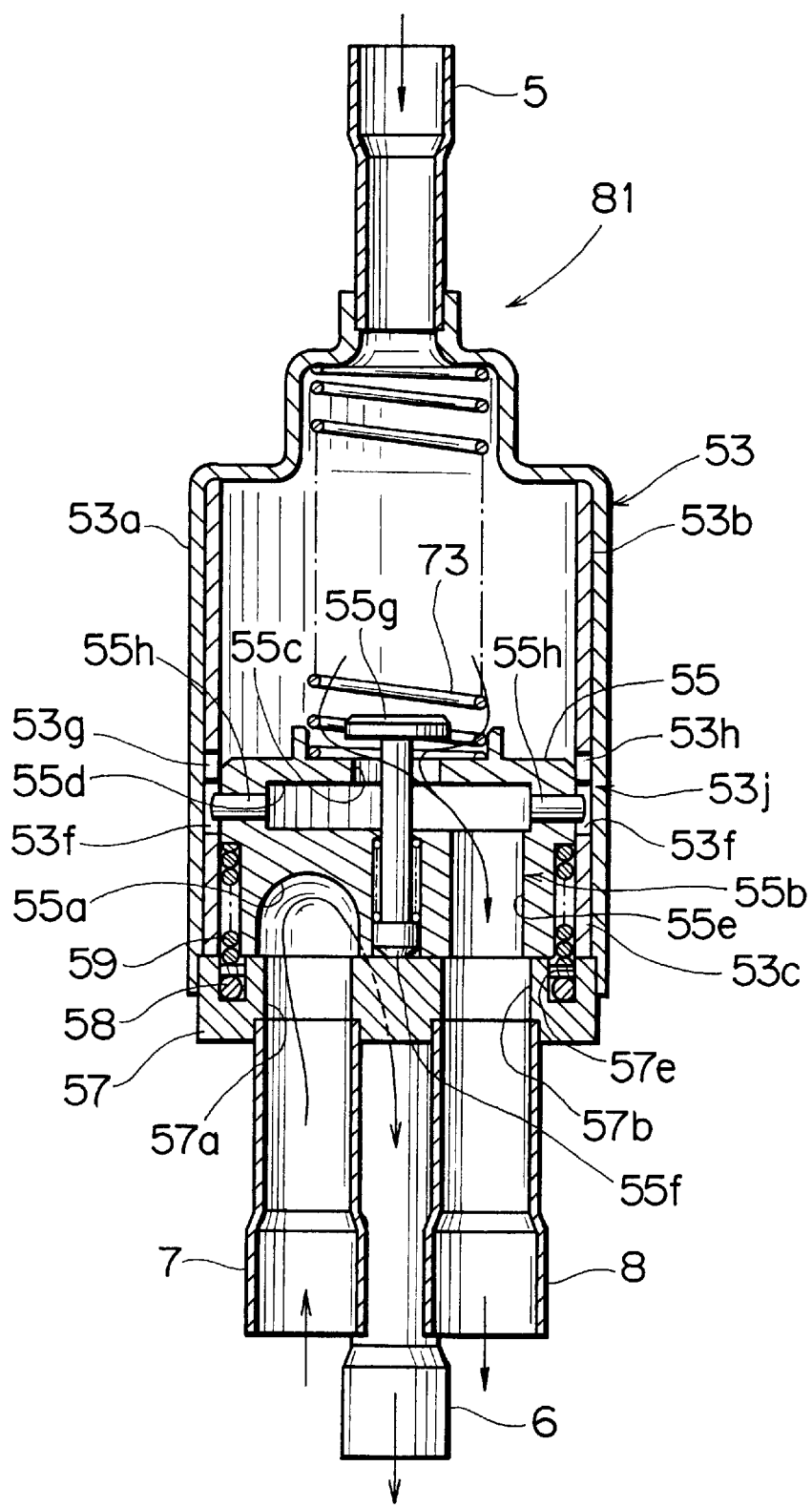
FIG. 50 is a sectional view of a channel selector valve of FIG. 48 in a cooling mode.

Then, each guide pin 55h situated at an intermediate position of the first cam groove 53g moves on the first cam groove 53g along the second inclined end surface 53e of the lower inner housing 53c, then is situated at the groove 53f of 0° (or 180°) of the lower inner housing 53c, while the main valve element 55 sits down on the valve seat 57 to reach the first position as shown in FIG. 50, thereby the refrigerating cycle A is in the cooling mode.

Thereafter, when the operation of the compressor 4 is halted, since the pressure of the refrigerant flowed into the valve housing 53 decreases, the energizing force of the coil spring 59 acts to part the main valve element 55 from the valve seat 57.

Then, each guide pin 55h, situated at the groove 53f of 0° (180°) of the lower inner housing 53c, moves on the first cam groove 53g along the first inclined end surface 53d of the upper inner housing 53b and comes back to an intermediate position of the first cam groove 53g shown in FIG. 49, thereby the main valve element 55 comes back to the intermediate position where the energizing force of the coil spring 59 balances with that of the second coil spring 73.

Thereafter, when the compressor 4 starts to operate again, the main valve element 55 comes back to the first position similarly to the operation described above, thereby the refrigerating cycle A is in the cooling mode.

To the contrary, when the compressor 4 is operated in a direction of inverse rotation, the pressure of the refrigerant existed in a space between the closed end of the outer housing 53a and the main valve element 55 is decreased, thereby the main valve element 55 is moved in the direction away from the valve seat 57 against the energizing force of the second coil spring 73.

Then, each guide pin 55h situated at an intermediate position of the first cam groove 53g moves on the first cam groove 53g along the first inclined end surface 53d of the upper inner housing 53b, then is situated at the groove 53f of the upper inner housing 53b where a division of 90° (or 270°) is shown in FIG. 51.

Figure 52:
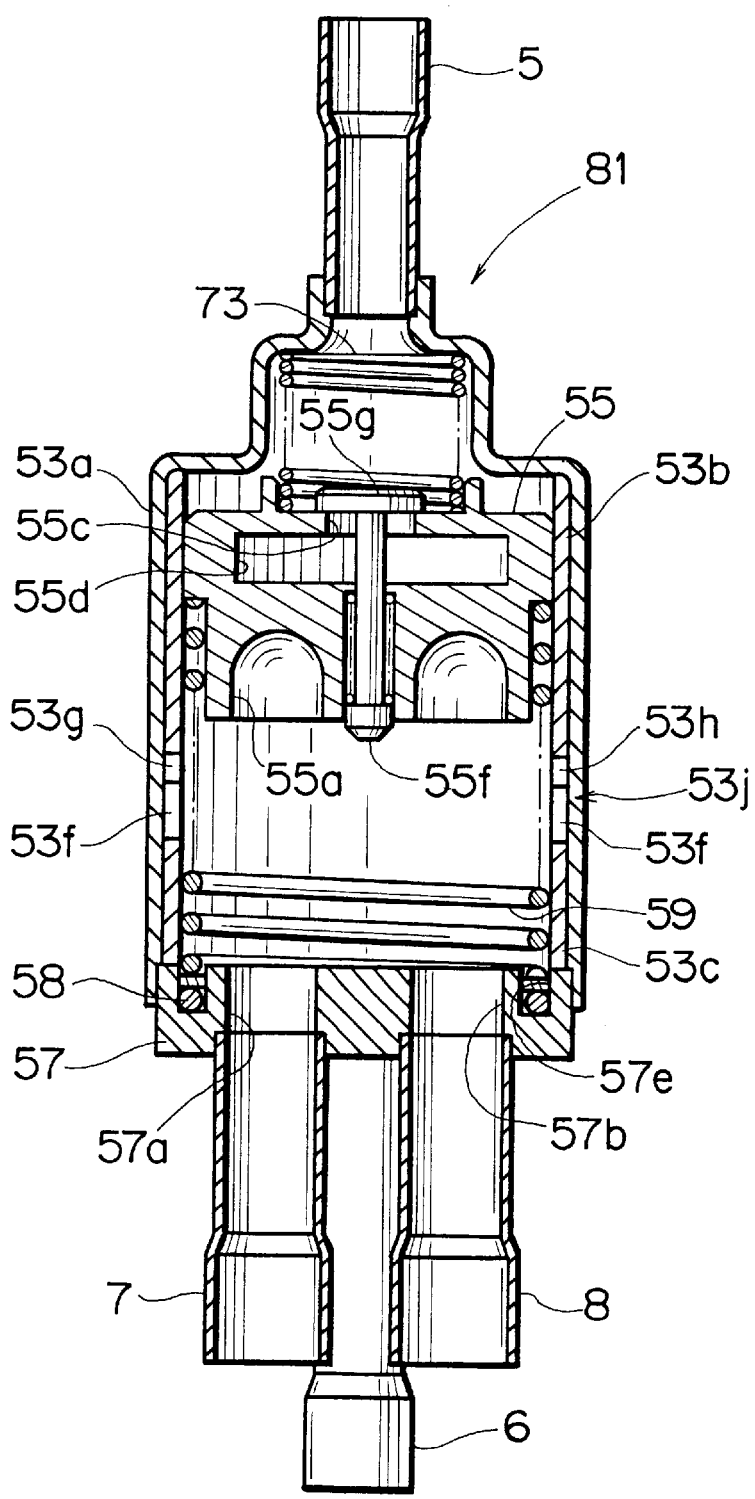
FIG. 52 is a sectional view of a channel selector valve of FIG. 48 upon switching between a cooling and heating mode.

While the main valve element 55 reaches a point where is the farthest away from the valve seat 57 as shown in FIG. 52.

Thereafter, when the operation of the compressor 4 is halted, since the decrease in the pressure of the refrigerant in the space between the closed end of the outer housing 53a and the main valve element 55 becomes zero, the main valve element 55 moves in the direction nearer to the valve seat 57 by the energizing force of the second coil spring 73.

Then, each guide pin 55h situated at the groove 53f of 90° (or 270°) of the upper inner housing 53b moves on the second cam groove 53h, then is situated at an intermediate position of the second cam groove 53h, at which each guide pin 55h proceeds by 30° toward the groove 53f of 180° (or 0°) of the lower inner housing 53c side as shown in FIG. 51, thereby the main valve element 55 further rotates by 60° from the state shown in FIG. 48 so as to reach said intermediate position.

Thereafter, when the compressor 4 starts to operate again, since the assistant valve element 55g closes the valve port 55c, the high pressure refrigerant flowed into the valve housing 53 from the compressor 4 acts to move the main valve element 55 toward the valve seat 57 side against the energizing force of the coil spring 59.

Figure 53:
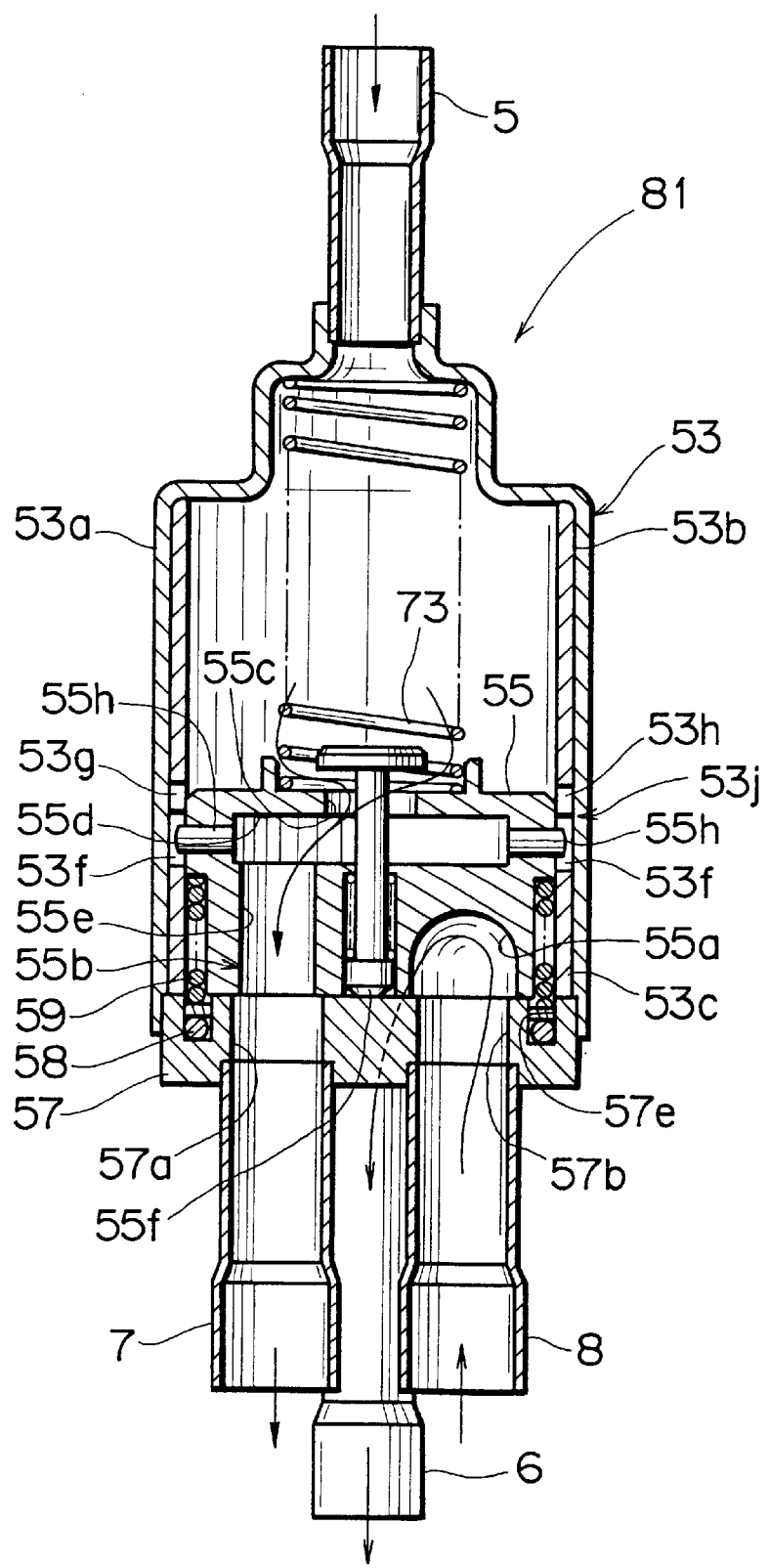
FIG. 53 is a sectional view of a channel selector valve of FIG. 48 in a heating mode.

Then, each guide pin 55h situated at an intermediate position of the second cam groove 53h moves on the second cam groove 53h along the first inclined end surface 53d of the lower inner housing 53c, then is situated at the groove 53f of 180° (or 0°) of the lower inner housing 53c, while the main valve element 55 sits down on the valve seat 57 to reach the second position as shown in FIG. 53, thereby the refrigerating cycle A is in the heating mode.

Thereafter, when the operation of the compressor 4 is halted, since the pressure of the refrigerant flowed into the valve housing 53 decreases, the energizing force of the coil spring 59 acts to part the main valve element 55 from the valve seat 57.

Then, each guide pin 55h, situated at the groove 53f of 180° (0°) of the lower inner housing 53c, moves on the first cam groove 53g and reaches to an intermediate position of the first cam groove 53g, at which each guide pin 55h proceeds by 60° toward the groove 53f of 270° (or 90°) of the upper inner housing 53b side as shown in FIG. 51, thereby the main valve element 55 further rotates by 180° from the state shown in FIG. 48 so as to reach said intermediate position.

Thereafter, the compressor 4 starts to operate again, by the high pressure refrigerant flowed into the valve housing 53, the main valve element 55 moves in the direction nearer to the valve seat 57 against the energizing force of the coil spring 59.

Then, each guide pin 55h situated at an intermediate position of the first cam groove 53g shown in FIG. 51 moves on the first cam groove 53g along the second inclined end surface 53e of the lower inner housing 53c and comes back to the groove 53f of 180° (or 0°) of the lower inner housing 53c, while the main valve element 55 comes back to the second position shown in FIG. 53, thereby the refrigerating cycle A is in the heating mode.

To the contrary, when the compressor 4 is operated in a direction of inverse rotation, the pressure of the refrigerant existed in a space between the closed end of the outer housing 53a and the main valve element 55 is decreased, and the main valve element 55 moves in the direction away from the valve seat 57 against the energizing force of the second coil spring 73, then each guide pin 55h, which has been situated at an intermediate position of the first cam groove 53g shown in FIG. 51, is situated at the groove 53f of 270° (or 90°) of the upper inner housing 53b.

Then, the main valve 55 further rotates by 180° from the state shown in FIG. 52 and reaches the farthest position from the valve seat 57.

Thereafter, when the operation of the compressor 4 is halted, each guide pin 55h moves on the second cam groove 53h from the groove 53f of 270° (or 90°) of the upper inner housing 53b and is situated at an intermediate position of the second cam groove 53h, at which each guide pin 55h proceeds by 30° toward the groove 53f of 0° (or 180°) of the lower inner housing 53c side, thereby the main valve element 55 further rotates by 240° from the state shown in FIG. 48 and reaches said intermediate position.

Then, when the compressor 4 starts to operate again, by the high pressure refrigerant flowed into the valve housing 53, the main valve element 55 moves in the direction nearer to the valve seat 57 against the energizing force of the coil spring 59.

Then, each guide pin 55h situated at an intermediate position of the second cam groove 53h moves on the second cam groove 53h along the first inclined end surface 53d of the lower inner housing 53c and is situated at the groove 53f of 0° (or 180°) of the lower inner housing 53c, while the main valve element 55 sits down on the valve seat 57 and reaches the first position as shown in FIG. 50, thereby the refrigerating cycle A is in the cooling mode.

Thereafter, when the operation of the compressor 4 is halted, since the pressure of the refrigerant flowed into the valve housing 53 decreases, the energizing force of the coil spring 59 acts to part the main valve element 55 from the valve seat 57, while each guide pin 55h, which has been situated at the groove 53f of 0° (or 180°) of the lower inner housing 53c, moves on the first cam groove 53g and comes back to the intermediated position of the first cam groove 53g shown in FIG. 49, thereby the main valve element 55 comes back to said intermediate position shown in FIG. 48.

The channel selector valve 81 according to the eighteenth embodiment constracted as described above gives a similar effect with that of the channel selector valve 51 according to the fifteenth embodiment. Moreover, in the channel selector valve 81 according to the eighteenth embodiment, since by using a balance between the energizing forces of the coil spring 59 and the second coil spring 73, the main valve element 55 is situated at the intermediate position in a range of the movement in the direction nearer to or away from the valve seat 57, thereby no pre-operation of the compressor 4 with the rotation in a normal direction is needed for a channel selection, i.e. the so-called dummy operation of the refrigerating cycle A can be omitted similarly to the channel selector valve 71 according to the seventeenth embodiment, therefore the channel selector valve 81 is advantageous in this respect.

In the aforementioned channel selector valves 51, 61, 71 and 81, each guide pin 55h of the main valve element 55 is moved along the cam groove 53j of the housing 53 so that the movement of the main valve element 55 in the direction nearer to or away from the valve seat 57 is transformed to the rotation of the main valve element 55 in a circumferential direction, instead the arrangement of the guide pin and the cum groove may be set inversely between the main valve element 55 and the valve housing 53.

A channel selector valve according to a nineteenth embodiment shown in FIG. 54 has such a construction mentioned just above, and in the channel selector valve 91 according to the nineteenth embodiment, a rotating shaft 93 of a main valve element 55 is provided at the center of a valve seat 57, a cam groove 53j is formed on the circumferential surface of the rotating shaft 93 as shown in FIGS. 55 and 56, then a hollow 55k (shown in FIG. 57) into which one half of a guide ball 95 is inserted, another half of the guide ball 95 being inserted into the cam groove 53j, is formed in a shaft hole 55j of the main valve element 55 shown in FIG. 54, into which the rotating shaft 93 is inserted.

In the channel selector valve 91 according to the nineteenth embodiment, constitutions of a low pressure side communication groove and a high pressure side communication channel of the main valve element 55 are different from those of the channel selector valves 51, 61, 71 and 81 according to the fifteenth to eighteenth embodiments, respectively, however the primary part of the channel selector valve 91 is the constitution for transforming the movement of the main valve element 55 in the direction nearer to or away from the valve seat 57 to the rotation of the main valve element 55 in a circumferential direction and is not a structure of the main valve element 55 for channel selection, therefore an explanation of the structure of the main valve element 55 will be omitted.

The channel selector valve 91 according to the nineteenth embodiment constracted as described above gives a similar effect with that of the channel selector valve 51 according to the fifteenth embodiment.

In the aforementioned channel selector valves 51, 61, 71, 81 and 91 according to the fifteenth to nineteenth embodiments, respectively, the cam groove 53j is formed over whole circumference of the valve housing 53 and the rotating shaft 53, instead the cam groove 53j may be formed on a partial circumference thereof.

Figure 58:
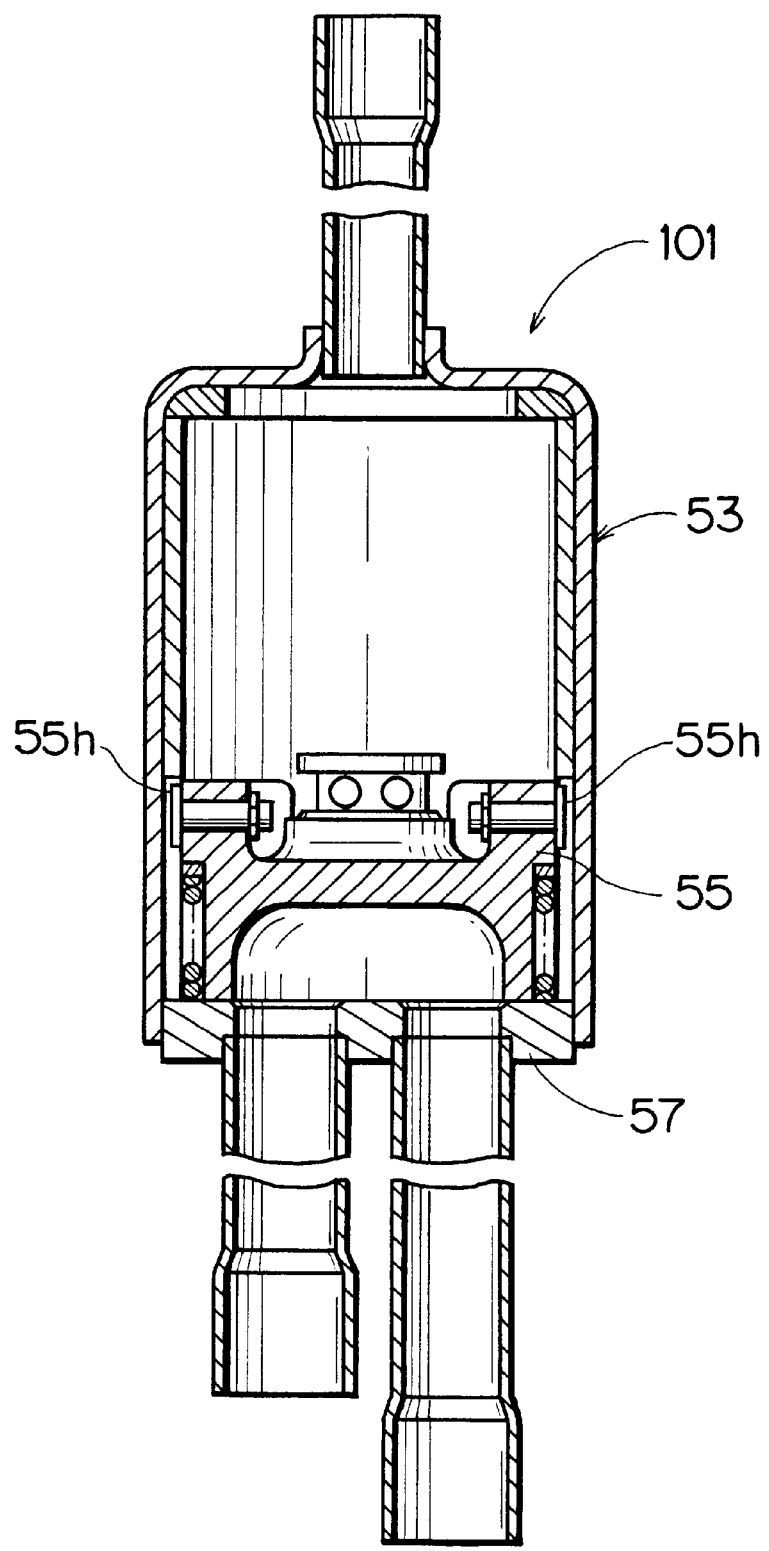
FIG. 58 is a sectional view of a channel selector valve according to a twentieth embodiment of the present invention, which can be employed as the rotary channel selector valve of FIG. 35.

A channel selector valve according to a twentieth embodiment shown in FIG. 58 has such a construction mentioned just above, and the channel selector valve 101 according to the twentieth embodiment is different from the channel selector valve 51 according to the sixteenth embodiment shown in FIG. 36 in points that each guide pin has a rectangular shape in its top view and is attached to the main valve element 55 to move rotatively and that the cam groove 53k on the inner circumferential surface of the valve housing 53 is not formed over the whole circumference of the valve housing 53 but formed divided in two independently with each other.

Figure 59:
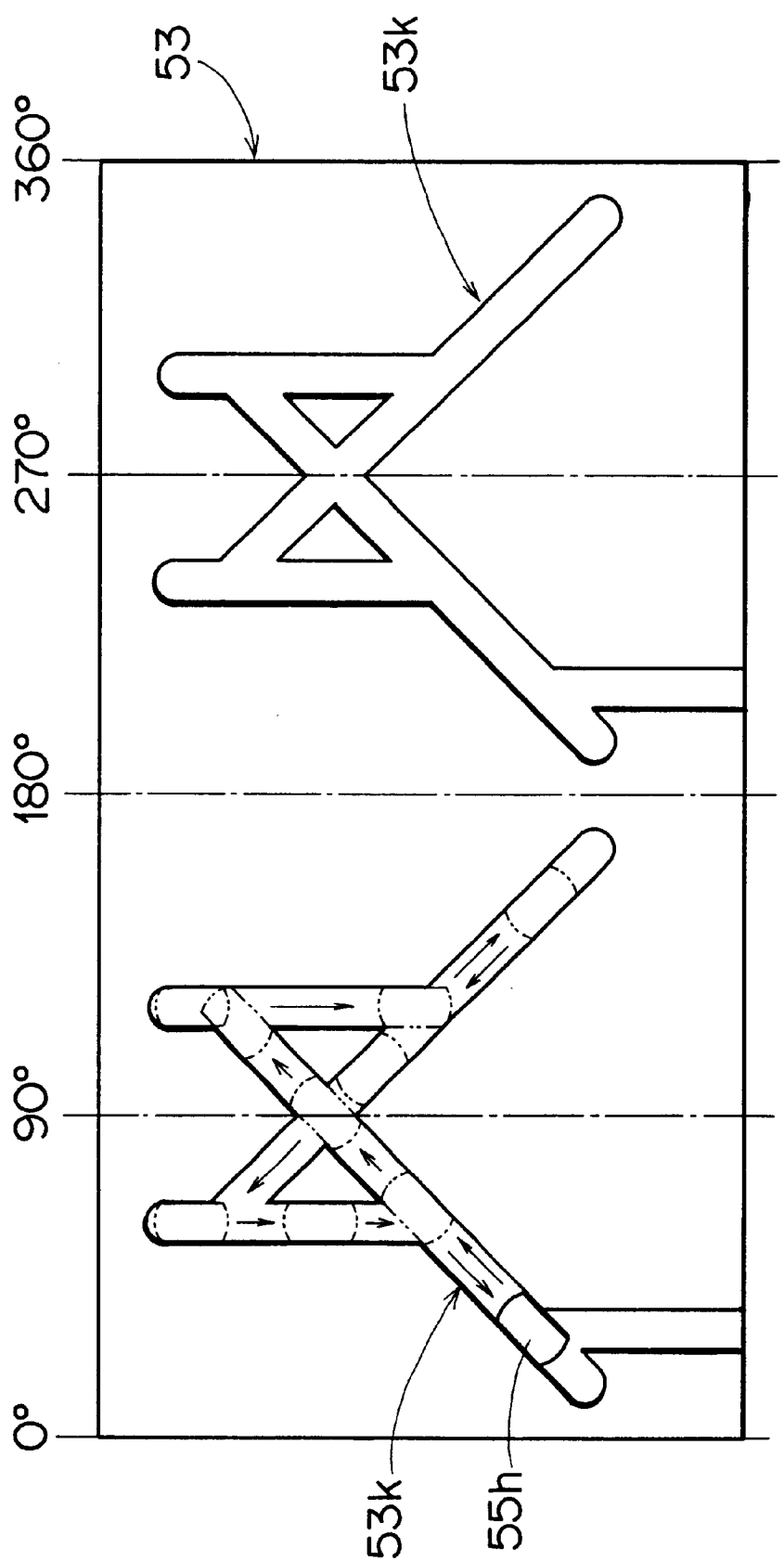
FIG. 59 is a development of a cam groove of FIG. 58.

In the channel selector valve 101 according to the twentieth embodiment, when the main valve element 55 moves in the direction nearer to or away from the valve seat 57, as shown in FIG. 59, each guide pin 55h moves back and forth in a X-shape channel along the cam groove 53k with changing its direction properly, thereby the main valve element 55 rotatively moves back and forth within the predetermined angles with respect to the valve housing 53.

In the channel selector valve 101 according to the twentieth embodiment, constitutions of a low pressure side communication groove and a high pressure side communication channel of the main valve element 55 and constitutions of a port of a valve seat 57 and so on are different from those of the channel selector valves 51, 61, 71, 81 and 91 according to the fifteenth to nineteenth embodiments, respectively.

However the primary part of the channel selector valve 101 is the constitution for transforming the movement of the main valve element 55 in the direction nearer to or away from the valve seat 57 to the rotation of the main valve element 55 in a circumferential direction and is not a structure of the main valve element 55 or the valve seat 57 for channel selection, therefore an explanation of the structure of the main valve element 55 and the valve seat 57 will be omitted.

The channel selector valve 101 according to the twentieth embodiment constructed as described above gives a similar effect with that of the channel selector valve 51 according to the fifteenth embodiment.

In the above, preferred embodiments of the channel selector valve according to the present invention are explained, then in the following, a preferred embodiment of a compressor with a channel selector valve according to the present invention will be explained.

Figure 60:
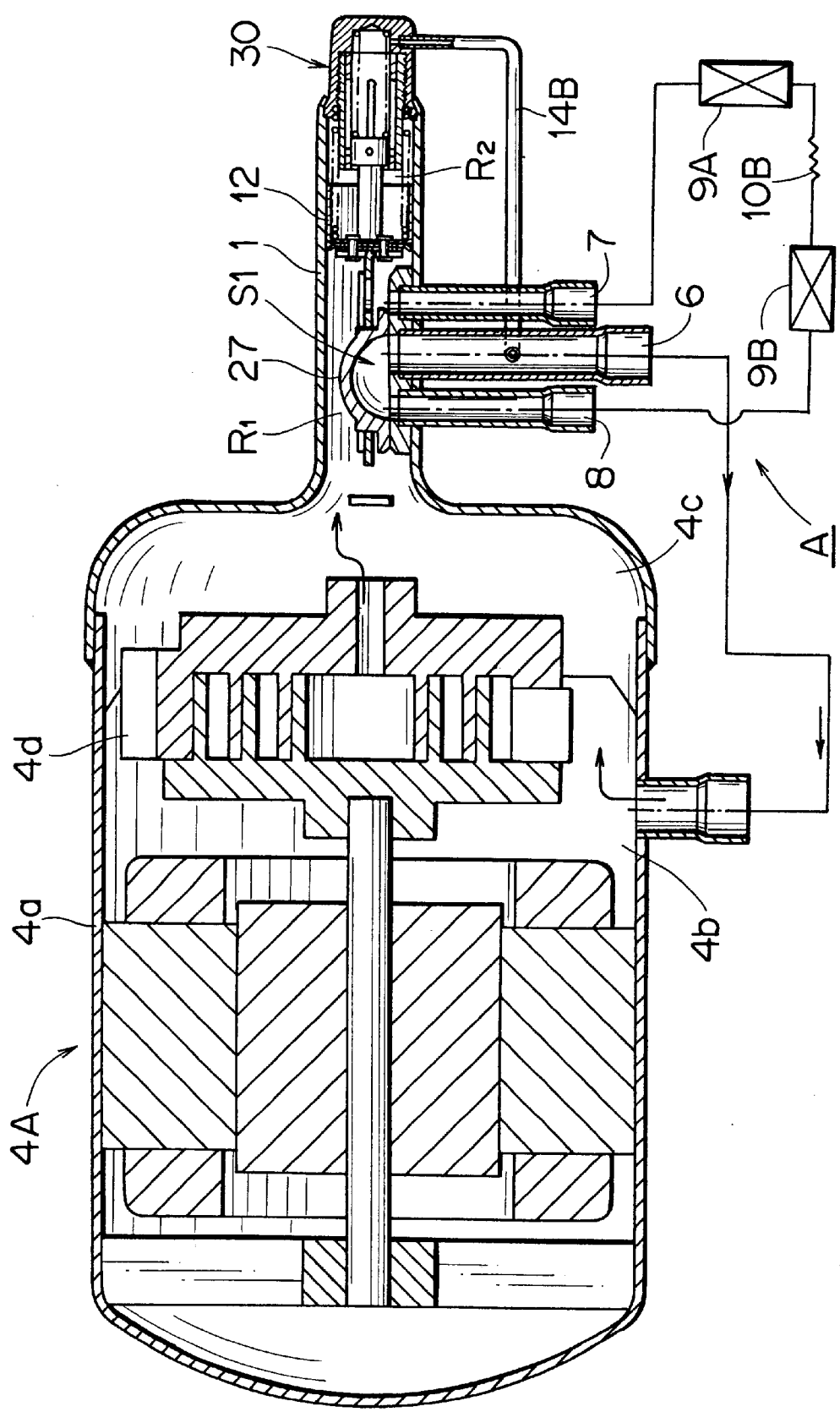
FIG. 60 is a view illustrating a schematic constitution of a refrigerating cycle employing a compressor with a channel selector valve according to a twenty first embodiment of the present invention.

FIG. 60 is a view illustrating a schematic constitution of a refrigerating cycle employing a compressor with a channel selector valve according to a twenty first embodiment of the present invention, in which the same abbreviation numerals with those used for the corresponding identical members or parts of the refrigerating cycle according to the fifth embodiment shown in FIG. 9 are used.

The compressor with a channel selector valve according to a twenty first embodiment, an operation state of which in the heating mode is shown by its sectional view in FIG. 60, is constructed by integrating the channel selector valve according to the fifth embodiment of the present invention shown in FIG. 9 with a compressor body 4A shown in FIG. 60.

The compressor body 4A comprises: a compressor housing 4a; a low pressure chamber 4b provided in the compressor housing 4a communicating with the inlet pipe 6; a high pressure chamber 4c provided in the compressor housing 4a and partitioned from the low pressure chamber 4b; and a compressing section 4d provided in the compressor housing 4a, which compresses a refrigerant introduced from the inlet pipe 6 into the low pressure chamber 4b and guides the refrigerant to the high pressure chamber 4c.

The compressor body 4A constructed as described above integrates the compressor housing 4a part, which partitions the high pressure chamber 4c of the compressor housing 4a in the interior thereof, with the reversing valve housing 1 in the channel selector valve according to the fifth embodiment and communicates the high pressure chamber 4c to the high pressure chamber $R_1$ of the reversing valve housing 1.

Consequently, in the compressor body 4A, the part that partitions the high pressure chamber 4c of the compressor housing 4a in the interior thereof functions as the outlet pipe 5 that guides a high pressure refrigerant compressed in the compressing section 4d to the high pressure chamber $R_1$ of the reversing valve housing 1.

As to the compressor with a channel selector valve according to a twenty first embodiment constructed as described above, the compressor body 4A is operated similarly to the operation of the compressor 4 in the refrigerating cycle according to the fifth embodiment, thereby the piston cylinder 12 of the reversing valve housing 1 can be selected between the first and second positions.

According to the compressor with a channel selector valve of the twenty first embodiment thus constructed, the same effect with that of the channel selector valve according to the fifth embodiment can be obtained, moreover, since the channel selector valve is integrated with the compressor, a laying pipes for connection can be omitted, thereby the construction can be simplified.

The above construction prevents a leak of the refrigerant from occurring at a connection point of a pipe laying between the high pressure chambers 4c and $R_1$, thereby contributing to prevention of atmospheric pollution, and since there is no current conducting part for an electromagnetic solenoid and the like around the compressor that generates oscillation, the above construction also prevents an occurrence of an electrical fault due to failure in current conduction at an electric contact and a breaking of electric wire and the like, thereby reliance of the operation can be improved.

Figure 61:
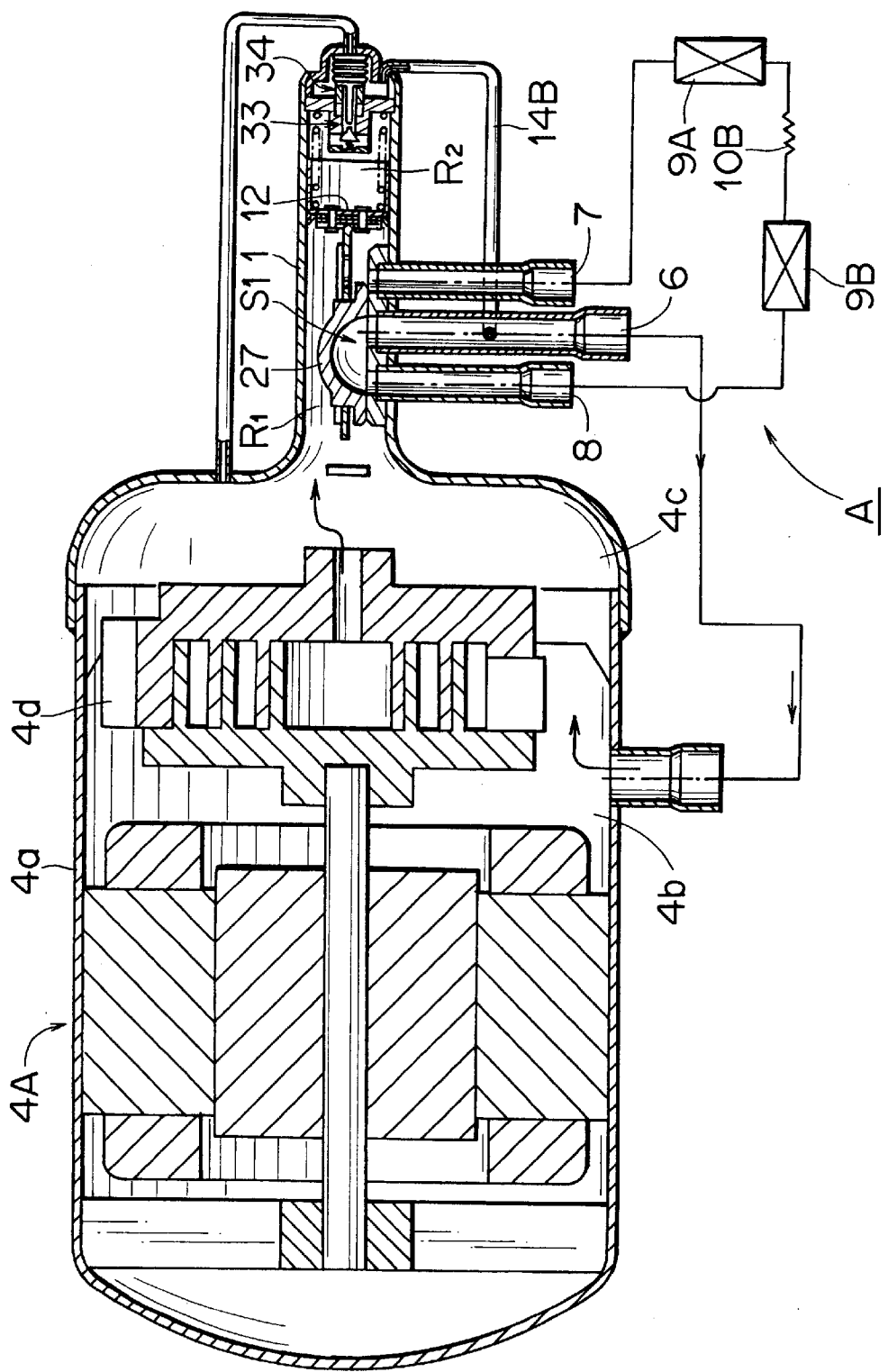
FIG. 61 is a view illustrating a schematic constitution of a refrigerating cycle employing a compressor with a channel selector valve according to a twenty second embodiment of the present invention.

A channel selector valve, which is integrated with the compressor body 4A to construct the compressor with a channel selector valve, is not limited to the channel selector valve according to the fifth embodiment shown in FIG. 9, which is employed in the compressor with a channel selector valve of the twenty first embodiment, instead, may be the channel selector valve according to the seventh embodiment of the present invention shown in FIG. 18, as shown in FIG. 61, i.e. a view illustrating a schematic constitution of a refrigerating cycle employing a compressor with a channel selector valve according to a twenty second embodiment of the present invention.

Moreover, although figures are omitted here, the channel selector valve according to sixth or eighth embodiment shown in FIG. 15 or 23, respectively, may be integrated with the compressor body 4A to construct the compressor with a channel selector valve. Furthermore, each channel selector valve explained in the respective embodiment up to the twentieth embodiment may be integrated with the compressor body 4A to construct the compressor with a channel selector valve.

When a channel selector valve except the channel selector valve according to the fifth embodiment is integrated with the compressor body 4A to construct the compressor with a channel selector valve, pipes and channels directly or indirectly connected to the pressure-transducing chamber $R_2$ and the second pressure-transducing chamber $R_5$ in each channel selector valve according to the respective embodiment is connected likewise in the compressor with a channel selector valve integrally constructed with the compressor body.

As to the compressor with the channel selector valve according to the embodiment, except the channel selector valve according to the fifth embodiment, integrally constructed with the compressor body 4A including the compressor with the channel selector valve according to the twenty first or twenty second embodiment, the channel selector valve integrated with the compressor body 4A to construct the compressor with the channel selector valve is separately constituted from the compressor 4, then the similar operation with that performed with respect to the refrigerating cycle A is performed, thereby an operation of the channel selector valve can be carried out.

By the compressor with the channel selector valve according to the embodiment, except the channel selector valve according to the fifth embodiment, integrally constructed with the compressor body 4A including the compressor with the channel selector valve according to the twenty first or twenty second embodiment, a similar effect with that of the compressor with the channel selector valve according to the twenty first embodiment can be obtained.

In each embodiment mentioned above, a channel selector valve for use to reverse a channel of the refrigerant in the refrigerating cycle and a compressor with a channel selector valve in which the channel selector valve is integrated are explained. However, the present invention can be widely applied to a channel selector valve for use to select a channel of various fluid, for example, liquid such as pressure oil and water or gas except refrigerant, a different type of channel selector valve or a compressor with a channel selector valve in which such a channel selector valve is integrated.

In the following, preferred embodiments of a device for controlling a refrigerating cycle according to the present invention will be explained with reference to the drawings.

Figure 63:
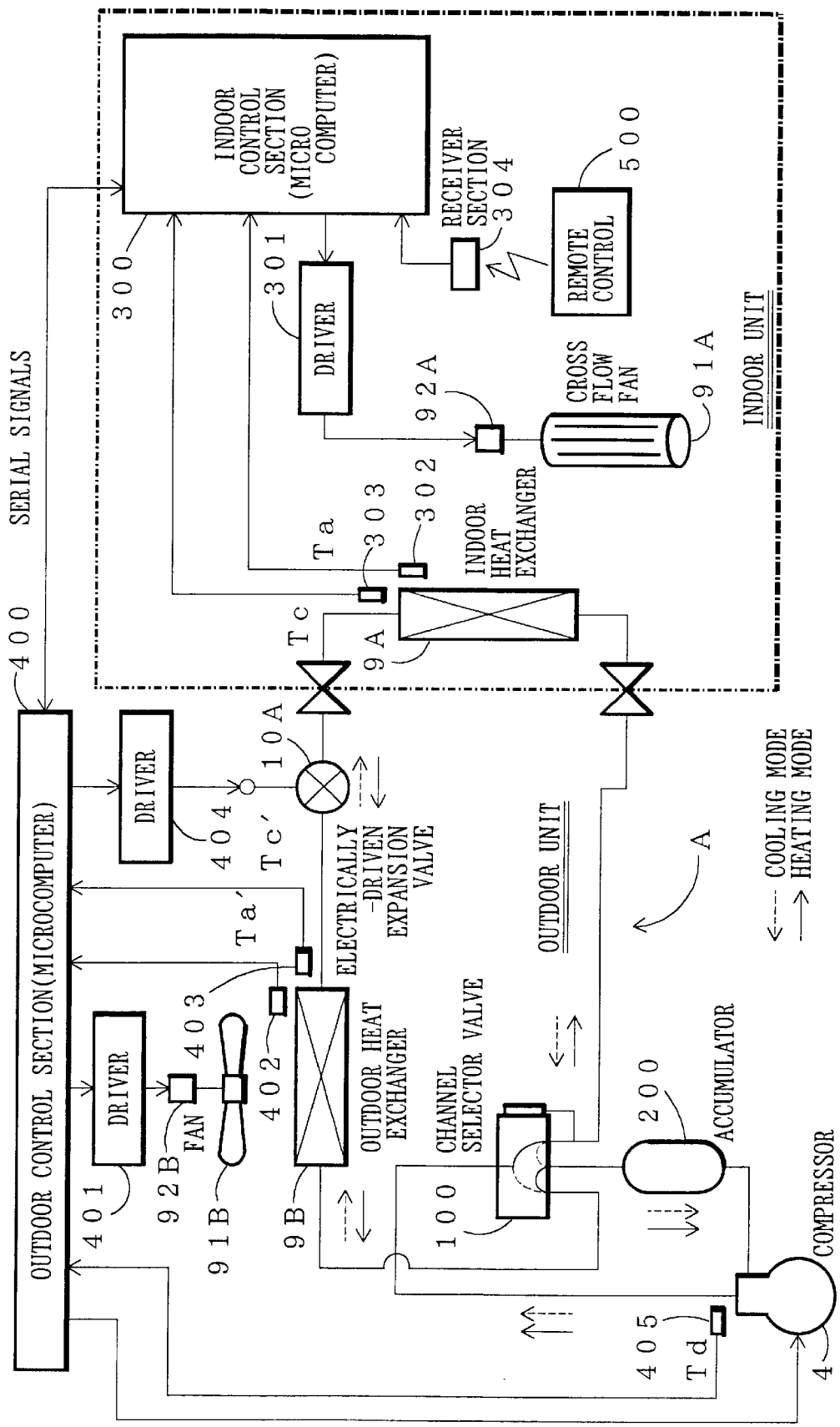
FIG. 63 is a block diagram illustrating an example of a refrigerating cycle according to an embodiment of the present invention.

FIG. 63 is a block diagram illustrating an example of a refrigerating cycle according to an embodiment of the present invention, which comprises a heat pump-type air conditioner consisting of an indoor unit (inside of alternate long and short dash line in the figure) and an outdoor unit (outside of alternate long and short dash line in the figure). In FIG. 63, an abbreviation numeral 4 denotes a compressor, 9A an indoor heat exchanger loaded in the indoor unit, 9B an outdoor heat exchanger loaded in the outdoor unit, 10A an electrically-driven expansion valve as a throttle device, 200 an accumulator, and 100 a channel selector valve. In the following embodiments, a word an electrically-driven expansion valve will be used for an explanation on the structure and a word throttle device will be used for an explanation on the function. Here, the throttle device is not limited to an electrically-driven expansion valve and may be other constitution.

An outlet of the compressor 4 is connected to the channel selector valve 100 while an inlet of the compressor 4 is connected to the channel selector valve 100 by way of the accumulator 200. The channel selector valve 100 is connected to the indoor heat exchanger 9A and the outdoor heat exchanger 9B through a pipe for heat exchanger while the electrically-driven expansion valve 10A is provided between the indoor heat exchanger 9A and the outdoor heat exchanger 9B. Thereby, the compressor 4, the channel selector valve 100, accumulator 200, the indoor heat exchanger 9A, the outdoor heat exchanger 9B and the electrically-driven expansion valve 10A constitute the refrigerating cycle A. In the refrigerating cycle A according to this embodiment, the channel selector valve 100 is any one of the various types of channel selector valve according to the following embodiments.

The compressor 4 compresses the refrigerant and the compressed refrigerant is guided into the channel selector valve 100. As will be explained later, the channel selector valve selects a channel in response to an operation mode, and the refrigerant discharged from the compressor 4 is guided into either the indoor heat exchanger 9A or the outdoor heat exchanger 9B in response to a channel selected. That is, in the heating mode, as shown in FIG. 63 by arrows, the compressed refrigerant is guided from the channel selector valve 100 into the indoor heat exchanger 9A, which functions as a condenser, the refrigerant guided from the indoor heat exchanger 9A is guided into the outdoor heat exchanger 9B, which functions as an evaporator through the electrically-driven expansion valve 10A. Then, the refrigerant evaporated in the outdoor heat exchanger 9B is guided into the compressor 4 by way of the channel selector valve 100 and the accumulator 200. On the other hand, in the cooling mode, as shown by broken lines in FIG. 63, the refrigerant compressed in the compressor 4 is circulated in order of the channel selector valve 100, the outdoor heat exchanger 9B, the electrically-driven expansion valve 10A, the indoor heat exchanger 9A, the channel selector valve 100, the accumulator 200, and the compressor 4, wherein the outdoor heat exchanger 9B functions as a condenser while the indoor heat exchanger 9A functions as a evaporator.

The indoor unit is provided with a cross flow fan 91A for sending air passing through the indoor heat exchanger 9A, and a heat exchanger motor 92A for rotating the cross flow fan 91A is controlled its rotation by an indoor control section 300 constituted with a microcomputer and the like through a driver 301, thereby a heat exchange capacity of the indoor heat exchanger 9A is controlled. An indoor temperature Ta is detected by a temperature sensor 302 while a temperature Tc of the indoor heat exchanger 9A is detected by a temperature sensor 303. A receiver section 304 receives signals of a remote control 500 such as an infrared-type, thereby the selection and setting of an operation in the indoor control section 300 can be carried out by a remote control.

The outdoor unit is provided with a fan 91B for sending air passing through the outdoor heat exchanger 9B, and a heat exchanger motor 92B for rotating the fan 91B is controlled its rotation by an outdoor control section 400 constituted with a microcomputer and the like through a driver 401, thereby a heat exchange capacity of the outdoor heat exchanger 9B is controlled. An outdoor temperature Ta is detected by a temperature sensor 402 while a temperature Tc of the outdoor heat exchanger 9B is detected by a temperature sensor 403. An outdoor control section 400 controls an opening ratio of the electrically-driven expansion valve 10A through a driver 404. Further, the outdoor control section 400 detects a temperature Td at the outlet of the compressor 4 by a temperature sensor 405 and controls the compressor 4 by a three-phase electrical power supplied from an inverter module explained later.

Figure 64:
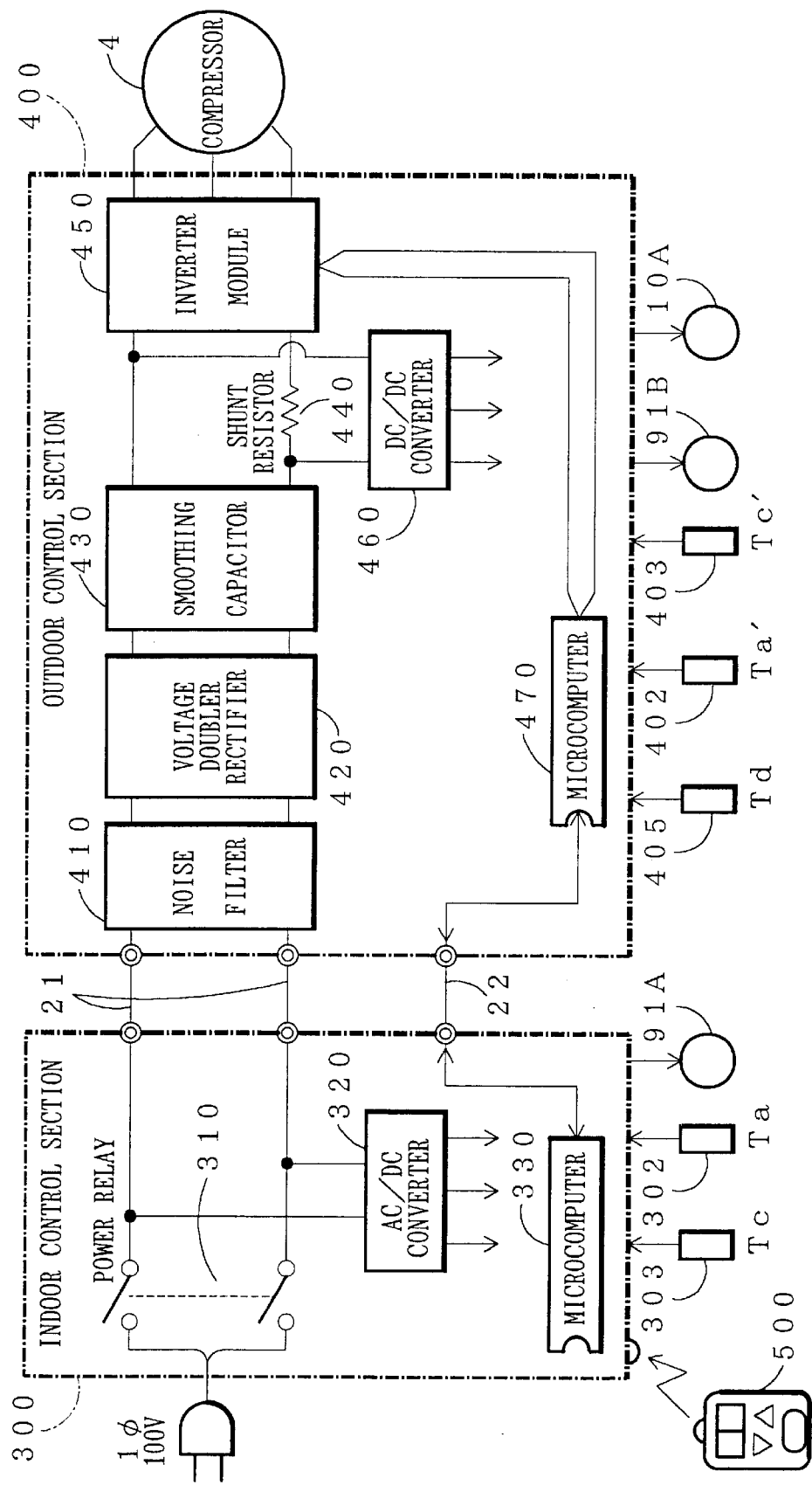
FIG. 64 is a block diagram principally illustrating an electric system of an indoor and outdoor control according to an embodiment of the present invention.

FIG. 64 is a block diagram principally illustrating an electric system of an indoor control section 300 and outdoor control section 400. The indoor control section 300 has a power relay 310 for performing an on-off action of a main power source. A single-phase alternating current of 100 V is supplied to an AC/DC converter 320 through the power relay 310, transformed into various predetermined direct current voltages by the AC/DC converter 320 and supplied to a microcomputer 330 and so on. The single-phase alternating current of 100 V supplied through the power relay 310 is also supplied to the outdoor control section 400 through a lead 21 for supplying power.

In the outdoor control section 400, an alternating current supplied is passed through a noise filter 410, rectified in a voltage doubler rectifier circuit 420 and smoothed by a smoothing capacitor 430, thereby a predetermined direct current voltage is generated. A current by the direct current thus generated is supplied to an inverter module 450 through a shunt resistor 440. A three-phase power is generated by the inverter module 450 and supplied to the compressor 4. On the other hand, an output from the smoothing capacitor 430 is transformed into a predetermined internal direct current voltage by a DC/DC converter 460 and supplied to a microcomputer 470 and so on. The microcomputer 470 outputs drive signals to the inverter module 450 so as to control an operation of the compressor 4. A capacity of the compressor 4 to compress the refrigerant is controlled by a frequency (Hz) of the drive signal, that is, the higher the frequency (Hz), the higher the capacity of compression. For example, if set 30 Hz as a first predetermined capacity and 10 Hz as a second predetermined capacity, the pressure of the refrigerant at the first predetermined capacity is higher than that at the second predetermined capacity. The microcomputer 470 performs a serial communication with the microcomputer 330 through a communication lead 22 so as to carry out a transfer of data.

Figure 62:
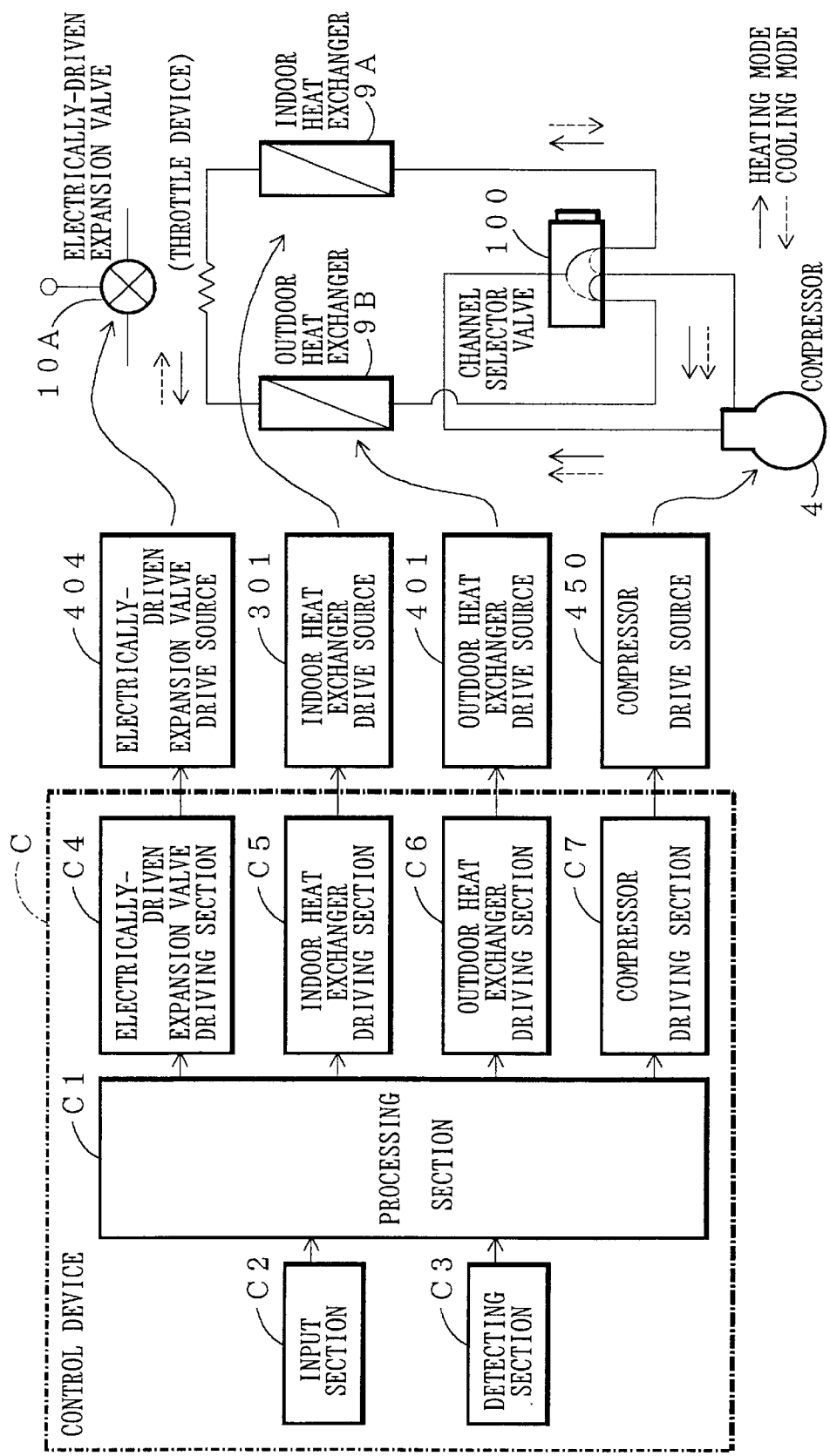
FIG. 62 is a block diagram according to an embodiment of a device for controlling a refrigerating cycle of the present invention.

FIG. 62 is a block diagram according to an embodiment of a device for controlling a refrigerating cycle of the present invention, in which each element of the block diagram corresponds to the respective element or a combination of each element in FIGS. 63 and 64. In the refrigerating cycle A, the identical element with that of FIG. 63 has the same abbreviation numeral with that of FIG. 63. A control device C shown by an alternate long and short dash line in FIG. 62 corresponds to the indoor control section 300 and the outdoor control section 400, in which a processing section C1 of the control device C corresponds to the microcomputer 330 of the indoor control section 300 and the microcomputer 470 of the outdoor control section 400. An input section C2 corresponds to the receiver section 304 of the indoor unit or a manual switch that is not shown in the figure, a detector section C3 corresponds to the temperature sensors 302, 303, 402, 403, 405, pressure detection means for detecting pressure, flow rate detection means for detecting flow rate, voltage☐current detection means for detecting voltage☐current or frequency detection means for detecting frequency, each means being not shown in the figure.

An electrically-driven expansion valve driving section C4, indoor heat exchanger driving section C5, outdoor heat exchanger driving section C6 and compressor driving section C7 are means to function when a control program according to each embodiment mentioned later is carried out. Each driving section mentioned above is a driver shown in FIG. 63.

The electrically-driven expansion valve driving section C4 outputs control signals to an electrically-driven expansion valve drive source (e.g. stepping motor) 404 and controls an opening ratio of a throttle of the electrically-driven expansion valve 10A through the electrically-driven expansion valve drive source 404. The indoor heat exchanger driving section C5 outputs control signals to an indoor heat exchanger drive source (e.g. fan motor) 301 that drives the cross flow fan 91A so as to operate or halt it in response to the control signal and controls a heat exchange capacity of the indoor heat exchanger 9A by the number of revolution. The outdoor heat exchanger driving section C6 outputs control signals to an outdoor heat exchanger drive source (e.g. fan motor) 401 that drives the cross flow fan 91B so as to operate or halt it in response to the control signal and controls a heat exchange capacity of the outdoor heat exchanger 9B by the number of revolution. The compressor driving section C7 outputs control signals to a compressor power source (e.g. inverter module or motor) 450 that controls the compressor 4 for a normal rotation, inverse rotation, start, halt and selection of its capacity. The compressor power source 450 is not limited to a motor and may be an engine.

Thus, in the refrigerating cycle A, an opening of the throttle of the electrically-driven expansion valve 10A is controlled, thereby a flow rate and a rate of change in a flow rate in the refrigerating cycle A is controlled. The indoor heat exchanger 9A and the outdoor heat exchanger 9B are driven or halted and heat exchange capacity thereof is controlled, thereby a pressure of the refrigerant in the indoor heat exchanger 9A, the outdoor heat exchanger 9B and the refrigerating cycle A is controlled. A normal rotation, inverse rotation, start, halt and selection of its capacity of the compressor 4 are controlled, thereby a pressure and a rate of change in a pressure of the refrigerant, and a flow rate and a rate of change in a flow rate of the refrigerant in the refrigerating cycle A are controlled. Consequently, a physical quantity such as a pressure, differential pressure and flow rate, and a rate of change in a physical quantity such as a rate of change in pressure, rate of change in differential pressure and rate of change in flow rate in the channel selector valve 100 in the refrigerating cycle A are controlled. Accordingly, in each embodiment of a channel selector valve mentioned later, non-electrical motive power is generated due to the physical quantity or the rate of change in the physical quantity mentioned above, then a channel is changed by the channel selector valve 100.

The control device C controls a functional component such as the electrically-driven expansion valve 10A, indoor heat exchanger 9A, outdoor heat exchanger 9B and compressor 4 in order to generate non-electrical motive power on the basis of a physical quantity concerning an operation control of the refrigerating cycle such as a pressure, temperature, flow rate, voltage, current, electric frequency and mechanical oscillation frequency. The refrigerating cycle is not limited to a heat pump-type air-conditioner and may be a heat pump-type chiller unit, engine drive-type or car air-conditioner.

Figure 65:
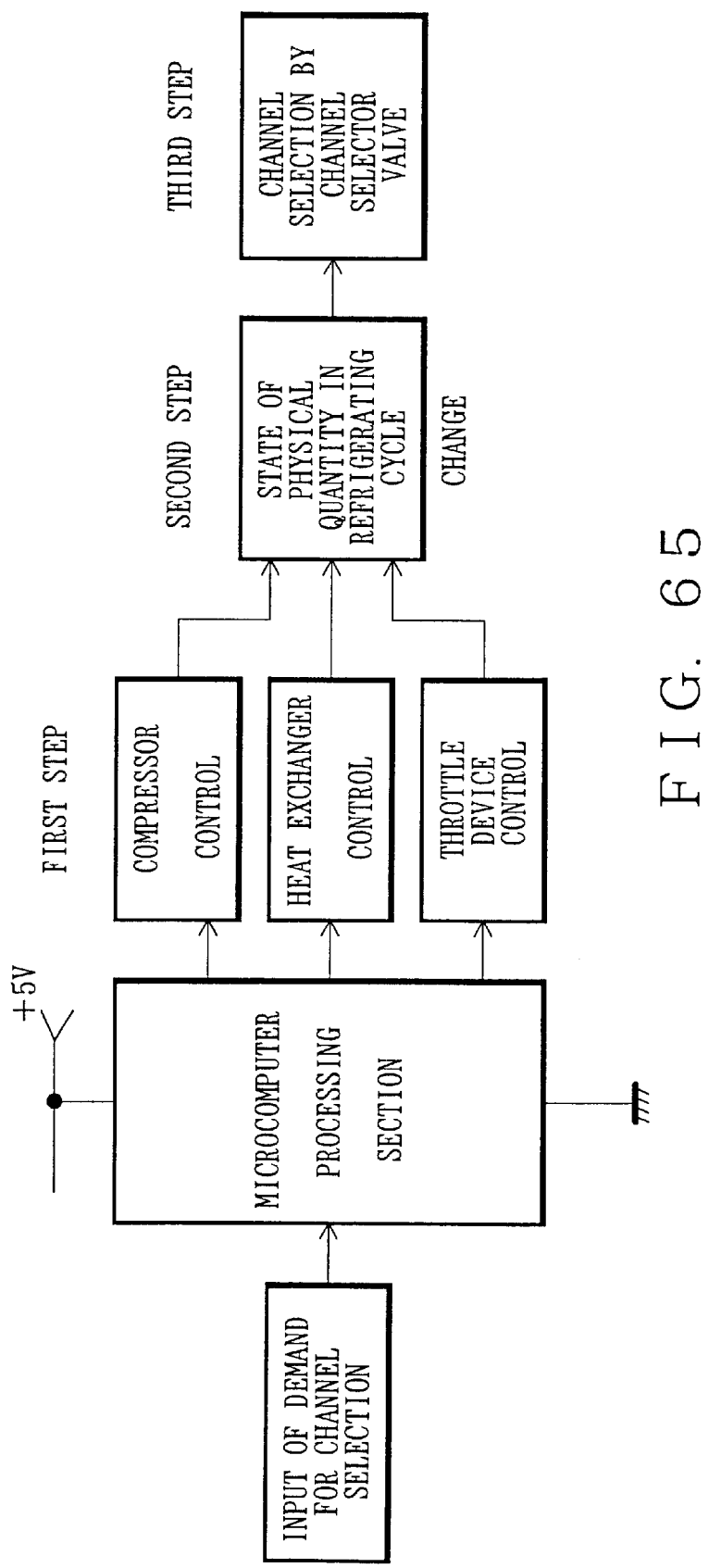
FIG. 65 is a block diagram illustrating a flow of signal and action according to an embodiment of a device for controlling a refrigerating cycle of the present invention.

FIG. 65 is a block diagram illustrating a flow of signal and action according to an embodiment of a device for controlling a refrigerating cycle of the present invention, in which an instruction for a heating or cooling operation by the remote control 500 and so on, or a demand for change of a channel by the channel selector valve through a change of the operation mode is inputted in the control section C. Then, as a first step, the control section C outputs signals with respect to "control of the compressor", "control of the heat exchanger" or "control of the throttle device". Then, as a result of various controls mentioned above, as a second step, a state of the physical quantity or the rate of change in the physical quantity of the refrigerating cycle changes, thereby, as a third step, a selector operation is carried out in a channel selector valve 100 according to each embodiment described later. The electrically-driven expansion valve 10A is an example of the throttle device.

Thus, in the present invention, an electric conduction to an electromagnetic coil by e.g. a relay contact or a semiconductor-type switch is not employed in order to select a channel by the channel selector valve.

In the following, some actual examples of control operation corresponding to the channel selector valve 100 or 50 according to the embodiment mentioned above will be explained.

In the following, a control operation of the control device C that controls the channel selector valve according to the first embodiment will be explained with reference to a flow chart. The processing section C1 of the control device C performs a control action by the microcomputer 330 of the indoor control section 300 and the microcomputer 470 of the outdoor control section 400. These microcomputers 330 and 470 in cooperation perform a control corresponding to each flow chart explained below with performing a transfer of data by a serial communication.

Figure 66:
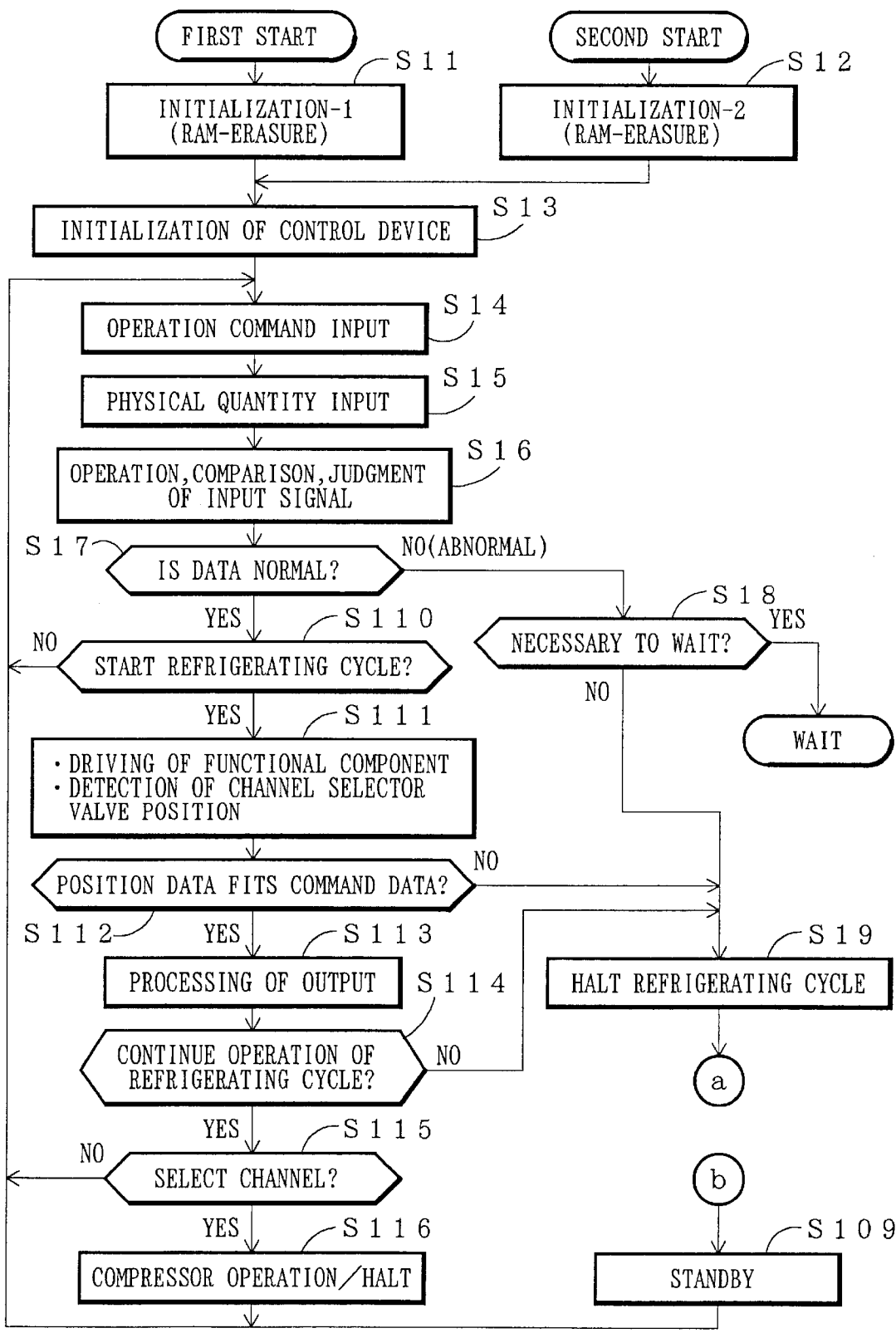
FIG. 66 is a part of a flow chart of a main routine according to an embodiment of the present invention.
Figure 67:
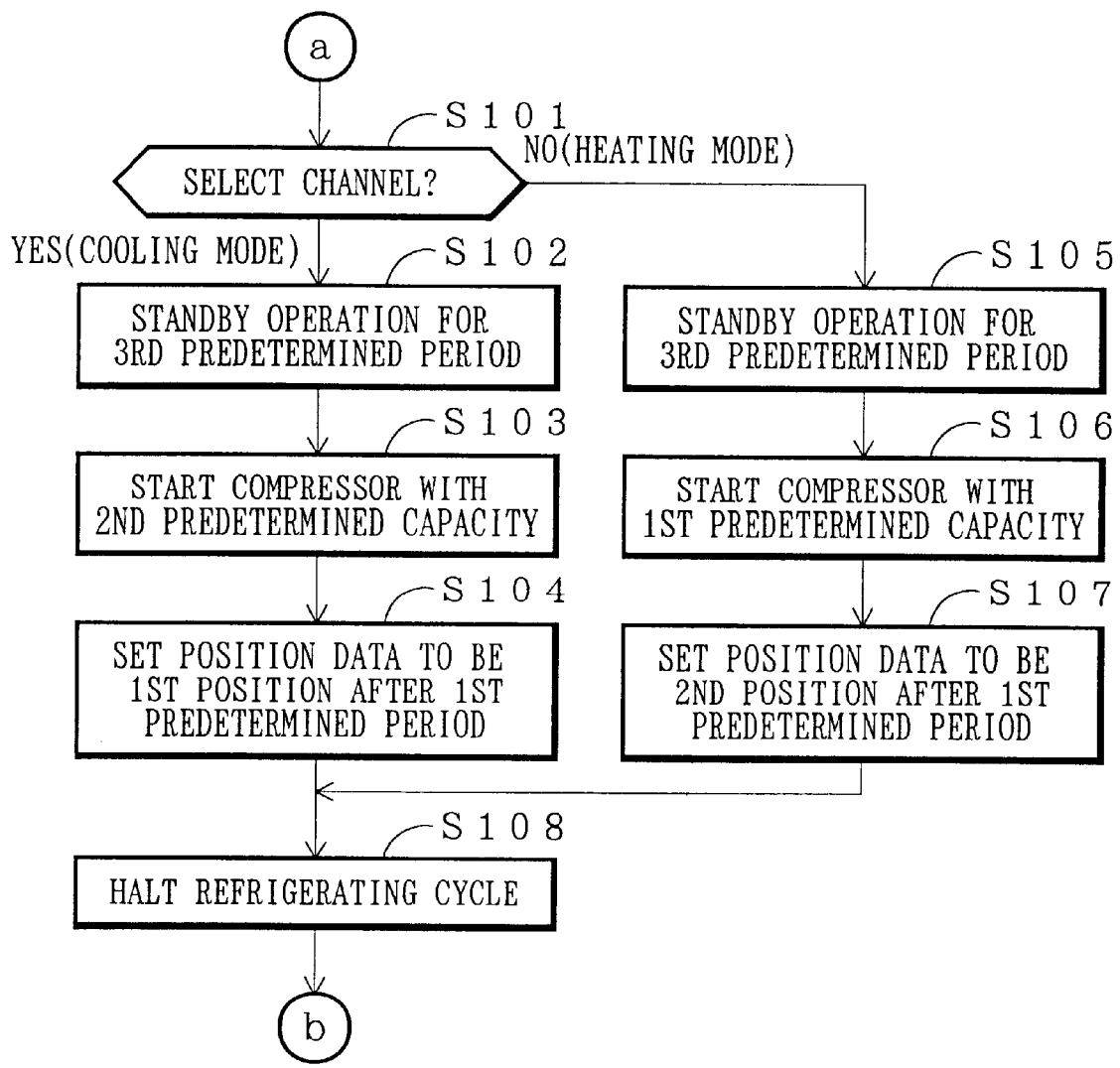
FIG. 67 is another part of a flow chart of a main routine according to an embodiment of the present invention.

FIGS. 66 and 67 are a part of a flow chart of a main routine, which is common as to the channel selector valve according to each embodiment from the first to twenty second embodiment. In the main routine, a power-on reset at a first priority level sets a first start, then at step S11 "initialization processing—1" such as a whole clear of RAM is performed so as to proceed to step S23. A second priority level by a reset of a watchdog timer or a calling off of a wait sets a second start, then "initialization processing—2" such as a partial clear of RAM is performed to proceed to step S13.

At step S13, an initialization processing of the control device is performed, then at step S14 an input processing of an operation instruction, which inputs operation signals by the remote control 500 or a switch, is performed, then at step S15 an input processing, which inputs a physical quantity concerning an operation control of the refrigerating cycle such as a pressure, temperature, flow rate, voltage, current, electric frequency and mechanical oscillation frequency is performed, and then at step S16 a general processing, which performs computation, comparison, judgement, determination of a control condition of the refrigerating cycle and so on, is performed so as to proceed to step S17.

At step S17, it is judged whether a data is normal or abnormal as a result of the processing. If abnormal, in step S18 it is judged whether a degree of the abnormality requires a standby or not, then if required, the standby is set, and if not required, an operation of the refrigerating cycle is halted at step S19, then the system proceeds to step S101 in FIG. 67. At step S101, it is judged whether the command is "select channel" or not, then if so, the system proceeds to step S102, and if not so, the system proceeds to step S105. At step S102 the operation is set standby for a third predetermined period of time (about 30 seconds), at step S103 an operation of the compressor 4 is started with a second predetermined capacity (e.g. 10 Hz), and at step S104 the position data is set to be the first position after a first predetermined period of time (about 10 seconds), then the system proceeds to step S108. At step 108, an operation of the refrigerating cycle is halted, then the system proceeds to step S109 in FIG. 66. At step S109, the system is on standby for a predetermined period of time until restart, then comes back to step S14.

On the other hand, if a data is normal at step S17, it is judged whether an operation of the refrigerating cycle is to be started or not, and if not, the system comes back to step S14, and if to be started, the system proceeds to step S111. At step S111, by each sub routine mentioned later, a drive processing of the functional component such as the compressor, electrically-driven expansion valve and heat exchange motor in response to each embodiment and a detection processing for detecting a position of the movable member (e.g. the piston cylinder 12) of the channel selector valve are performed, thereby a control of selection of the channel selector valve according to each embodiment is carried out.

At step S112, it is judged whether a position data of the movable member of the channel selector valve coincides with a command data or not, then if not, the system proceeds to step S19, and if coincides, various output processing such as a display is performed at step S113, then the system proceeds to step S114. At step S114, it is judged whether an operation of the refrigerating cycle is to be continued or not, then if not, the system proceeds to step S19, and if to be continued, at step S115 it is judged whether the command is "select channel" or not. If not, the system comes back to step S14, while if so, the system performs a processing of an operation or halt of the compressor in response to each embodiment at step S116, then comes back to step S14.

Figure 68:
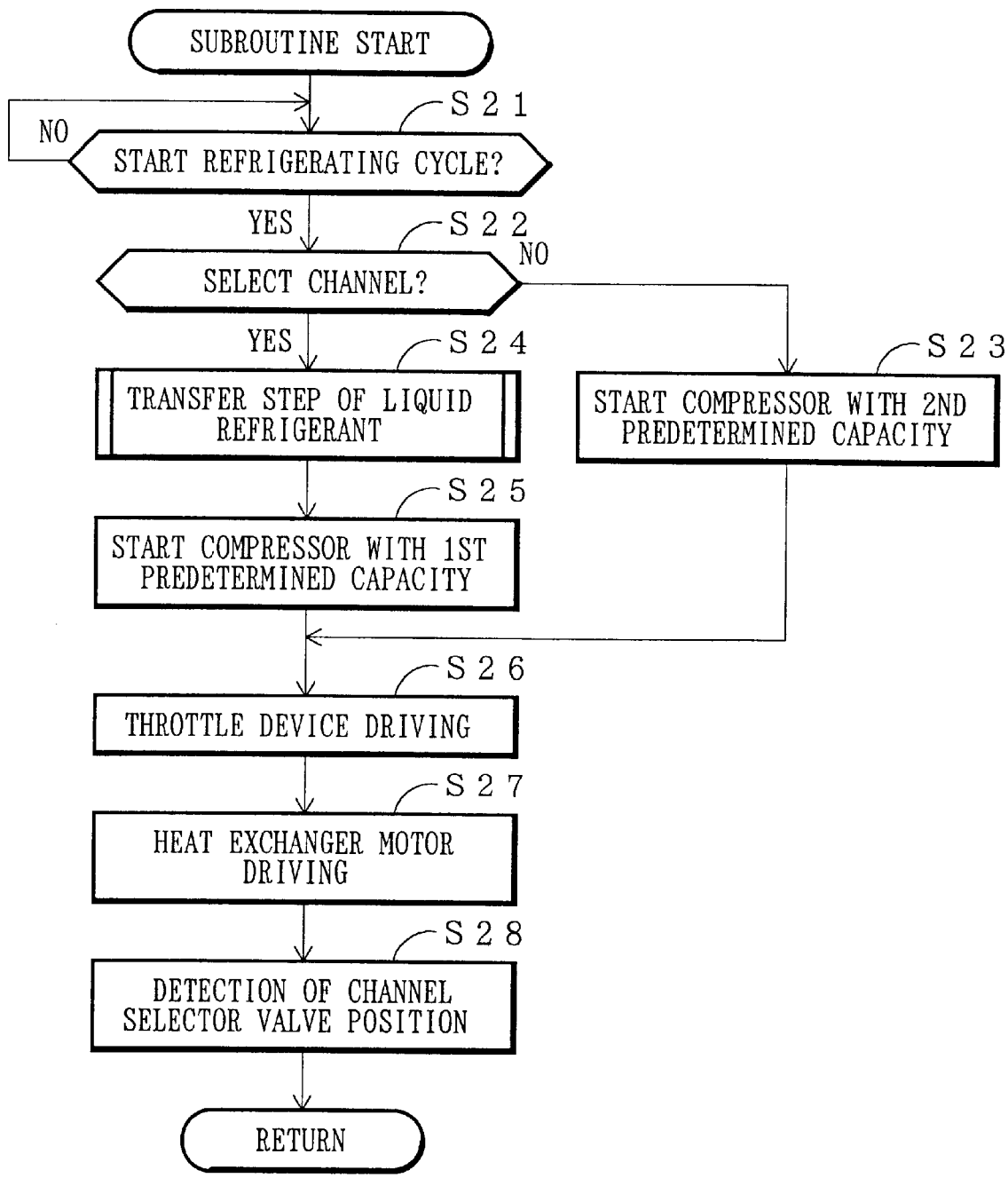
FIG. 68 is a flow chart of a sub-routine for a channel selector valve according to the first embodiment of the present invention.
Figure 69:
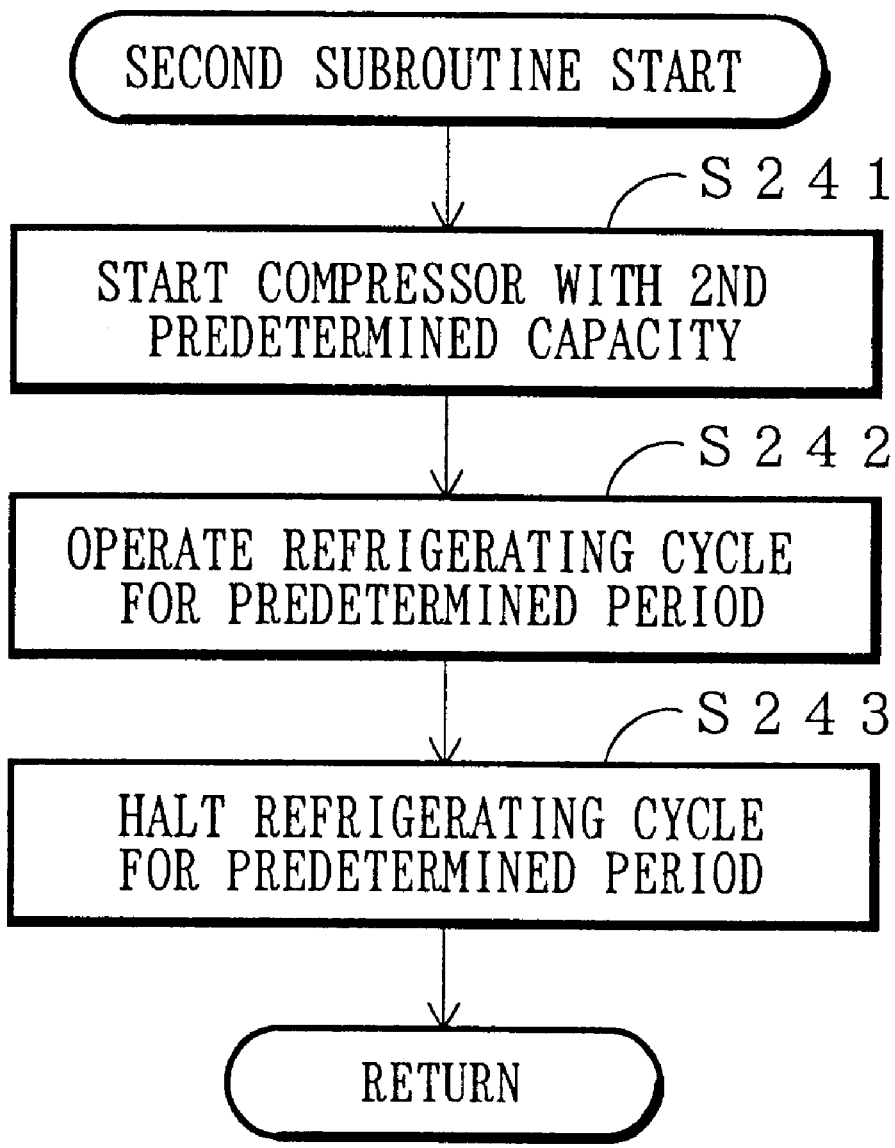
FIG. 69 is a flow chart of steps of transferring liquid refrigerant according to an embodiment of the present invention.

FIG. 68 is a flow chart of a sub-routine (step S111) for a channel selector valve (FIGS. 1 and 2) according to the first embodiment of the present invention. At step S21, it is watched whether an operation of the refrigerating cycle is to be started or not, and if to be started, it is judged whether the command is "select channel" or not at step S22. If not, an operation of the compressor 4 is started with a second predetermined capacity (e.g. 10 Hz), then the system proceeds to step S26, while if the command is "select channel", a processing for transferring the liquid refrigerant in FIG. 69 is performed at step S24, then an operation of the compressor 4 is started with a first predetermined capacity (e.g. 30 Hz) at step S25 and then, the system proceeds to step S26. Here, the step S23 corresponds to claim 87 and the step S25 corresponds to claim 76.

At step S26 a drive processing (normal processing) of the throttle device is performed, at step S27 a drive processing (normal processing) of the heat exchanger motor is performed, and at step S28 a detection processing of a position of the channel selector valve is performed, thereby the system comes back to a main routine. In this detection processing of a position of the channel selector valve, a state of a channel in the channel selector valve, i.e. a position of the movable member is detected by comparing a temperature Tc of the indoor heat exchanger 9A with a temperature Tc' of the outdoor heat exchanger 9B. The state of a channel in the channel selector valve may be detected by comparing a pressure of the indoor heat exchanger 9A with a pressure of the outdoor heat exchanger 9B. When a slide valve 27 of the channel selector valve moves, there is a short cycle mode (a phenomenon that a high pressure side is connected to a low pressure side) even though it appears in a short period of time. At this time, there is a load change of the compressor 4, which appears as a fluctuation in a load current. Therefore, such a method may be employed that a state of selection of the channel selector valve is detected by watching the load current when the command "select channel" by the channel selector valve is set. For this purpose, the load current is watched by detecting a voltage between both ends of a shunt resistor shown in FIG. 64.

A processing for transferring a liquid refrigerant shown in FIG. 69 corresponds to claim 77. At step S241 an operation of the compressor 4 is started with a second predetermined capacity (e.g. 10 Hz), at step S242 an operation of the refrigerating cycle is performed for a fourth predetermined period of time (equal to or longer than about three minutes), and at step S243 an operation of the refrigerating cycle is halted for a fifth predetermined period of time (shorter than about three minutes), then the system comes back to the former routine. This processing for transferring a liquid refrigerant may be omitted, although the movable member easily moves, if this processing is included.

In the processing of an operation or halt of the compressor at step S116 of the main routine, the compressor 4 is operated with a third predetermined capacity (e.g. 5 Hz) in the first embodiment and the system comes back to step S14, which corresponds to claim 83.

With the processings described above, when a channel is not switched by the channel selector valve, the movable member is held at the first position at step S23, while when a channel is switched, the movable member is moved from the first position to the second position at step S25.

If a connection relationship between the pipes 7 and 8 and heat exchangers 9A and 9B in the first embodiment is reversed, a control of the system can be performed in such a manner that the piston cylinder 12 is situated at the second position in the heating mode and that the piston cylinder 12 is situated at the first position in the cooling mode.

Figure 70:
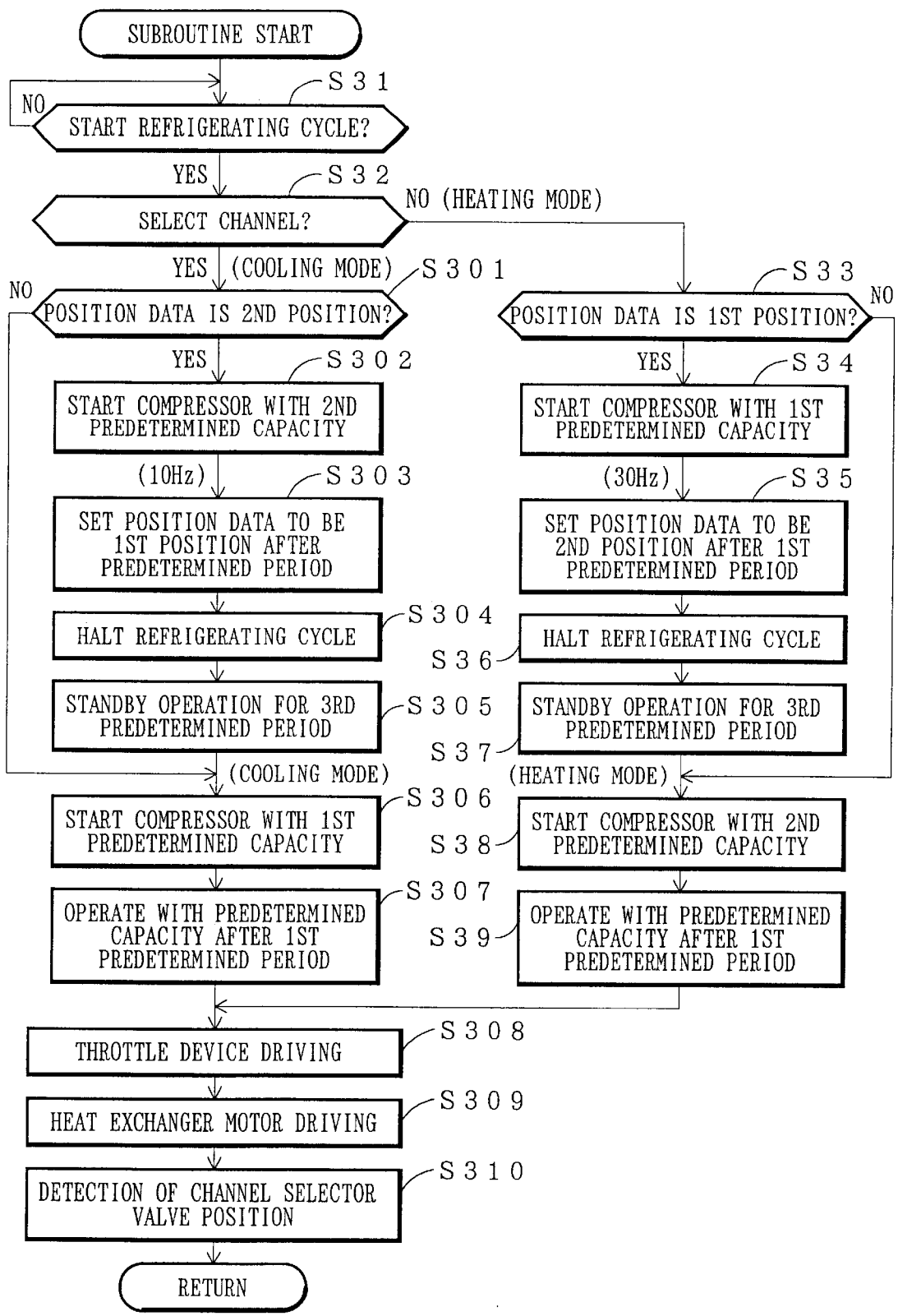
FIG. 70 is a flow chart of a sub-routine for a channel selector valve according to the second embodiment of the present invention.

FIG. 70 is a flow chart of a sub-routine (step S111 in FIG. 66) for a channel selector valve (FIGS. 9 to 14) according to the fifth embodiment of the present invention. At step S31 it is watched whether an operation of the refrigerating cycle is to be started or not, and if to be started, it is judged whether the command is "select channel" or not at step S32. If the command is not "select channel", it is judged whether the position data is the first position or not, and if not the first position, the system proceeds to step S38, while if the first position, an operation of the compressor 4 is started with a first predetermined capacity (e.g. 30 Hz) at step S34 and the position data is renewed to the second position after a first predetermined period of time (e.g. about 10 seconds) at step S35. Then, at step S36 an operation of the refrigerating cycle is halted, at step S37 the operation is set standby for a third predetermined period of time (about 30 seconds) and then, the system proceeds to step S38. At step S38 an operation of the compressor 4 is started with a second predetermined capacity (e.g. 10 Hz), at step S39 the compressor 4 is operated with a predetermined capacity (corresponding to a load) after a first predetermined period of time (about 10 seconds) and then, the system proceeds to step S308.

On the other hand, if the command is "select channel" at step S32, it is judged whether the position data is the second position or not at step S301, and if not the second position, the system proceeds to step S306, while if the second position, an operation of the compressor 4 is started with a second predetermined capacity (e.g. 10 Hz) at step S302, then the position data is renewed to the first position after a first predetermined period of time (about 10 seconds) at step S303. Then, at step S304 an operation of the refrigerating cycle is halted, at step S305 the operation is set standby for a third predetermined period of time (about 30 seconds), and the system proceeds to step S306. At step S306 an operation of the compressor 4 is started with a first predetermined capacity (e.g. 30 Hz), at step S307 the compressor 4 is operated with a predetermined capacity (corresponding to a load) after a first predetermined period of time (about 10 seconds), then the system proceeds to step S308.

At step S308 a drive processing (normal processing) of the throttle device is performed, at step S309 a drive processing (normal processing) of the heat exchanger motor is performed, and at step S310 a detection processing of a position of the channel selector valve is performed similarly to the step S28, then the system comes back to the main routine (FIG. 66). The steps S34 to S37 and S302 to S305 correspond to claim 74.

In the processing of an operation or halt of the compressor at step S116 of the main routine, a processing to halt an operation of the compressor 4 is performed in the fifth embodiment and following each embodiment starting with the ninth embodiment, and then the system comes back to step S14, which corresponds to claim 83.

In the channel selector valve according to the fifth embodiment, if a connection relationship between the pipes 7 and 8 and heat exchangers 9A and 9B is reversed, a position of selection of a channel is reversed in response to the operation mode.

A processing to perform a control of selection of the channel selector valve according to the thirteenth embodiment and the channel selector valve 51 according to the fifteenth embodiment is similar to a control of the channel selector valve according to the fifth embodiment shown in FIG. 70, in which the channel selector valve 51 is controlled by controlling an operation of the compressor 4.

Figure 71:
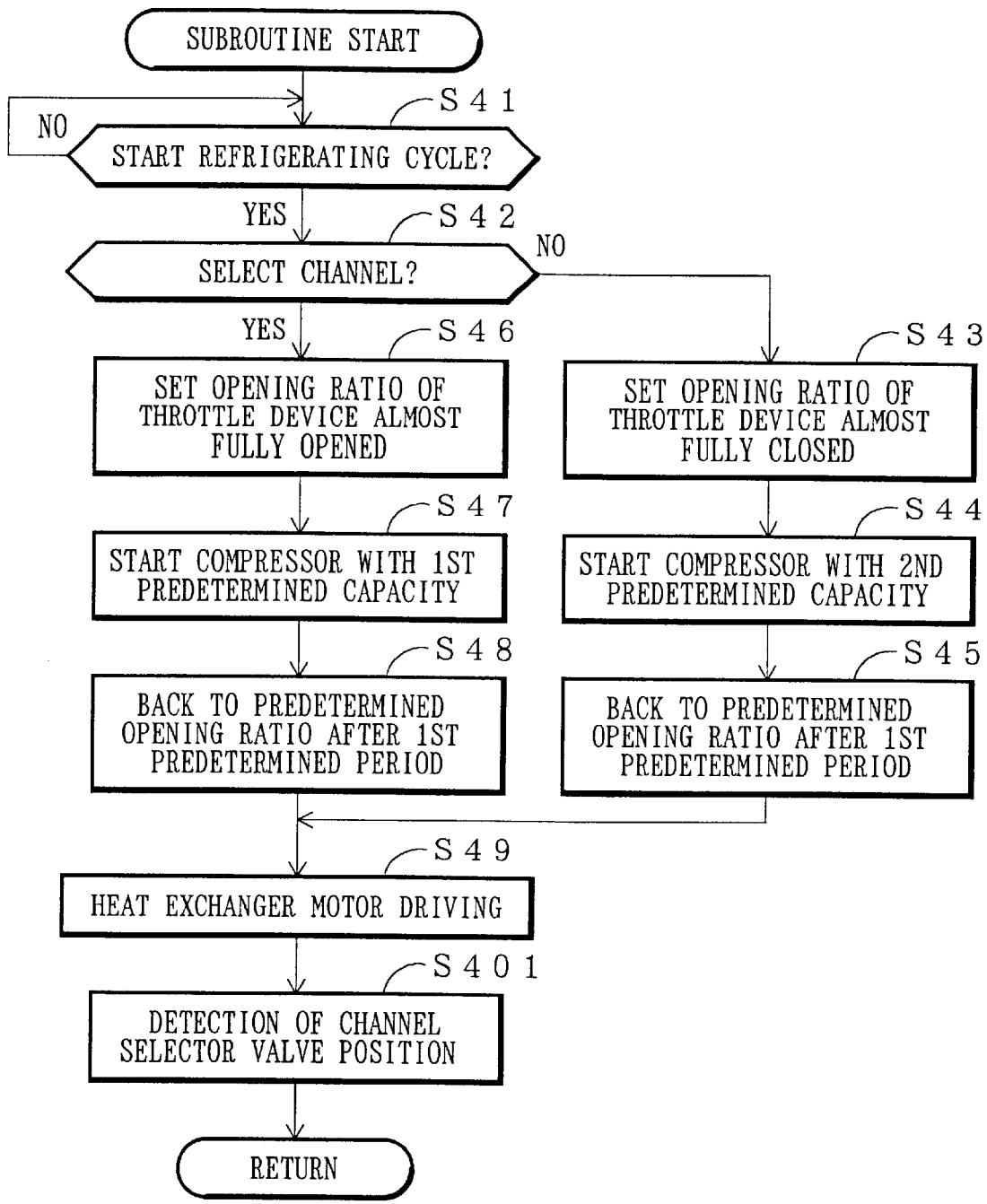
FIG. 71 is a flow chart of a sub-routine for a channel selector valve according to the third embodiment of the present invention.

FIG. 71 is a flow chart of a sub-routine (step S111 in FIG. 66) for a channel selector valve (FIGS. 24 to 27) according to the ninth embodiment of the present invention. At step S41 it is watched whether an operation of the refrigerating cycle is to be started or not, and if to be started, it is judged whether the command is "select channel" or not at step S42. If the command is not "select channel", an opening ratio of the electrically-driven expansion valve is set almost fully closed, at step S44 an operation of the compressor 4 is started with a second predetermined capacity (e.g. 10 Hz), at step S45 the opening ratio of the electrically-driven expansion valve is set back to a predetermined opening ratio (corresponding to a load) after a first predetermined period of time (about 10 seconds), then the system proceeds to step S49.

On the other hand, if the command is "select channel" at step S42, the opening ratio of the electrically-driven expansion valve is set almost fully opened at step S46, an operation of the compressor 4 is started with a first predetermined capacity (e.g. 30 Hz) at step S47, the opening ratio of the electrically-driven expansion valve is set back to a predetermined opening ratio (corresponding to a load) after a first predetermined period of time (about 10 seconds) at step S48, then the system proceeds to step S49.

At step S49 a drive processing (normal processing) of the throttle device is performed, and at step S401 a detection processing of a position of the channel selector valve is performed similarly to the step S28, then the system comes back to the main routine (FIG. 66). The steps S43 and S46 correspond to claim 78, while the step S48 corresponds to claim 81.

Figure 72:
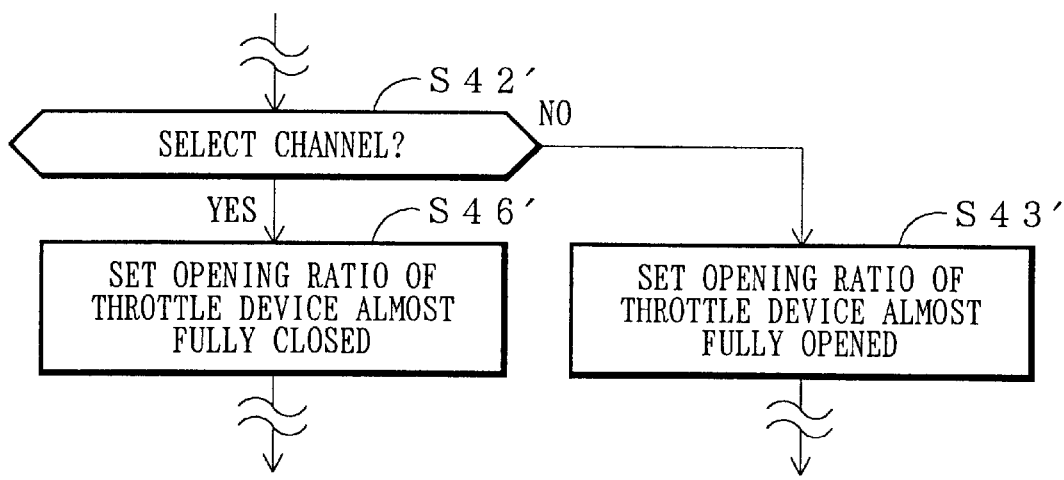
FIG. 72 is a flow chart of a sub-routine when a position of a capillary tube according to the third embodiment of the present invention is exchanged with that of an electrically-driven expansion valve.

In FIGS. 24 and 25, the capillary tube 10B is provided between the channel 14A and the indoor heat exchanger 9A and the electrically-driven expansion valve 10A is provided between the channel 14A and the outdoor heat exchanger 9B. Instead, positions of the capillary tube 10B and the electrically-driven expansion valve 10A can be changed with each other. In this case, a control can be performed by replaceing steps S42, S43 and S46 in a flow chart shown in FIG. 71 with steps S42', S43' and S46' in a flow chart shown in FIG. 72. That is, if the command is not "select channel" at step S42', an opening ratio of the electrically-driven expansion valve is set almost fully opened at step S43', then the system proceeds to step S44, while if the command is "select channel" at step S42', an opening ratio of the electrically-driven expansion valve is set almost fully closed at step S46', then the system proceeds to step S47.

Figure 73:
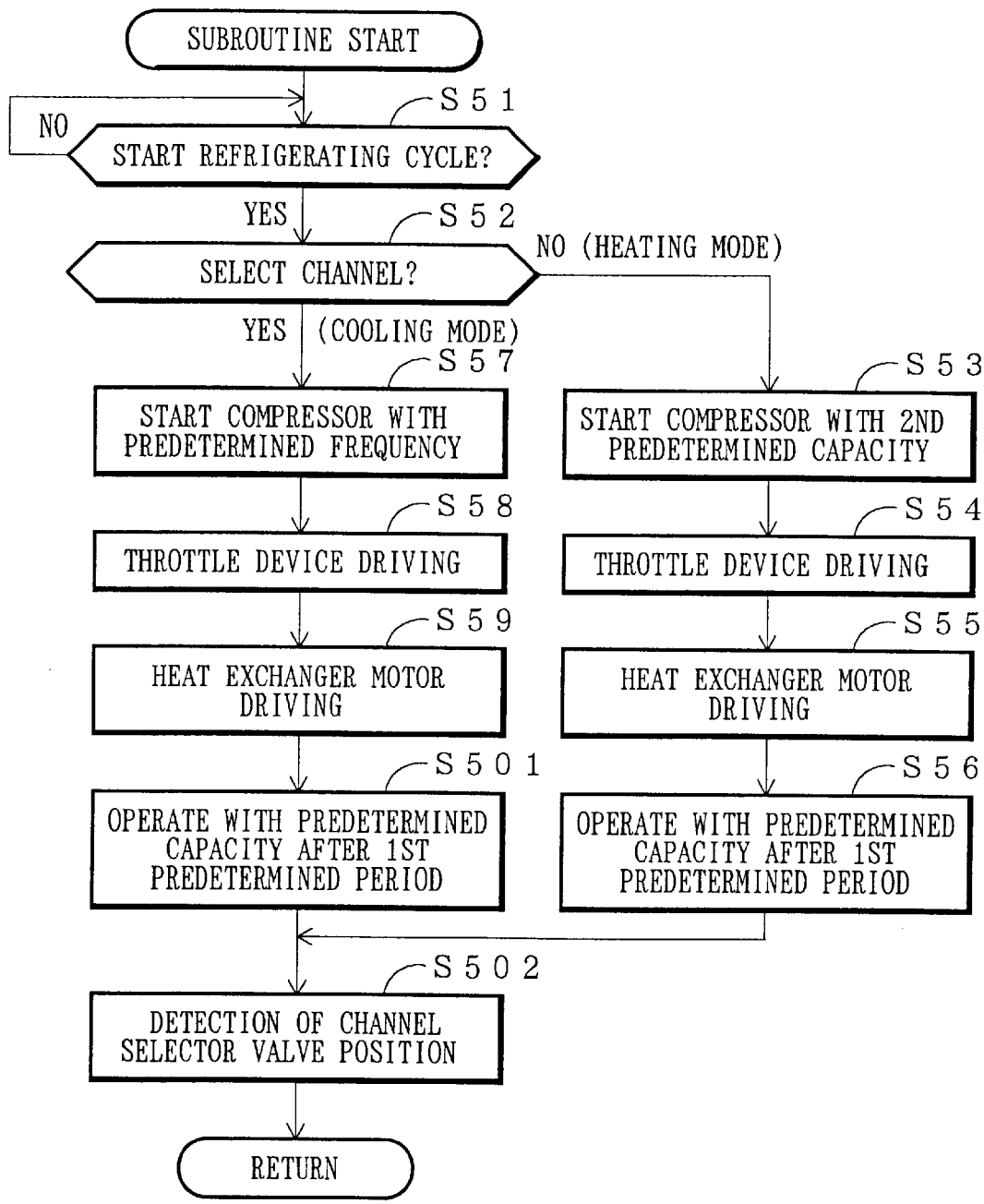
FIG. 73 is a flow chart of a sub-routine for a channel selector valve according to the fourth embodiment of the present invention.

FIG. 73 is a flow chart of a sub-routine (step S111 in FIG. 66) for a channel selector valve according to the tenth embodiment (FIGS. 28 and 29) of the present invention. At step S51 it is watched whether an operation of the refrigerating cycle is to be started or not, and if to be operated, it is judged whether the command is "select channel" or not at step S52. If the command is not to switch a channel, at step S53 an operation of the compressor 4 is started with a second predetermined capacity (e.g. 10 Hz), at step S54 a drive processing (normal processing) of the electrically-driven expansion valve is performed, at step S55 a drive processing (normal processing) of the heat exchanger motor is performed, and at step S56 the compressor 4 is operated with a predetermined capacity (corresponding to a load) after a first predetermined period of time (about 10 seconds), then the system proceeds to step S502.

On the other hand, if the command is "select channel" at step S52, an operation of the compressor 4 is started at step S57 and driven at a specific frequency. Then, at step S58 a drive processing (normal processing) of the throttle device is performed, at step S59 a drive processing (normal processing) of the heat exchanger motor is performed, and at step S501 the compressor 4 is operated with a predetermined capacity (corresponding to a load) after a first predetermined period of time (about 10 seconds), then the system proceeds to step S502.

At step S502 a detection processing of a position of the channel selector valve is performed similarly to the step S28, then the system comes back to the main routine (FIG. 66). The step S57 corresponds to claim 75 and the step S501 corresponds to claim 80.

With the processings mentioned above, a control of selection of the channel selector valve is carried out by resonating the pilot oscillation valve 30 with the compressor 4.

Figure 74:
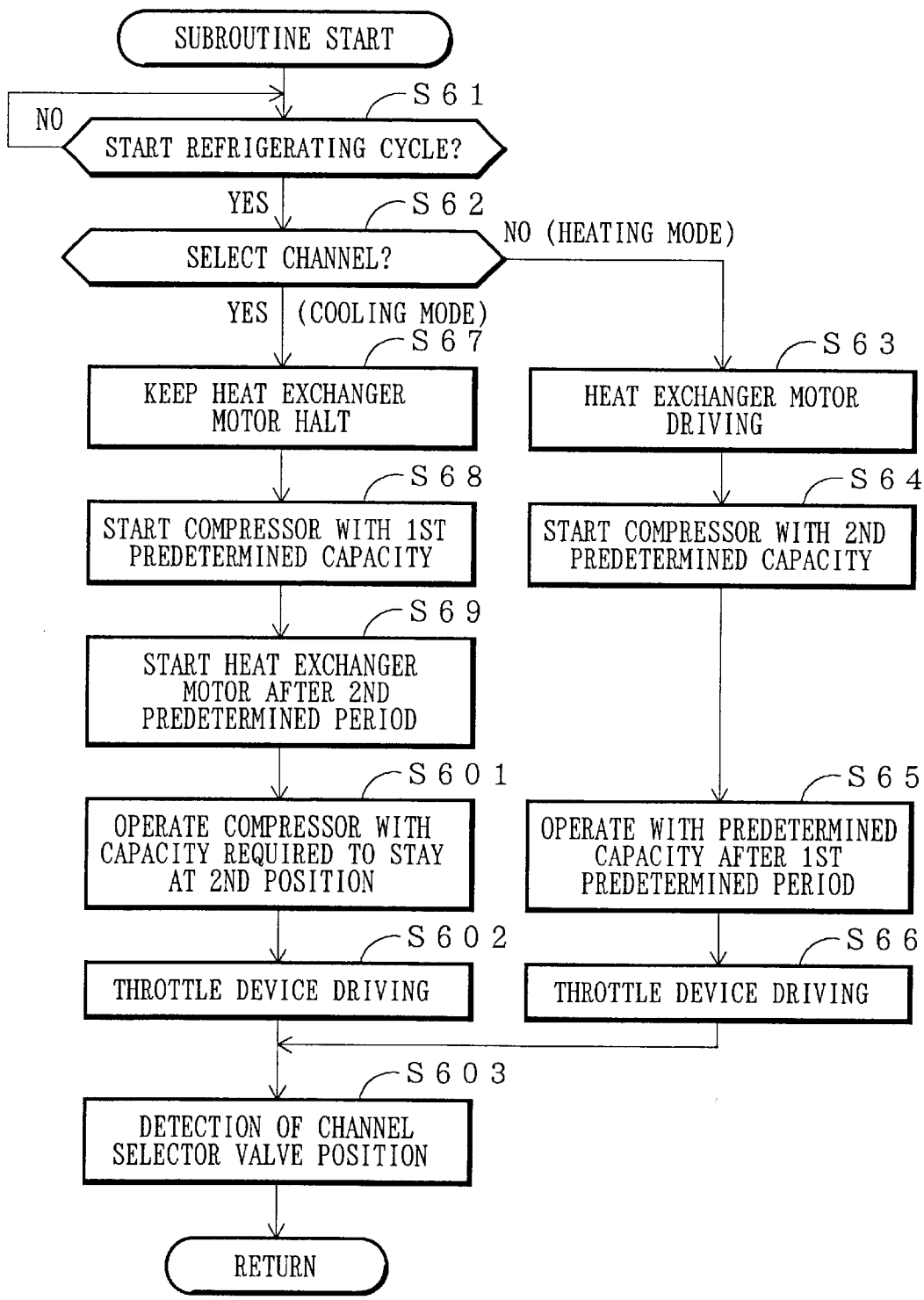
FIG. 74 is a flow chart of a sub-routine for a channel selector valve according to the fifth embodiment of the present invention.

FIG. 74 is a flow chart of a sub-routine (step S111 in FIG. 66) for a channel selector valve according to the eleventh embodiment (FIGS. 30 and 31) of the present invention. At step S61 it is watched whether an operation of the refrigerating cycle is to be started or not, and if to be started, it is judged whether the command is "select channel" or not at step S62. If the command is not "select channel", at step S63 a drive processing (normal processing) of the heat exchanger motor is performed, at step S64 an operation of the compressor 4 is started with a second predetermined capacity (e.g. 10 Hz), at step S65 the compressor 4 is operated with a predetermined capacity (corresponding to a load) after a first predetermined period of time (about 10 seconds), and at step S66 a drive processing (normal processing) of the throttle device is performed, then the system proceeds to step S603.

On the other hand, if the command is "select channel" at step S62, at step S67 an operation of the heat exchanger motor is kept halted, at step S68 an operation of the compressor 4 is started with a first predetermined capacity (e.g. 30 Hz), and at step S69 an operation of the heat exchanger motor is started after a second predetermined period of time (about 20 seconds), then an operation of the heat exchanger motor is started. Then, at step S601 the compressor 4 is operated with a capacity required to hold the movable member (e.g. the piston cylinder 12) at the second position, and at step S602 a drive processing (normal processing) of the throttle device is performed, then the system proceeds to step S603. At step S603 a detection processing of a position of the channel selector valve is performed similarly to the step S28, then the system comes back to the main routine (FIG. 66). The step 67 corresponds to claim 79 and the steps S69 and S601 correspond to claim 82.

With the processings mentioned above, a control of selection of the channel selector valve is carried out by controlling the heat exchanger.

In the first to eleventh embodiments mentioned above, the channel selector valve constructed by employing a slide-type four-way selector valve is explained. In the following, an embodiment, in which the present invention is applied to a rotary channel selector valve that performs its channel selector operation by rotation of a main valve element in a valve housing will be explained.

A schematic constitution of a refrigerating cycle A employing a rotary channel selector valve will be explained with reference to FIG. 35, in which the same abbreviation numerals with those used for the corresponding identical members or parts of the refrigerating cycle A shown in FIG. 63 are used.

In FIG. 35, a channel of the refrigerant in the cooling mode is shown by solid lines while that in the heating mode is shown by broken lines. In this refrigerating cycle A, a place where the high pressure refrigerant discharged from the compressor 4 is guided to and a place where the refrigerant to be sucked by the compressor 4 by way of an accumulator 200 is guided from are mutually selected out of the indoor heat exchanger 9A and the outdoor heat exchanger 9B by a rotary four-way selector valve 50, and an electrically-driven expansion valve 10A is provided between the indoor heat exchanger 9A and the outdoor heat exchanger 9B. Pressure sensors Pc and Pc' are disposed at the indoor heat exchanger 9A and the outdoor heat exchanger 9B, respectively, to detect each pressure, thereby a position of the movable member can be detected. These pressure sensors may be disposed at a channel near the rotary four-way selector valve 50.

Figure 75:
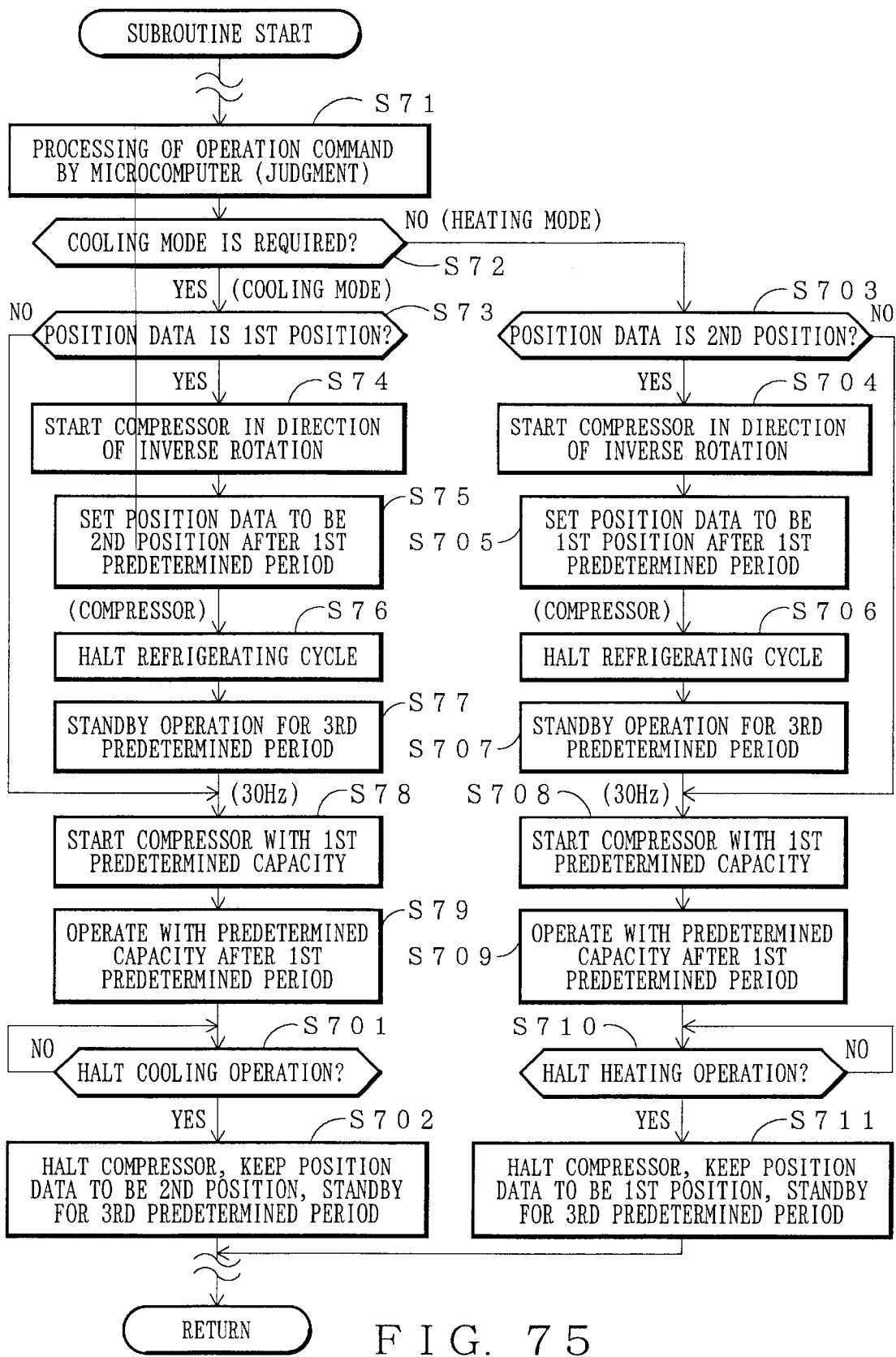
FIG. 75 is a flow chart of a sub-routine for a channel selector valve according to the seventh embodiment of the present invention.

FIG. 75 is a flow chart of a sub-routine (step S111 in FIG. 66) for a channel selector valve 81 according to the eighteen embodiment of the present invention. At step S71 a judge processing of an operation command by a microcomputer is performed, and at step S72 it is judged whether an operation mode required is the cooling mode or not. If the cooling mode is required, processings starting from step S73 are performed, on the other hand if the heating mode is required, processings starting from step S703 are performed.

At step S73 it is judged whether a position data is the first position or not, and if not, the system proceeds to step S78, on the other hand if the first position, at step S74 an operation of the compressor 4 is started in its inverse direction, then at step S75 the position data is renewed into the second position after a first predetermined period of time (e.g. 10 seconds). Then, at step S76 an operation of the refrigerating cycle is halted, an at step S77 an operation thereof is set standby for a third predetermined period of time (about 30 seconds), then the system proceeds to step S78. At step S78 an operation of the compressor 4 is started with a first predetermined capacity (e.g. 30 Hz), then at step S79 the compressor 4 is operated with a predetermined capacity (corresponding to a load) after a first predetermined period of time (e.g. 10 seconds). Then, at step S701 it is watched whether there is an indication of halt of an operation (cooling operation) or not, and if there is, at step S702, an operation of the compressor 4 is halted and the system is set standby for a third predetermined period of time (about 30 seconds) with keeping the position data to be the second position, then the system comes back to the former routine.

On the other hand, at step S72 if the heating mode is required, at step S703 it is judged whether a position data is the second position or not, and if not, the system proceeds to step S708, on the other hand if the second position, at step S704 an operation of the compressor 4 is started in its inverse direction, then at step S705 the position data is renewed into the first position after a first predetermined period of time (e.g. 10 seconds). Then, at step S706 an operation of the refrigerating cycle is halted, an at step S707 an operation thereof is set standby for a third predetermined period of time (about 30 seconds), then the system proceeds to step S708. At step S708 an operation of the compressor 4 is started with a first predetermined capacity (e.g. 30 Hz), then at step S709 the compressor 4 is operated with a predetermined capacity (corresponding to a load) after a first predetermined period of time (e.g. 10 seconds). Then, at step S710 it is watched whether there is an indication of halt of an operation (heating operation) or not, and if there is, at step S711, an operation of the compressor 4 is halted and the system is set standby for a third predetermined period of time (about 30 seconds) with keeping the position data to be the first position, then the system comes back to the former routine.

INDUSTRIAL APPLICABILITY

According to a channel selector valve of the present invention since a channel selection of fluid by the channel selector valve is performed by employing non-electric motive power generated when a control section controls a physical quantity of the fluid, there is no necessity of using an electrically-driven drive source such as an electromagnetic solenoid, resulting in decreasing cause of fault to occur, improving a reliability of the operation, contributing to prevention of environmental pollution due to an operation at a power plant and powerful promotion of energy saving and the like.

According to the channel selector valve of the present invention as described above, a channel selection of fluid by the channel selector valve is passively performed using motive power generated by a non-electrically-driven drive source provided separately from the channel selector valve, therefore there is no necessity for the channel selector valve to have a source for generating motive power.

According to the channel selector valve of the present invention as described above, at least one of element components in a refrigerating cycle having the channel selector valve is used as the drive source, therefore there is no necessity to newly provide a drive source for selecting a channel by a channel selector valve.

According to the channel selector valve of the present invention as described above, the element component in the refrigerating cycle acts so that a change in a physical quantity is generated in the refrigerating cycle, therefore a selection of a channel of fluid by the channel selector valve is performed as a consequence.

According to the channel selector valve of the present invention as described above, at least one change among changes in pressure, differential pressure and flow rate of fluid in the channel selector valve arising from an action of the element component in the refrigerating cycle is used, therefore a selection of a channel by the channel selector valve can be easily performed by using such a change in physical quantity generated in the refrigerating cycle as motive power.

According to a channel selector valve of the present invention as described above, a selection of a place where a main port is communicated to between two selector ports, which is achieved by moving a movable member between the first and second positions, can be performed without using electric motive power, resulting in decreasing cause of fault to occur. Therefore, there is no necessity of a drive source to generate electric motive power, resulting in decreasing cause of fault to occur, improving a reliability of the operation, contributing to prevention of environmental pollution due to an operation at a power plant and powerful promotion of energy saving and the like.

According to the channel selector valve of the present invention as described above, the element component in the refrigerating cycle acts so that a change in a physical quantity is generated in the refrigerating cycle, therefore a selection of a channel of fluid by the channel selector valve is performed as a consequence without a drive source newly provided.

According to the channel selector valve of the present invention as described above, at least one change among changes in pressure, differential pressure and flow rate of fluid in the channel selector valve arising from an action of the element component in the refrigerating cycle is used, therefore a selection of a channel by the channel selector valve can be easily performed by using such a change in physical quantity generated in the refrigerating cycle as motive power.

According to a channel selector valve of the present invention as described above, first and second three-way selector valves constituted by the channel selector valve are combined, therefore a four-way selector valve, which can select a channel of fluid, is easily constructed without using electric motive power by a simple combination of valves usable separately.

According to the channel selector valve of the present invention as described above, an action of a first three-way selector valve is incorporated with that of a second three-way selector valve so that the channel selector valve functions securely as a four-way selector valve by the combination.

According to the channel selector valve of the present invention as described above, the movable member of the first three-way selector valve situated at the first position is moved to the second position by a first drive mechanism of the first three-way selector valve, while the movable member of the first three-way selector valve situated at the second position is moved to the first position by a second drive mechanism, a pressure of fluid at the first selector port is set equal to that at the second selector port, thereby a movement of the movable member of the second three-way selector valve is passively performed.

According to the channel selector valve of the present invention as described above, a pressure of fluid at the main port is suitably adjusted in response to a position of the movable member of the first three-way selector valve, and an energizing force to move the movable member of the first three-way selector valve to a different position is stored in storing means for storing energizing force, the movable member of the first three-way selector valve is moved by the energizing force without using electric motive power, thereby the movable member of the second three-way selector valve can be passively moved without using electric motive power.

According to the channel selector valve of the present invention as described above, by using a channel selector valve that solely constructs a four-way selector valve, a place where fluid introduced from the exterior of the housing flows to and a place where fluid discharged to the exterior of the housing is introduced from can be selected without using electric motive power.

According to the channel selector valve of the present invention as described above, the movable member can be moved without using electric motive power due to a difference between a pressure of fluid introduced from the exterior of the housing and a pressure of fluid discharged to the exterior of the housing, which is generated between the first space of the first pressure chamber partitioned by the movable member in the housing and the second pressure chamber, thereby a channel of fluid can be selected.

According to a method of driving the channel selector valve of the present invention as described above, when the channel selector valve is driven, even if there is no difference between a pressure of fluid in the first space and a pressure of fluid in the second pressure chamber, the movable member can be moved from the second position to the first position by an energizing force of the energizing means, and a difference between a pressure of fluid in the first space and a pressure of fluid in the second pressure chamber is set in response to the energizing force of the energizing means so that the movable member is held at the first or second position, thereby a selection state of a channel of fluid can be maintained.

According to the channel selector valve of the present invention as described above, the movable member easily can be kept being situated at the first or second position by making use of a static friction force between the valve seat and the movable member.

According to a method of driving the channel selector valve of the present invention as described above, when the channel selector valve is driven, a selection of a channel of fluid that is achieved by moving the movable member from the first position to the second position is carried out by using a change in pressure of fluid in the first space without using electric motive power generated by an electrically-driven drive source such as an electromagnetic solenoid and the like, thereafter a selection state, in which the movable member is situated at the second position, can be maintained.

According to the channel selector valve of the present invention as described above, the movable member can be moved between the first and second positions by making use of an internal pressure of the housing, which is changed by fluid introduced from the exterior into the interior of the housing by way of an inlet port of the housing, without using electric motive power generated by an electrically-driven drive source such as an electromagnetic solenoid and the like.

According to the channel selector valve of the present invention as described above, a selector valve element of a non-electrically-driven pilot valve is moved between a fifth position and a sixth position, thereby a place in which a pressure of fluid is lower than that in the first space of the first pressure chamber is selected between the second pressure chamber and the third pressure chamber, which are partitioned by the movable member and situated sandwiching the first pressure chamber therebetween, the movable member is moved by a motive power as low as a power required to perform a selection of the selector valve element of the pilot valve, and a selection of a channel of fluid can be carried out.

According to the channel selector valve of the present invention as described above, when a difference between a pressure of fluid in the second pressure chamber and that in the third pressure chamber cancels out, the selector valve element is moved from one to another between the fifth and sixth positions by second driving means, thereby the movable member can be moved from one to another between the first and second positions without using electric motive power.

According to the channel selector valve of the present invention as described above, a difference in a pressure of fluid is generated between a fourth pressure chamber and a fifth pressure chamber of the pilot valve with making these chambers be communicated to or isolated with the second or third pressure chamber, by using a first or second subvalve in response to a movement of the movable member, and an energizing force is suitably stored to third or fourth storing means for storing energizing force, thereby a movement of the selector valve element in the pilot valve over a range from a fifth position to an eighth position, which is for generating a difference in a pressure of fluid between the third and second pressure chambers, said difference being transformed into a motive power to move the movable member, can be performed without using electric motive power.

According to the channel selector valve of the present invention as described above, when a difference between a pressure of fluid in the second pressure chamber and that in the third pressure chamber cancels out, the selector valve element is moved from one to another between the fifth and sixth positions by second driving means, thereby the movable member can be moved from one to another between the first and second positions without using electric motive power.

According to the channel selector valve of the present invention as described above, an energizing force is suitably stored to third or fourth storing means for storing energizing force of the pilot valve by using a difference in a pressure of fluid generated between a second pressure chamber and a third pressure chamber, thereby the selector valve element is moved to a seventh or eighth position when a difference between a pressure of fluid in the second pressure chamber and that in the third pressure chamber cancels out, thereby making a change in a difference in pressure between fluid in a fourth pressure chamber of the pilot valve, which communicates with the third pressure chamber, and fluid in a fifth pressure chamber of the pilot valve, which communicates with the second pressure chamber, thereby the movable member can be moved from one to another between the first and second positions without using electric motive power.

According to the channel selector valve of the present invention as described above, the movable member is moved from one to another between the first and second positions by changing a pressure of fluid introduced from the exterior to the interior of the housing by way of an inlet port of the housing, while the movable member is moved from another to one between the first and second positions only or supplementarily by using an energizing force stored in the energizing means, thereby a selection of a channel by the channel selector valve can be easily and securely achieved without using electric motive power.

According to the channel selector valve of the present invention as described above, the movable member situated at either the first or second position is stayed at one position or moved to another position selectively, thereby a selection of a channel by the channel selector valve can be securely achieved without using electric motive power.

According to the channel selector valve of the present invention as described above, the latch mechanism selectively performs the first or second state, thereby a selection of a channel by the channel selector valve can be securely achieved without using electric motive power.

According to the channel selector valve of the present invention as described above, a selection of a channel by the channel selector valve can be achieved without directly affecting a large impact to the movable member, that is, without directly applying a control to a movement of the movable member.

According to a method of driving the channel selector valve of the present invention as described above, after a control of a movement of the movable member situated at one position by the latch mechanism is removed, the movable member can be securely moved from the one position to another position, in addition, the latch mechanism can control a movement of the movable member, that is, securely control the movable member to be situated at the one position.

According to the channel selector valve of the present invention as described above, when the second latch mechanism controls a movement of a valve-opening member, the movable member, which is moved from one position to another position by the third drive mechanism, can move from the another position to the one position by the fourth drive mechanism, while to the contrary, when the second latch mechanism does not control a movement of a valve-opening member, the movable member, which is moved from one position to another position by the third drive mechanism, can be held at the another position by using a motive power of the third drive mechanism without using an exclusive drive source and the like.

According to the channel selector valve of the present invention as described above, a state, in which the movable member moved from one position to another position by the third drive mechanism is held at the another position, can be mutually produced whenever the third drive mechanism generates a motive power.

According to a method of driving the channel selector valve of the present invention as described above, the second latch mechanism is transferred between a state in which a movement of the valve-opening member from the valve-closing position to the valve-opening position is controlled and a state in which said control is removed, thereby the system can be transferred from one state, in which the movable member can move from the another position to the one position by using a motive power generated by the fourth drive mechanism, to another state in which the movable member cannot move from the another position to the one position, or the system can be transferred from the another state to the one state.

According to the channel selector valve of the present invention as described above, a selection, which is achieved by moving the movable member between the first and second positions, of a place to which the fluid introduced from the exterior of the housing into the first space by way of the inlet port is discharged and a place from which the fluid discharged from the second space to the exterior of the housing by way of the outlet port is introduced, is carried out by a change in pressure of the fluid introduced into the first space without using an exclusive drive source such as an electromagnetic solenoid.

According to the channel selector valve of the present invention as described above, the movable member moved from the first position to the second position by using a motive power generated by a non-electrically-driven drive source can be held at the second position even if the motive power is not continuously supplied.

According to the channel selector valve of the present invention as described above, a force applied to the movable member is adjusted by fluid in the first space, thereby a selection of a channel by the channel selector valve can be securely achieved without using an electrically-driven drive source.

According to the channel selector valve of the present invention as described above, a force applied to the movable member is adjusted by fluid in the first space, thereby a selection of a channel by the channel selector valve can be securely achieved without using an electrically-driven drive source, in addition, even if a force applied to the movable member by a pressure of fluid in the first space becomes equal to a force applied to the movable member by a pressure of fluid in the second space, an energizing force of the energizing means moves the movable member to the first position, thereby the first position can be set as an initial position of the movable member.

According to a method of driving the channel selector valve of the present invention as described above, when the channel selector valve is driven, a force applied to the movable member in a direction from the first to second position is set to exceed a force applied to the movable member in a direction from the second to first position, thereby the movable member is moved from the first position to the second position, then the force applied to the movable member in a direction from the first to second position can be lowered as long as said force corresponds to a pressure to hold the movable member at the second position, therefore a degree of freedom in an operation of the refrigerating cycle can be raised after the movable member is moved to the second position.

According to the channel selector valve of the present invention as described above, an opening ratio of the electrically-driven expansion valve is changed to change a pressure of fluid, thereby the movable member easily moves between the first and second positions and a selection of a channel by the channel selector valve can be securely achieved without using electric motive power.

According to the channel selector valve of the present invention as described above, a frequency of an oscillation generated by the compressor is changed, thereby the movable member easily moves between the first and second positions and a selection of a channel by the channel selector valve can be securely achieved without using electric motive power.

According to the channel selector valve of the present invention as described above, a difference in fluid pressure is changed, for example, by changing an efficiency of heat exchange by the heat exchanger, thereby the movable member easily moves between the first and second positions and a selection of a channel by the channel selector valve can be securely achieved without using electric motive power.

According to the channel selector valve of the present invention as described above, a space required for the movable member to move between the first and second positions can be set smaller than that in a case of a linear slide-type channel selector valve. Also, the main valve element is moved by using a difference between a pressure of fluid introduced from the exterior of the housing and that of fluid discharged to the exterior of the housing, which is generated between the second pressure chamber and the first space in the first pressure chamber partitioned by the main valve element, thereby a channel of fluid can be selected.

According to the channel selector valve of the present invention as described above, a pressure of fluid, which flows into second communication means formed at one end surface of the main valve element for communicating the ports of the valve seat with each other, is utilized so as to generate a rotative thrust of the main valve element, thereby the main valve element can be rotated without using electric motive power and a channel of fluid can be selected.

According to the channel selector valve of the present invention as described above, a fluid in the inlet port and a fluid in the outlet port, which are formed at a reverse side of the housing with each other, generate a difference in pressure of the fluid between both sides of the housing sandwiching the main valve element, and by utilizing this difference in pressure the main valve element can be rotated between the first and second positions without using electric motive power.

According to the channel selector valve of the present invention as described above, the main valve element is moved in a direction of the central axis of the housing by using non-electric motive power so as to transform this movement in a direction of the central axis into a rotation in a direction of circumference of the housing by the conversion means of moving direction, thereby the main valve element is rotated between the first and second positions and a channel of fluid can be selected.

According to the channel selector valve of the present invention as described above, a movement of the cam follower pin in the cam groove transforms a movement of the main valve element in a direction of the central axis by using non-electric motive power into a rotation in a direction of circumference of the housing, thereby a channel of fluid can be selected without using electric motive power.

According to the channel selector valve of the present invention as described above, when a cam groove is formed in the housing, a guide of the first half of the inner housing is joined with a guide of the second half of the inner housing, thereby the cam follower pin of the main valve element disposed in the housing can be easily disposed in the cam groove.

According to the channel selector valve of the present invention as described above, the end surface of the main valve element, on which the second communication means is formed for communicating the ports of the valve seat with each other, is away from the valve seat at a position except the first and second positions where the ports can communicates with each other by the second communication means, thereby an equalization of a pressure of the fluid in each port, in a state that the ports cannot communicate with each other, can be easily achieved without using electric motive power.

According to the channel selector valve of the present invention as described above, when the main valve element is situated at a position except the first and second positions, where the main valve element is away from the valve seat so that the ports cannot communicate with each other by the second communication means, a communication channel, which selectively communicates the opposite port formed at the opposite end side of the housing to the two selector ports formed at the valve seat at the one end side of the housing, is closed by the subvalve energized toward a direction of closing by the subvalve energizing means, thereby an unnecessary communication between the opposite port and the selector port, in a state that is not a normal selection state, can be prevented from occurring.

According to the channel selector valve of the present invention as described above, a part of a movement of the main valve element toward a direction of the central axis of the housing, which is needed to rotate the main valve element, is achieved by moving the main valve element away from the valve seat with an own weight of the main valve, thereby non-electric motive power required to move the main valve element can be reduced.

According to the channel selector valve of the present invention as described above, a movement of the main valve element in the direction away from the valve seat, which is needed for the movable member to rotate for moving from one to another between the first and second positions, is performed only or supplementarily by using an energizing force stored in the energizing means for energizing the main valve element, thereby a selection of a channel by the channel selector valve can be easily and securely achieved without using electric motive power.

According to the channel selector valve of the present invention as described above, a movement of the main valve element in the direction nearer to the valve seat, which is needed for the movable member to rotate for moving from another to one between the first and second positions, is performed only or supplementarily by using an energizing force stored in the second energizing means for energizing the main valve element, thereby a selection of a channel by the channel selector valve can be easily and securely achieved without using electric motive power.

According to the channel selector valve of the present invention as described above, the main valve element is moved in the direction nearer to the valve seat or in the direction away from the valve seat by using non-electric motive power, thereby it is easily to set up whether the main valve element is repeatedly rotated at the same position out of either the first or second position or is rotated at a different position.

According to the channel selector valve of the present invention as described above, when the cam follower pin is placed in the groove of the cam groove in order to situate the main valve element at one position out of the first and second positions, the main valve element is prevented from rotating at another position out of the first and second positions upon a next rotation of the main valve element.

According to the channel selector valve of the present invention as described above, when the cam follower pin is placed in the second groove of the cam groove in order to situate the main valve element at another position, which is different from the former position, out of the first and second positions, the main valve element is prevented from coming back to the former position upon a next rotation of the main valve element.

According to the channel selector valve of the present invention as described above, a movement of the main valve element in the direction nearer to or away from the valve seat, which is needed to rotate the main valve element between the first and second positions, can be performed by smoothly rotating the main valve element between the first and second positions with the aid of the slide means that reduces a sliding resistance between the main valve element and the housing.

According to a compressor with the channel selector valve of the present invention as described above, a compressor, with which the channel selector valve is integrated, can be easily constructed, in addition, since there is no necessity to use a pipe for forming a high pressure chamber inside, reducing pipe laying and pipe joining around the compressor, thereby reducing leak of fluid at the joining portion of pipes and contributing to prevention of air pollution when the fluid is some kind of refrigerant. Moreover, since there is no current conducting part for an electromagnetic solenoid and the like around the compressor that generates oscillation, the above construction also prevents an occurrence of an electrical fault due to failure in current conduction at an electric contact and a breaking of electric wire and the like, thereby reliance of the operation can be improved.

According to a device for controlling a refrigerating cycle of the present invention as described above, since the channel selector valve is controlled by controlling the functional components for controlling the operation of the refrigerating cycle, upon a selector operation of a valve such as a four-way selector valve provided in the refrigerating cycle for selecting a channel of fluid, prevention of environmental pollution and energy saving and the like are effectively achieved.

According to a device for controlling a refrigerating cycle of the present invention as described above, the functional component is controlled to control an operation of the refrigerating cycle, thereby generating a non-electrical motive power, by which the channel selector valve is passively controlled, therefore, upon a selector operation of a valve such as a four-way selector valve provided in the refrigerating cycle for selecting a channel of fluid, prevention of environmental pollution and energy saving and the like are effectively achieved.

According to a device for controlling a refrigerating cycle of the present invention as described above, by using a microcomputer, which controls an operation of the refrigerating cycle, the functional component is controlled to control an operation of the refrigerating cycle, thereby generating a non-electrical motive power, by which the channel selector valve is passively controlled, therefore, upon a selector operation of a valve such as a four-way selector valve provided in the refrigerating cycle for selecting a channel of fluid, prevention of environmental pollution and energy saving and the like are effectively achieved.

According to a device for controlling a refrigerating cycle of the present invention as described above, the functional component is controlled to control an operation of the refrigerating cycle, thereby a physical quantity or a rate of change in the physical quantity is generated as a non-electrical motive power, by which the channel selector valve is passively controlled, therefore, upon a selector operation of a valve such as a four-way selector valve provided in the refrigerating cycle for selecting a channel of fluid, prevention of environmental pollution and energy saving and the like are effectively achieved.

According to a device for controlling a refrigerating cycle of the present invention as described above, by using a microcomputer, which controls an operation of the refrigerating cycle, the functional component is controlled to control an operation of the refrigerating cycle, thereby a physical quantity or a rate of change in the physical quantity is generated as a non-electrical motive power, by which the channel selector valve is passively controlled, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, in order to generate a non-electrical motive power for controlling the channel selector valve, the functional component is controlled on the basis of a physical quantity, which concerns with a control of an operation of the refrigerating cycle, selected from the group consisting of a pressure, temperature, rate of flow, voltage, current, electrical frequency and mechanical oscillation frequency, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the physical quantity, which is the non-electrical motive power and is generated by the refrigerating cycle, is a pressure, differential pressure or rate of flow with respect to fluid existing in the channel selector valve, and the rate of change in a physical quantity, which is the non-electrical motive power and is generated by the refrigerating cycle, is a rate of change in pressure, rate of change in differential pressure or rate of change in rate of flow with respect to the fluid, therefore, upon a selector operation of a valve such as a four-way selector valve provided in the refrigerating cycle for selecting a channel of fluid, prevention of environmental pollution and energy saving and the like are effectively achieved.

According to a device for controlling a refrigerating cycle of the present invention as described above, an operational condition of the refrigerating cycle is commanded from an operation command section and a physical quantity generated by the refrigerating cycle is detected in a physical quantity detector section, then the control section receives input signals sent from the operation command section and the physical quantity detector section. Then, the control section sends output signals to a driving section that drives a drive source of at least one of a plurality of functional components communicated to the refrigerating cycle so as to control said functional component, and the device generates a non-electrical motive power by controlling the refrigerating cycle and passively controls the channel selector valve by said motive power, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the control section controls at least one of a plurality of functional components communicated to the refrigerating cycle so as to start an operation of the refrigerating cycle, thereby controlling the channel selector valve in a state corresponding to the start of an operation, which is commanded by the operation command section, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the control section starts to operate a compressor communicated to the refrigerating cycle in a direction of inverse rotation when the control section decides to select the channel selector valve on the basis of a command of the operation command section, thereby a channel is selected by the channel selector valve, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the control section controls at least one of a plurality of functional components communicated to the refrigerating cycle so as to operate the refrigerating cycle, thereby controlling the channel selector valve in a state corresponding to the operation, which is commanded by the operation command section, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the control section controls at least one of a plurality of functional components communicated to the refrigerating cycle so as to halt an operation of the refrigerating cycle, thereby controlling the channel selector valve in a state corresponding to the halt of the operation, which is commanded by the operation command section, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the channel selector valve is constructed in a manner that a movable member moves so as to select a channel, and the control section comprises at least one unit selected from the group consisting of: a memory unit for memorizing position data of the movable member of the channel selector valve; a comparison unit and a judge unit for comparing and judging, respectively, the position data and operation command data; and a learning unit learning on the basis of physical quantity data by a control of functional components and control data of the channel selector valve, therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to the device for controlling a refrigerating cycle of the present invention as described above, the control section receives the input signals, performs a predetermined processing and judges whether a channel is to be changed or not to be changed by the channel selector valve, then confirms a position on the basis of present position data, then sends the output signals to the driving section so as to control the functional components in the refrigerating cycle, then receives new input signals after a predetermined period of time, confirms a position of the movable member, and sets position data of said position as new present position data when said position is changed to a new position, therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to the device for controlling a refrigerating cycle of the present invention as described above, the control section confirms a position of the movable member by at least one temperature detection means, at least one pressure detection means, at least one magnetic detection means, at least one current detection means or a combination thereof after a predetermined period of time, and then installs position data corresponding to said position into the memory unit of the control section, therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to a device for controlling a refrigerating cycle of the present invention as described above, a microcomputer that controls the refrigerating cycle is used, thereby controlling at least one of a plurality of functional components communicated to the refrigerating cycle so as to control the refrigerating cycle, and in order to control the driving section for driving the functional component so that the position of the movable member is to be moved or not to be moved, the microcomputer performs a processing consisting of the steps of:

receiving input signals; confirming a position by taking out present position data of a movable member installed in a memory unit; carrying out an operation to decide whether the movable member is to be moved of not to be moved, comparing, and judging; selecting and deciding a driving section; outputting drive signals to the driving section selected and decided; judging a position of the movable member by input signals after a predetermined period of time, with or without moving a position of the movable member by a physical quantity generated by at least one functional component that is selected and decided in said step of selecting and deciding or a rate of the physical quantity; and installing position data of a position of the movable member into the memory unit when said position is changed to a new position, therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to a device for controlling a refrigerating cycle of the present invention as described above, an operational condition of the refrigerating cycle is commanded from an operation command section and a physical quantity generated by the refrigerating cycle is detected in a physical quantity detector section, then the control section receives input signals sent from the operation command section and the physical quantity detector section. Then, the control section sends output signals to a driving section that drives a drive source of at least one of a plurality of functional components communicated to the refrigerating cycle so as to control said functional component for controlling an operation of the refrigerating cycle, and when judging to select a channel by using the channel selector valve on the basis of a command of the operation command section, the control section sends output signals to a driving section for driving a power source of a compressor so as to start an operation of the compressor of the refrigerating cycle and starts an operation of the refrigerant cycle so as to generate a motive power exceeding a first predetermined motive power, thereby the channel selector valve is passively controlled. Therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to a device for controlling a refrigerating cycle of the present invention as described above, an operational condition of the refrigerating cycle is commanded from an operation command section and a physical quantity generated by the refrigerating cycle is detected in a physical quantity detector section, then the control section receives input signals sent from the operation command section and the physical quantity detector section. Then, the control section sends output signals to a driving section that drives a drive source of at least one of a plurality of functional components communicated to the refrigerating cycle so as to control said functional component for controlling an operation of the refrigerating cycle, and when judging to select a channel by using the channel selector valve on the basis of a command of the operation command section, the control section sends output signals to a driving section for driving a power source of a compressor so as to start an operation of the compressor in a direction of inverse rotation and starts an operation of the refrigerant cycle so as to generate a motive power exceeding a third predetermined motive power, thereby the channel selector valve is passively controlled. Therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to the device for controlling a refrigerating cycle of the present invention as described above, the channel selector valve selects a channel by moving the movable member between the first and second positions in response to an internal motive power, the control section memorizes position data corresponding to the first or second position of the movable member in a memory unit thereof, the control section starts an operation of the refrigerating cycle when the position data indicates the second or first position, halts the operation of the refrigerating cycle with renewing position data in the memory unit to the first or second position, respectively, after a first predetermined period of time, and keeps the operation of the refrigerating cycle standby during a third predetermined period of time. Therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to the device for controlling a refrigerating cycle of the present invention as described above, the control section operates the compressor in a specific frequency immediately after starting the operation of the compressor and starts an operation of the refrigerating cycle so that a motive power exceeding a first predetermined motive power is generated as an internal motive power of the channel selector valve. Therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the control section starts an operation of the compressor with a first predetermined capacity, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the device acts similarly to the device as described in claim 72, in addition,] the control section starts an operation of the compressor with a second predetermined capacity so that a motive power lower than a first predetermined motive power is generated as an internal motive power of the channel selector valve, then operates the refrigerating cycle for a fourth predetermined period of time, then halts the operation of the refrigerating cycle for a fifth predetermined period of time, and then starts an operation of the compressor with a first predetermined capacity so that a motive power exceeding a first predetermined motive power is generated as an internal motive power of the channel selector valve. Therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the control section sends output signals to a throttle device driving section so that an opening ratio of a throttle device of the refrigerating cycle is almost fully opened or almost fully closed, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the control section sends output signals to a heat exchanger motor driving section so that a heat exchanger motor of the refrigerating cycle is kept halted, therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, once the control section starts an operation of the compressor, the control section sends output signals to the compressor driving section after a first predetermined period of time and drives the power source of the compressor so that a motive power exceeding a second predetermined motive power is generated, thereby operating the refrigerating cycle. Therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to the device for controlling a refrigerating cycle of the present invention as described above, once the control section starts an operation of the compressor, the control section sends output signals to the throttle device driving section so as to set the opening ratio of the throttle device a predetermined opening ratio after a first predetermined period of time, therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to the device for controlling a refrigerating cycle of the present invention as described above, once the control section starts an operation of the compressor, the control section sends output signals to the heat exchanger motor driving section after a second predetermined period of time so as to start an operation of the heat exchanger motor, sends output signals to the compressor driving section so as to generate a motive power lower than a first predetermined motive power, and drives the power source of the compressor so as to generate a motive power exceeding a second predetermined motive power, thereby operating the refrigerating cycle. Therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to the device for controlling a refrigerating cycle of the present invention as described above, when the control section performs a predetermined processing and judges to select a channel by the channel selector valve or to halt an operation of the refrigerating cycle, the control section sends output signals to the compressor driving section: to drive the power source of the compressor with a third predetermined capacity so as to generate a motive power lower than a second predetermined motive power; or to halt the operation of the compressor, thereby halting the operation of the refrigerating cycle. Therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, when the control section performs a predetermined processing and judges to select a channel by the channel selector valve or to halt an operation of the refrigerating cycle, the control section sends output signals to the compressor driving section to halt the operation of the compressor, then keeps the refrigerating cycle standby for a third predetermined period of time, then sends output signals to the compressor driving section to start the operation of the compressor, then renews position data in a memory unit to a first or second position after a first predetermined period of time, thereby halting the operation of the compressor again. Therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to the device for controlling a refrigerating cycle of the present invention as described above, when positional data memorized by a memory unit of the control section indicate a first or second position, the control section starts an operation of the refrigerating cycle so that a motive power exceeding a first predetermined motive power is generated as an internal motive power of the channel selector valve. Therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

According to a device for controlling a refrigerating cycle of the present invention as described above, an operational condition of the refrigerating cycle is commanded from an operation command section and a physical quantity generated by the refrigerating cycle is detected in a physical quantity detector section, then the control section receives input signals sent from the operation command section and the physical quantity detector section. Then, the control section sends output signals to a driving section that drives a drive source of at least one of a plurality of functional components communicated to the refrigerating cycle so as to control said functional component for controlling an operation of the refrigerating cycle, and when judging not to select (i.e. not to switch) a channel by using the channel selector valve on the basis of a command of the operation command section, the control section sends output signals to a driving section for driving a power source of a compressor so as to start an operation of the compressor of the refrigerating cycle and starts an operation of the refrigerant cycle so as to generate a motive power lower than a first predetermined motive power, thereby the channel selector valve is passively controlled. Therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, the control section starts an operation of the compressor with a second predetermined capacity, therefore, upon a selector operation of a valve such as a four-way selector valve provided in the refrigerating cycle for selecting a channel of fluid, prevention of environmental pollution and energy saving and the like are effectively achieved.

According to a device for controlling a refrigerating cycle of the present invention as described above, an operational condition of the refrigerating cycle is commanded from an operation command section and a physical quantity generated by the refrigerating cycle is detected in a physical quantity detector section, then the control section receives input signals sent from the operation command section and the physical quantity detector section. Then, the control section sends output signals to a driving section that drives a drive source of at least one of a plurality of functional components communicated to the refrigerating cycle so as to control said functional component for controlling an operation of the refrigerating cycle, and when judging not to select (i.e. not to switch) a channel by using the channel selector valve on the basis of a command of the operation command section, the control section sends output signals to a driving section for driving a power source of a compressor so as to start an operation of the compressor of the refrigerating cycle and starts an operation of the refrigerant cycle so as to generate a motive power exceeding a first predetermined motive power, thereby the channel selector valve is passively controlled. Therefore, upon a selector operation of a valve such as a four-way selector valve provided in the refrigerating cycle for selecting a channel of fluid, prevention of environmental pollution and energy saving and the like are effectively achieved.

According to the device for controlling a refrigerating cycle of the present invention as described above, when the control section performs a predetermined processing and judges to halt an operation of the refrigerating cycle, the control section sends output signals to the compressor driving section so as to halt the operation of the compressor, then keeps the refrigerating cycle standby for a third predetermined period of time without renewing position data in a memory unit. Therefore, upon a selector operation of a valve such as a four-way selector valve provided in the refrigerating cycle for selecting a channel of fluid, prevention of environmental pollution and energy saving and the like are effectively achieved, and in addition, a secure control of the refrigerating cycle can be performed.

What is claimed is:

1. A channel selector valve for selecting a channel of fluid comprising:
   a movable member moving between a first position and a second position in a housing of the channel selector valve; and
   driving means for driving the movable member between the first position and the second position by employing non-electric motive power generated when a control section controls a physical quantity of the fluid, wherein a first selector port out of two selector ports of the housing communicates with a main port of the housing through the interior of the housing when the movable member is situated at the first position, while a second selector port out of the two selector ports of the housing communicates with a main port of the housing through the interior of the housing when the movable member is situated at the second position.

2. The channel selector valve according to claim 1, wherein a drive source generating said non-electric motive power comprises at least one of element components in a refrigerating cycle having the channel selector valve, a change in physical quantity, which arises in the refrigerating cycle from an action of said at least one of element components, is employed as at least a part of said motive power, thereby the channel is passively selected.

3. The channel selector valve according to claim 2, wherein said change in physical quantity is at least one change among changes in pressure, differential pressure and flow rate of fluid in the channel selector valve, said changes arising from an action of said at least one of the element components.

4. The channel selector valve according to claim 2, wherein the element component is an electrically driven expansion valve provided in the refrigerating cycle and the change in physical quantity is a change in pressure of fluid due to a change in an opening ratio of the electrically driven expansion valve.

5. The channel selector valve according to claim 2, wherein the element component is a compressor provided in the refrigerating cycle and the change in physical quantity is a change in a frequency of a mechanical oscillation generated by the compressor.

6. The channel selector valve according to claim 2, wherein the element component is a heat exchanger provided in the refrigerating cycle and the change in physical quantity is a change in pressure of fluid due to a change in the amount of heat exchange by the heat exchanger.

7. A channel selector valve constituted as a four-way selector valve by combining a first and second three-way selector valves, each of which is constituted by the channel selector valve according to claim 1.

8. The channel selector valve according to claim 7, wherein the channel selector valve is constituted as a four-way selector valve by the first and second three-way selector valves,
the main port of the first three-way selector valve is an inlet port formed in the housing, through which fluid introduced from the exterior to the interior of the housing of the first three-way selector valve passes, while the main port of the second three-way selector valve is an outlet port formed in the housing, through which the fluid discharged from the interior to the exterior of the housing of the second three-way selector valve passes,
the first selector port of the first three-way selector valve is connected to the second selector port of the second three-way selector valve, while the second selector port of the first three-way selector valve is connected to the first selector port of the second three-way selector valve,
the movable member of the second three-way selector valve moves to the second position when the movable member of the first three-way selector valve moves to the first position, while the movable member of the second three-way selector valve moves to the first position when the movable member of the first three-way selector valve moves to the second position.

9. The channel selector valve according to claim 8, wherein said driving means of the first three-way selector valve comprises:
a first drive mechanism that moves the movable member situated at the first position of the first three-way selector valve to the second position when a difference between a fluid pressure at the first selector port in the first three-way selector valve and a fluid pressure at the second selector port cancels out; and
a second drive mechanism that moves the movable member situated at the second position of the first three-way selector valve to the first position when a difference between a fluid pressure at the first selector port in the first three-way selector valve and a fluid pressure at the second selector port cancels out.

10. The channel selector valve according to claim 9, wherein the first and second three-way selector valves are constructed so that the main port is isolated from the second selector port when the movable member is situated between the first position and a third position where is nearer to the second position than the first position, while that the main port is isolated from the first selector port when the movable member is situated between the second position and a fourth position where is between the second position and the third position,
the first drive mechanism comprises first storing means for storing energizing force to move the movable member of the first three-way selector valve from the first position to the fourth position, by a fluid pressure being higher than a first predetermined value of the main port, when the movable member of the first three-way selector valve is situated at the first position, said energizing force being less than the first predetermined value, and
the second drive mechanism comprises second storing means for storing energizing force to move the movable member of the first three-way selector valve from the second position to the third position, by a fluid pressure being higher than a second predetermined value of the main port, when the movable member of the first three-way selector valve is situated at the second position, said energizing force being less than the second predetermined value.

11. The channel selector valve according to claims 1, 2 or 3 wherein the main port is an inlet port formed in the housing, through which fluid introduced from the exterior to the interior of the housing passes,
the housing further comprises an outlet port, through which the fluid discharged from the interior to the exterior of the housing passes,
when the movable member is situated at the first position, the inlet port and the first selector port are communicated with each other inside the housing, while the outlet port and the second selector port are communicated with each other inside the housing,
when the movable member is situated at the second position, the inlet port and the second selector port are communicated with each other inside the housing, while the outlet port and the first selector port are communicated with each other inside the housing.

12. The channel selector valve according to claim 11, wherein the movable member partitions the interior of the housing into a first and second pressure chambers and also forms a first and second spaces in the first pressure chamber,
the inlet port is formed in the housing so as to communicate with the first space and the outlet port is formed in the housing so as to communicate with the second space,
when the movable member is situated at the first position, the fluid introduced from the exterior of the housing into the first space by way of the inlet port is discharged to the first selector port, while the fluid discharged from the second space to the exterior of the housing by way of the outlet port is introduced from the second selector port, when the movable member is situated at the second position, the fluid introduced from the exterior of the housing into the first space by way of the inlet port is discharged to the second selector port, while the fluid discharged from the second space to the exterior of the housing by way of the outlet port is introduced from the first selector port.

13. A compressor with the channel selector valve as claimed in claim 12 comprising:

a compressor housing having an inlet, which is connected to the outlet port;

a low pressure chamber that is provided in the interior of the compressor housing and communicates with the inlet;

a high pressure chamber that is provided in the interior of the compressor housing and partitioned off from the low pressure chamber; and a compressing section that is provided in the interior of the compressor housing, compresses fluid introduced into the low pressure chamber from the inlet, and guides the fluid into the high pressure chamber, wherein a part of the compressor housing partitioning the high pressure housing therein is integrally formed with a part of the housing having the inlet port therein, thereby the interior of the part of the housing communicates with the high pressure chamber.

14. A method of driving the channel selector valve as claimed in claim 12, comprising the steps of:

communicating the first space to the second pressure chamber through an equalizing path formed in the movable member;

energizing the movable member in a direction of moving from the second position to the first position by energizing means for energizing; and applying a force to the movable member from the first pressure chamber side by fluid introduced from the exterior of the housing into the first space by way of the inlet port, said force being stronger than a resultant force consisting of an energizing force by said energizing means and a force applied to the movable member by fluid in the second pressure chamber introduced from the first space by way of said equalizing path, thereby the movable member moves from the first position to the second position.

15. The channel selector valve according to claim 12, wherein the housing has a valve seat disposed in the first pressure chamber, the outlet port and the two selector ports are disposed on the valve seat, the second space moves on the valve seat responding to a movement of the movable member moving between the first and second positions, and a place with which the outlet port communicates by way of the second space is selected to be either the first selector port or the second selector port.

16. A method of driving the channel selector valve as claimed in claim 15, comprising the steps of:

communicating the first space to the second pressure chamber through an equalizing path formed in the movable member;

energizing the movable member in a direction of moving from the second position to the first position by energizing means for energizing; and applying a force to the movable member from the first pressure chamber side by fluid introduced from the exterior of the housing into the first space by way of the inlet port, said force being stronger than a resultant force consisting of an energizing force by said energizing means, a force applied to the movable -member by fluid in the second pressure chamber introduced from the first space by way of said equalizing path, and a static friction force between the valve seat and the movable member, whereby the movable member moves from the first position to the second position and the movable member is kept staying at the second position by the static friction force between the valve seat and the movable member against an energizing force of the energizing means, after a difference between a pressure of fluid in the first space and that in the second pressure chamber decreases due to circulation of fluid between the first space and the second pressure chamber through the equalizing path.

17. The channel selector valve according to claim 12, wherein the driving means comprises:

a third drive mechanism that moves the movable member from one position out of the first and second positions toward an opposite position; and a fourth drive mechanism that moves the movable member from the opposite position toward the one position, wherein the third and fourth drive mechanisms employ a change in physical quantity of the interior of the housing due to fluid introduced into the interior of the housing at least as a part of the motive power.

18. The channel selector valve according to claim 17, wherein the movable member partitions the interior of the housing into the first pressure chamber, the second pressure chamber, and a third pressure chamber situated so that the first pressure chamber is sandwiched between the second and third pressure chambers, the channel selector valve further comprises a non-electrically driven pilot valve that selectively communicates the outlet port to either the second pressure chamber or the third pressure chamber, said pilot valve comprises:

a second housing having a second main port that is provided outside the housing and communicates with the outlet port; and a selector valve element that partitions the interior of the second housing into a fourth pressure chamber communicating with the third pressure chamber and a fifth pressure chamber communicating with the second pressure chamber, and that is movable in the second housing between a fifth position where the second main port communicates with the fourth pressure chamber and a sixth position where the second main port communicates with the fifth pressure chamber, due to a difference between a pressure of fluid in the second pressure chamber and that in the third pressure chamber.

19. The channel selector valve according to claim 18, further comprising second driving means to move the selector valve element from one position out of the fifth and sixth positions to an opposite position when the difference between a pressure of fluid in the second pressure chamber and that in the third pressure chamber cancels out.

20. The channel selector valve according to claim 19, wherein the movable member has a first equalizing path communicating the first space to the second pressure chamber and a second equalizing path communicating the first space to the third pressure chamber, the movable member has a first subvalve that isolates the third pressure chamber from the fourth pressure chamber when the movable member is situated at the first position and that communicates the third pressure chamber to the fourth pressure chamber when the movable member is situated at the second position, and has a second subvalve that communicates the second pressure chamber to the fifth pressure chamber when the movable member is situated at the first position and that isolates the second pressure chamber from the fifth pressure chamber when the movable member is situated at the second position, the pilot valve communicates the second main port to the fourth pressure chamber when the selector valve element is situated between the fifth position and a seventh position located nearer to the sixth position than the fifth position, and communicates the second main port to the fifth pressure chamber when the selector valve element is situated between the sixth position and a eighth position located between the sixth position and the seventh position, and the second driving means has third and fourth storing means for storing energizing force, the third storing means for storing energizing force stores an energizing force, which is less than a third predetermined value, to move the selector valve element from the fifth position to the eighth position due to a fluid pressure in the fifth pressure chamber exceeding the third predetermined value when the selector valve element is situated at the fifth position, and the fourth storing means for storing energizing force stores an energizing force, which is less than a fourth predetermined value, to move the selector valve element from the sixth position to the seventh position due to a fluid pressure in the fourth pressure chamber exceeding the fourth predetermined value when the selector valve element is situated at the sixth position.

21. The channel selector valve according to claim 18, wherein a third main port communicating with the inlet port is further formed in the second housing, the third main port communicates with the fifth pressure chamber when the selector valve element is situated between the fifth and seventh positions and communicates with the fourth pressure chamber when the selector valve element is situated between the sixth and eighth positions, and the channel selector valve further comprises second driving means for moving the selector valve element either from the fifth position to the eighth position or from the sixth position to the seventh position when the difference between a pressure of fluid in the second pressure chamber and that in the third pressure chamber cancels out.

22. The channel selector valve according to claim 21, wherein the second driving means has third and fourth storing means for storing energizing force, the third storing means for storing energizing force stores an energizing force, which is less than a third predetermined value, to move the selector valve element from the fifth position to the eighth position due to a fluid pressure in the fifth pressure chamber exceeding the third predetermined value when the selector valve element is situated at the fifth position, and the fourth storing means for storing energizing force stores an energizing force, which is less than a fourth predetermined value, to move the selector valve element from the sixth position to the seventh position due to a fluid pressure in the fourth pressure chamber exceeding the fourth predetermined value when the selector valve element is situated at the sixth position.

23. The channel selector valve according to claim 12, wherein the driving means comprises:

a third drive mechanism to move the movable member from one position out of the first and second positions to an opposite position; and a fourth drive mechanism to move the movable member from the opposite position to the one position, wherein one drive mechanism out of the third and fourth drive mechanisms employs a change in physical quantity of the interior of the housing due to fluid introduced into the interior of the housing at least as a part of the motive power, while an opposite drive mechanism employs an energizing force that is applied to the movable member by energizing means received in the interior of the housing at least as a part of the motive power.

24. The channel selector valve according to claim 23, further comprising a latch mechanism that selectively controls a movement of the movable member from one position out of the first and second positions toward an opposite position.

25. The channel selector valve according to claim 24, wherein the latch mechanism selectively performs a first and second states, in the first state, a movement of the movable member to the opposite position by the driving means is controlled at the first position, and in the second state, a movement of the movable member from the one position to the opposite position by the driving means is allowed.

26. The channel selector valve according to claim 25, wherein the latch mechanism comprises a latch piece that moves in the housing following a movement of the movable member between the first and second positions, and in a first state of the latch mechanism, a movement of the latch piece is controlled, thereby a movement of the movable member is controlled at the one position.

27. A method of driving the channel selector valve as claimed in claim 25, wherein when the movable member, a movement of which to the opposite position is controlled by the latch mechanism and situated at the one position, is moved to the opposite position, the movable member is once moved by the driving means in a direction of moving from the opposite position to the one position, then is moved from the one position to the opposite position, and when the movable member situated at the opposite position is moved to the one position, the movable member is once moved by the driving means in a direction of moving from the one position to the opposite position, then is moved from the opposite position to the one position.

28. The channel selector valve according to claim 23, further comprising:

a valve-opening member that moves from a valve-closing position to a valve-opening position by the motive power while the third drive mechanism generates the motive power;

a pilot path that is opened from a valve closing state thereof by the valve-opening member moved from the valve-closing position to the valve-opening position;

an attenuation mechanism acting when the pilot path is open, which attenuates the motive power generated by the fourth drive mechanism so as to prevent the movable member from moving from the opposite position to the one position; and a second latch mechanism to selectively control a movement of the valve-opening member from the valve-closing position to the valve opening position.

29. The channel selector valve according to claim 28, wherein the second latch mechanism alternately repeats a third and fourth states, in the third state, a movement of the valve-opening member to the valve-opening position is controlled at the valve-closing position, and in the fourth state, a movement of the valve-opening member from the valve-closing position to the valve-opening position is allowed.

30. A method of driving the channel selector valve as claimed in claim 28, wherein when the movable member situated at the one position is moved to the opposite position, a generation of the motive power by the third drive mechanism is once halted, then the generation thereof by the third drive mechanism is started again and then, the motive power generated by the third drive mechanism is maintained to be a predetermined value exceeding the motive power, which is generated by the fourth drive mechanism and attenuated by the attenuation mechanism, and when the movable member situated at the opposite position is moved to the one position, a generation of the motive power by the third drive mechanism is halted, then the movable member is moved from the opposite position to the one position by the fourth drive mechanism.

31. The channel selector valve according to claim 23, wherein the driving means comprises a communication pipe that always communicates the second pressure chamber to the first selector port outside the housing.

32. The channel selector valve according to claim 23, wherein the driving means comprises a state-holding mechanism to hold the movable member, which is moved from the first position to the second position, at the second position.

33. The channel selector valve according to claim 32, wherein the state-holding mechanism comprises:

a state-holding selector valve provided in the second pressure chamber, which by a selecting action of a second selector valve element selects either a first state or a second state, in said first state the second pressure chamber communicates with the exterior of the housing through a first introducing port and in said second state the second pressure chamber communicates with the exterior of the housing through a second introducing port; and energizing means for energizing the selector valve, which energizes the second selector valve element so that the state-holding selector valve in the second state selects the first state, the movable member allows the energizing means for energizing the selector valve to energize the second selector valve element when the movable member is situated at the first position, while the movable member makes the second selector valve element act a selection so that the state-holding selector valve selects the second state against an energizing by the energizing means for energizing the selector valve when the movable member is situated at the second position.

34. The channel selector valve according to claim 33, wherein the energizing means energizes the movable member in a direction of moving from the second position to the first position, and a pressure of fluid, which is introduced from the exterior of the housing into the first space by way of the inlet port, acts on the movable member in a direction of moving from the first position to the second position.

35. A method of driving the channel selector valve as claimed in claim 34, wherein when the movable member moves from the first position to the second position, a pressure of fluid introduced into the first space from the exterior of the housing by way of the inlet port is set higher than a predetermined value, so that a force, which is applied to the movable member by fluid existing in the first space in a direction from the first position to the second position, is set stronger than a force, which is applied to the movable member by fluid existing in the place to which the second pressure chamber is communicated in a direction from the second position to the first position, after the movable member has moved from the first position to the second position, a pressure of fluid existing in the first space and a pressure of fluid existing in the second pressure chamber are set so that the movable member is kept staying at the second position.

36. The channel selector valve according to claim 11, wherein the housing is formed cylindrical, at least the two selector ports are formed at a valve seat situated at one end of the housing in a direction of a central axis of the housing, the movable member is constructed by a main valve element, which is received in the housing and rotative around the central axis, the main valve element is provided with communication means for selectively communicating a selector port out of the two selector ports to the main port, the main valve element rotates and displaces around the central axis so as to move between the first and second positions, when the main valve element is situated at the first position, a first selector port out of the two selector ports is communicated to the main port by the communication means, and when the main valve element is situated at the second position, a second selector port out of the two selector ports is communicated to the main port by the communication means.

37. The channel selector valve according to claim 36, wherein at least one port out of the inlet port and the outlet port is formed at the valve seat, an end surface of the main valve element in a direction of the central axis sits down on the valve seat, said end surface is provided with second communication means for selectively communicating said one port to a first selector port out of the two selector ports, when the main valve element is situated at the first position, the second communication means communicates the second selector port to said one port, and when the main valve element is situated at the second position, the second communication means communicates the first selector port to said one port.

38. The channel selector valve according to claim 37, wherein the opposite port is formed at an opposite end of the housing in a direction of the central axis, and the communication means has a communication channel that communicates one end surface side of the main valve element to an opposite end surface side of the main valve element in the interior of the housing.

39. The channel selector valve according to claim 36, further comprising conversion means for converting a moving direction, which converts a movement of the main valve element in a direction of the central axis with respect to the housing into a movement in a rotational direction around the central axis, wherein the main valve element is movable in a direction of the central axis in the interior of the housing, and the driving means makes the main valve element have a reciprocating motion in a direction of the central axis with respect to the housing.

40. The channel selector valve according to claim 39, wherein
the conversion means for converting a moving direction comprises:
a cam groove that is provided in one out of the main valve element and the housing, and extends over a whole circumference of the rotational direction; and
a cam follower pin that is provided in another out of the main valve element and the housing, and moves in the cam groove,
the cam groove has a first and second cam grooves continuing with each other in the rotational direction, said first cam groove is formed inclined so as to part from the valve seat in a direction of the central axis as being displaced in the rotational direction, while said second cam groove is formed inclined so as to move nearer to the valve seat in a direction of the central axis as being displaced in the rotational direction.

41. The channel selector valve according to claim 40, wherein
the cam groove is provided in the housing, the housing comprises an outer housing and an inner housing received in the outer housing,
the inner housing comprises a first half and a second half divided in a direction of the central axis in a state that the inner housing is received in the outer housing, and
each guide, which constitutes the cam groove in a state that an end of the first half and an end of the second half are joined with each other, is formed at the respective ends of the first and second halves.

42. The channel selector valve according to claim 40, wherein
at least one port out of the inlet port and the outlet port is formed at the valve seat,
second communication means is formed at an end surface of the main valve element, the end surface faces the valve seat, said second communication means selectively communicates the opposite port to a first selector port out of the two selector ports in a state that the end surface sits down on the valve seat,
when the main valve element is situated at the first position, the second selector port is communicated to the opposite port by the second communication means of the main valve element, and the end surface of which sits down on the valve seat, and
when the main valve element is situated at the second position, the first selector port is communicated to the opposite port by the second communication means of the main valve element, and the end surface of which sits down on the valve seat.

43. The channel selector valve according to claim 42, wherein the opposite port is formed at an opposite end side of the housing in a direction of the central axis, and the communication means comprises:
a communication channel that communicates one end surface side of the main valve element to an opposite end surface side of the main valve element in the housing;
a subvalve that opens and closes the communication channel;
subvalve energizing means for energizing the subvalve toward a direction of closing; and
valve opening means for opening the subvalve against an energizing force by the subvalve energizing means in a state that the one end surface of the main valve element sits down on the valve seat.

44. The channel selector valve according to claim 43, wherein the housing is disposed so that the opposite end of the housing is situated lower than one end of the housing in a direction of the central axis, and the driving means employs an own weight of the main valve element at least as a part of the motive power.

45. The channel selector valve according to claim 43, wherein the driving means employs an energizing force by energizing means for energizing main valve element, which energizes the main valve element to part from the valve seat in a direction of the central axis, as a part of the motive power.

46. The channel selector valve according to claim 43, wherein the driving means comprises second energizing means for energizing the main valve element, which energizes the main valve element to move nearer to the valve seat in a direction of the central axis.

47. The channel selector valve according to claim 46, wherein the driving means comprises energizing means for energizing the main valve element, which energizes the main valve element to part from the valve seat in a direction of the central axis, due to a resultant force of an energizing force by the energizing means for energizing the main valve element and an energizing force by the second energizing means for energizing the main valve element, the cam follower pin is situated at an intermediate position of the cam groove except end portions of one end side and an opposite end side of the housing in a direction of the central axis, and the main valve element is situated at a neutral position halfway within a reciprocating motion in a direction of the central axis when the cam follower pin is situated at the intermediate position.

48. The channel selector valve according to claim 47, wherein
an end portion of the one end side of the housing in a direction of the central axis out of the cam groove is provided with a groove that continues to a join, at which one end of the first cam groove being situated at the one end side of the housing is connected to one end of the second cam groove,
the groove is formed so that the one end surface of the main valve element sits down on the valve seat in a state that the cam follower pin is situated at the groove,
the groove is disposed being displaced to the lower course than the
the groove is formed so that the one end surface of the main valve element sits down on the valve seat in a state that the cam follower pin is situated at the groove,
the groove is disposed being displaced to the lower course than the join in the rotational direction, and when the main valve element moves in the direction away from the valve seat in a direction of the central axis, a movement of the cam follower pin is controlled from the groove to a cam groove out of the first and second cam grooves, which is situated at the upper course than the groove in the rotational direction.

49. The channel selector valve according to claim 48, wherein an end portion of the opposite end side of the housing in a direction of the central axis out of the cam groove is provided with a second groove that continues to a join, at which an opposite end of the first cam groove being situated at the opposite end side of the housing is connected to an opposite end of the second cam groove, the second groove is formed so that the main valve element is the farthest away from the valve seat in a state that the cam follower pin is situated at the second groove, the second groove is disposed being displaced to the lower course than the second join in the rotational direction, and when the main valve element moves in the direction nearer to the valve seat in a direction of the central axis, a movement of the cam follower pin is controlled from the second groove to a cam groove out of the first and second cam grooves, which is situated at the upper course than the second groove in the rotational direction.

50. The channel selector valve according to claim 47, wherein an end portion of the opposite end side of the housing in a direction of the central axis out of the cam groove is provided with a second groove that continues to a join, at which an opposite end of the first cam groove being situated at the opposite end side of the housing is connected to an opposite end of the second cam groove, the second groove is formed so that the main valve element is the farthest away from the valve seat in a state that the cam follower pin is situated at the second groove, the second groove is disposed being displaced to the lower course than the second join in the rotational direction, and when the main valve element moves in the direction nearer to the valve seat in a direction of the central axis, a movement of the cam follower pin is controlled from the second groove to a cam groove out of the first and second cam grooves, which is situated at the upper course than the second groove in the rotational direction.

51. The channel selector valve as claimed in claim 36, wherein slide means for decreasing a sliding resistance between the housing and the main valve element is provided there between.

52. A compressor with the channel selector valve as claimed in claim 36 comprising:

a compressor housing having an inlet, which is connected to the outlet port;

a low pressure chamber that is provided in the interior of the compressor housing and communicates with the inlet;

a high pressure chamber that is provided in the interior of the compressor housing and partitioned off from the low pressure chamber; and a compressing section that is provided in the interior of the compressor housing, compresses fluid introduced into the low pressure chamber from the inlet, and guides the fluid into the high pressure chamber, wherein a part of the compressor housing partitioning the high pressure housing therein is integrally formed with a part of the housing having the inlet port therein, thereby the interior of the part of the housing communicates with the high pressure chamber.

* * * * *